US010060296B2

(12) United States Patent
Friesth

(10) Patent No.: US 10,060,296 B2
(45) Date of Patent: Aug. 28, 2018

(54) QUINTUPLE-EFFECT GENERATION MULTI-CYCLE HYBRID RENEWABLE ENERGY SYSTEM WITH INTEGRATED ENERGY PROVISIONING, STORAGE FACILITIES AND AMALGAMATED CONTROL SYSTEM CROSS-REFERENCE TO RELATED APPLICATIONS

(71) Applicant: Kevin Lee Friesth, Fort Dodge, IA (US)

(72) Inventor: Kevin Lee Friesth, Fort Dodge, IA (US)

(*) Notice: Subject to any disclaimer, the term of this patent is extended or adjusted under 35 U.S.C. 154(b) by 291 days.

(21) Appl. No.: 14/613,994

(22) Filed: Feb. 4, 2015

(65) Prior Publication Data

US 2015/0143806 A1 May 28, 2015

Related U.S. Application Data

(63) Continuation-in-part of application No. 14/081,271, filed on Nov. 15, 2013, now Pat. No. 9,624,913, and
(Continued)

(51) Int. Cl.
*F01K 3/00* (2006.01)
*F03G 6/06* (2006.01)
(Continued)

(52) U.S. Cl.
CPC .............. *F01K 3/00* (2013.01); *F01K 13/00* (2013.01); *F01K 13/02* (2013.01); *F01K 25/00* (2013.01);
(Continued)

(58) Field of Classification Search
CPC . F01K 3/00; F01K 13/02; F01K 13/00; F01K 25/00; F03G 6/067; F03G 6/068;
(Continued)

(56) References Cited

U.S. PATENT DOCUMENTS 4,094,148 A 6/1978 Nelson
5,272,879 A * 12/1993 Wiggs .................... F01K 25/08
165/45
(Continued)

FOREIGN PATENT DOCUMENTS

EP 0 084 815 8/1983
EP 2335813 6/2011
(Continued)

OTHER PUBLICATIONS

Patent Cooperation Treaty International Search Report and Written Opinion of the International Searching Authority.
(Continued)

*Primary Examiner* — Hoang Nguyen
(74) *Attorney, Agent, or Firm* — Brick Gentry PC; Brian J. Laurenzo; Srikant Mikkilineni

(57) ABSTRACT

Provided is a consumer to industrial scale renewable energy based quintuple-generation systems and energy storage facility. The present invention has both mobile and stationary embodiments. The present invention includes energy recovery, energy production, energy processing, pyrolysis, byproduct process utilization systems, separation process systems and handling and storage systems, as well as an open architecture for integration and development of additional processes, systems and applications. The system of the present invention primarily uses adaptive metrics, biometrics and thermal imaging sensory analysis (including additional input sensors for analysis) for monitoring and control with the utilization of an integrated artificial intelligence and automation control system, thus providing a balanced, environmentally-friendly ecosystem.

19 Claims, 50 Drawing Sheets

Related U.S. Application Data a continuation-in-part of application No. 14/267,580, filed on May 1, 2014.

(60) Provisional application No. 61/727,108, filed on Nov. 15, 2012, provisional application No. 61/859,377, filed on Jul. 29, 2013, provisional application No. 61/877,467, filed on Sep. 13, 2013, provisional application No. 61/886,213, filed on Oct. 3, 2013, provisional application No. 61/896,039, filed on Oct. 26, 2013, provisional application No. 61/926,372, filed on Jan. 12, 2014, provisional application No. 61/954,178, filed on Mar. 17, 2014, provisional application No. 61/972,365, filed on Mar. 30, 2014, provisional application No. 62/010,784, filed on Jun. 11, 2014.

(51) Int. Cl.
| | | |
|---|---|---|
| *F24J 2/54* | (2006.01) | |
| *F01K 13/02* | (2006.01) | |
| *F03G 7/04* | (2006.01) | |
| *F01K 13/00* | (2006.01) | |
| *F01K 25/00* | (2006.01) | |
| *F24J 2/07* | (2006.01) | |
| *F24J 2/14* | (2006.01) | |
| *F24J 2/18* | (2006.01) | |
| *F24J 2/52* | (2006.01) | |
| *F28D 20/00* | (2006.01) | |
| *F02G 1/043* | (2006.01) | |
| *F24J 2/46* | (2006.01) | |

(52) U.S. Cl.
CPC ............. *F03G 6/067* (2013.01); *F03G 6/068* (2013.01); *F03G 7/04* (2013.01); *F24J 2/07* (2013.01); *F24J 2/14* (2013.01); *F24J 2/18* (2013.01); *F24J 2/5241* (2013.01); *F24J 2/541* (2013.01); *F28D 20/0039* (2013.01); *F02G 1/043* (2013.01); *F24J 2/461* (2013.01); *F24J 2002/5462* (2013.01); *Y02E 10/41* (2013.01); *Y02E 10/45* (2013.01); *Y02E 10/46* (2013.01); *Y02E 10/47* (2013.01); *Y02E 20/14* (2013.01); *Y02E 60/142* (2013.01); *Y02E 70/30* (2013.01); *Y02P 80/24* (2015.11)

(58) Field of Classification Search
CPC ......... F03G 7/04; F28D 20/0039; F24J 2/541; F24J 2/5241; F24J 2/18; F24J 2/14; F24J 2/07; F24J 2002/5462; F24J 2/461; Y02E 60/142; Y02E 10/41; Y02E 70/30; Y02E 20/14; Y02E 10/47; Y02E 10/46; F02G 1/043

USPC ...... 60/641.2–641.4, 641.655, 659, 517–516
See application file for complete search history.

(56) References Cited

U.S. PATENT DOCUMENTS

| | | | | |
|---|---|---|---|---|
| 5,293,748 | A * | 3/1994 | Flanigan | F25B 9/14 60/517 |
| 5,465,708 | A * | 11/1995 | Goebel | F03G 6/06 126/635 |
| 5,507,158 | A * | 4/1996 | Bernier | F25B 17/08 62/480 |
| 6,311,513 | B1 * | 11/2001 | Tang | F25B 15/008 62/476 |
| 6,655,137 | B1 * | 12/2003 | Sardari | B01D 53/8668 60/280 |
| 7,877,999 | B2 * | 2/2011 | Nuel | F02G 1/043 60/398 |
| 7,954,321 | B2 * | 6/2011 | Shinnar | F03G 6/04 165/902 |
| 8,056,334 | B2 * | 11/2011 | Corbett, Jr. | B29C 43/027 264/239 |
| 2004/0058249 | A1 * | 3/2004 | Cai | H01M 8/0221 429/248 |
| 2010/0252028 | A1 * | 10/2010 | Mierisch | F01K 3/12 126/640 |
| 2011/0049992 | A1 * | 3/2011 | Sant'Anselmo | F03D 9/007 307/64 |
| 2011/0204717 | A1 * | 8/2011 | Shaffer | G06Q 40/04 307/18 |
| 2012/0100062 | A1 | 4/2012 | Nakamura et al. | |
| 2012/0122017 | A1 * | 5/2012 | Mills | F01K 23/064 429/504 |
| 2012/0159942 | A1 * | 6/2012 | Klassen | F02G 1/0435 60/522 |
| 2012/0171943 | A1 * | 7/2012 | Dunnavant | H05K 7/20745 454/184 |

FOREIGN PATENT DOCUMENTS

| | | |
|---|---|---|
| GB | 1 530 126 | 10/1978 |
| WO | WO2010092584 | 8/2010 |
| WO | WO2011011831 | 2/2011 |
| WO | WO2011/077248 | 6/2011 |
| WO | WO2011077248 | 6/2011 |

OTHER PUBLICATIONS

The extended European Search Report of the Patent Cooperation Treaty International Search Report and Written Opinion of the International Searching Authority.
Invitation to Pay Additional Fees including Communication Relating to the Results of the Partial International Search of the International Searching Authority.

* cited by examiner

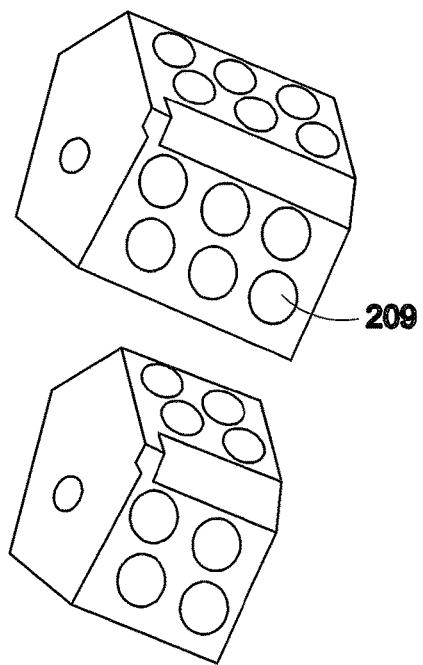
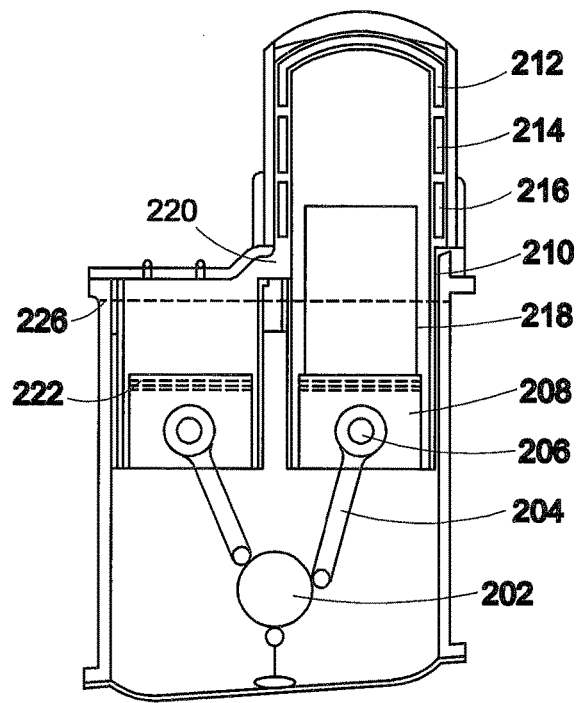
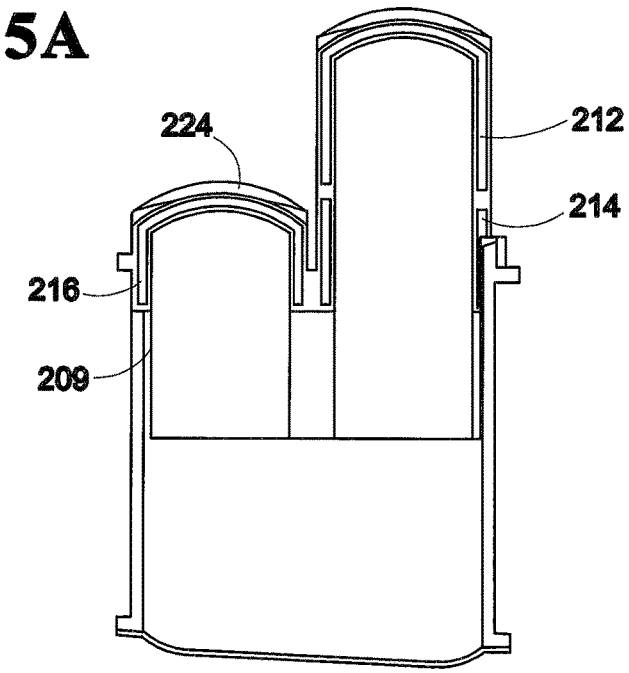
Fig. 5A
Fig. 5B
Fig. 5C

QUINTUPLE-EFFECT GENERATION MULTI-CYCLE HYBRID RENEWABLE ENERGY SYSTEM WITH INTEGRATED ENERGY PROVISIONING, STORAGE FACILITIES AND AMALGAMATED CONTROL SYSTEM CROSS-REFERENCE TO RELATED APPLICATIONS

CROSS-REFERENCE TO RELATED APPLICATIONS

This application claims priority from U.S. Provisional Application Ser. No. 61/727,108 filed Nov. 15, 2012 and entitled HYBRID WIND SOLAR HYDROGEN AMMONIA REGENERATE SYSTEM; from U.S. Provisional Application Ser. No. 61/859,377 filed Jul. 29, 2013 and entitled DISTRIBUTED HYBRID ENERGY GENERATION, STORAGE SYSTEM AND INTEGRATED MONITOR, ANALYSIS AND CONTROL SYSTEM; from U.S. Provisional Application Ser. No. 61/877,467 filed Sep. 13, 2013 entitled DISTRIBUTED HYBRID ENERGY GENERATION, STORAGE SYSTEM AND INTEGRATED MONITOR, ANALYSIS AND CONTROL SYSTEM; from U.S. Provisional Application Ser. No. 61/886,213 filed Oct. 3, 2013 entitled HYBRID SOLAR TRIGENERATION SYSTEM BASED MICROGRID CCHP PROVIDING HEATING, COOLING, ELECTRICAL GENERATION AND ENERGY STORAGE USING AN INTEGRATED AUTOMATION SYSTEM FOR MONITOR, ANALYSIS AND CONTROL; from U.S. Provisional Application Ser. No. 61/896,039 filed Oct. 26, 2013 entitled HYBRID TRIGENERATION SYSTEM BASED MICROGRID CCHP PROVIDING HEATING, COOLING, ELECTRICAL GENERATION AND ENERGY STORAGE USING AN INTEGRATED AUTOMATION SYSTEM FOR MONITOR, ANALYSIS AND CONTROL; from U.S. application Ser. No. 14/081,271 filed Nov. 15, 2013 entitled HYBRID TRIGENERATION SYSTEM BASED MICROGRID COMBINED COOLING, HEAT AND POWER PROVIDING HEATING, COOLING, ELECTRICAL GENERATION AND ENERGY STORAGE USING AN INTEGRATED AUTOMATION SYSTEM FOR MONITOR, ANALYSIS AND CONTROL; from Patent Cooperation Treaty Application Ser. No. PCT/US13/70313 filed Nov. 15, 2013 entitled HYBRID TRIGENERATION SYSTEM BASED MICROGRID COMBINED COOLING, HEAT AND POWER PROVIDING HEATING, COOLING, ELECTRICAL GENERATION AND ENERGY STORAGE USING AN INTEGRATED AUTOMATION SYSTEM FOR MONITOR, ANALYSIS AND CONTROL; from U.S. Provisional Patent Application Ser. No. 61/926,372 filed Jan. 12, 2014 and entitled AUTOMATED HYBRID AQUAPONICS AND BIOREACTOR SYSTEM INCLUDING PRODUCT PROCESSING AND STORAGE FACILITIES WITH INTEGRATED ROBOTICS, CONTROL SYSTEM, AND RENEWABLE ENERGY SYSTEM; from U.S. Provisional Application Ser. No. 61/954,178 filed Mar. 17, 2014 and entitled ULTRAGRID QUAD-EFFECT GENERATION MULTI CYCLE HYBRID RENEWABLE ENERGY SYSTEM WITH INTEGRATED ENERGY PROVISIONING, STORAGE FACILITIES AND AMALGAMATED CONTROL SYSTEM; from U.S. Provisional Application Ser. No. 61/972,365 filed Mar. 30, 2014 and entitled ULTRAGRID QUAD-EFFECT GENERATION MULTI-CYCLE HYBRID RENEWABLE ENERGY SYSTEM WITH INTEGRATED ENERGY PROVISIONING, STORAGE FACILITIES AND AMALGAMATED CONTROL SYSTEM; from U.S. patent application Ser. No. 14/267,580 filed May 1, 2014 and entitled AUTOMATED HYBRID AQUAPONICS AND BIOREACTOR SYSTEM INCLUDING PRODUCT PROCESSING AND STORAGE FACILITIES WITH INTEGRATED ROBOTICS, CONTROL SYSTEM, AND RENEWABLE ENERGY SYSTEM; from Patent Cooperation Treaty Application Ser. No. PCT/US14/36410 filed May 1, 2014 and entitled AUTOMATED HYBRID AQUAPONICS AND BIOREACTOR SYSTEM INCLUDING PRODUCT PROCESSING AND STORAGE FACILITIES WITH INTEGRATED ROBOTICS, CONTROL SYSTEM, AND RENEWABLE ENERGY SYSTEM; and from U.S. Provisional Application Ser. No. 62/010,784 filed Jun. 11, 2014 and entitled QUINTUPLE-EFFECT GENERATION MULTI-CYCLE HYBRID RENEWABLE ENERGY SYSTEM WITH INTEGRATED ENERGY PROVISIONING, STORAGE FACILITIES AND AMALGAMATED CONTROL SYSTEM. The contents of U.S. Provisional Application Ser. No. 61/727,108, U.S. Provisional Application Ser. No. 61/859,377, U.S. Provisional Application Ser. No. 61/877,467, U.S. Provisional Application Ser. No. 61/886,213, U.S. Provisional Application Ser. No. 61/896,039, U.S. application Ser. No. 14/081,271, Patent Cooperation Treaty Application Number PCT/US13/70313, U.S. Provisional Application Ser. No. 61/926,372, U.S. Provisional Application Ser. No. 61/954,178, U.S. Provisional Application. Ser. No. 61/972,365, U.S. application Ser. No. 14/267,580, Patent Cooperation Treaty Application Number PCT/US14/36410, and U.S. Provisional Application Ser. No. 62/010,784 are hereby incorporated in their entireties by reference.

FIELD OF THE INVENTION

The present invention relates to a highly scalable mobile and stationary Quintuple-effect generation renewable energy system and energy storage systems. The present invention also relates to processes of capturing and converting energy and monitoring said processes. More specifically, the invention relates to elements encompassing distributed energy generation, including hybrid wind and solar energy generation, energy transfer, energy conversion, energy storage, energy provisioning intelligent software and hardware interfacing offering energy monitoring, analysis and building automation/interfacing/control. Said elements include, but are not limited to, Stirling engines, absorption cooling systems and associated storage systems.

BACKGROUND

Prior art thermal energy sources consisted primarily of Gas Turbines, Microturbines, Reciprocating Engines, Steam Turbines, Nuclear Power Plants, Radioisotope Thermal Generator, Geothermal, Stirling Engines, Fuel Cells and other thermal input sources operating in conjunction with combined heating and power (CHP). The preferred method of the present invention encapsulates a Stirling engine and absorption cooling system and an associated storage system with integrated control system into an amalgamated energy ecosystem.

Prior art energy and thermal sources consisted primarily of gas turbines, microturbines, reciprocating engines, steam turbines, nuclear power plants, radioisotope thermal generator, geothermal, boilers, Stirling engines, fuel cells, thermal solar systems, and other thermal input sources, all of which generally used single cycle systems. These were generally accepted in prior art as a controlled and semi controlled method of creating usable work with an energy input, these methods are well documented in prior art and typically related information and supporting literature is readily and publicly available. Prior art single cycle implementations all suffered from lower efficiency and substandard performance to include non-optimized design and development. Prior art typically used steam as a primary medium to transfer thermal energy, steam suffers from low density thereby equating to lower thermal transfer yields and efficiency compared to other direct methods. The present invention's preferred embodiment offers a reliable thermal management system that is comprised of connections such as a thermosiphon for low thermal transfer use, heat pipe for high thermal transfer use, thermal exchanger using thermal transfer mediums such as steam, water and glycol mixture, oil or molten salt, a combination of these systems and components may be used for thermal temperature management of the thermal generational source. The preferred embodiment provides enhanced waste heat reclamation and energy recycling thereby gaining additional efficiency.

Each sequential prior art so called enhancement such as what is commonly but mistakenly referred to as combined cycle systems (CCS) was based on flawed design logic by inclusion of faulty and trouble prone prior art methods with non-optimized nor monetized integrated solutions, prior art typically included and incorporated a great many inefficient standalone applications and processes in prior art implementations thereby perpetrating substandard performance and similarly low operational efficiencies and associated characteristics.

Mobile methods of prior art would include automobiles, trucks, trains and ships using mechanical driven applications, stationary methods of prior art would include non-mobile applications such as pumps, compressors, generators, these lists are not to be considered exhaustive. The items listed above are only provided as examples of associated applications of fuel or energy driven forces for the expressed purpose of demonstrating enhancement and extension of functionality of integration with prior art methods of creating processes and applications to do work.

The preferred embodiment is encompassed within the encapsulation of a unified analysis, monitor, control and energy provisioning system, Stirling engine, absorption cooling, thermal storage and enhancing system efficiency from recycling and reclamation processes of thermal waste energy which defines a clear and present advantage to define the preferred method of the present invention over prior art and its implementations.

Prior art did in fact advance single cycle generations systems to use a secondary cycle, mistakenly named, targeted and narrowly envisioned as a combined cycle system. This type of system added a secondary generation method, typically using steam generation from thermal communication of waste heat as its process for the purpose of using inefficient steam turbines, increased capital cost ratios, expensive operations and management, increased water demand and usage from local supplies, the technology also carries with it an explosion risk and potential for injury to employees from related operational risks. Prior art use of combined cycles typically used energy usage level inputs as leverage against increase in total efficiency gains at depreciated advancement of energy usage efficiency. The preferred method of the present invention additional advantage to prior art comprises the application and processes of the preferred embodiment to expand and enhance value added advantages over prior art in that excess thermal energy to thermal energy storage with hot and cold thermal energy input to expand the available temperature band, additionally electrical generational energy may be stored as chemical energy storage as a medium for enhanced overall system efficiency, energy utilization and expanded energy storage capability.

Typically, thermal transfer methods such as thermosiphons, heat pipes and heat exchangers using transfer mediums such as molten salt, water, water/glycol, steam and other phase change materials typically require the use of pumps and compressors for pressure as the general accepted methods of applications and processes to communicate thermal energy from point to point. Additionally, thermosiphons and heat pipes may be substituted for the above methods for transfer and communication of thermal energy.

Prior art typically uses cooling towers for wet and dry cooling. Fans powered by electrical energy. The preferred method of the present invention uses Stirling engines using thermal waste heat to provide input basis for rotational energy generation for the cooling fan and using waste heat for supply to absorption cooling for higher efficiency of the Stirling usage of the cold thermal input and to facilitate higher cooling capacity of the cooling tower using waste heat to cold via absorption cooling.

The preferred method of the present invention will extend efficiencies and performance enhancements by inclusion and integration to previously installed prior art systems and devices such as nuclear power plants, coal power plants, natural gas power plants, geothermal power plants, radioisotope thermal generators and other applications that use thermal intensive applications that generate thermal energy typically use steam powered systems, typically and generally using steam turbines. These systems commonly use dry and wet cooling towers at the detriment of expunging usable thermal energy through the cooling towers steam release or associated cooling system typically by using additional energy to power the circulation cooling fans, water pumping and steam control system and excessive and water released as steam in many area's is a needed commodity not always readily available in bulk as is the case with wet cooling, or as in the case of dry cooling the excessive energy usage with the circulations cooling fans, coolant pumps and steam control systems. Steam systems also suffer from deterioration of their system components and pipes from the caustic effects of water stripped of suspended solids or pH balancing additives when converted to steam and its highly corrosive properties increasing operations and maintenance costs.

Prior art design of a Radioisotope Thermoelectric Generator (RTG) is simple by the standards of nuclear technology: the main component is a sturdy container of a radioactive material (the fuel). Typically, thermocouples where placed in the walls of the container, with the outer end of each thermocouple connected to a heat sink. Radioactive decay of the fuel produces thermal energy as heat which flows through the thermocouples to the heat sink, generating electricity in the process.

Typically, prior art RTG implementation uses a thermocouple which is a thermoelectric device that typically was used to convert thermal energy directly into electrical energy using the well-established "Seebeck effect". The application primarily consists of two kinds of metal, potentially comprised of semiconductors in which both can conduct electricity. These conductors are typically connected to each other in a closed loop topology. If the two junctions of these conductors are at different temperatures, an electric current will typically be found flowing in the loop.

Prior art RTG's generally use thermoelectric couples or "thermocouples" to convert thermal energy from the radioactive material thermal reaction for conversion into electricity. Generally, thermocouples are very reliable and have a relative long lifespan, they are however also highly inefficient; efficiencies above 10% have generally never been achieved and most RTGs have efficiencies between 3-7% and sustained power output also is a huge limiting factor. Research has been done with objectives to improve efficiency by using other technologies to generate electricity from the available thermal energy. The ultimate goal is that by achieving higher efficiency would translate into less radioactive fuel is required to generate the same amount of power, and therefore a lighter overall weight for the generator. This is a critically important factor in spaceflight launch, drone and other prototype development and associated cost considerations.

A thermionic converter—an energy conversion device which relies on the principle of thermionic emission—can achieve efficiencies between 10-20%, but requires higher temperatures than those at which standard RTGs typically operate. Other potentially extreme radioactive isotopes could also have been used to provide power, but short half-lives make these unfeasible. Several space-bound nuclear reactors have previously used thermionics, but nuclear reactors are generally too heavy to use on most small area implementations.

Dynamic generators can provide power at a multiple of times higher than the conversion efficiency of prior art RTGs. The preferred method of the present invention consists primarily of a next-generation radioisotope-fueled power source called the Stirling Radioisotope Generator (SRG) that uses free-piston Stirling engines coupled to alternators or a generator for the purpose of converting thermal energy to electricity. SRG prototypes demonstrated an efficiency of around 20%. The use of non-contacting moving parts, non-degrading flexural bearings, and a lubrication-free and hermetically sealed environment has, in test units, demonstrated no appreciable degradation over years of operation. Past experimental trials and corresponding results demonstrate that an SRG could continue running for decades with little or no maintenance. Vibration can be eliminated as a concern by implementation of dynamic balancing or use of dual-opposed piston movement. Potential applications of a Stirling radioisotope power system include exploration and science missions to deep-blue sea probes, drones and submarines, deep-space, space probes, landers, rovers, which would include bases on the Moon, Mars and other potential stationary bases. The preferred method of presentation advantage over prior art through its use of available thermal input into a Stirling engine and absorption cooling to widen the available thermal temperature band and increase usage of this temperature band thereby increasing efficiency and its advantage.

Liquid desiccant technology to perform dehumidification has been in use since the 1930s. A liquid desiccant is simply a liquid that has a high affinity for water (naturally absorbs moisture from the air) and is used as a drying agent. A desiccant refers to any substance that has a high affinity for water (hygroscopic) and is used as a drying agent.

Heat Recovery Ventilation (HRV) and Energy Recovery Ventilation (ERV) systems are typically ducted ventilation systems generally consisting of two fans—one to draw air in from outside and one to remove stale internal air. Throughout the cooling season, the system works to cool and dehumidify the incoming, outside air. This is primarily accomplished by the system taking the rejected heat and sending it into the exhaust airstream to recycle the thermal energy.

Subsequently, this air cools the condenser coil at a lower temperature than if the rejected heat had not entered the exhaust airstream. During the heating seasons, the system works in a reverse mannerism. Instead of discharging the heat into the exhaust airstream, the system draws thermal energy from the exhaust airstream in order to pre-heat the incoming air. It is at this point that the air passes through a primary unit and then into the controlled space. With this type of system, it is normal, during the cooling seasons, for the exhaust air to be cooler than the ventilation air and, during the heating seasons, warmer than the ventilation air. It is for this reason the system works very efficiently and effectively. The Coefficient of Performance (COP) will greatly increase as the conditions become more extreme and additional benefit and efficiency from the increased system loads when communicated from thermal storage enhances overall value and annual energy savings.

Energy recovery ventilation (ERV) systems are similar to HRV systems but they transfer water vapor carried as moisture in the form of humidity as well as heat energy, thereby controlling humidity levels. In the case of the summer season, they can remove some of the water vapor from the moisture-laden outdoor air before it is brought indoors; in the case of the winter season, they can transfer moisture in the form of humidity as well as heat energy to the incoming colder, dryer outdoor air. An air-to-air heat exchanger, generally installed in a roof space, recovers heat from the internal air before it is discharged to the outside, and warms the incoming air with the recovered heat. The efficiency of an ERV system is the ratio of energy transferred between the two air streams compared with the total energy transported through the heat exchanger. A heat recovery ventilation system is not a heating system, but it is typically able to recover between 65-95% of the heat from the exhaust air before it is discharged to outside.

Energy recovery ventilation (ERV) is the energy recovery process of exchanging the energy contained in typical controlled units and building area air and using it to treat whether in summer would precool or in winter preheat the incoming outdoor ventilation air in enclosed units, residential and commercial HVAC systems. For instance, during the warmer seasons, the system pre-cools and dehumidifies while humidifying and pre-heating in the cooler seasons. The benefit of using energy recovery is the ability to meet the appropriate ventilation & energy standards, while improving indoor air quality and reducing total energy requirements and associated HVAC equipment capacity requirements.

Desalination is known and generally accepted in prior art as a controlled and semi controlled environment for desalination and is well documented in prior art and typically related information and supporting literature is readily and publicly available. This apparatus can produce drinking water on an ultra large scale, at a price that is truly competitive with pumping from a reservoir or ground well or deep well aquifer, and produces no brine effluent to be disposed of due to the preferred method of the present invention of evaporation, distillation, processing, separation of associated minerals and components from ocean and seas water sources.

Many different types and methods have been developed and used over centuries of its use for fresh water supplies and as a method for salt extraction. Fresh water and salt are two essential elements required for a typical cycle of life for the survival of all living creatures which is including humans. The primary sources of salt is generally mined from rocks or extracted from sea water from the oceans and seas.

Maximum consumption of salt is in its natural form after being produced from oceans, seas or mined directly from rock formations. Salt is needed in regulating the fluid balance or water content of body. Through time, awareness about the use and potential abuse of salt has grown tremendously and the demand for refined iodized salt has increased dramatically over the last few years. Salt cravings may occur as a result of trace mineral deficiencies or due to the deficiency of sodium chloride itself.

Salt is important for preservation of life, but misuse and overconsumption can cause serious health problems, such as high blood pressure and inflammation, more so from those individuals who are genetically predisposed to hypertension. Diets high in salt also known as sodium, tied to hypertension and heart risk in some studies, may also worsen diseases caused by abnormal immune response, laboratory research suggests.

In recent studies, mice fed high-salt diets had a more severe version of an animal form of multiple sclerosis, an autoimmune disease that affects the central nervous system. Additional studies show the cells interact with the body to promote inflammation. Additionally, autoimmune diseases, illnesses such as psoriasis and asthma in which the system that protects the body from invaders wrongly attacks healthy cell from excessive salt intake.

Desalination, desalinization or desalting refers to one of several processes that are used to remove a desired amount of salt and other minerals from saline water, brine and seawater. Typically, desalination may also refer to the removal of salts and minerals from soil. Generally, seawater is desalinated to produce fresh water, commonly referred to as potable water which is suitable for human and animal consumption or used for crop irrigation. Some potential byproducts of seawater desalination if separated and processed are salt, gypsum, magnesium chloride, magnesium sulfate, potassium chloride, potassium hydroxide, boron and bromine, the above list is not exhaustive, and this does not reflect the entire list of recoverable salts and minerals from oceans and seas.

Desalination is the method to access fresh water used in countries that lack natural fresh water supplies and additionally used aboard many sea going ships and submarines. Most current efforts with desalination, recycling surface runoff and wastewater processing are typically focused on developing cost-effective ways of providing fresh potable water for hydration and irrigation. Along with and including wastewater which is one of the few rainfall-independent water sources.

Data Center prior art and past design approach implementations generally maintained the philosophy of filling the room to capacity with components and then attempt best effort using the best-known methods available to cool it and provide emergency power for backup purposes. Typically, data centers were designed for tight spacing and for air flow through the floor, up through the data center cases and out through the top which was then vented from the room through ducts. Prior art typically used large air conditioners or mechanical chillers, then efforts to use more imaginative methods using what worked well in the past with the use of evaporative cooling system, this was paired with an external airside economizer by bringing in colder air from outside which cools the facility and the data center computers, the weakness of this system is the extremely low density of air, more so in its highly limited thermal energy transfer ability and the rapidly changing outside temperatures greatly affecting performance and efficiency.

Concrete is a composite material composed of coarse granular material the aggregate and/or filler embedded in a hard matrix of material the cement and/or binder that fills the space among the aggregate particles and glues them together. The word concrete comes from the Latin word "concretus" which means compact or condensed, the perfect passive participle of "concrescere", from "con" which means together and "crescere" which means to grow.

Modern structural concrete differs from Roman concrete in two important details. First, its mix consistency is fluid and homogeneous, allowing it to be poured into forms rather than requiring hand-layering together with the placement of aggregate, which, in Roman practice, often consisted of rubble. Second, integral reinforcing steel gives modern concrete assemblies great strength in tension, whereas Roman concrete could depend only upon the strength of the concrete bonding to resist tension.

Concrete is widely used for making architectural structures, foundations, brick/block walls, pavements, bridges/overpasses, highways, runways, parking structures, dams, pools/reservoirs, pipes, footings for gates, fences and poles and even boats. Concrete is used in large quantities almost everywhere mankind has a need for infrastructure. The amount of concrete used worldwide in a ton for ton comparison is typically twice that of steel, wood, plastics, and aluminum combined. Concrete's use as a material commonly exceeds all others and is only exceeded by use of naturally occurring freshwater.

Concrete is also the basis of a large commercial industry. Globally, the ready-mix concrete industry, the largest segment of the concrete market, is projected to exceed $100 billion in revenue by 2015. Given the size of the concrete industry, and the fundamental way concrete is used to shape the infrastructure of the modern world, it is difficult to overstate the role this material plays today.

There are many types of concrete available, created by varying the proportions of the main ingredients below. In this way or by substitution for the cementitious and aggregate phases, the finished product can be tailored to its application with varying strength, density, or chemical and thermal resistance properties. "Aggregate" consists of large chunks of material in a concrete mix, generally a coarse gravel or crushed rocks such as limestone, or granite, along with finer materials such as sand. "Cement", commonly Portland cement, and other cementitious materials such as fly ash and slag cement, serve as a binder or a Ligare for the aggregate.

Water is then mixed with this dry composite, which produces a semi-liquid that workers can shape (typically by pouring it into a form or mold). The concrete solidities and hardens to rock-hard strength through a chemical process called hydration. The water reacts with the cement, which bonds the other components together, creating a robust, sturdy and stone-like material. "Chemical admixtures" are added to achieve varied properties. These ingredients may speed or slow down the rate at which the concrete hardens, and impart many other useful properties. "Reinforcements" are often added to concrete. Concrete can be formulated with high compressive strength, but always has lower tensile strength. For this reason, it is usually reinforced with materials that are strong in tension (often steel or more recently with composites).

"Mineral admixtures" are becoming more popular in recent decades. The use of recycled materials as concrete ingredients has been gaining popularity because of increasingly stringent environmental legislation, and the discovery that such materials often have complimentary and valuable properties. The most conspicuous of these are fly ash, a by-product of coal-fired power plants, and silica fume, a byproduct of industrial electric arc furnaces. The use of these materials in concrete reduces the amount of resources required, as the ash and fume act as a cement replacement. The preferred method of the present invention uses gypsum and ash from desalination to monetize both applications and their associated efficiency over prior art. This displaces some cement production, an energetically expensive and environmentally problematic process, while reducing the amount of industrial waste that must be disposed of.

The required mixture depends on the type of structure or object being built, how the concrete is mixed and delivered, and how it is placed to form the structure or mold the object. Portland cement is the most common type of cement in general usage today for modern day construction. It is a basic ingredient of concrete, mortar and plaster. It consists of a mixture of oxides of calcium, silicon and aluminum. Portland cement and similar materials are made by heating limestone (a source of calcium) with clay and grinding this product (called clinker) with a source of sulfate (most commonly gypsum).

A brick is a block, or a single unit of a ceramic material used in masonry construction. Typically, bricks are stacked together or laid as brickwork using various kinds of mortar to hold the bricks together and make a permanent structure. Bricks are typically produced in common or standard sizes in bulk quantities. They have been regarded as one of the longest lasting and strongest building materials used throughout recorded history.

In the general sense, a "brick" is a standard-sized weight-bearing building unit. Bricks are laid in horizontal courses, sometimes dry and sometimes with mortar. When the term is used in this sense, the brick might be made from clay, lime-and-sand, concrete, or shaped stone. In a less clinical and more colloquial sense, bricks are made from dried earth, usually from clay-bearing subsoil. In some cases, such as adobe, the brick is merely dried. More commonly it is fired in a kiln of some sort to form a true ceramic. Prior art suffers from inefficiency during kiln process which is a substantial energy requirement. Prior art additionally was not able to benefit from which the preferred method of the present invention uses coils and heat exchangers to recover waste energy for enhanced efficiencies of all included thermal energy intensive application and processes. Prior art lacked thermal energy storage systems to benefit efficiency from thermal energy recovery and thermal energy reuse.

Prior art of brick and block making application and processes typically was never fully or partially automated due to its inherent design and deployment flaws. The preferred method of the present invention uses metrics, biometrics and thermal imaging technologies of analysis, monitoring and control of the brick making process using amalgamated with artificial intelligence and automation including robotics to reduce or eliminate injuries and enhanced uptime, productivity and enhanced volume.

Aluminum smelting is the process of extracting aluminum from its oxide, alumina, generally by the Hall-Héroult process however alumina is extracted from the ore bauxite by means of the Bayer process at an alumina refinery. This is an electrolytic process as such an aluminum smelter uses tremendous amounts of electrical energy; they tend to be located very close to huge energy generation stations, often hydro-electric ones. Additionally, they are located near ocean and seaports with a majority of smelter's use imported alumina. A very large amount of carbon is typically used in this process, often resulting in significant amounts of GHG emissions with carbon dioxide and carbon monoxide most prevalent. The preferred method of the present invention integration of emissions capture, sequestering and reuse creates an environmental friendly solution while reducing the carbon footprint over prior art.

Prior art defined a process called Hall-Héroult electrolysis which is the typical production route for primary process and commonly used method for aluminum production. This process uses an electrolysis cell which is typically made of a steel shell with a series of insulating linings of refractory materials. The cell consists of a brick-lined outer steel shell as a container and as support structure. Comprised within the shell, consists of cathode blocks are cemented together by ramming paste. Basis for the top of the cell lining is in contact with the molten metal which then acts as the cathode. The molten electrolyte must be maintained at high temperature inside the cell to prevent solidification. The prebaked anode is typically made of carbon, generally in the form of large sintered blocks suspended in the electrolyte. Typically, a single Soderberg type of electrode or a predetermined number of prebaked carbon blocks which are generally used as the anode, while the principal formulation and the fundamental reactions occurring on their surface are normalized for consistent energy distribution and production.

An aluminum smelter consists of a large number of cell and typically referred to as pots in which the electrolysis process takes place. A typical small smelter may contain anywhere from as little as 40 pots which may be used in small facilities and though the largest proposed smelters are up to sixty-five times that capacity which has approached near 2,500 pots in major smelting facilities, each pot typically produces approximately one ton of aluminum production a day. Smelting is operated as a batch process, with the aluminum metal deposited at the bottom of the pots and periodically transferred away for final processing. Energy supplies must be consistent and constantly available.

The hot blast temperature can be from 900° C. to 1300° C. (1600° F. to 2300° F.) depending on the stove design and condition. The temperatures they deal with may be 2000° C. to 2300° C. (3600° F. to 4200° F.). Oil, tar, natural gas, powdered coal and oxygen can also be injected into the furnace at a tuyere level in the furnace area to combine with the coke to release additional energy and increase the percentage of reducing gases present which is necessary to increase productivity. In the second stage, known as steelmaking, impurities such as sulfur, phosphorus, and excess carbon are removed and alloying elements such as manganese, nickel, chromium and vanadium are added to produce the exact steel required. Steel mills then turn molten steel into blooms, ingots, slabs and sheet through casting, hot rolling and cold rolling.

An integrated steel mill has all the functions for primary steel production: A) iron making (conversion of ore to liquid iron); B) steelmaking (conversion of pig iron to liquid steel), casting (solidification of the liquid steel); C) roughing rolling/billet rolling (reducing size of blocks); and D) product rolling (finished shapes). The principal raw materials for an integrated mill are iron ore, limestone, and coal (or coke) or a replacement carbon input. These materials are charged in batches into a blast furnace where the iron compounds in the ore give up excess oxygen and become liquid iron. At intervals of a few hours, the accumulated liquid iron is tapped from the blast furnace and either cast into pig iron or directed to other vessels for further steelmaking operations. Historically the Bessemer process was a major advancement in the production of economical steel, but it has now been entirely replaced by other processes such as the basic oxygen furnace.

Cast iron is iron or a ferrous alloy which has been heated until it liquefies, and is then poured into a mold to solidify. It is usually made from pig iron. The alloy constituents affect its color when fractured: white cast iron has carbide impurities which allow cracks to pass straight through. Grey cast iron has graphitic flakes which deflect a passing crack and initiate countless new cracks as the material breaks.

Carbon (C) and silicon (Si) are the main alloying elements, with the amount ranging from 2.1-4 wt % and 1-3 wt %, respectively. Iron alloys with less carbon content are known as steel. While this technically makes these base alloys ternary Fe—C—Si alloys, the principle of cast iron solidification is understood from the binary iron carbon phase diagram. Additionally, ceramics can be added for high performance alloy use. Since the compositions of most cast irons are around the eutectic point of the iron-carbon system, the melting temperatures closely correlate, usually ranging from 1,150 to 1,200° C. (2,100 to 2,190° F.), which is about 300° C. (572° F.) lower than the melting point of pure iron. The preferred method of the present invention to enhance efficiency communicating thermal energy from thermal energy storage for the purpose of preheating and heating the thermal intensive cast iron processes.

Cast iron tends to be brittle, except for malleable cast irons. With its relatively low melting point, good fluidity, capability, excellent machinability, resistance to deformation and wear resistance, cast irons have become an engineering material with a wide range of applications and are used in pipes, machines and automotive industry parts, such as cylinder heads (declining usage), cylinder blocks and gearbox cases (declining usage). It is resistant to destruction and weakening by oxidation (rust).

Enzymes are proteins, which act as catalysts. Enzymes lower the energy required for a reaction to occur, without being used up in the reaction. Many types of industries, to aid in the generation of their products, utilize enzymes. Examples of these products are; cheese, alcohol and bread. Fermentation is a method of generating enzymes for industrial purposes.

Fermentation involves the use of microorganisms, like bacteria and yeast to produce the enzymes. There are two methods of fermentation used to produce enzymes. These are submerged fermentation and solid-state fermentation. Submerged fermentation involves the production of enzymes by microorganisms in a liquid nutrient media. The enzymes are recovered by methods such as centrifugation, for extra-cellularly produced enzymes and lysing of cells for intracellular enzymes. Many industries are dependent or interdependent on enzymes for the production of their goods. Industries that use enzymes generated by fermentation are the brewing, wine making, baking, cheese production and other uses requiring breakdown of materials.

Corn milling process is approximately 20% of the annual corn harvest is currently used by industrial corn processors to produce a variety of products such as sweeteners, starches, oils, ethanol and animal feeds. The great majority of the remainder is fed to livestock, poultry & fish. This versatile grain is comprised of four primary components that make manufacturing of a variety of products and byproducts possible. Corn's typical components are Starch (61%), Corn oil (4%), Protein (8%) and Fiber (11%)—approximately 16% of the corn kernel's weight is moisture. The preferred embodiment involves corn wet milling as the primary method of processing and each method produces distinct products and feedstocks for co-products and their associated production.

While the wet milling process is capital intensive with potentially higher operating costs, the ability to produce a variety of products can be valuable offset in dealing with volatile markets. The wet milling process results in slightly lower ethanol yields than a traditional dry milling process since some of the fermentable starch exits the process attached to the saleable co-products.

The Corn wet-milling process is designed to extract the highest use and value proposition from each component of the corn kernel, the preferred method of the present invention comprises the process beginning with the corn kernels being soaked in large tanks called steep tanks in a dilute aqueous sulfur dioxide solution, additionally the preferred embodiment uses thermal energy input from storage to assist in softening corn kernels and to eliminate any bacteria that may be present that could contaminate and degrade further steps in the process. The softened kernel is then processed to remove the germ which is further processed to remove the high-value corn oil. The Germ Meal remaining after the oil is extracted and marketed for animal feed use.

Following germ removal, the remaining kernel components are separated to remove the fiber. The fiber is then combined with the evaporated, concentrated and dried steep liquor and other co-product streams to produce Corn Gluten Feed. The starch and gluten protein subsequently pass through the screens and the starch-gluten slurry is sent to centrifugal separators where the lighter gluten protein and the heavier starch are separated. The gluten protein is then concentrated and dried to produce Corn Gluten Meal, a 60% protein feed. Animal feeds corn gluten feed (CGF) and corn gluten meal (CGM). For purposes defined within CGF and its processed plankton (blue green algae) additives will be referred to as enhanced feed grains (EFG). The preferred method of the present invention incorporates using waste thermal energy and waste $CO_2$ generation for plankton inputs which yields vertical markets compared to prior art expulsion of both with little or no reclamation or recycling to benefit the same.

Some of the starch is then washed and dried or modified and dried. These starch products are marketed to the food, paper, and textile industries. The remaining starch can be processed into products such as high fructose sweeteners or ethanol. Typically, an average bushel of corn yields 31.5 lbs. of Starch, 12.5 lbs. of Gluten Feed, 2.5 lbs. of Gluten Meal and 1.6 lbs. of Corn Oil.

Ethanol is considered a quasi-renewable energy source due to fact that the energy is partially generated by using a resource, sunlight, which cannot be depleted, it must be noted however that the planting, fertilizing and harvesting process requires vast amounts of energy that typically came from non-renewable sources.

Creation of ethanol starts with photosynthesis causing a feedstock, such as sugar cane or a grain such as maize (corn), or even switch grass to grow. These feedstocks are processed via milling or cellulosic processes into ethanol. It can be made from petroleum products via catalytic hydration of ethylene with sulfuric acid as the catalyst. Ethanol may also be obtained via ethylene or acetylene, from calcium carbide, coal, oil gas, and other sources. Petroleum derived nonrenewable based ethanol (synthetic ethanol) is chemically identical to bio-ethanol and can be differentiated only by radiocarbon dating.

Bio-ethanol is usually obtained from the conversion of carbon-based feedstock. Agricultural feedstocks are considered renewable because they get energy from the sun using photosynthesis, provided that all minerals required for growth (such as nitrogen and phosphorus) are returned to the land. Ethanol can be produced from a variety of feedstocks such as sugar cane, bagasse, Miscanthus, sugar beet, sorghum, grain, switchgrass, barley, hemp, kenaf, potatoes, sweet potatoes, cassava, sunflower, fruit, molasses, corn, Stover, grain, wheat, straw, cotton, other biomass, as well as many types of cellulose waste and harvestings, whichever has the best well-to-wheel assessment.

Carbon fiber is a type of woven carbon filament. For the rigid composite material made from carbon fiber used in aerospace and other applications are commonly combined composite formed by introduction of a Carbon fiber reinforced polymer matrix.

Prior art Carbon fiber, alternatively graphite fiber, carbon graphite or CF, is a material consisting of fibers typically about 5-10 µm in diameter and primarily composed mostly of carbon atoms. To produce carbon fiber, the carbon atoms are bonded together in crystals that are more or less aligned parallel to the long axis of the fiber as the crystal alignment gives the fiber high strength-to-volume ratio (making it strong for its size). Several thousand carbon fibers are bundled together to form a tow, which may be used by itself or woven into a fabric.

The properties of carbon fibers, such as high stiffness, high tensile strength, low weight, high chemical resistance, high temperature tolerance and low thermal expansion. Due to these advantages the popularity and growing interest is a groundswell of effort and investment, this stems from industries such as aerospace, civil engineering, military, and motorsports, along with host of other competition sports. It is worth while noting however that Carbon Fiber is relatively expensive when compared to similar fibers, such as glass fibers or plastic fibers.

Carbon fibers are usually combined with other materials to form an advanced composite material. When combined with a plastic resin and wound or molded it forms carbon fiber reinforced polymer (often referred to as carbon fiber) which has a very high strength-to-weight ratio usually compared to the characteristics of steel that is also extremely rigid although Carbon Fiber is somewhat brittle. Special note may be taken however that it can demonstrated that Carbon Fibers when composed with other materials, such as with graphite and graphene to form carbon-carbon composites, which have a very high heat tolerance. There are a host of other additives such as titanium and other bonding elements that can enhance the characteristics of the sought composite requirements.

A 6 µm diameter carbon filament can be compared to the diameter of a human hair. Each carbon filament thread is a bundle of many thousand carbon filaments. A single such filament is a thin tube with a diameter of 5-8 micrometers and consists almost exclusively of carbon. The atomic structure of carbon fiber is similar to that of graphite, consisting of sheets of carbon atoms (graphene sheets) arranged in a regular hexagonal pattern, the difference being in the way these sheets interlock. Graphite is a crystalline material in which the sheets are stacked parallel to one another in regular fashion. The intermolecular forces between the sheets are relatively weak Van der Waals forces, giving graphite its soft and brittle characteristics.

Depending upon the precursor to make the fiber, carbon fiber may be turbostratic or graphitic, or have a hybrid structure with both graphitic and turbostratic parts present. In turbostratic carbon fiber the sheets of carbon atoms are haphazardly folded, or crumpled, together. Carbon fibers derived from Polyacrylonitrile (PAN) are turbostratic, whereas carbon fibers derived from mesophase pitch are graphitic after heat treatment at temperatures exceeding 2200° C. Turbostratic carbon fibers tend to have high tensile strength, whereas heat-treated mesophase-pitch-derived carbon fibers have high Young's modulus (i.e., high stiffness or resistance to extension under load) and high thermal conductivity.

Carbon fiber is most notably used to reinforce composite materials, particularly the class of materials known as carbon fiber or graphite reinforced polymers. Non-polymer materials can also be used as the matrix for carbon fibers. Due to the formation of metal carbides and corrosion considerations, carbon has seen limited success in metal matrix composite applications. Reinforced carbon-carbon (RCC) consists of carbon fiber-reinforced graphite, and is used structurally in high-temperature applications. The fiber also finds use in filtration of high-temperature gases, as an electrode with high surface area and impeccable corrosion resistance, and as an anti-static component. Molding a thin layer of carbon fibers significantly improves fire resistance of polymers or thermoset composites because a dense, compact layer of carbon fibers efficiently reflects heat. The use of carbon fiber composites is commonly used as a direct replacement for aluminum from many commercial applications in favor of other metals because of galvanic corrosion issues.

Precursors for carbon fibers are polyacrylonitrile (PAN), rayon and pitch. Carbon fiber filament yarns are used in several processing techniques: the direct uses are for prepregging, filament winding, pultrusion, weaving, braiding, etc. Carbon fiber yarn is rated by the linear density (weight per unit length, i.e. 1 g/1000 m=1 tex) or by number of filaments per yarn count, in thousands. For example, 200 tex for 3,000 filaments of carbon fiber is three times as strong as 1,000 carbon filament yarn, but is also three times as heavy. This thread can then be used to weave a carbon fiber filament fabric or cloth. The appearance of this fabric generally depends on the linear density of the yarn and the weave chosen. Some commonly used types of weave are twill, satin and plain. Carbon filament yarns can also be knitted or braided.

Pyrolysis is the heating of an organic material, such as biomass, in the absence of oxygen. Pyrolysis is the chemical decomposition is induced in organic materials by heat in the absence of oxygen. Organic materials are transformed into gaseous components and a solid residue (coke) containing fixed carbon and ash. Typical Pyrolysis Process is formally defined as chemical decomposition induced in organic materials by heat in the absence of oxygen. In practice, it is not possible to achieve a completely oxygen-free atmosphere; actual pyrolytic systems are operated with less than stoichiometric quantities of oxygen. Because no oxygen is present the material does not combust but the chemical compounds (i.e. cellulose, hemicellulose and lignin) that make up that material thermally decompose into combustible gases and charcoal.

Most of these combustible gases can be condensed into a combustible liquid, called pyrolysis oil or bio-oil, though there are some permanent gases such as CO2, CO, H2, light hydrocarbons. Typically, pyrolysis of biomass produces three products: one liquid, bio-oil, one solid, bio-char and one gaseous (syngas). The proportion of these products depends on several factors including the composition of the feedstock and process parameters. Some oxygen will be present in any pyrolytic system, nominal oxidation will occur. If volatile or semi-volatile materials are present in the waste, thermal desorption will also occur. Pyrolysis is an emerging technology. Although the basic concepts of the process have been validated, the performance data for an emerging technology are not yet fully appreciated.

Bio-oil is a dense complex mixture of oxygenated organic compounds. It has a fuel value that is generally 50-70% that of petroleum bases fuels and can be used as boiler fuel or upgraded to renewable transportation fuels. Using the above method of the present invention consists of separation promoting pure product outputs with high quality when compared to convention bio-oil processed by prior art systems. It density is >1 kg L-1, much greater than that of biomass feedstock, making it more cost effective to transport than biomass.

All pyrolysis-based feedstock production follows the same basic pattern. It's similar in concept and chemistry to the epochal processes that produced petroleum, just taking place over a much shorter time. Biomass such as corn Stover, sawdust, or switch grass or other ag or biomass material is subjected to high pressure and heat in an oxygen-free atmosphere. The material decomposes, without combusting, into water plus carbon-rich gases, solids, and liquids.

The gas portion, mostly a mixture of H2 and CO called syngas, can be used as fuel or further processed into hydrocarbons. The solid, known as coke or char, is around 90% carbon and was usually and generally burned to provide heat for the process, the preferred method of the present invention uses renewable energy generational input whereas coke has a higher value usage when provided as the preferred base carbon product such as the coke in the combined steel and aluminum production and recycling facility. The liquid, known as pyrolysis oil, is a mixture of oxygenated hydrocarbons that can be chemically reduced to create a gasoline-like fuel.

Ethanol fermentation and pyrolysis aren't the only energy-related uses for biomass. Cogeneration can burn the material to generate steam turbine heat. Gasification can convert it into syngas, which can be processed into liquid fuels using Fischer-Tropsch chemistry, an expensive but established industrial process.

Pyrolysis generally yields a higher-value end product per pound of biomass than cogeneration and can be transformed to a liquid more cost effectively than gasification and liquefied to the quality of drop-in fuels and bio created lubrications. The preferred method of the present invention of renewable thermal energy for pyrolysis forms a primary solution for use of biomass for renewable lubrication and char and/or coke production and reduction and/or elimination of the need for use of fossil fuels for energy or as component feedstock required for modern chemical basis and production.

Pyrolysis of organic materials produces combustible gases, including carbon monoxide, hydrogen and methane, and other hydrocarbons. If the off-gases are cooled, liquids condense producing an oil/tar residue and contaminated water. Pyrolysis typically occurs under pressure and at operating temperatures above 430° C. (800° F.). The pyrolysis gases require further treatment. It should be noted that this thermal range is well within the range of solar thermal energy production range which would equate that no external energy generation would be needed using stored thermal energy as the energy input basis.

Conventional thermal treatment methods, such as rotary kiln, rotary hearth furnace, or fluidized bed furnace, are used for waste pyrolysis. Kilns or furnaces used for pyrolysis, potentially for incineration would be physically similar but would operate at lower temperature and with less air supply than would be required for combustion. Molten salt process may also be used for waste pyrolysis. These processes are described in the following sections:

Rotary Kiln

The rotary kiln is a refractory-lined, slightly-inclined, rotating cylinder that serves as a heating chamber.

Fluidized Bed Furnace

The circulating fluidized bed uses high-velocity air to circulate and suspend the waste particles in a heating loop and operates at temperatures up to 430° C. (800° F.).

Molten Salt Destruction

Molten-salt destruction is another type of pyrolysis. In molten-salt destruction, a molten salt incinerator uses a molten, turbulent bed of salt, such as sodium carbonate, as a heat transfer and reaction/scrubbing medium to destroy hazardous materials. Shredded solid waste is injected with air under the surface of the molten salt. Hot gases composed primarily of carbon dioxide, stream, and unreacted air components rise through the molten salt bath, pass through a secondary reaction zone, and through an emission gas recycle and cleanup system before discharging to the atmosphere. Other pyrolysis by-products react with the alkaline molten salt to form inorganic products that are retained in the melt. Spent molten salt containing ash is tapped from the reactor, cooled and recycled.

The word farming in the sense of an agricultural landholding derives from the verb "to farm" a revenue source, whether taxes, customs, rents of a group of manors or simply to hold an individual manor by the feudal land tenure of "fee farm". The word is from the medieval Latin noun "firma" meaning "a fixed agreement, contract", from the classical Latin adjective "firmus" which means "strong, stout, firm." In the medieval age, virtually all manors and major estates and noblemen were engaged in the business of agriculture, many included their own blacksmiths and other sub skill classes to provide bases to be supportive of their farming efforts which was typically a principal revenue source, as such to hold a manor and become a noblemen by the tenure of "fee farm" became synonymous with the practice of agriculture itself. Farm control and land ownership has traditionally been a key indicator of status and power, especially in Medieval European agrarian societies.

Typically, a farm is an area of land commonly referred to as agriculture or water commonly referred to as aquaculture, either of these may include various structures and substructures that are primarily devoted to the practice of producing and managing food (i.e. produce, grains, and animals such as livestock or aquatic species. It is the basic production facilities used for food production and or generation. Generally, a farm may be owned and operated by a single individual, family, community, corporation or a company. A typical farm can be a scale any size from a fraction of an acre to several or tens of thousands of acres.

A business producing tree fruits, berries, syrups or nuts is called an orchard; a vineyard produces grapes. The stable is used for operations principally involved in the training of horses. Stud and commercial farms breed and produce other animals and livestock. A farm that is primarily used for the production of milk, cream or cheese and other dairy products is typically called a dairy farm. Additional specialty farms include aquaponics which can be aeroponics or hydroponics for the growth of plants or aquaculture otherwise referred to as an aquatic farm or a fish farm, which would raise fish in pens and tanks to grow as a food source, and tree farms, which grow trees for sale for transplant, lumber, or decorative use.

Desalination, Distillation, Evaporator, Steel Mill, Mini Mill, Plastics and Polymer component production, Carbon Fiber production, Cast Iron production, TARDUS Defense system, Absorption Cooling, Cold Storage, Dry Storage, Fast Freeze System, Wind turbines, solar generators, thermal solar, photovoltaic solar, chemical and thermal energy storage, Stirling applications and processes, chiller, refrigeration, heating and air conditioning, water heating, distillation, water purification and desalination systems, electrical regeneration using various types of fuel, chemical and thermal sources in various designs and configurations for providing an energy generation responds to fulfill energy needs to include other processes and separation applications and processes are well known in prior art. It is envisioned that the electrical wiring, liquid, semi liquid and solid material transfer conduits may consist of conduits, ducts, pipes, hoses, pneumatic tubing, conveyer belts, or any means of connecting loops and circuits, conveying solid and/or semi-solid matter.

However, prior art of the above systems and devices, particularly when said referenced inventions are physically deployed they generally are not planned, established or orchestrated to benefit from higher efficiency as integral components as elements in an integrated multi-level control system environment by forming a complete and essential logical cycle or in otherwise would be referred to as an energy ecosystem, generally systems are planned for a deployment with an efficiency basis as an independent device with subpar system design performance.

Deployment of prior art had required higher part count, increased manufacturing costs, increased assembly costs, increased transportation costs, increased subpart count and more costly parts with larger custom parts inventory required, overlapping and duplicated subsystems, frequent problematic maintenance and repair costs, rising levelized cost of energy and products production, additionally causes higher operating expenses, grid energy connection and transfer line losses.

Prior art smart grid designs and integrations primarily use smart meters on consumer connections to monitor usage. Improving upon previous art of smart grid implementation of the current invention is effectuated via monitoring usage, identifying the energy usage sources through device data transmitting, manual consumer input and from its common electrical signal fingerprint, storing profile data sets, responding with appropriate energy assumptions from extracted usage profiles, analysis of time of day usage for enhanced energy load response for power quality and energy availability to enhance grid stability.

Wind energy technology is typically used to convert kinetic energy from wind into mechanical energy and/or electricity. To extract wind power, a wind turbine may include a rotor with a set of blades and a rotor shaft connected to the blades. Wind passing over the rotor connected blades may cause the blades to turn and the rotor shaft to rotate. In addition, the rotating rotor shaft may be coupled to a mechanical system that performs a mechanic task such as pumping water, atmosphere gas separation compressors, providing rotational energy to generate electricity. Alternatively, the rotor shaft may be connected to an electric generator that converts the rotational energy into electricity, which may subsequently be used to power a consumer, commercial or industrial device, and/or electrical grid.

Solar energy technology is typically used to convert radiated light energy from the sun into thermal energy and/or photovoltaic electricity. To extract solar power, a collection surface and/or reflector as is the case with thermal solar technologies to concentrate the solar energies on the aforementioned solar collector surface. Solar energy striking the collection surface is converted into photovoltaic generated electrical energy or as thermal generated heat for direct use, transfer and/or storage. However, the variable nature of wind and availability of solar energy may interfere with baseload and/or on-demand generation of electricity, generated products and byproducts from wind and solar energy. For example, energy storage using chemical and thermal techniques may be required to offset fluctuations in electricity, products and byproducts generated from wind and solar power and/or maintain reliable electric and or thermal energy provisioning service and/or in a private and public electrical grid.

Thermal Energy Storage (TES) can be provisioned via thermal energy transfer fluids and mediums generated from solar thermal and/or electrical and or chemical reaction collector systems and/or from thermal conversion is accomplished by action of chilling mechanisms, particularly special, non-compressors based, absorption chillers and other devices configured to absorb, dissipate or transfer thermal energy transference into low temperature thermal energy storage. Additionally, thermal energy can be generated via transference from a heating and/or cooling element or other derived application processes to initiate thermal conveyance to a medium, additionally as a method for electrical energy to thermal energy storage technique.

Thermal Energy On-Demand is made available from Thermal Energy Storage Systems pumping thermal transfer fluids for direct use as a thermal energy production of a service such as providing thermal energy for a space heating, water heater or other thermal intensive applications and operations can be used to cool other units and areas within units, such as water directed to the aquaculture unit or the atmosphere of the aeroponics unit, cold storage or fast freeze storage. This process can be conducted via fluid to thermal transfer device such as a Stirling engine and/or steam turbine and/or thermal intensive applications usage and/or through a secondary thermal transfer liquid for storage and reuse of waste thermal energy.

Commercial Grid Backup Energy Reserve also called commercial grid-scale energy storage refers to the methods used to store energy on a commercial grid scale within a commercial's energy power grid. Energy is stored during times when production from energy generation components exceeds localized energy consumption and the stores are used at times when consumption exceeds available baseload production or establishes a higher baseline energy requirement.

In this way, energy production need not be drastically sealed up and down to meet momentary consumption requirements, production levels are maintained at a more consistently stable level with improved energy quality. This has the advantage that energy storage-based power plants and/or thermal energy can be efficiently and easily operated at constant production levels.

In particular, the use of commercial grid-connected intermittent energy sources such as photovoltaic and thermal solar as well as wind turbines can benefit from commercial grid energy thermal storage. Energy derived from solar and wind sources are inherently variable by nature, meaning the amount of electrical energy produced varies with time, day of the week, season, and random environmental factors that occurs in the variability of the weather.

In an electrical power grid and/or thermal intensive systems with energy storage, energy sources that rely on energy generated from wind and solar must have matched commercial grid scale energy storage regeneration to be scaled up and down to match the rise and fall of energy production from intermittent energy sources. Thus, commercial grid energy storage is the one method that the commercial can use to adapt energy production to energy consumption, both of which can vary over time. This is done to increase efficiency and lower the cost of energy production and/or to integrate and facilitate the use of intermittent energy sources.

Thermal energy storage most commonly uses molten salt mixture as a high temperature transfer and storage medium which is used to store heat collected by a solar collection system, biogas generated thermal input or by electrical generated thermal storage injection. Thermal energy storage consisting of commonly available substances and storage mediums, for example water frozen into ice to store energy as a cold temperature storage medium.

Stored energy can be used to generate electricity or provide thermal energy during inadequate solar and/or wind energy generation availability or during extreme weather events. Thermal efficiencies over one year of 99% have been predicted. Thermal Energy Storage System has shown that the electricity into storage to electricity-out (round trip efficiency) in the range of 75 to 93% using enhanced energy recovery systems.

Prior art Stirling Radioisotope Generators (SRG), typically used free-piston Stirling engines coupled to alternators or a generator for the purpose of converting thermal energy to electricity. Stirling engines are a known heat engine that have higher efficiency than steam-based systems which can convert thermal energy into electricity. The RPS program is developing Stirling technology for possible use in future space missions. NASA had previously planned to complete development of two Advanced Stirling Radioisotope Generator (ASRG) units, unfortunately for energy development overall the decision to discontinue development of an ASRG system occurred in late 2013. NASA's Glenn Research Center continues development and testing of free piston type Stirling engine technology for potential use by current and future space exploration missions. Inside a free piston Stirling engine with linear generator, a moving piston is driven by the heat of a fuel source. The piston would move a magnet back and forth through a coil of wire as a linear generator to generate electrical current in the wire.

Because the process used to convert thermal energy into electricity, known as the Stirling cycle, is more efficient than the thermoelectric and photovoltaic solar powered systems, generators using Stirling technology could provide a more efficient means of producing power for spacecraft than existing power systems. Prior art implementations of ASRG and the original type of SRG prototypes typically demonstrated a much lower efficiency and lower power generation from inherent design flaws than can be achieved with the preferred embodiment of the present invention.

All buildings and targeted areas needing environmental control require controlled mechanical ventilation, or the function of controlled and purposeful introduction of outdoor air to the intended conditioned control space. Buildings, homes and controlled environmental areas intentionally seal buildings for a higher degree of air quality and environmental control. Most air quality standards and guidelines however specify that nearly 30% of the control area air space must be recirculated each hour. An air handler typically with an efficient fan will operate on a 33% minimum duty cycle including calls for heating and cooling. On average over the year, generally the fan cycling control will activate the fan about 15% of the time without coincident heating or cooling demand.

Past prior art and its implementation was generally mismatched components not planned nor integrated in such a way to eliminate material and component overlap, reducing efficiency and greatly increasing installation and maintenance costs. Building enclosures must be "built tightly sealed and then ventilated correctly for health, comfort and environmental ventilation requirements. To control an environmental control system, it must be an enclosed system and properly maintained. Eliminating leaks which cause pressure issues must be eliminated to allow easy control air flow exchange between the inside stale air and the outside fresh air source. It must be noted however that a tightly sealed building enclosure or control area requires both mechanical ventilation and pollutant and organism source control which are required to ensure that there is reasonable indoor air quality and removal of pollutants and allergens from inside the building, house or control area.

Heat recovery ventilation (HRV) and energy recovery ventilation (ERV) systems are ducted ventilation systems typically consisting of two fans—one to draw air in from outside and one to remove stale internal air. An air-to-air thermal energy exchanger commonly called a heat exchanger, generally installed in a roof space, recovers thermal energy from the internal air before it is discharged to the externally, and thermal exchanges with the incoming air with the recovered thermal energy.

Typically, environmental control systems effectuate changes to temperature, humidity and air quality of the ambient air within the controlled area. Such amalgamated systems include heating, cooling, dehumidification, humidification, ultra-violet light, air filtration and ventilation is generally inefficient and lacking in environmental quality. Furthermore, since some of the potential cooling power of the typical air-conditioner system is misused for dehumidification, the cooling capacity of the air conditioner is significantly reduced, and loaded performance is heavily degraded.

Prior art methods used isolated processes and applications of the various system with their mechanisms and their support components create instances such as there was an increase in capacities, but the overall performance of the system and its increased energy use efficiency was relatively poor.

Typically, in liquid desiccant type dehumidifier systems, moisture must be transferred from the cooled dehumidifier sump to the heated evaporator sump. Since the moisture is in the form of a low concentration desiccant, this is performed by pumping or otherwise transferring the desiccant. Since the desiccant also contains desiccant ions which acts as a drying agent it must be therefore returned to the cooled dehumidifier sump to maintain the desiccant ion level required for dehumidification. This is generally achieved in dehumidification mode by allowing sumps in the cooled dehumidifier sump and heated sump of the evaporator section that are interconnected via ducts with a common wall between the two sumps that constrains communications and only allows very controlled transfer and limited bidirectional flow to occur naturally while also forming a thermal stratification between the sumps without the need for pumps or other means of circulation.

Molten-carbonate fuel cells ("MCFC") are high-temperature fuel cells that operate at temperatures of 600° C. and above. The high operating temperature of Solid Oxide Fuel Cells ("SOFC") make SOFCs and MCFC's suitable candidates for application waste energy recovery and recycling for use with Stirling heat engines and absorption cooling or additional energy recovery devices or as combined cooling, freezing, heat and power system with optional rotational energy output, which further increases overall fuel and system efficiency.

In thermodynamics, the term endothermic describes a process or reaction in which the system absorbs energy from its surroundings in the form of heat. The term was coined by Marcellin Berthelot from the Greek roots "endo", derived from the word "endon" which means "within" and the root "therm" which means "hot." The intended use and sense is that of a reaction that depends on absorption or taking in heat if it is to proceed for work. The opposite of an endothermic process is an exothermic process, one that releases, "radiates" energy in the form of heat.

A SOFC is an exothermic electrochemical conversion device that produces electricity directly from oxidizing a fuel. Fuel cells are characterized by their electrolyte material; the SOFC has a solid oxide or ceramic, electrolyte. Advantages of this class of fuel cells include high efficiency, long-term stability, fuel flexibility, low emissions, relatively low system cost and with thermal energy generation for thermal waste energy recovery and potential for system efficiency gains. The largest potential disadvantage is the high operational temperatures which can result in longer start-up times along with mechanical and chemical compatibility issues. The preferred method of the present invention introduces thermal waste energy recovery, thermal storage and controlled energy communication for additional usage for enhanced efficiency, this will also reduce and potentially eliminate long startup times.

Solid oxide fuel cells are a class of fuel cells characterized by the use of a solid oxide material as the electrolyte. SOFCs use a solid oxide electrolyte to conduct negative oxygen ions from the cathode to the anode. The electrochemical oxidation of the oxygen ions with hydrogen or carbon monoxide thus occurs on the anode side. SOFC's typically operate at very high temperatures, typically between 500 and 1,000° C. Recent advances allow lower high range temperatures to be used such as the preferred embodiment of the present invention. At these temperatures, SOFCs do not require expensive noble metals such as a platinum catalyst material with its limited availability to initiate electrochemical reactions, as is currently necessary for lower-temperature extremely expensive fuel cells such as PEMFCs, and are not vulnerable to carbon monoxide catalyst poisoning but suffer from efficiency optimization, PEMFC's suffers from difficulties with exposure to freezing and moisture control system vulnerability, damage to the fuel cell from contaminations, expenses and efficiency loss from energy use from methods to remove impurities from atmospheric air input for oxygen supplies.

However, vulnerability to sulfur poisoning has been widely observed and the sulfur must be removed before entering the cell through the use of adsorbent beds or other means. The preferred method of the present invention may use hydroxyl ammonium nitrate and/or triethanol ammonium nitrate and/or a mixture of them to include water as the fuel input basis which has hydrogen and oxygen in its chemical matrix as a high-density fuel with relatively easy storage methods as a liquid fuel. Alternately a method of the present invention is use of the rotational energy for providing energy to pressure swing absorption device (PSA) or an air separation unit (ASU) which can use thermal input using distillation, an additional method would entail the use of absorbent or specific porous filter materials for the purpose of provisioning pure or nearly pure oxygen input to the fuel cell.

Solid oxide fuel cells have a wide variety of applications from use as auxiliary power units in vehicles to stationary power generation with outputs from 100 W to 20 MW achieving a near efficiency of a SOFC device up to the previously theoretical mark of 60% and exceeding that mark with the inclusion of preferred embodiment. The higher operating temperature make SOFCs suitable candidates for the preferred embodiment using application and processes to include a Stirling engine which is an endothermic device and amalgamated with an additional recovery device consisting primarily of an absorption cooling system to enable a system for combined cooling, freezing, heating and power functionality (CCFHP) with system integration to a unified analysis, monitor, control and energy provisioning system, which further increases overall system efficiency, redundancy and reliability.

A solid oxide fuel cell is made up of four layers, three of which are ceramics (hence the name). A single cell consisting of these four layers stacked together is typically only a few millimeters thick. Hundreds of these cells are then connected in series to form what most people refer to as an "SOFC stack". The ceramics generally used in SOFCs do not become electrically and ionically active until they reach very high temperature and as a consequence the stacks have to run at temperatures ranging from 500 to 1,000° C. Reduction of oxygen into oxygen ions occurs at the cathode. These ions can then diffuse through the solid oxide electrolyte to the anode where they can electrochemically oxidize the fuel. In this reaction, a water byproduct is given off us well as two electrons. These electrons then flow through an external circuit where they can do work. The cycle then repeats as those electrons enter the cathode material again.

Typically, most of the downtime of a SOFC stems from the mechanical balance of plant, the air preheater, pre-reformer and/or ammonia cracker, afterburner, water heat exchanger, anode tail gas oxidizer, and electrical balance of plant, power electronics, hydrogen sulfide sensor and fans. Internal thermal energy generation from the SOFC for reforming and cracking leads to a large decrease in the balance of plant costs in designing and building of a full system. The planar fuel cell design geometry is the typical sandwich type geometry employed by most types of fuel cells, where the electrolyte is sandwiched in between the electrodes.

Concerning the ceramics primarily monolithic ceramics have attractive properties like high stiffness, strength, stability at high temperatures, making them useful for biomedical, electronic, automotive, industrial, defense and space applications. However, monolithic ceramics tend to be brittle, mechanically unreliable and poor electrical conductor, which limits their use. In order to improve these properties, ceramic matrix composites have been developed. There has been a considerable amount of research reported in the literature on fiber-ceramic composites.

Hydroxylamine nitrate has generally been produced by one of several processes utilizing hydroxylamine sulfate and converting it to the end product by processes such as electrodialysis or a cation-exchange process. Some processes produce aqueous hydroxylamine from hydroxylammonium sulfate. However, heretofore none have been found which produce the aqueous hydroxylamine salts by neutralization of the corresponding acid, without causing spontaneous decomposition upon addition of the concentrated acid. Conversely, addition of the hydroxylamine to nitric acid causes spontaneous decomposition of the product HAN, even when the nitric acid has been diluted to less than about 50% by weight.

Hydroxylamine nitrate has several commercial applications, such use as the component or one of the components of a liquid fuel. It is in this application a highly purified form of the compound is required, especially when it is to be employed as a fuel where the hydroxyl ammonium nitrate (HAN) solution is stable in an aqueous solution, but must be completely free of transition metal elements, such as iron and copper.

The hydroxylamine salt produced by the electrolytic processes of the prior art can be converted to hydroxylamine nitrate at low solution strength and in an impure state. The double displacement reaction employed requires an electrochemical cell that has a plurality of compartments and requires anion exchange membranes and/or bipolar membranes. The draw back and disadvantage of this design requires significant capital costs and extremely high energy costs.

Processing costs of desalinating sea water (infrastructure, energy and maintenance) are generally higher than the alternatives (fresh water from rivers, reservoirs, aquifers or groundwater, water recycling and water conservation techniques), but alternatives are not always applicable such as area effects from low rain fall, low snow accumulations and/or droughts. Expected water acquisition costs for 2013 range from 50 cents to 1 US dollar per cubic meter, chart in FIG. 1. Energy consumption of sea water desalination can be potentially as low as 3 kWh per cubic meter, this is similar to the energy consumption of existing fresh water supplies transported over extreme distances, but this does equate too much higher costs than typically seen with local fresh potable water supplies which use approximately 0.2 kWh or less per cubic meter when and if said water is available.

The laws of physics will determine minimum energy consumption for sea water desalination of approximately 1 kWh per cubic meter, this would exclude pre-filtering and intake/outfall pumping and post-filtering if necessary from heavier than normal contamination levels. Less than 2 kWh per cubic meter has been achieved with existing reverse osmosis membrane technology, leaving limited scope for further energy reductions. Estimated, supplying all domestic water by sea water desalination would increase US Domestic energy consumption by around 10%, which is approximately about the amount of energy used by a commonly used domestic refrigerator.

Distilling of Sea Water has been, by and large, extremely cost prohibitive, very precarious operational histories, and known to potentially be environmentally unfriendly. Both distillation and reverse osmoses systems return concentrated brine along with sometimes, other added chemicals used to de-foam, reduce scale or kill plant growth, to be disposed of, usually pumped back into the ocean increasing salinity and hot zones. These issues have caused great concern from the high potential for damage to the ocean environmental ecosystem. Prior art and other commonly used methods of making drinking water may potentially pose additional threats and the potential for damage which needs to also include the cost of disposing of the byproduct brine effluent. In addition to the environmental concerns that the desalinization process poses, the high costs and lack of availability of required energy sources associated with either distillation or Reverse Osmoses processes have essentially limited or eliminated the wide spread use. The preferred method of the present invention with its included processes and applications are embodied as an ocean or sea water distillation system, all of these concerns and issues are allayed or removed and open a vertical market for processed products are created enhancing financial viability.

The traditional process used in these operations is vacuum distillation which is essentially the boiling of water at less than atmospheric pressure and thus a much lower temperature than normal. This is because the phase change energy required for boiling of a liquid occurs when the vapor pressure equals the ambient pressure and vapor pressure increases with temperature. Thus, because of the reduced temperature, low-temperature "waste" heat from electrical power and in the preferred method of the present invention of "waste" thermal energy from Stirling engine generation or other thermal "waste" thermal energy from industrial processes can be reclaimed.

The principal competing processes use membranes to desalinate, principally applying reverse osmosis technology. Membrane processes use semipermeable membranes and pressure to separate salts from water. Reverse osmosis plant membrane systems typically use less energy than thermal distillation, which has led to a reduction in overall desalination costs over the past decade. Desalination remains energy intensive, however, and future costs will continue to depend on the price of both energy and desalination technology.

Quintuple-generation is the process of using excess thermal from energy generation for another task: in this case the production of potable water from seawater or brackish groundwater in an integrated, or "multi-purpose", facility where a power plant provides the energy for desalination. Alternatively, the facility's energy production may be dedicated to the production of potable water (a stand-alone facility), or excess energy may be produced and incorporated into the energy grid (a true Quintuple-generation facility) or as the preferred method of present invention communicates excess thermal energy to thermal energy storage for later use.

Quintuple-generation takes various forms, and theoretically any form of energy production could be used. However, the majority of current and planned prior art and current day cogeneration type of desalination plants use either fossil fuels or nuclear power as their source of energy. The advantage of multi-purpose facilities is they can be more efficient in land use, energy consumption, thus making desalination a more viable option for potable drinking water.

Additionally, the current trend in multi-purpose facilities is in design of hybrid configurations, in which permeate from a reverse osmosis desalination component is mixed with distillate from thermal desalination. Basically, two or more desalination processes are combined along with power production, with the preferred method of the present invention even higher efficiencies, production yields and revenue streams can be achieved with inclusion and amalgamation of additional steps and stages with the associated processes and applications.

Factors that generally determine the costs for desalination include capacity and type of facility, location, feed water, labor, energy, financing, and concentrate disposal. Desalination stills now control pressure, temperature and brine concentrations to optimize efficiency. It is worth noting that costs are falling, and generally positive about the technology for affluent areas in proximity to oceans, desalinated water may be a solution for some water-stress areas.

Typically, with prior art desalination methods and processes produce large quantities of a concentrate, which may be increased in temperature, and contain residues of pretreatment and cleaning chemicals, their reaction byproducts, and heavy metals due to corrosion. Chemical pretreatment and cleaning are a necessity in most desalination plants, which typically includes the treatment against biofouling, scaling, foaming and corrosion in thermal plants, and against biofouling, suspended solids and scale deposits in membrane plants.

Prior art failed attempts to limit the environmental impact of returning the brine with its increased salinity and its increased temperature to the seas or oceans, attempts to dilute the concentrate and its temperature with another stream of water entering the ocean, such as the outfall of a wastewater treatment or power plant. While seawater power plant cooling water outfalls are not as fresh as wastewater treatment plant outfalls, salinity and temperature is only slightly reduced. With medium to large power plant and desalination plant, the power plant's cooling water flow is likely to be at least several times larger than that of the desalination plant. Another method to reduce the increase in salinity is to mix the brine via a diffuser in a mixing zone. For example, once the pipeline containing the brine reaches the sea floor, it can split into many branches, each releasing brine gradually through small holes along its length. Mixing can be combined with power plant or wastewater plant dilution.

Brine is denser than seawater due to higher solute concentration. The ocean bottom is most at risk because the brine with its increased salinity and temperature sinks and remains there long enough to damage the ecosystem. Careful reintroduction can minimize this problem but does not eliminate the damage to the environment. Prior art's typical oceanographic conditions off the coast allow for rapid dilution of the concentrated increased temperature byproduct, thereby only able to minimize the harm to the environment.

Some methods of desalination, particularly in combination with evaporation ponds and solar stills (solar desalination), do not discharge brine. They do not use chemicals in their processes nor the burning of fossil fuels. They do not work with membranes or other critical parts, such as components that include heavy metals, thus do not cause toxic waste (and high maintenance).

The disadvantage of this method is the salts and contaminants are leftover and will require cleanup and reclamation may also draw unwanted attention from environmental agencies to the waste buildup and potential damage from waste leaching into water tables. Currently, approximately 50% of the world's sea salt production still relies on fossil energy sources.

Multi-stage flash distillation (MSF) is a water desalination process that typically uses thermal energy to distill sea water by flashing a portion of the water into steam, typically this is done with multiple stages of what are essentially countercurrent regenerative heat exchangers. Multi-stage flash distillation plants generally produce about 60% of all desalinated water in the world.

The plant has a series of effect spaces also called stages, each containing a heat exchanger and a condensate collector. The sequence has a cold end and a hot end while intermediate stages have intermediate temperatures. The stages have different pressures corresponding to the boiling points of water at the stage temperatures. After the hot end there is a container called the brine heater. The preferred method of the present invention communicates required thermal energy from thermal storage with an as needed and on demand for multi-flash distillation energy input needs.

When the plant is operating in steady state, feed water at the cold inlet thermal temperature flows, or is pumped, through the heat exchangers in the stages and warms up via regeneration. When it reaches the brine heater it already has nearly the maximum temperature. In the brine heater, an amount of additional thermal energy is added. After the brine heater, the water flows through valves back into the stages which have ever lower pressure and temperature. As it flows back through the stages the water is now called concentrate otherwise generally referred to as brine, to distinguish it from the inlet water. In fact, at each stage, as the brine enters, its temperature is above the boiling point at the pressure of the stage, and a small fraction of the brine water boils ("flashes") to steam thereby reducing the temperature until equilibrium is reached. The resulting steam is a little hotter than the feed water in the heat exchanger. The steam cools and condenses against the heat exchanger tubes, thereby heating the feed water as described earlier in a regenerative fashion enhancing operational efficiency.

The total evaporation in all the stages is up to approximately 15% of the water flowing through the system, depending on the range of temperatures used. With increasing temperature there are growing difficulties of scale formation and corrosion. 120° C. appears to be a maximum thermal energy input, although scale avoidance may require thermal input temperatures below 70° C.

The feed water carries away the excess latent heat of the condensed steam, maintaining the low temperature of the stage. The pressure in the chamber remains constant as equal amounts of steam is formed when new warm brine enters the stage and steam is removed as it condenses on the tubes of the heat exchanger. The equilibrium is quite stable, because if at some point more vapor forms, the pressure increases therefore reduces evaporation and increases condensation.

In the final stage the brine and the condensate has a temperature near the inlet temperature. The brine and condensate are then pumped out from the low-pressure field within the stage to the ambient pressure. The brine and condensate still carry a small amount of thermal energy that is recovered from the system when they are discharged via the regenerator. The thermal energy recovery helps make up for this loss.

The thermal energy added in the brine heater in prior art usually comes in the form of hot steam from an industrial process co-located with the desalination plant. The steam is allowed to condense against tubes carrying the brine. The preferred method uses a fluid medium due to the reduced loss from the enhanced density.

The energy that makes possible the evaporation is all present in the brine as it leaves the heater. The reason for letting the evaporation happen in multiple stages rather than a single stage at the lowest pressure and temperature, is that in a single stage, the feed water would only warm to an intermediate temperature between the inlet temperature and the heater, while much of the steam would not condense and the stage would not maintain the lowest pressure and temperature. Plants of this nature typically operate at 23-27 kWh per cubic meter which is approximately 90 MJ per cubic meter of distilled fresh water.

Because the colder salt water entering the process Countercurrent exchange otherwise referred to as a regenerator, counter flows with the saline waste water/distilled water, relatively little thermal energy leaves in the outflow—most of the heat is picked up by the colder saline water flowing toward the heater and the energy is recycled.

In addition, MSF distillation plants, especially large ones, are often paired with power plants in a cogeneration configuration. Waste heat from the power plant is used to heat the seawater, providing cooling for the power plant at the same time. This reduces the energy needed by one-half to two-thirds, which drastically alters the economics of the plant, since energy is by far the largest operating cost of MSF plants. Reverse osmosis, MSF distillation's main competitor, requires more pretreatment of the seawater and more maintenance, as well as energy in the form of work (electricity, mechanical power) as opposed to cheaper low-grade waste heat.

Multiple-effect distillation (MED) is a distillation process often used for sea water desalination. It consists of multiple stages or "effects". In each stage the feed water is heated by steam in tubes. Some of the water evaporates, and this steam flows into the tubes of the next stage, heating and evaporating more water. Each stage essentially reuses the energy from the previous stage. The tubes can be submerged in the feed water, but more typically the feed water is sprayed on the top of a bank of horizontal tubes, and then drips from tube to tube until it is collected at the bottom of the stage.

The plant can be seen as a sequence of closed spaces separated by tube walls, with a heat source in one end and a heat sink in the other end. Each space consists of two communicating subspaces, the exterior of the tubes of stage (n) and the interior of the tubes in stage (n+1). Each space has a lower temperature and pressure than the previous space, and the tube walls have intermediate temperatures between the temperatures of the fluids on each side. The pressure in a space cannot be in equilibrium with the temperatures of the walls of both subspaces. It has an intermediate pressure. Then the pressure is too low or the temperature too high in the first subspace and the water evaporates. In the second subspace, the pressure is too high or the temperature too low and the vapor condenses. This carries evaporation energy from the warmer first subspace to the colder second subspace. At the second subspace the energy flows by conduction through the tube walls to the colder next space.

The thinner the metal in the tubes and the thinner the layers of liquid on either side of the tube walls, the more efficient is the energy transport from space to space. Introducing more stages between the heat source and sink reduces the temperature difference between the spaces and greatly reduces the heat transport per unit surface of the tubes. The energy supplied is reused more times to evaporate more water, but the process takes more time. The amount of water distilled per stage is directly proportional to the amount of energy transport. If the transport is slowed down, one can increase the surface area per stage, i.e. the number and length of the tubes, at the expense of increased installation cost.

Reverse osmosis plant is a processing plant where the process of reverse osmosis takes place. An average modern reverse osmosis plant needs six kilowatt-hours of electricity to desalinate one cubic meter of water. The process also results in an amount of salty briny waste. The challenge for these plants is to find ways to reduce energy consumption, use sustainable energy sources and improve the process of desalination and to innovate in the area of waste management to deal with the waste. Self-contained water treatment plants using reverse osmosis, called reverse osmosis water purification units, are normally used in a military context.

Reverse osmosis (RO) is a water purification technology that uses a semipermeable membrane. This membrane-technology is not properly a filtration method. In RO, an applied pressure is used to overcome osmotic pressure, a colligative property that is driven by chemical potential, a thermodynamic parameter. RO can remove many types of molecules and ions from solutions and is used in both industrial processes and in producing potable water. The result is that the solute is retained on the pressurized side of the membrane and the pure solvent is allowed to pass to the other side. To be "selective," this membrane should not allow large molecules or ions through the pores (holes), but should allow smaller components of the solution (such as the solvent) to pass freely.

In the normal osmosis process, the solvent naturally moves from an area of low solute concentration (High Water Potential), through a membrane, to an area of high solute concentration (Low Water Potential). The movement of a pure solvent is driven to reduce the free energy of the system by equalizing solute concentrations on each side of a membrane, generating osmotic pressure. Applying an external pressure to reverse the natural flow of pure solvent, thus, is reverse osmosis. The process is similar to other membrane technology applications. However, there are key differences between reverse osmosis and filtration. The predominant removal mechanism in membrane filtration is straining, or size exclusion, so the process can theoretically achieve perfect exclusion of particles regardless of operational parameters such as influent pressure and concentration. Moreover, reverse osmosis involves a diffusive mechanism so that separation efficiency is dependent on solute concentration, pressure, and water flux rate. Reverse osmosis is most commonly known for its use in drinking water purification from seawater, removing the salt and other effluent materials from the water molecules.

Osmosis is a natural process. When two liquids of different concentration are separated by a semipermeable membrane, the fluid has a tendency to move from low to high solute concentrations for chemical potential equilibrium. Formally, reverse osmosis is the process of forcing a solvent from a region of high solute concentration through a semipermeable membrane to a region of low solute concentration by applying a pressure in excess of the osmotic pressure. The largest and most important application of reverse osmosis is the separation of pure water from seawater and brackish waters; seawater or brackish water is pressurized against one surface of the membrane, causing transport of salt-depleted water across the membrane and emergence of potable drinking water from the low-pressure side.

The membranes used for reverse osmosis have a dense layer in the polymer matrix—either the skin of an asymmetric membrane or an interfacial polymerized layer within a thin-film-composite membrane—where the separation occurs. In most cases, the membrane is designed to allow only water to pass through this dense layer, while preventing the passage of solutes (such as salt ions). This process requires that a high pressure be exerted on the high concentration side of the membrane, usually 2-17 bar (30-250 psi) for fresh and brackish water, and 40-82 bar (600-1200 psi) for seawater, which has around 27 bar (390 psi) natural osmotic pressure that must be overcome. This process is best known for its use in desalination (removing the salt and other minerals from sea water to get fresh water), but it has also been used to purify fresh water for medical, industrial, and domestic applications.

In modern cement kilns many advanced features are used to lower the fuel consumption per ton of clinker produced. Cement kilns are extremely large, complex, and inherently dirty industrial installations, and have many undesirable emissions. Of the various ingredients used in concrete the cement is the most energetically expensive. Even complex and efficient kilns require 3.3 to 3.6 gigajoules of energy to produce a ton of clinker and then grind it into cement. Many kilns can be fueled with flammable wastes with the most commonly used fuel source being used tires. The extremely high temperatures and long periods of time at those temperatures allow cement kilns to efficiently and completely burn even difficult-to-use fuels.

In recent years, alternatives have been developed to help replace cement. Products such as PLC (Portland Limestone Cement) which incorporate limestone as a material replacement into the mixture of materials, are currently being tested and evaluated. This is primarily due to cement production being one of the largest predicted producers (at about 5 to 10%) of global greenhouse gas emissions. Combining water with a cementitious type material forms a cement paste by the process of hydration. The cement paste glues the aggregate mixture together, fills voids any contained within the mixture, and makes it flow more freely. A lower water-to-cement ratio yields a stronger, more durable concrete, while more water gives a freer-flowing concrete with a higher slump. Pure water is required to be used to make concrete to eliminate bonding problems when setting or as a cause of premature failure of the object or structure. Hydration involves many different reactions, often occurring simultaneously at the same time. As the reactions proceed, the products of the cement hydration process gradually bond together the individual sand and gravel particles and other components of the concrete to form a warm solid yet soft object or structure.

Decorative stones such as quartzite, small river stones or crushed glass are sometimes added to the surface of concrete for a decorative "exposed aggregate" finish, popular among landscape designers while allowing the cement product to be decorative, exposed aggregate adds robustness to a concrete walks, driveway and walls.

Concrete is strong in compression, as the aggregate efficiently carries the compression load. However, it is weak in tension as the cement holding the aggregate in place can crack, allowing the structure to fail. Reinforced concrete may add steel reinforcing bars, steel fibers, glass fiber, carbon fiber, composite fiber or plastic fiber to carry tensile loads. Use of these additives will be permanently embedded in poured concrete to create a reinforced concrete structure.

Chemical admixtures are materials in the form of powder or fluids that are added to the concrete to give it certain characteristics not obtainable with plain concrete mixes. In normal use, admixture dosages are less than 5% by mass of cement and are added to the concrete at the time of batching-mixing. Accelerators speed up the hydration (hardening) of the concrete. Typical materials used are Ca(NO3)2 and NaNO3. Retarders slow the hydration of concrete and are used in large or difficult pours where partial setting before the pour is complete is undesirable. Typical polyol retarders are sugar, sucrose, sodium gluconate, glucose, citric acid, and tartaric acid.

Air entrainments add and entrain tiny air bubbles in the concrete, which reduces damage during freeze-thaw cycles, increasing durability. However, entrained air entails a trade off with strength, as each 1% of air may decrease compressive strength 5%. Plasticizers increase the workability of plastic or "fresh" concrete, allowing it to be placed more easily, with less consolidating effort. A typical plasticizer is lignosulfonate. Plasticizers can be used to reduce the water content of a concrete while maintaining workability and are sometimes called water-reducers due to this use. Such treatment improves its strength and durability characteristics. Superplasticizers (also called high-range water-reducers) are a class of plasticizers that have fewer deleterious effects and can be used to increase workability more than is practical with traditional plasticizers. Compounds used as superplasticizers include sulfonated naphthalene formaldehyde condensate, sulfonated melamine formaldehyde condensate, acetone formaldehyde condensate and polycarboxylate ethers.

Pigments can be used to change the color of concrete, for aesthetics. Corrosion inhibitors are used to minimize the corrosion of steel and steel bars in concrete. Bonding agents are used to create a bond between old and new concrete (typically a type of polymer). Pumping aids improve pumpability, thicken the paste and reduce separation and bleeding There are inorganic materials that also have pozzolanic or latent hydraulic properties. These very fine-grained materials are added to the concrete mix to improve the properties of concrete (mineral admixtures), or as a replacement for Portland cement (blended cements).

Fly ash: A by-product of coal-fired electric generating plants, it is used to partially replace Portland cement (by up to 60% by mass). The properties of fly ash depend on the type of coal burnt. In general, siliceous fly ash is pozzolanic, while calcareous fly ash has latent hydraulic properties.

Concrete plant facility showing a Concrete mixer being filled from the ingredient silos. Concrete production is the process of mixing together the various ingredients—water, aggregate, cement, and any additives to produce concrete. Concrete production is time-sensitive. Once the ingredients are mixed, workers must put the concrete in place before it hardens. In modern usage, most concrete production takes place in a large type of industrial facility called a concrete plant, or often a batch plant.

In general usage, concrete plants come in two main types, ready mix plants and central mix plants. A ready-mix plant mixes all the ingredients except water, while a central mix plant mixes all the ingredients including water. A central mix plant offers more accurate control of the concrete quality through better measurements of the amount of water added, but must be placed closer to the work site where the concrete will be used, since hydration begins at the plant.

A concrete plant consists of large storage hoppers for various reactive ingredients like cement, storage for bulk ingredients like aggregate and water, mechanisms for the addition of various additives and amendments, machinery to accurately weigh, move, and mix some or all of those ingredients, and facilities to dispense the mixed concrete, often to a concrete mixer truck.

Modern concrete is usually prepared as a viscous fluid, so that it may be poured into forms, which are containers erected in the field to give the concrete its desired shape. There are many different ways in which concrete formwork can be prepared, such as Slip forming and Steel plate construction. Alternatively, concrete can be mixed into dryer, non-fluid forms and used in factory settings to manufacture precast concrete products.

There is a wide variety of equipment for processing concrete, from hand tools to heavy industrial machinery. Whichever equipment builders use; however, the objective is to produce the desired building material; ingredients must be properly mixed, placed, shaped, and retained within time constraints. Once the mix is where it should be, the curing process must be controlled to ensure that the concrete attains the desired attributes. During concrete preparation, various technical details may affect the quality and nature of the product.

When initially mixed, Portland cement and water rapidly form a gel of tangled chains of interlocking crystals, and components of the gel continue to react over time. Initially the gel is fluid, which improves workability and aids in placement of the material, but as the concrete sets, the chains of crystals join into a rigid structure, counteracting the fluidity of the gel and fixing the particles of aggregate in place. During curing, the cement continues to react with the residual water in a process of hydration. In properly formulated concrete, once this curing process has terminated the product has the desired physical and chemical properties. Among the qualities typically desired, are mechanical strength, low moisture permeability, and chemical and volumetric stability.

Thorough mixing is essential for the production of uniform, high-quality concrete. For this reason, equipment and methods should be capable of effectively mixing concrete materials containing the largest specified aggregate to produce uniform mixtures of the lowest slump practical for the work.

Separate paste mixing has shown that the mixing of cement and water into a paste before combining these materials with aggregates can increase the compressive strength of the resulting concrete. The paste is generally mixed in a high-speed, shear-type mixer at a w/cm (water to cement ratio) of 0.30 to 0.45 by mass. The cement paste premix may include admixtures such as accelerators or retarders, superplasticizers, pigments, or silica fume. The premixed paste is then blended with aggregates and any remaining batch water and final mixing is completed in conventional concrete mixing equipment.

High-energy mixed (HEM) concrete is produced by means of high-speed mixing of cement, water and sand with net specific energy consumption of at least 5 kilojoules per kilogram of the mix. A plasticizer or a superplasticizer is then added to the activated mixture, which can later be mixed with aggregates in a conventional concrete mixer. In this process, sand provides dissipation of energy and creates high-shear conditions on the surface of cement particles. This results in the full volume of water interacting with cement. The liquid activated mixture can be used by itself or foamed (expanded) for lightweight concrete. HEM concrete hardens in low and subzero temperature conditions and possesses an increased volume of gel, which drastically reduces capillarity in solid and porous materials.

Workability is the ability of a fresh (plastic) concrete mix to fill the form-mold properly with the desired work (vibration) and without reducing the concrete's quality. Workability depends on water content, aggregate (shape and size distribution), cementitious content and age (level of hydration) and can be modified by adding chemical admixtures, like superplasticizer. Raising the water content or adding chemical admixtures increases concrete workability. Excessive water leads to increased bleeding (surface water) and/or segregation of aggregates (when the cement and aggregates start to separate), with the resulting concrete having reduced quality. The use of an aggregate with an undesirable gradation can result in a very harsh mix design with a very low slump, which cannot readily be made more workable by addition of reasonable amounts of water.

Workability can be measured by the concrete slump test, a simplistic measure of the plasticity of a fresh batch of concrete test standards. Slump is normally measured by filling an "Abrams cone" with a sample from a fresh batch of concrete. The cone is placed with the wide end down onto a level, non-absorptive surface. It is then filled in three layers of equal volume, with each layer being tamped with a steel rod to consolidate the layer. When the cone is carefully lifted off, the enclosed material slumps a certain amount, owing to gravity. A relatively dry sample slumps very little, having a slump value of one or two inches (25 or 50 mm) out of one foot (305 mm). A relatively wet concrete sample may slump as much as eight inches. Workability can also be measured by the flow table test.

Slump can be increased by addition of chemical admixtures such as plasticizer or superplasticizer without changing the water-cement ratio. Some other admixtures, especially air-entraining admixture, can increase the slump of a mix. High-flow concrete, like self-consolidating concrete, is tested by other flow-measuring methods. One of these methods includes placing the cone on the narrow end and observing how the mix flows through the cone while it is gradually lifted. After mixing, concrete is a fluid and can be pumped to the exact location where needed. Concrete has relatively high compressive strength, but much lower tensile strength. For this reason, it is usually reinforced with materials that are strong in tension (often steel and most recently use of composites). The elasticity of concrete is relatively constant at low stress levels but starts decreasing at higher stress levels as matrix cracking develops. Concrete has a very low coefficient of thermal expansion and shrinks as it matures. All concrete structures crack to some extent, due to shrinkage and tension. Concrete that is subjected to long-duration forces is prone to creep.

Tests can be performed to ensure that the properties of concrete correspond to specifications for the application. Different mixes of concrete ingredients produce different strengths, which are measured in psi or MPa. Different strengths of concrete are used for different purposes. Very low-strength (2000 psi or less) concrete may be used when the concrete must be lightweight. Lightweight concrete is often achieved by adding air, foams, or lightweight aggregates, with the side effect that the strength is reduced. For most routine uses, 3000-psi to 4000-psi concrete is often used. 5000-psi concrete is readily commercially available as a more durable, although more expensive, option. 5000-psi concrete is often used for larger civil projects. Strengths above 5000 psi are often used for specific building elements. For example, the lower floor columns of high-rise concrete buildings may use concrete of 12,000 psi or more, to keep the size of the columns small. Bridges may use long beams of 10,000 psi concrete to lower the number of spans required. Occasionally, other structural needs may require high-strength concrete. If a structure must be very rigid, concrete of very high strength may be specified, even much stronger than is required to bear the service loads. Strengths as high as 19,000 psi have been used commercially for these reasons.

Modern clay bricks are formed in one of three processes—soft mud, dry press, or extruded. Normally, brick contains the following ingredients: Silica (sand)—50% to 60% by weight, Alumina (clay)—20% to 30% by weight, Lime—2 to 5% by weight, Iron oxide—≤7% by weight, Magnesia—less than 1% by weight The soft mud method is the most common, as it is the most economical. It starts with the raw clay, preferably in a mix with 25-30% sand to reduce shrinkage. The clay is first ground and mixed with water to the desired consistency. The clay is then pressed into steel molds with a hydraulic press. The shaped clay is then fired ("burned") at 900-1000° C. to achieve strength. The preferred method of the present invention communicates thermal energy from thermal storage for the purpose of providing thermal energy for preheating and heating the kiln for the firing process.

In modern brickworks, this is usually done in a continuously fired tunnel kiln, in which the bricks are fired as they move slowly through the kiln on conveyors, rails, or kiln cars, which achieves a more consistent brick product. The bricks often have lime, ash, and organic matter added, which accelerates the burning process.

An oval or circular trench is dug, 6-9 meteres wide, 2-2.5 meters deep, and 100-150 meters in circumference. A tall exhaust chimney is constructed in the center. Half or more of the trench is filled with "green" (unfired) bricks which are stacked in an open lattice pattern to allow airflow. The lattice is capped with a roofing layer of finished brick. In operation, new green bricks, along with roofing bricks, are stacked at one end of the brick pile; cooled finished bricks are removed from the other end for transport to their destinations. In the middle, the brick workers create a firing zone by dropping fuel (coal, wood, oil, debris, and so on) through access holes in the roof above the trench.

The advantage of the above design is a much greater energy efficiency compared with clamp or scove kilns. Sheet metal or boards are used to route the airflow through the brick lattice so that fresh air flows first through the recently bunted bricks, heating the air, then through the active burning zone. The air continues through the green brick zone (pre-heating and drying the bricks), and finally out the chimney, where the rising gases create suction which pulls air through the system. The reuse of heated air yields savings in fuel cost.

The dry press method is similar to the soft mud brick method, but starts with a much thicker clay mix, so it forms more accurate, sharper-edged bricks. The greater force in pressing and the longer burn make this method more expensive.

European-style extruded bricks or blocks are used in single-wall construction with finishes applied on the inside and outside. Their many voids comprise a greater proportion of the volume than the solid, thin walls of fired clay. Such bricks are made in 15-, 25-, 30-, 42- and 50-cm widths. Some models have very high thermal insulation properties, making them suitable for zero-energy buildings.

The raw materials for calcium-silicate bricks include lime mixed with quartz, crushed flint or crushed siliceous rock together with mineral colorants. The materials are mixed and left until the lime is completely hydrated; the mixture is then pressed into molds and cured in an autoclave for two or three hours to speed the chemical hardening. The finished bricks are very accurate and uniform, although the sharp arrises need careful handling to avoid damage to brick (and bricklayer). The bricks can be made in a variety of colors; white is common but pastel shades can be achieved. This type of brick is common in Sweden, especially in houses built or renovated in the 1970s, where it is known as "Mexitegel" (Mexi Bricks). In India these are known as fly ash bricks, manufactured using the FaL-G (fly ash, lime and gypsum) process. Calcium-silicate bricks are also manufactured in Canada and the United States, and meet the criteria set forth in ASTM C73-10 Standard Specification for Calcium Silicate Brick (Sand-Lime Brick). It has lower embodied energy than cement based man-made stone and clay brick.

The fired color of clay bricks is influenced by the chemical and mineral content of the raw materials, the firing temperature, and the atmosphere in the kiln. For example, pink colored bricks are the result of a high iron content, white or yellow bricks have a higher lime content. Most bricks burn to various red hues; as the temperature is increased the color moves through dark red, purple and then to brown or grey at around 1,300° C. (2,372° F.). Calcium silicate bricks have a wider range of shades and colors, depending on the colorants used. The names of bricks may reflect their origin and color, such as London stock brick and Cambridgeshire White.

"Bricks" formed from concrete are usually termed blocks, and are typically pale grey in color. They are made from a dry, small aggregate concrete which is formed in steel molds by vibration and compaction in either an "egg-layer" or static machine. The finished blocks are cured rather than fired using low-pressure steam. Concrete blocks are manufactured in a much wider range of shapes and sizes than clay bricks and are also available with a wider range of face treatments—a number of which simulate the appearance of clay bricks.

Natural stone bricks are of limited modern utility due to their enormous comparative mass, the consequent foundation needs, and the time-consuming and skilled labor needed in their construction and laying. They are very durable and considered more handsome than clay bricks by some. Only a few stones are suitable for bricks. Common materials are granite, limestone and sandstone. Other stones may be used (for example, marble, slate, quartzite, and so on) but these tend to be limited to a particular locality.

For efficient handling and laying, bricks must be small enough and light enough to be picked up by the bricklayer using one hand (leaving the other hand free for the trowel). Bricks are usually laid flat and as a result the effective limit on the width of a brick is set by the distance which can conveniently be spanned between the thumb and fingers of one hand, normally about four inches (about 100 mm). In most cases, the length of a brick is about twice its width, about eight inches (about 200 mm) or slightly more. This allows bricks to be laid bonded in a structure which increases stability and strength (for an example, see the illustration of bricks laid in English bond, at the head of this article). The wall is built using alternating courses of stretchers, bricks laid length-wise, and headers, bricks laid width-wise. The headers tie the wall together over its width. In fact, this wall is built in a variation of English bond called English cross bond where the successive layers of stretchers are displaced horizontally from each other by half a brick length. In true English bond, the perpendicular lines of the stretcher courses are in line with each other.

A bigger brick makes for a thicker (and thus more insulating) wall. Historically, this meant that bigger bricks were necessary in colder climates while a smaller brick was adequate, and more economical, in warmer regions. Nowadays this is no longer an issue, as modern walls typically incorporate specialized insulation materials. Bricks are used for building, block paving and pavement. In the USA, brick pavement was found incapable of withstanding heavy traffic, but it is coming back into use as a method of traffic calming or as a decorative surface in pedestrian precincts. Bricks in the metallurgy and glass industries are often used for lining furnaces, in particular refractory bricks such as silica, magnesia, chamotte and neutral (chromo-magnesite) refractory bricks. This type of brick must have good thermal shock resistance, refractoriness under load, high melting point, and satisfactory porosity. The correct brick for a job can be selected from a choice of color, surface texture, density, weight, absorption and pore structure, thermal characteristics, thermal and moisture movement, and fire resistance.

In the process of steel production and because of the energy cost and structural stress associated with heating and cooling a blast furnace, typically these primary steelmaking vessels will operate on a continuous production campaign of several years duration. Even during periods of low steel demand, it may not be feasible to let the blast furnace grow cold, though some adjustment of the production rate is possible. Integrated mills are large facilities that are typically only economical to build in 2,000,000 ton per year annual capacity and up. Final products made by an integrated plant are usually large structural sections, heavy plate, strip, wire rod, railway rails, and occasionally long products such as bars and pipe.

Cast iron is made by re-melting pig iron, often along with substantial quantities of scrap iron, scrap steel, lime stone, carbon (coke) and taking various steps to remove undesirable contaminants. Phosphorus and sulfur may be burnt out of the molten iron, but this also burns out the carbon, which must be replaced. Depending on the application, carbon and silicon content are adjusted to the desired levels, which may be anywhere from 2-3.5% and 1-3% respectively. Other elements are then added to the melt before the final form is produced by casting. Iron is sometimes melted in a special type of blast furnace known as a cupola, but more often melted in electric induction furnaces or electric arc furnaces.

After melting is complete, the molten iron is poured into a holding furnace or ladle. The preferred method of the present invention stems from using thermal energy communicated from thermal energy storage to enhance energy efficiency, additional efficiency can be obtained with the preferred method of the present invention recycling and recover of waste heat through use of heat exchangers and coils near the furnace to collect the waste thermal energy for communication to storage.

Cast iron's properties are changed by adding various alloying elements, or alloyants. Next to carbon, silicon is the most important alloyant because it forces carbon out of solution. The only over very important alloy is inclusion of ceramic which makes for a very high performance alloy combination with the silicon which is commonly used in cylinders and other high performance applications. Instead the carbon forms graphite which results in a softer iron, reduces shrinkage, lowers strength, and decreases density. Sulfur, when present, forms iron sulfide, which prevents the formation of graphite and increases hardness. The problem with sulfur is that it makes molten cast iron sluggish, which causes short run defects. To counter the effects of sulfur, manganese is added because the two form into manganese sulfide instead of iron sulfide. The manganese sulfide is lighter than the melt, so it tends to float out of the melt and into the slag.

Grey cast iron is characterized by its graphitic microstructure, which causes fractures of the material to have a grey appearance. It is the most commonly used cast iron and the most widely used cast material based on weight. Most cast irons have a chemical composition of 2.5-4.0% carbon, 1-3% silicon, and the remainder is iron. Grey cast iron has less tensile strength and shock resistance than steel, but its compressive strength is comparable to low and medium carbon steel.

White cast iron is a type of cast iron that displays white fractured surface due to the presence of cementite. With a lower silicon content (graphitizing agent) and faster cooling rate, the carbon in white cast iron precipitates out of the melt as the metastable phase cementite, $Fe_3C$, rather than graphite. The cementite which precipitates from the melt forms as relatively large particles, usually in a eutectic mixture, where the other phase is austenite (which on cooling might transform to martensite).

Malleable iron starts as a white iron casting that is then heat treated at about 900° C. (1,650° F.). The preferred method of the present invention stems from using thermal energy communicated from thermal energy storage to enhance energy efficiency. Graphite separates out much more slowly in this case, so that surface tension has time to form it into spheroidal particles rather than flakes. Due to their lower aspect ratio, spheroids are relatively short and far from one another, and have a lower cross section vis-a-vis a propagating crack or phonon. They also have blunt boundaries, as opposed to flakes, which alleviates the stress concentration problems faced by grey cast iron. In general, the properties of malleable cast iron are more like mild steel. There is a limit to how large a part can be cast in malleable iron, since it is made from white cast iron.

Ductile east iron or nodular is a more recent development. Minute amounts of magnesium or cerium added to these alloys slow down the growth of graphite precipitates by bonding to the edges of the graphite planes. Strict control of other elements and timing, allows the carbon to separate as spheroidal particles as the material solidifies. The properties are similar to malleable iron, but parts may be able to cast with considerably larger molded sections.

Converting captured and sequestered $CO_2$ into products such as chemicals, plastics, fuels, building materials, and other commodities is both an environmental friendly method and economically advantageous. Incorporation into existing polymer (plastics) formulations results in packaging foams with higher tensile strength and load-bearing capacity, and adhesives and coatings with improved adhesion, cohesive strength, and "weatherabilty" properties, such as UV- and water-resistance. Capital requirements and operational costs to produce the non-fossil fuels polymers closely mirror conventional production costs, and the products demonstrate increased strength and environmental resistance relative to existing polymers. The production scope is a diverse range of applications, including flexible, rigid, and microcellular packaging foams, thermoplastics, polyurethane adhesives and sealants, and coating resins for food and beverage cans.

Each carbon filament is produced from a precursor polymer such as polyacrylonitrile (PAN), rayon, or petroleum pitch. For synthetic polymers such as PAN or rayon, the precursor is first spun into filament yarns, using chemical and mechanical processes to initially align the polymer atoms in a way to enhance the final physical properties of the completed carbon fiber. Precursor compositions and mechanical processes used during spinning filament yarns may vary among manufacturers. After drawing or spinning, the polymer filament yarns are then heated to drive off non-carbon atoms (carbonization), producing the final carbon fiber.

The carbon fibers filament yarns may be further treated to improve handling qualities, and then wound on to bobbins. Synthesis of carbon fiber from Polyacrylonitrile (PAN) 1) Polymerization of acrylonitrile to PAN 2) Cyclization during low temperature process 3) High temperature oxidative treatment of carbonization (hydrogen is removed). Following this process, graphitization starts when nitrogen is removed and chains are joined into graphite planes. A common method of manufacture involves heating the spun PAN filaments to approximately 300° C. in air, which breaks many of the hydrogen bonds and oxidizes the material.

The oxidized PAN is then placed into a furnace, the preferred method of the present invention uses thermal energy from thermal energy storage to provide pre-heat and heating of the furnace, having an inert atmosphere of a gas such as argon, and heated to approximately 2000° C., the preferred method of the current invention also would include the use of heat exchangers and coils near the furnace for the purpose of recycling and recovery of thermal waste energy for the purpose of communicating to thermal energy storage enhancing overall system efficiencies, this thermal energy induces graphitization of the material, changing the molecular bond structure. When heated in the correct conditions, from the preferred method of the present invention thermal energy is communicated to the furnace to enforce these chains to bond side-to-side (ladder polymers), forming narrow graphene sheets which eventually merge to form a single, columnar filament. The result is usually 93-95% carbon. Lower-quality fiber can be manufactured using pitch or rayon as the precursor instead of PAN. The carbon can become further enhanced, as high modulus, or high strength carbon, by heat treatment processes. Carbon heated in the range of 1500-2000° C. (carbonization) exhibits the highest tensile strength (820,000 psi, 5,650 MPa or $N/mm^2$), while carbon fiber heated from 2500 to 3000° C. (graphitizing) exhibits a higher modulus of elasticity (77,000,000 psi or 531 GPa or 531 $kN/mm^2$).

Directed-Energy Weapon System (DEWS) is a weapon system that emits energy or energy accelerated projectile aimed at a specified target in a determined or projected direction or flight path of an intended target. DEWs of prior art have typically been categorized by the frequency in which they operate such as RF (for radio frequency) and such as Laser, which is a weapon based on the type of energy discharge.

Enzymes commercially available now are generally at economical input costs comparable in ratio to the value added chemical process and associated vertical products. Furthermore, any substantial reduction in the cost of production of enzymes will be a positive stimulus for the commercialization of enzymatic depilation. Proteases are one of the most important groups of industrial enzymes and account for nearly 60% of the total enzyme sale. The major uses of free proteases occur in dry cleaning, detergents, meat processing, cheese making, and production of digestive enzymes.

A wide range of microorganisms including them are available commercially; and, they have almost completely replaced chemical hydrolysis of starch in starch processing industry. Although many microorganisms produce this enzyme, the most commonly used for their industrial application are *Bacillus licheniformis, Bacillus amyloliquifuciens* and *Aspergillus niger*. Amylases stand out as a class of enzymes, which are of useful applications in the food, brewing, textile, detergent and pharmaceutical industries.

Common biomass can be easily determined after simple drying in oven as well as in dissector and weighing by digital balance. Fungal proteases are of particular importance in the Submerged fermentation is the cultivation of microorganisms in liquid nutrient broth. Industrial enzymes can be produced using this process. This involves selective growing carefully selected microorganisms. The preferred method of the present invention comprises an artificial intelligence controlled and stabilized environmental control system using adaptive metrics, biometrics and thermal imaging sensing for active analysis, monitoring and machine learning control providing sustainable ecosystem elements encompassing a high volume symmetrical fermentation growth system while incorporating a microalgae bioreactor and organism reactor production system. Through monitoring the health of the enzymes through artificial intelligence analysis, monitoring and control from thermal analysis of fermentation, reactor and bioreactor systems will modify environmental settings for optimized growth and production through a process of machine learning algorithms. The process of harvesting enzymes from the fermentation medium the microbial cells and other insolubles must be removed.

This process is typically performed by centrifugation. In general, most industrial enzymes are extracellular (secreted by cells into the external environment), they remain in the fermented mixture after the biomass has been removed. The biomass can be recycled as a feed additive once dried or may be used fertilizer if it is treated with lime to inactivate the microorganisms and stabilize it for storage and application. The enzymes in the remaining broth are then concentrated by evaporation, membrane filtration or crystallization depending on their intended application. If pure enzyme preparations are required, they are usually isolated by gel or ion exchange chromatography. Certain applications require solid enzyme products, so the crude powder enzymes are made into granules to make them more convenient to use. Sometimes liquid formulations are preferred because they are easier to handle and dose along with other liquid ingredients. Enzymes used in starch conversion to convert glucose into fructose are immobilized, typically on the surfaces of inert granules held in reaction.

Fermentation in liquid media is of two types depending upon the mode of operation: A. Batch fermentation, B. Continuous fermentation. Batch reactors are simplest type of mode of reactor operation. In this mode, the reactor is filled with medium and the fermentation is allowed to proceed. When the fermentation has finished the contents are emptied for downstream processing. The reactor is then cleaned, re-filled, re-inoculated and the fermentation process starts again. Continuous reactors: Fresh media is continuously added and bioreactor fluid is continuously removed. As a result, cells continuously receive fresh medium and products and waste products and cells are continuously removed for processing. The reactor can thus be operated for long periods of time without having to be shut down. Continuous reactors can be many times more productive than batch reactors. This is parity due to the fact that the reactor does not have to be shut down as regularly and also due to the fact that the growth rate of the bacteria in the reactor can be more easily controlled and optimized.

In addition, cells can also be immobilized in continuous reactors, to prevent their removal and thus further increase the productivity of these reactors. Continuous reactors are as yet not widely used in industry but do find major application in wastewater treatment. Fed batch reactor is the most common type of reactor used in industry. In this reactor, fresh media is continuous or sometimes periodically added to the bioreactor but unlike a continuous reactor, there is no continuous removal. The fermenter is emptied or partially emptied when reactor is full or fermentation is finished. As with the continuous reactor, it is possible to achieve high productivities due to the fact that the growth rate of the cells can be optimized by controlling the flow rate of the feed entering the reactor.

Production process of ethanol typically has a few basic steps for large scale production of ethanol which are: microbial (yeast) fermentation of sugars, distillation, dehydration, and denaturing (optional for resale tax advantage). Prior to fermentation, some crops require saccharification or hydrolysis of carbohydrates such as cellulose and starch into sugars. Saccharification of cellulose is called cellulolysis (cellulosic ethanol production). Enzymes are used to convert starch into sugar.

Ethanol fermentation is typically used in the ethanol process in which ethanol is produced by microbial fermentation of the sugar. Microbial fermentation will currently only work directly with sugars. Two major components of plants, starch and cellulose, are both made up of sugars, and can in principle be converted to sugars for fermentation. There are three primary methods primarily consisting of the use of sugar (e.g. sugar cane) and starch (e.g. corn) this would also include the newest method of which there is great efforts currently addressing the area of cellulosic ethanol, where the cellulose part of a plant is broken down to sugars and subsequently converted to ethanol. The preferred method of the present invention will communicate thermal energy from thermal energy storage for the purpose of assisting and maintaining proper fermentation temperatures.

For the ethanol to be usable as a fuel or other intended uses, the majority of the water must be removed. Most of the water is removed by distillation, but the purity is limited to 95-96% due to the formation of a low-boiling water-ethanol azeotrope with maximum (95.6% m/m (96.5% v/v) ethanol and 4.4% m/m (3.5% v/v) water). This mixture is called hydrous ethanol and can be used as a fuel alone, but unlike anhydrous ethanol, hydrous ethanol is not miscible in all ratios with gasoline, so the water fraction is typically removed in further treatment in order to be used as fuel or other intended uses.

There are basically three dehydration processes to remove the water from an azeotropic ethanol/water mixture. The first process, used in many early fuel ethanol plants, is called azeotropic distillation and consists of adding benzene or cyclohexane to the mixture. When these components are added to the mixture, it forms a heterogeneous azeotropic mixture in vapor-liquid-liquid equilibrium, which when distilled produces anhydrous ethanol in the column bottom, and a vapor mixture of water, ethanol, and cyclohexane/benzene. When condensed, this becomes a two-phase liquid mixture. The heavier phase, poor in the entrainer (benzene or cyclohexane), is stripped of the entrainer and recycled to the feed, while the lighter phase together with condensate from the stripping is recycled to the second column. Another early method, called extractive distillation, consists of adding a ternary component which will increase ethanol's relative volatility. When the ternary mixture is distilled, it will produce anhydrous ethanol on the top stream of the column.

Pyrolysis is a thermochemical decomposition of organic material at elevated temperatures in the absence or near absence of oxygen or halogen. Primarily consists and involves the simultaneous change of chemical composition and physical phase, and is irreversible. The word is coined from the Greek-derived elements pyro "fire" and lysis "separating".

Pyrolysis is a type of thermolysis which is commonly observed in organic materials exposed to high temperatures. Thermal decomposition, or thermolysis, is a chemical decomposition caused by heat. The decomposition temperature of a substance is the temperature at which the substance chemically decomposes. The reaction is usually endothermic as heat is required to break chemical bonds in the compound undergoing decomposition. When not controlled and decomposition is sufficiently exothermic, a positive feedback loop is created producing thermal runaway and can potentially result in an explosion. Pyrolysis is one of the processes involved in charring wood, starting at 200-300° C. (390-570° F.). Typically, pyrolysis of organic substances produces gas and liquid products and leaves a solid residue richer in carbon content, char or coke. Extreme pyrolysis, the primary method of carbon fiber production is a process in which pyrolysis leaves mostly carbon as the residue, is called carbonization.

The pyrolysis process is heavily used in the chemical industry, for example, to produce charcoal, activated carbon, methanol, and other chemicals from wood, to convert ethylene dichloride into vinyl chloride to make PVC, to produce coke from coal, to convert biomass into syngas and bio-char or bio-coke, to turn waste into safely disposable substances, and for transforming medium-weight hydrocarbons from oil into lighter ones like gasoline. These specialized uses of pyrolysis may be called various names, such as dry distillation, destructive distillation, or cracking.

Pyrolysis typically also plays an important role in several cooking procedures, such as baking, frying, grilling, and caramelizing. In addition, it is a tool of chemical analysis, for example, in mass spectrometry and in carbon-14 dating. Many highly important chemical compounds for required life, such as phosphorus and sulfuric acid, were first obtained by this very process. Pyrolysis has generally been assumed to occur during catagenesis, the conversion of buried organic matter to fossil fuels, hence pyrolysis use of pressure and thermal energy. It is also the basis of pyrography. In their embalming process, the ancient Egyptians used a mixture of substances, including methanol, which they obtained from the pyrolysis of wood.

Pyrolysis differs from other high-temperature processes like combustion and hydrolysis in that it usually does not involve reactions with oxygen, water, or any other reagents. In practice, it is not possible to achieve a completely oxygen-free atmosphere. Because some oxygen is present in any pyrolysis system, a small amount of oxidation occurs.

The term has also been applied to the decomposition of organic material in the presence of superheated water or steam (hydrous pyrolysis), for example, in the steam cracking of oil.

Pyrolysis is usually the first chemical reaction that occurs in the burning of many solid organic fuels, like wood, cloth, and paper, and also of some kinds of plastic. In a wood fire, the visible flames are not due to combustion of the wood itself, but rather of the gases released by its pyrolysis, whereas the flame-less burning of a solid, called smoldering, is the combustion of the solid residue (char or charcoal) left behind by pyrolysis. Thus, the pyrolysis of common materials like wood, plastic, and clothing is extremely important for fire safety and firefighting.

In many industrial pyrolysis applications such as Charcoal production, Bio-char production, Coke production, Carbon fiber production, Pyrolytic carbon production, Biofuels, Plastic waste disposal, Waste tire disposal, the process is done under pressure and at operating temperatures above 430° C. (806° F.). For agricultural waste, for example, typical temperatures are 450 to 550° C. (840 to 1,000° F.). The preferred method of the present invention may communicate thermal energy from thermal storage on demand or as needed to maintain renewable energy input and a sustainable method of processing.

Traditional air cooling has several major issues that are typical deficiencies of air cooling systems. First, air cooling systems are generally not very efficient due to fact the humidity in the datacenter air space is kept artificially low, therefore the density of air is tremendously low, this lack of density creates an inefficient mass volume movement of air from its propensity to dissipate flow, thereby thermal transfer inefficiencies between datacenter heat sources requiring cooling and exhaust to expel datacenter thermal energy, which can pose a problem with severely overclocked processors or in particularly beefy rigs filled with multiple graphics cards. Second, the heat sinks on powerful component coolers can get rather large and unruly putting excessive pressure on boards and connections, their size can accentuate air flow blockage and enhance poor air flow from reduced fluid lines for smooth air flow to effectuate efficient thermal transfer removal. Finally, fans are typically loud and tend to fail from blade imbalance, poor bearing construction and from overheating.

Liquid cooling is a highly effective method of removing excess thermal energy, with the most common heat transfer fluid in desktop systems being a water and glycol mixture. The advantages of water cooling over air cooling include water's higher specific thermal energy capacity and thermal conductivity. The principle used in cooling electronics and electrical components is identical to that used in an internal combustion engine, with the liquid coolant being circulated by a coolant pump through a duct to thermal transfer unit, sometimes referred to as a thermal transfer block mounted to the intended target to be cooled and then transferring the thermal energy away from the target out to the thermal transfer heat exchanger to dissipate the thermal energy from the system. Liquids allow the transfer of more thermal energy communicated away from the components being cooled than air, making liquid cooling suitable for overclocking and high-performance computer applications. In comparison with air cooling, liquid cooling is also influenced less by the ambient temperature and little if any influence from humidity. Liquid cooling's comparatively low noise-level compares favorably to that of active cooling, which can become quite noisy.

Disadvantages of liquid cooling include complexity and the potential for a coolant leak. Leaked water can damage any electronic components with which it comes into contact, and the need to test for and repair leaks makes for more complex and less reliable installations. An air-cooled heat sinks are generally much simpler to build, install, and maintain than a water cooling solution, although specific water cooling kits can also be found, which may be just as easy to install as an air cooler. These are not limited to cooling of CPU's, GPU's or short and long-term memory however, as storage drive cooling is also possible.

While originally limited to mainframe computers, liquid cooling has become a practice largely associated with overclocking in the form of either manufactured kits, or in the form of do-it-yourself setups assembled from individually gathered parts. The past few years have seen an increase in the popularity of liquid cooling in pre-assembled, moderate to high performance, desktop computers. Additionally, a sealed or "closed-loop" system will typically incorporating a small pre-filled radiator, fan, and water block simplify the installation and maintenance of water cooling at a slight cost in cooling effectiveness relative to larger and more complex setups.

Traditional water cooling versus the preferred method of the present invention consists a hybrid air and closed-loop chilled liquid coolant cooling system. Typically, liquid cooling is generally combined with air cooling, using liquid cooling for the higher thermal energy components, such as CPUs, GPUs, short and long-term memory, storage drives, voltage regulator modules (VRMs), and even power supplies can be water-cooled. This can be accomplished while retaining the simpler and cheaper air cooling for less demanding component and system cooling and for general datacenter thermal energy removal.

More recently a growing number of companies are manufacturing water-cooling components compact enough to fit inside a computer case and shaped to fit specific motherboards, power units and various components. This, and the general trend to use CPU's, GPU's, drives memory and other thermal intensive components of higher power dissipation, has greatly increased the popularity and usefulness of water cooling, although only a very small select group of computers users such as gamers and video editors, and special effects professionals use liquid coolant-cooled systems.

Modern liquid cooling systems use minor system pressurization, this typically is approximately 15 psi. This process generally raises the boiling-point of the coolant and reduces evaporation. The use of water cooling carries the risk of lower temperature vaporization from heat exposure. Many water based liquid cooling applications require the use of a water and antifreeze mixture, typically glycol.

Liquid coolant in general is typically a water and glycol mixture for removing thermal energy from a component, machine, system or area. Liquid coolant may be recycled through a recirculating system. Recirculating systems generally in prior art rely upon cooling towers, evaporators and economizers to remove thermal energy is accomplished with negligible evaporative loss of cooling water. A heat exchanger or condenser may separate non-contact liquid coolant from a fluid being cooled. Antifreeze also inhibits corrosion from dissimilar metals and can increase the boiling point, allowing a wider range of water cooling temperatures in attempts to raise the vaporization point to a temperature unlikely to be experienced. Its distinctive odor also alerts operators to cooling system leaks and problems that could typically go unattended in a water-only cooling system.

Dairy farming is a class of agriculture, where female cattle, goats, or other mammals are raised for their milk, which may be either processed on-site or transported to a dairy for processing and eventual retail safe. A centralized dairy facility processes milk and dairy products, such as cream, butter, yogurt, cheese and ice cream. Dairy farms generally sell the male calves borne by their mothers for veal meat, as dairy breeds are not normally satisfactory for commercial beef production. Many dairy farms typically grow their own feed, typically including corn, alfalfa, and hay using the manure as fertilizer for the above crops.

Specific species pre-processing for when the targeted species is harvested for commercial purposes, they initially need some preprocessing to be readied safely for delivery to the next part of the product process chain in a fresh and undeteriorated condition. Typical handling and processes are transferring the targeted species from grow out areas to the holding area in the processing area.

Further processing and handling may commence such as sorting and grading, skinner, bleeding, gutting and washing, cutting, chilling, storing the chilled processed species. The number and order in which these operations that are undertaken differ with the various targeted species and the type of processing needed for the finished product.

Targeted species preservation techniques are required to prevent product spoilage, reducing waste from product trimming and lengthen shelf life. There are processes designed to inhibit the activity of spoilage bacteria and the metabolic changes that result in the loss of product quality. Spoilage bacteria are the specific bacteria that produce the unpleasant odors and flavors associated with spoiled product. Targeted species will normally host a variety of bacteria that are not spoilage type of bacteria, and most of the bacteria present on spoiled product played no basis in the spoilage. For, a bacterium to initiate and flourish, it requires the right temperature, sufficient humidity and oxygen, and surroundings that are pH balanced but not too acidic. Various preservation techniques work by interrupting one or more of these requirements.

Control of temperature with the use of ice preserves products during processing and extends shelf life by lowering the temperature. As the temperature is decreased, the metabolic activity in the product from microbial or autolytic processes can be reduced or eliminated. This is achieved by refrigeration where the temperature is dropped to about 0° C., or freezing where the temperature is dropped below −18° C.

Poultry farms are devoted to raising chickens (egg layers or broilers), turkeys, ducks, and other fowl, generally for meat or eggs. Eggs are typically produced on large egg ranches on which environmental parameters are well controlled. Chickens are exposed to artificial light cycles to stimulate egg production year-round. In addition, it is a common practice to induce molting through careful manipulation of light and the amount of food they receive in order to further increase egg size and production.

On average, a chicken lays one egg a day, but not on every day of the year. This varies with the breed and time of year. In 1900, average egg production was 83 eggs per hen per year. In 2000, it was well over 300. In the United States, laying hens are butchered after their second egg laying season. In Europe, they are generally butchered after a single season. The laying period begins when the hen is about 18-20 weeks old (depending on breed and season). Males of the egg-type breeds have little commercial value at any age, and all those not used for breeding (roughly fifty percent of all egg-type chickens) are killed soon after hatching.

Specific species pre-processing for when the targeted species is harvested for commercial purposes, they initially need some preprocessing to be readied safely for delivery to the next part of the product process chain in a fresh and undeteriorated condition. Typical handling and processes are transferring the targeted species from grow out areas to the holding area in the processing area.

Further processing and handling may commence such as sorting and grading, skinner, bleeding, gutting and washing, cutting, chilling, storing the chilled processed species. The number and order in which these operations that are undertaken differ with the various targeted species and the type of processing needed for the finished product.

The land and buildings of a farm are called the "farmstead". Large animal enterprises where livestock are raised on rangeland are typically called ranches. Where livestock are raised in confinement on feed produced elsewhere, the term feedlot is usually used and generally where final grow out and finishing is completed.

Intensive animal farming or industrial livestock production, also called factory farming, is a modern form of intensive farming that refers to the industrialized production of livestock, including cattle, poultry (in "Battery cages") and fish in confinement at high stocking density commonly referred to as pens or tanks, a practice typical in industrial farming by agribusinesses. The main products of this industry are meat, milk and eggs for human consumption.

Confinement at high stocking density is one part of a systematic effort to produce the highest output at the lowest cost by relying on economics of scale, modern machinery, biotechnology, and global trade. Factory farms hold large numbers of animals, typically cows, pigs, turkeys, or chickens, often indoors, typically at high densities. The aim of the operation is to produce large quantities of meat, eggs, or milk at the lowest possible cost. Food is supplied in place, and a wide variety of artificial methods are employed to maintain animal health and improve production, such as the use of antimicrobial agents, vitamin supplements, and growth hormones. Physical restraints are used to control movement or actions regarded as undesirable. Breeding programs are used to produce animals more suited to the confined conditions and able to provide a consistent food product. Many routine husbandry practices involve ear tagging, dehorning, loading, medical operations, vaccinations and hoof care, as well as training for agricultural shows and preparations.

Cattle for example once they obtain an targeted-level weight, those on a range or grow lots are then transferred to a feedlot to be fed a specialized animal feed which consists of corn byproducts (derived from ethanol production), barley, and other grains as well as alfalfa, cottonseed meal, and premixes composed of micro-ingredients such as vitamins, minerals, chemical preservatives, antibiotics, fermentation products, and other essential ingredients that are purchased from premix companies, usually in sacked form, for blending into commercial rations. Because of the availability of these products, a farmer who uses his own grain can formulate his own rations and be assured his animals are getting the recommended levels of minerals and vitamins.

Aquaculture is the cultivation of the natural produce of water (fish, shellfish, algae and other aquatic organisms). The term is distinguished from fishing by the idea of active human effort in maintaining or increasing the number of organisms involved, as opposed to overfishing and overburden wild stocks and creating imbalance of the natural ecosystem. Subsets of aquaculture include Mariculture (aquaculture in the ocean); Algaculture (the production of kelp seaweed and other algae); Fish farming (the raising of catfish, tilapia and crawfish in freshwater and brackish ponds or salmon in marine ponds); and the growing of cultured pearls. Extensive aquaculture is based on local photosynthetic production while intensive aquaculture is based on fish fed with an external food supply.

Confinement and overcrowding of animals results in a lack of exercise and natural locomotory behavior, which weakens their bones and muscles. An intensive poultry farm provides the optimum conditions for viral mutation and transmission with thousands of birds crowded together in a closed, warm, and dusty environment is highly conducive to the transmission of a contagious disease. Selecting generations of birds for their faster growth rates and higher meat yields has left birds' immune systems less able to cope with infections and there is a high degree of genetic uniformity in the population, making the spread of disease more likely. Further intensification of the industry has been suggested by some as the solution to avian flu, on the rationale that keeping birds indoors will prevent contamination. However, this relies on perfect, fail-safe biosecurity—and such measures are near impossible to implement.

Movement between farms by people, materials, and vehicles poses a threat and breaches in biosecurity are possible. Intensive farming may be creating highly virulent avian flu strains. With the frequent flow of goods within and between countries, the potential for disease spread is high. Confinement and overcrowding of animals' environment presents the risk of contamination of the meat from viruses and bacteria. Feedlot animals reside in crowded conditions and often spend their time standing in their own waste.

The major concentration of the industry occurs at central slaughter and meat processing plants for this phase, with only seven companies slaughtering and processing with monopolistic percentages of cows, sheep, pigs and chickens. This concentration at the slaughter phase is in large part due to financial and regulatory barriers that make it nearly impossible for small slaughter plants to be built, maintained or stay in business. Factory farming is no more beneficial to livestock producers than traditional farming because it contributes to the overproduction that drives down prices. Through "forward contracts" and "marketing agreements,"

meatpackers are able to set the price of livestock long before they are ready for production.

Many of the nation's livestock producers would like to market livestock directly to consumers but with limited USDA inspected slaughter facilities livestock grown locally cannot typically be slaughtered and processed locally.

The fullest extent of the advantage the preferred method of present invention can be realized and monetized from its amalgamation of energy input, energy usage, waste energy recycling, reuse and finally capturing higher efficiencies from optimized performance to reach near theoretical achievable levels. Removing prior art deficiencies and inefficiencies from prior arts attempts at flawed implementation to answer a need with a typically individualized answer or solution while fulfilling only a narrow segment of the need in question versus the preferred method of the present invention fulfilling a solution to meet the needs and the query while offering answers and solutions to questions and issues created from the sequence of fulfilling the initial need or query. The preferred method of the present invention examines not only the initial needs and questions but attempts to provide additional answers and solutions to complex consequences created by fulfillment of the initial needs and queries as a complete and robust solution.

SUMMARY

The present embodiments relate to techniques for mobile and stationary, localized distributed energy generation, storage, and utilization systems. Furthermore, the present embodiments relate to thermal solar systems for thermal energy generation and using the stored thermal and/or chemical and electrical energy to subsequently generate electricity and thermal energy on demand for heating, cooling and thermal energy intensive applications. Also, the present embodiments incorporate a Stirling engine designed with additional efficiencies due to cylinder design, placement and thermal stratification with the addition of a cold source loop. Additionally, the Stirling engine may include an additional thermal loop allowing waste heat from the Stirling cycle to be utilized, thereby increasing efficiency, to produce byproduct chemicals, feedstock, or various other substances. Furthermore, the chemicals produced by the system may be utilized to further increase efficiencies of the system, often in conjunction with the thermal energies form the system to power such things as absorption cooling systems, distillation systems, feedstock production systems, desalination systems, pyrolysis systems, ethanol production systems, fermenters, graphene production systems, carbon fiber production systems, cast iron refinement systems, aluminum refinement systems, solid-oxide fuel cells, radiant heating loops, radiant cooling loops, compressors, electrolyzers, The present embodiments include a Stirling engine utilizing at least one driveshaft, generator, bearings, and a compression side cylinder, power piston, regenerator, displacer side cylinder, and piston. The Stirling engine of the present embodiments also includes an over-sized high-heat thermal loop interfacing with the displacer side cylinder and an ice-water loop interfacing with the compression side cylinder. A further loop may be included to capture waste heat not utilized by the Stirling engine of the present embodiments to be utilized elsewhere within the system to increase the overall efficiency of the system. Also included in the present embodiments is a solar thermal collector utilizing one or more parabolic reflectors, linear receivers have a high-temperature and medium-temperature absorber and coordinating reflector with radiator. Also included is a high-temperature thermal fluid capture loop and a medium temperature thermal fluid capture loop as well as crescent shaped cross supports allowing for unimpeded independent rotational motion of the linear parabolic reflectors. In one or more embodiments one or more photovoltaic cells are attached to one or more of the parabolic reflectors. Thermal energy captured by the present embodiments are directed to sub-systems or to one or more thermal storage vessels that include one or more of the following: high-heat capacity, medium-heat capacity, low-heat capacity, working fluid and cold storage. The present embodiments also incorporate and utilize a computerized control system that intelligently monitors, controls and re-allocates captured energies and sub-system conversion and utilization processes by utilizing machine learning based on previous user input and/or one or more defined rules. The computerized control system of the present embodiments may also include one or more biometric and/or thermal imaging sensor to determine necessary re-allocations and utilization of the sub-system processes.

Objectives of the present invention include, but are not limited to:

One object of the present invention is to greatly enhance the localized energy generation by utilizing localized renewable energy generation and localized energy storage for on demand availability thereby lowering expensive commercial grid energy metered use.

A second object of the present invention is to provide a production facility that is based on symbiotic relationship with optimized emulation of the natural energy generation to use cycles.

A third object of the present invention is to provide a device wherein multiple components may be associated and interconnected with applications to one another to enhance efficiency and power production capabilities. This is effectuated by combining element processes to reduce losses by combining device element cycles and applications of material usage, thermal and electrical energy electrical demands.

A fourth object of the present invention is to reduce system component non-beneficial and redundant manufacturing and construction material requirements.

A fifth object of the present invention is to reduce system components count and area use requirements and greatly increases the ratio of production generated in consideration to system component install costs further than previously possible, due to the improvement of hybrid integration and generation.

A six object is to enable high efficiency by enabling thermal storage for heat and cold storage providing for on demand availability versus prior art usage of inefficient usage by increased startup and shutdown energy requirements of generation on demand of individual component applications and processes.

A seventh object is the inclusion of energy generation, storage, component and area cooling and/or heating requirements into a single system solution; recycle thermal energy from other processes waste heat to enhance efficiency and reduce system energy input requirements.

An eighth object is to recycle generated waste heat energy to use stored water supplies in closed loop coolant system to reduce subsystem requirements and maintenance.

A ninth object is to recycle generated waste heat for ground water and waste water reclamation and purification while reducing input energy requirements.

A tenth object is to recycle generated waste heat for potential use in desalination while reducing input energy requirements.

An eleventh object is to recycle regenerated waste heat for use in distillation while reducing input energy requirements.

A twelfth object is to recycle regenerated waste heat for use as replacement for thermal processing of water for heating water for usage and storage for on demand availability while reducing input energy requirements.

A thirteenth object is to provide potable water from localized unprocessed water sources or contaminated public water provisioning.

A fourteenth object is to store thermal energy to enable scalable commercial mass energy storage.

A fifteenth object is to use locally generated biomaterial as localized input for higher level product production.

A sixteenth object is to use stored thermal energy for conversion into localized thermal application use for on demand availability and usage.

A seventeenth object is to use stored chemical energy for conversion to electrical and thermal energy.

An eighteenth object is to reduce the carbon footprint for electrical and thermal generation.

A nineteenth object is to reduce the carbon footprint for localized energy consumption.

A twentieth object is to enable a localized renewable energy ecosystem for generation, storage and regeneration.

In addition, other objectives will be apparent from the figures and description herein below.

BRIEF DESCRIPTION OF THE DRAWINGS

FIG. 5a is an overall schematic view according to one or more examples of an embodiment of a Stirling engine block of cylinders in accordance with the present invention.

FIG. 5b is a schematic according to one or more examples of an embodiment of a section end view of a single set of Stirling engine cylinders with dual pistons in accordance with the present invention.

FIG. 5c is a schematic according to one or more examples of an embodiment of a section end view of a single set of Stirling engine cylinders in accordance with the present invention.

FIG. 6a-1 is a schematic according to one or more examples of an embodiment of an absorber field unit ("AFU") in accordance with the present invention.

FIG. 6a-2 is a top elevation view according to one or more examples of an embodiment of an AFU with reflector panels in accordance with the present invention.

FIG. 6a-3 is a schematic according to one or more examples of an embodiment of a carriage apparatus and motor in accordance with the present invention.

FIG. 6a-4 is a close-up perspective view according to one or more examples of an embodiment of a motor and gear for the carriage apparatus in accordance with the present invention.

FIG. 6b-1 is a schematic according to one or more examples of an embodiment of a solar-thermal collector in accordance with the present invention.

FIG. 6b-2 is a schematic according to one or more examples of an embodiment of a solar photo voltaic apparatus in accordance with the present invention.

FIG. 6c-1 is a schematic according to one or more examples of an embodiment of an overall view and details of the ultra-light, cable-truss-bridge structure of the collector in accordance with the present invention.

FIG. 6c-2 is a schematic according to one or more examples of an alternative embodiment of an overall view of the structure of a collector in accordance with the present invention.

DETAILED DESCRIPTION

Figure 1:
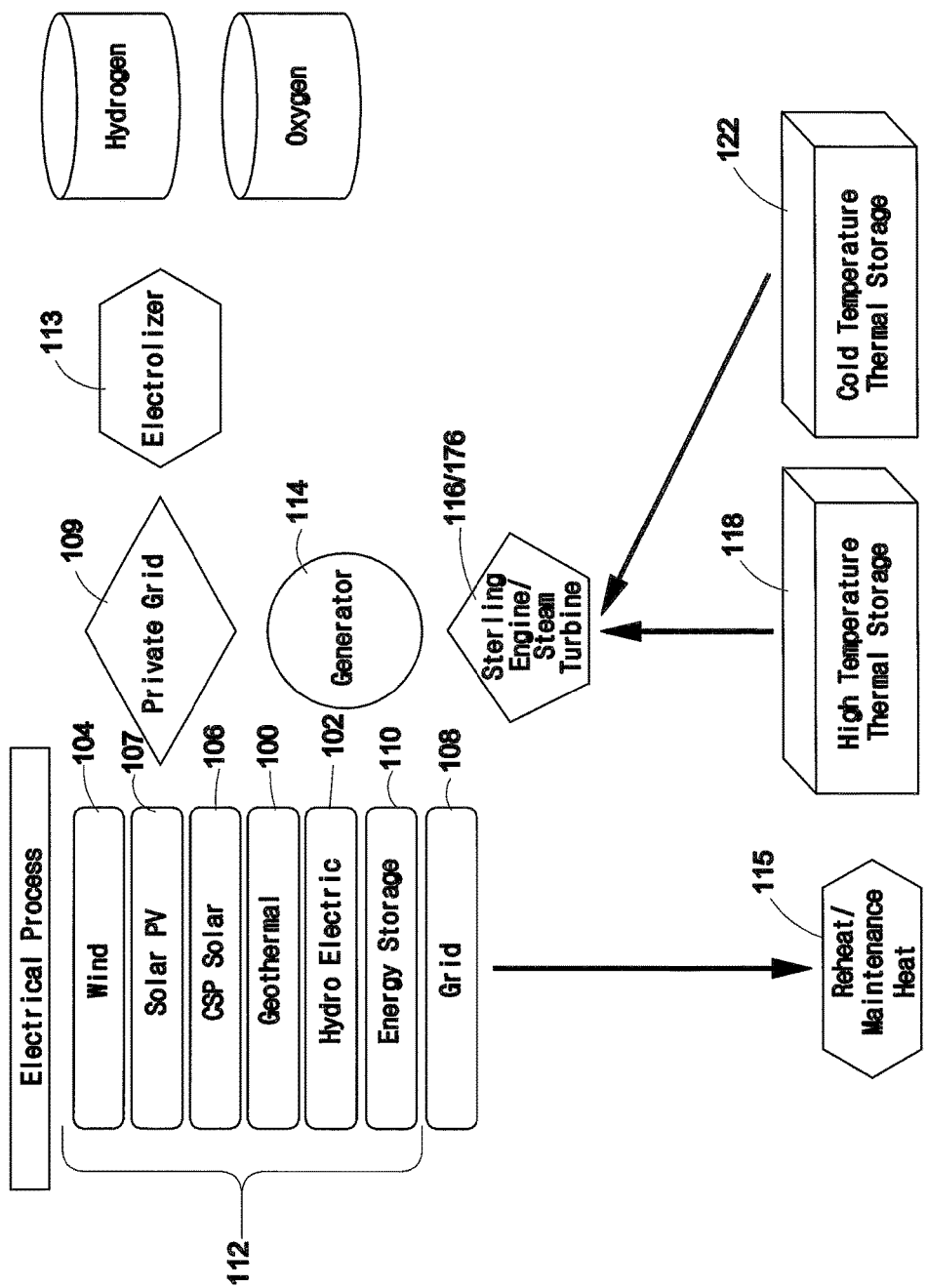
FIG. 1 is a flowchart according to one or more examples of an embodiment of electrical process in accordance with the present invention.

The following included description of the present invention has a primary core generation element that is comprised of the solar thermal component 106. Potential additional integration includes hybrid wind and/or photovoltaic solar power energy 107 generating devices. For example, the preferred embodiment of the solar thermal component 106 of the present invention integrates a photovoltaic solar panel 107 on top of the uppermost reflector 130. Supplemental thermal energy will be achieved from digester provided bios gas burner thermal generation. These devices form the key quintessential embodiment, integral for establishment of the distributed energy generation source to effectuate the other elements of the system. This provides energy generation source provisioning for electrical, chemical and grid connection, bidirectional networked data communication and control for interconnection and interoperability.

The following included description makes references to the accompanying drawings, which are provided for illustration of the preferred embodiment. However, such embodiment does not represent the full scope of the invention. The subject matter which the inventor does regard his invention is particularly pointed out and distinctly claimed in the claims of this specification.

The present invention forms a system defined by a set of integrated processes for the production and storage of electrical, chemical and thermal energy. Production and processing of thermal energy is typically for the purpose of thermal energy vessel storage and geothermal storage 100 for later use. Other objects, features, and advantages of the present invention will be readily appreciated from the following descriptions and listed improvements.

The description in the above sections and the following is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

It is a principal object and advantage of the present invention to maximize renewable energy as opposed to grid connected fossil and nuclear fuel sources for energy generation systems. Renewable energy is a term of art used to describe power derived from environmentally friendly sources of energy including renewable (or regenerative), non-polluting energy sources. (No source can be completely non-polluting, since any energy source requires an input of energy which creates some pollution.) Specific types of renewable energy include wind power, solar power, hydropower, geothermal power, and biomass/biofuel power.

As depicted in FIG. 1, it is another object and advantage of the present invention to use renewable energy sources 112 instead of non-renewable energy sources in a Quintuple-generation system set-up to create the electrical energy, heating and cooling to operate an integrated system, which can greatly reduce the costs in operating and maintaining such a system while using recycling to recover thermal energy from heat exchangers and coils for communication of energy to an energy storage facility. Quintuple-generation CCFRHP (also known as combined cooling, freezing, rotational energy, heat and power) refers to the combined production and utilization of electricity and heat energy, where the heat energy and cold energy are used as a combined energy source for Stirling engine 116 generation of rotational energy as a common energy source for all rotational energy intensive application and processes.

This "waste heat" is typically created as a byproduct during an industrial process. Instead of releasing this heat into the surrounding environment (and essentially treating this heat energy as waste heat), a quintuple-generation system will harness this heat energy for further thermal storage input and future uses. Such uses would include absorption cooling 121 for refrigeration 172 and cold storage 124. Quintuple-generation systems allow for the use of a higher percentage of energy obtained from an energy source. This translates into energy conservation, and thus savings to the user of the trigeneration system, since less of the energy needs to be used to obtain the same amount of useful energy from the energy source (as compared to a system that does not harness the waste heat).

The efficiency of a trigeneration system increases when the heating or cooling that is obtained from an energy source is utilized close to where the heating or cooling is created and harnessed. Further, the heat energy can be in the form of hot water or steam when not used for space heating, for example. It is a further object and advantage of the present invention to exploit such renewable energy in a Quintuple-generation facility, where the renewable energy could be utilized to its fullest potential thereby using less energy and passing off the savings to the user of such a facility.

It is another object and advantage of the present invention to provide an ULTRAGRID™ 194 connected and operated system that is grid independent and can operate almost anywhere (e.g., an open lot in a city or a field in the country), and can used as a distributed energy source for grid power provisioning close to customers, eliminate transportation costs, enhance power quality from its controlled environment, recycles energy wastes, and helps conserve energy resources.

Figure 10:
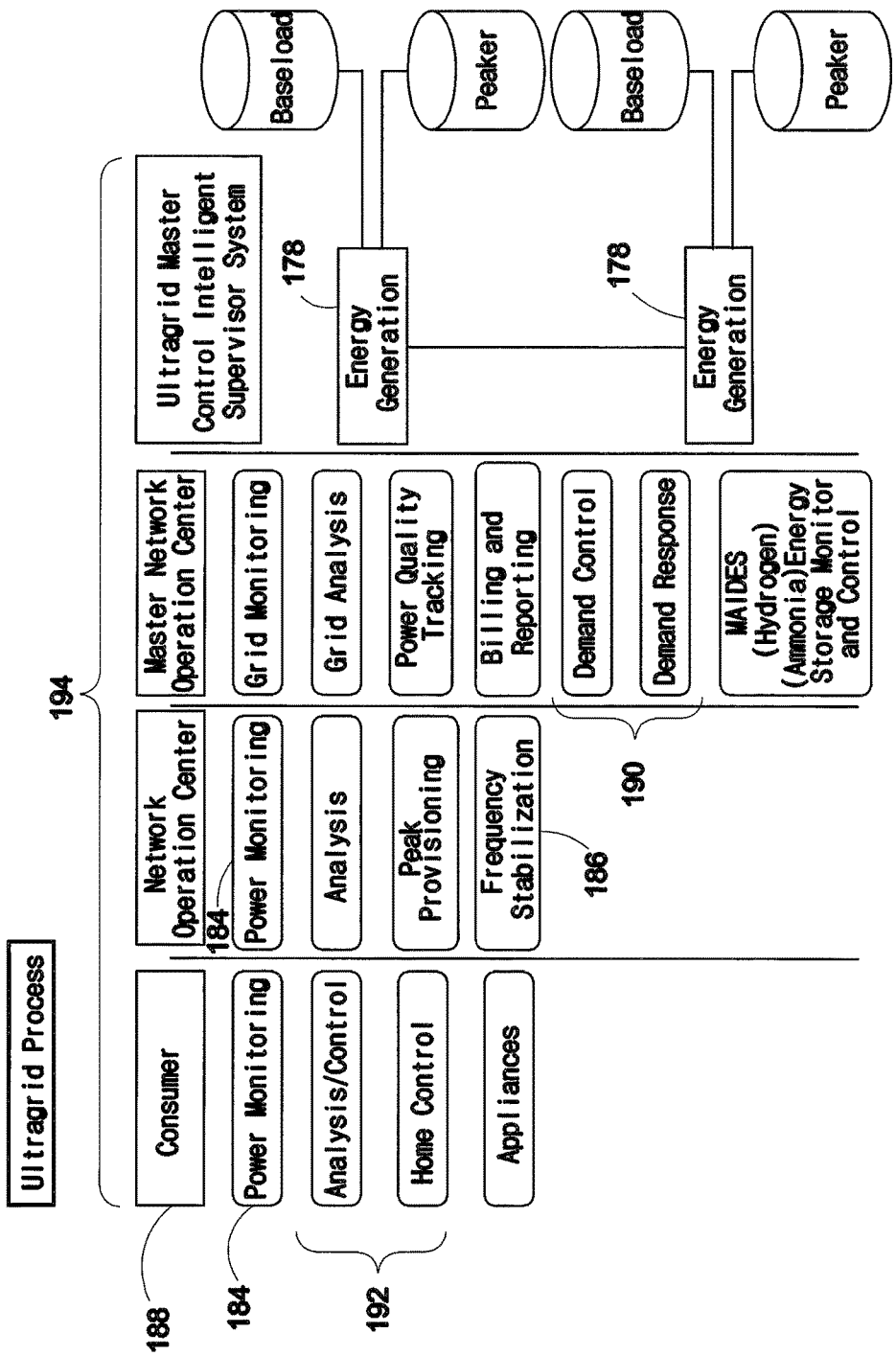
FIG. 10 is a block diagram according to one or more examples of an embodiment of the improved smart grid, ULTRAGRID™, layers in accordance with the present invention.

As depicted in FIG. 10, the present invention relates to a system and method of sustainable amalgamation of industries that vertically integrates highly unique ULTRAGRID™ 194 connected and controlled system design with green energy sources and energy storage 110. This invention has particular application to inclusion of additional industries and its associated processes and applications to form symbiotic systems using the previous description and outlines listed above that are for illustrative purposes the invention described previously above and described hereinafter with reference to this application. This is achieved by inclusion of an artificial intelligence and machine learning control system with active interfacing of adaptive biometrics, thermal imaging sensory and additional sensors for detection product contaminations, product quality assurance tracking of all methods, applications and product, can be quickly and easily be identified and analyzed to provide additional information for the control system. However, it will be appreciated that this invention may find use in alternate applications, such as breeding crustaceans or other aquatic species and/or growth of any other suitable plant.

Production of thermal energy is based on the premise that fluctuation of generational inputs is acceptable due to inherent design adaptations that maximize production during high energy generation availability and can scale downward or enter standby mode to match input limitations from lower generational capacity periods. However, generational output of the renewable energy technologies may fluctuate from inherent variations in environmental changes and effectual actions. Furthermore, such fluctuations may prevent the renewable energy generation technologies from balancing energy generation with energy demand (e.g., grid electrical demands, thermal applications and components). As a result, the systems may incur costs associated with operating and/or shutting down electric generators powered by other forms of energy (e.g., hydrogen, ammonia, thermal, coal, natural gas, hydroelectric power 102, nuclear power) in response to changes in electric demand and/or fluctuations in the supply of renewable generated power. To reduce such costs and/or increase the reliability of renewable power, the system of FIG. 1 may store energy from the renewable energy generation and subsequently generate energy in the form of electrical and thermal, hydrogen and ammonia from the stored energy based on electric demand. First, the energy may be stored in a chemical storage system 183 such as hydrogen, ammonia and other stored gases (e.g. Argon, Helium, Neon, etc.).

Second, the energy may be stored as heat in a high-heat-capacity thermal storage system 125 (e.g. molten salt, etc.). Low-heat-capacity working fluid may additionally be placed into an insulated storage vessel to retain the heat in short term stored low-heat-capacity fluid and/or to use external thermal input to maintain usable low-heat-capacity fluid capability. To generate electricity from the stored energy, a chemical-transfer mechanism, energy generation may selectively transfer chemical from storage to provide on demand energy generation.

Additionally heat-transfer mechanism, energy generation may selectively transfer heat from thermal storage to provide on demand energy generation. Heat energy without conversion can be used to initiate Stirling engine thermal energy input 116. Once heat is transferred, heat may also boil a working fluid (e.g., due to the low boiling point of working fluid), generating and steam and/or vapor that is used to rotate rotor blades of a turbine. Turbine and/or Stirling engine 116 usable work energy may then be used to drive an electric generator that supplies electricity to a load, or other uses for example such as providing rotational and/or linear energy for a pump or compressor and/or thermal energy to a thermal intensive application.

Such on-demand generation of energy from stored renewable energy may additionally reduce costs associated with the operation of other power stations to offset fluctuations in energy generation from renewable energy. Along the same lines, the use of mechanical elements (e.g., rotation-transmission mechanism and/or linear transmission mechanism and/or specifically could be rotor blades and/or gas and/or working fluid activated pistons), low-heat-capacity fluid and friction to store the energy may provide cost savings over conventional energy storage mechanisms such as batteries and/or pumped-storage hydroelectricity 102. In other words, the system of FIG. 4 may facilitate the effective, economical, and/or reliable generation of electricity and other thermal intensive applications with renewable energy.

Figure 4:
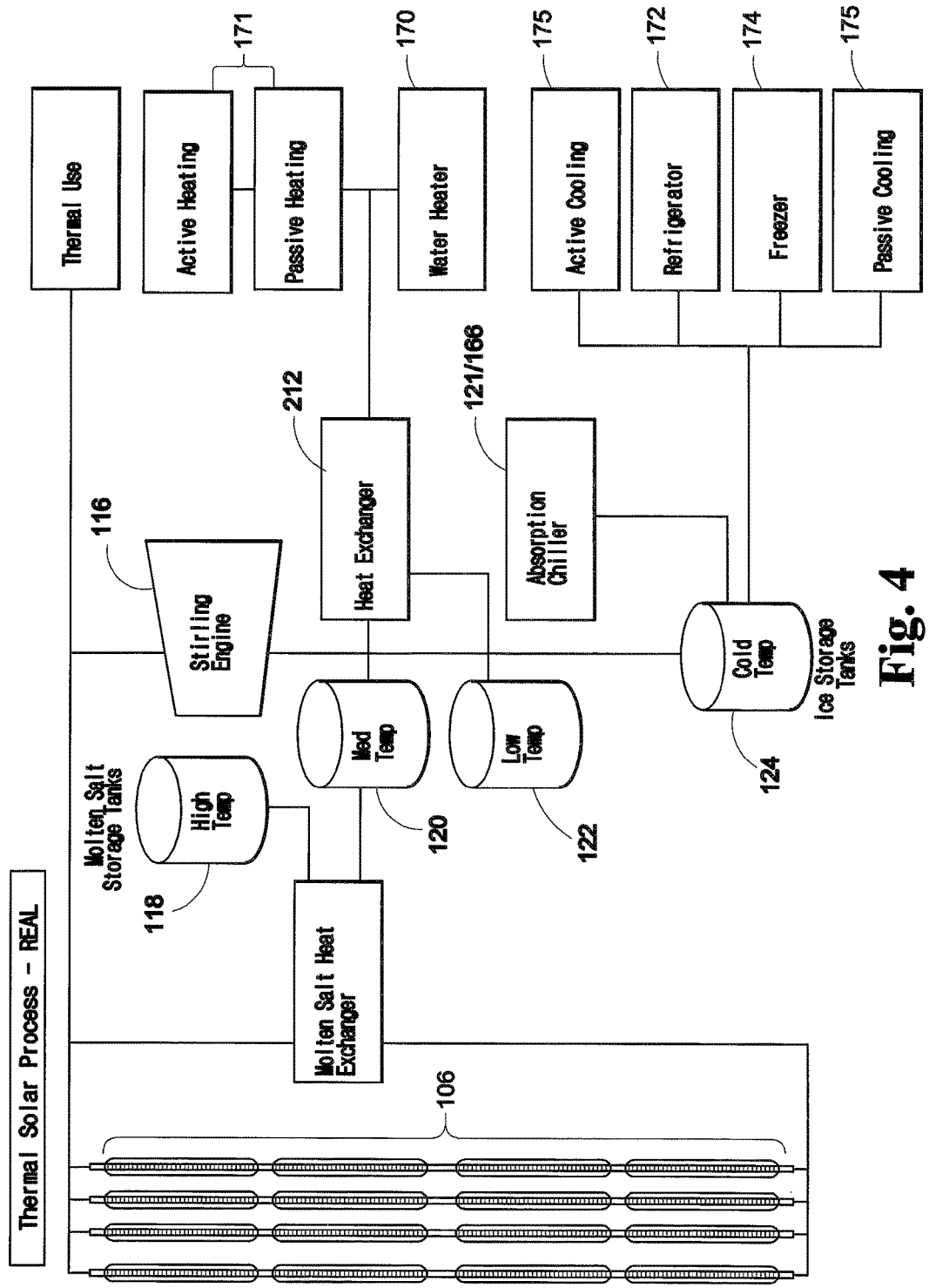
FIG. 4 is a flowchart according to one or more examples of an embodiment of a thermal solar process in accordance with the present invention.

FIG. 4 shows heat-transfer mechanism in accordance with an embodiment. As mentioned above, heat-transfer mechanism may enable the selective transfer of heat from low-heat-capacity fluid to working fluid. Heat-transfer mechanism and/or device may include a thermally conductive component such as a thermally insulated pipe and a thermally insulating component. Thermally conductive component may include a metal surface, manifold, conductive rod, radiator, and/or other structure that facilitates heat transfer mechanism. Conversely, thermally insulating component may include a vacuum-insulated panel and/or other thermally insulating material or structure.

To retain heat in low-heat-capacity fluid, thermally insulating component may be positioned between low-heat-capacity fluid and working fluid, as shown in FIG. 4. (Note that the positions of components and may be interchanged.) Because low-heat-capacity fluid is also enclosed in an insulated vessel (e.g., thermal insulated storage vessel 196 of FIG. 3), energy may be effectively stored in low-heat-capacity fluid as long as thermally insulating component prevents low-heat-capacity fluid from thermally contacting thermally conducting component and/or working fluid.

To transfer heat from low-heat-capacity fluid to working fluid, thermally insulating component may be redirected to enable thermal contact between low-heat-capacity fluid and working fluid through thermally conducting component. Once thermal contact is made between low-heat-capacity fluid and thermally conducting component, heat may be transferred from low-heat-capacity fluid to working fluid.

Figure 2:
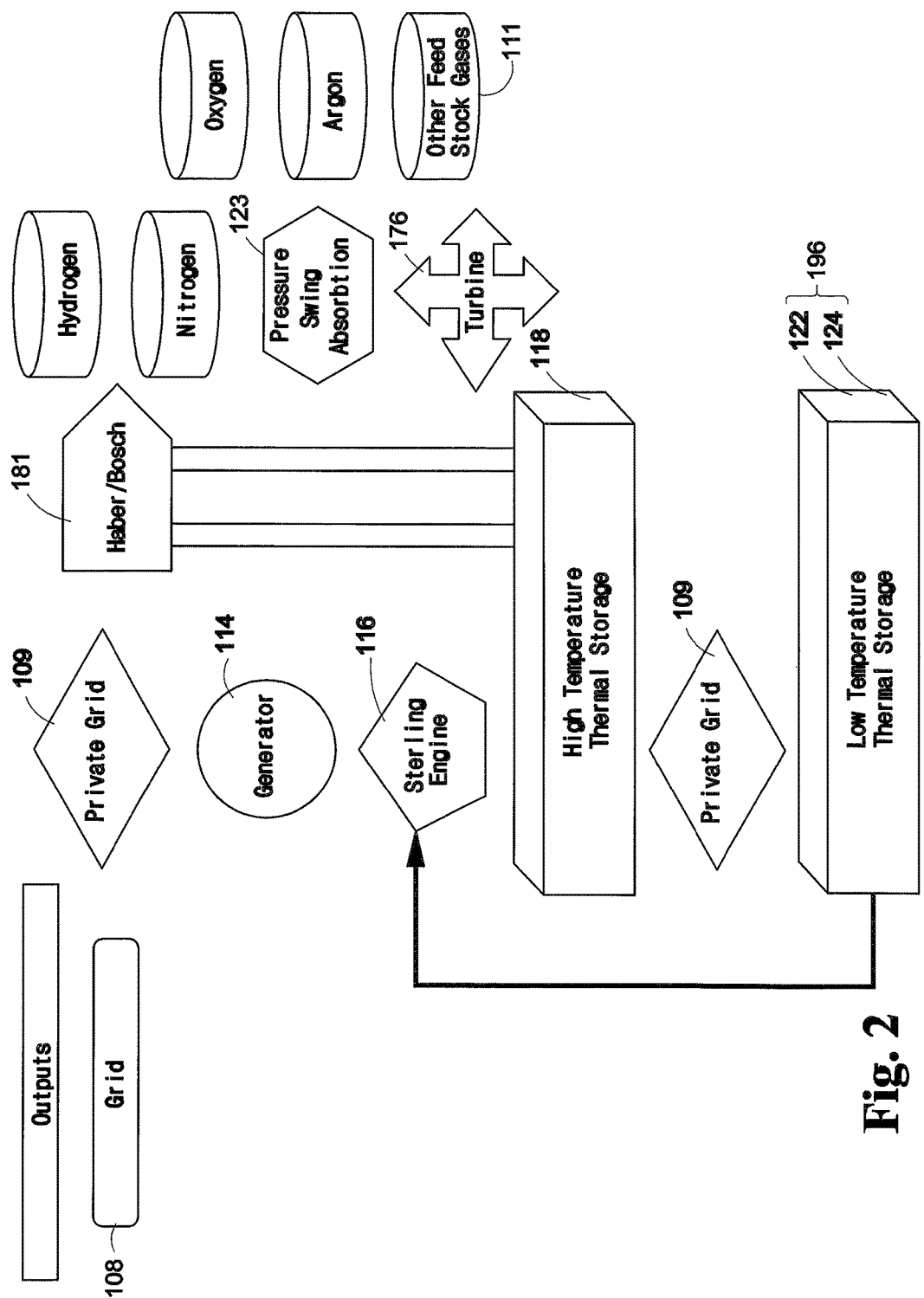
FIG. 2 is a flowchart illustrating the outputs in accordance with the embodiment of FIG. 1.

FIG. 2 shows a flowchart illustrating the process of generating rotational and/or linear energy to provide usable work torque, for example to activate a pump or generator 114 in accordance with an embodiment. In one or more embodiments, one or more of the steps may be omitted, repeated, and/or performed in a different order. Accordingly, the specific arrangement of steps shown in FIG. 2 should not be construed as limiting the scope of the embodiments. Next, an insulated pressure vessel may be used to retain heat in the low-heat-capacity fluid. The rotating blades and insulated vessel may thus facilitate the storing of energy from the renewable energy in the low-heat-capacity fluid. The stored energy may then be used to generate electricity and thermal energy based on energy demand associated with energy requirements.

To generate electricity from the stored energy, the chemical and/or heat from the associated storage of low-heat-capacity fluid may be selectively transferred from the low-heat-capacity fluid to the working fluid. For example, a thermally insulating component may be disposed between the low-heat-capacity fluid and the working fluid to retain the heat in the low-heat-capacity fluid. During periods of low solar and/or low wind and/or high electrical demand, the thermally insulating component may be repositioned to transfer the heat from the low-heat-capacity fluid to the working fluid through a thermally conductive component such as a metal surface, a manifold, a conductive rod, and/or a radiator.

Finally, the transferred heat in the working fluid is used to generate electricity. More specifically, the working fluid may be associated with a low boiling point, such that the transfer of heat from the low-heat-capacity fluid to the working fluid quickly boils the working fluid. Vapor and/or Steam from the boiled working fluid may then be used to rotate a turbine's rotor blades, and the turbine may be used to drive a rotational device for usable work.

The preferred embodiment for the hybrid energy generation system consists of two core elements, one element consists of the thermal solar energy collection modules with an associated centrally located absorber for thermal collection and the other element is the thermal energy storage system for quintessential heat and cold based storage.

The preferred embodiment for the central thermal solar system is modular design construction, consisting of rows of rectangular panels with parabolic shape and a central axis on each row, giving them the ability to track the sun and focus reflected light onto the closest absorber.

The preferred embodiment for the horizontally mounted thermal solar absorber consists of a pipe like structure to be mounted parallel above the horizontally mounted solar panel segments 136 and absorb the focused solar energy from the panels below. The absorber will itself also has a rectangular panel with parabolic shape mounted above the absorber to cause reflected solar energy from the below panels that extends past the absorber to be reflected upon the top of the absorber to cause efficiency enhancement with a nearly 360-degree solar contact upon the absorber surface.

Figures 1, 2, 6A:
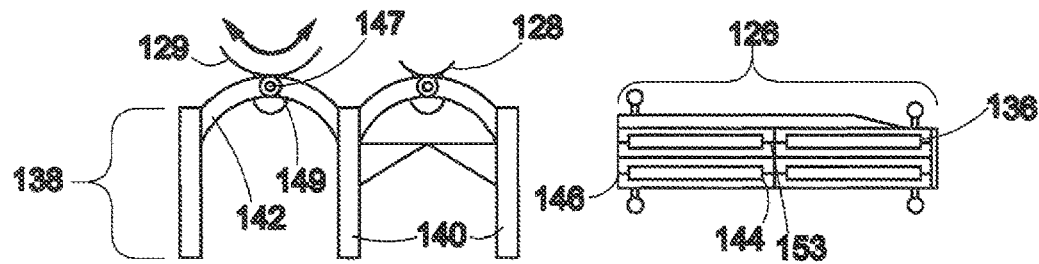
Figures 3, 6A:
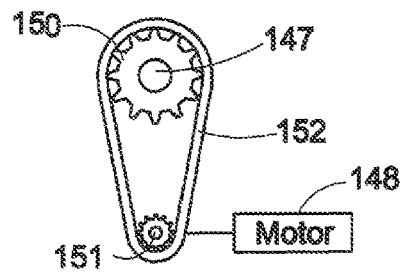
Figures 4, 6A:
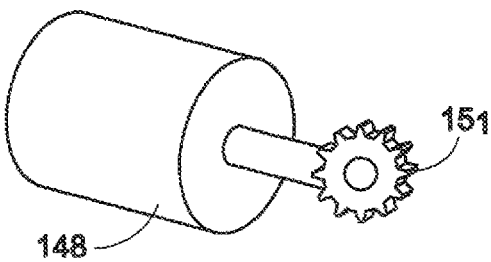
Figures 1, 6B:
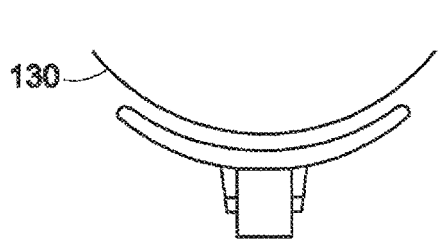
Figures 2, 6B:
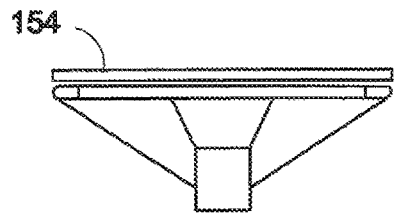
Figures 1, 6C:
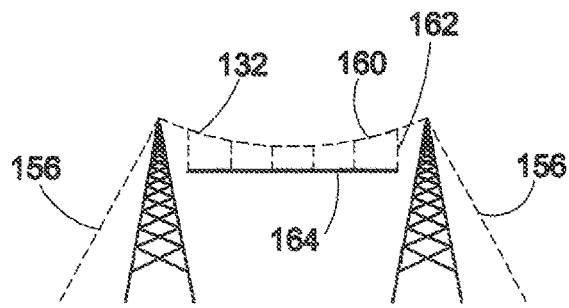
Figures 2, 6C:
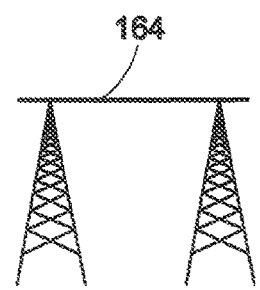

Referring again to the drawings, FIGS. 6a-1 and 6a-2 shows a schematic view of a Thermal Solar Field Unit 1000 ("TSFU"), comprised of multiple rows of reflectors 130, between two adjacent AFU dual collectors 164 elevated by a suspension cable bridge 132 (FIGS. 6c-1 and 6c-2). FIGS. 6b-1 and 6b-2 shows a schematic of ground base supports 134 with a mounting bracket and the reflector 130 (FIG. 6b-1) and/or photovoltaic panel 154 (FIG. 6b-2).

A multitude of AFUs aligned parallel with the reflector panel 136 rows and connected to respective high temperature and medium temperature loops comprises one Energy Generation Module ("EGM"). A multitude of EGMs comprises the Solar Thermal Array Conversion System ("STACS") Field. Based on optimization strategies, the reflectors 130 may target either of the two dual collectors 164 on the edges of the TSFU. Pending on which side of the targeted dual collector 164 the reflector panel 136 is located in relationship to the sun's position; there are Passive solar 129 and Contra 128 arranged solar reflectors 130. The Passive solar reflectors 129 are on the same side of the dual collector 164 as the sun. The Contra arranged solar reflectors 128 are on the opposite side of the collector 164 in relationship to the sun. Similarly, the collector 164 that is on the "sun's side" of the TSFU may be referred to as Passive solar dual collector 164. The dual collector 164 that is on the opposite side of the sun may be referred as Contra arranged solar collector. Contra solar reflectors 128 target Passive solar dual collectors 164 and vice-versa.

Figure 6D:
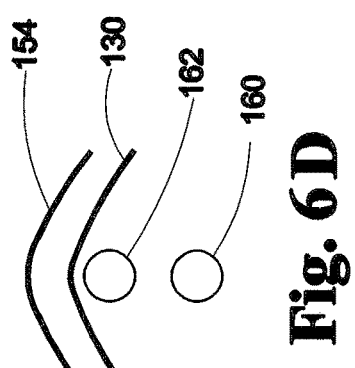
FIG. 6d is a schematic according to one or more examples of an embodiment of an overall view of the solar thermal collectors, reflector, and solar photovoltaic panel in accordance with the present invention.
Figure 6E:
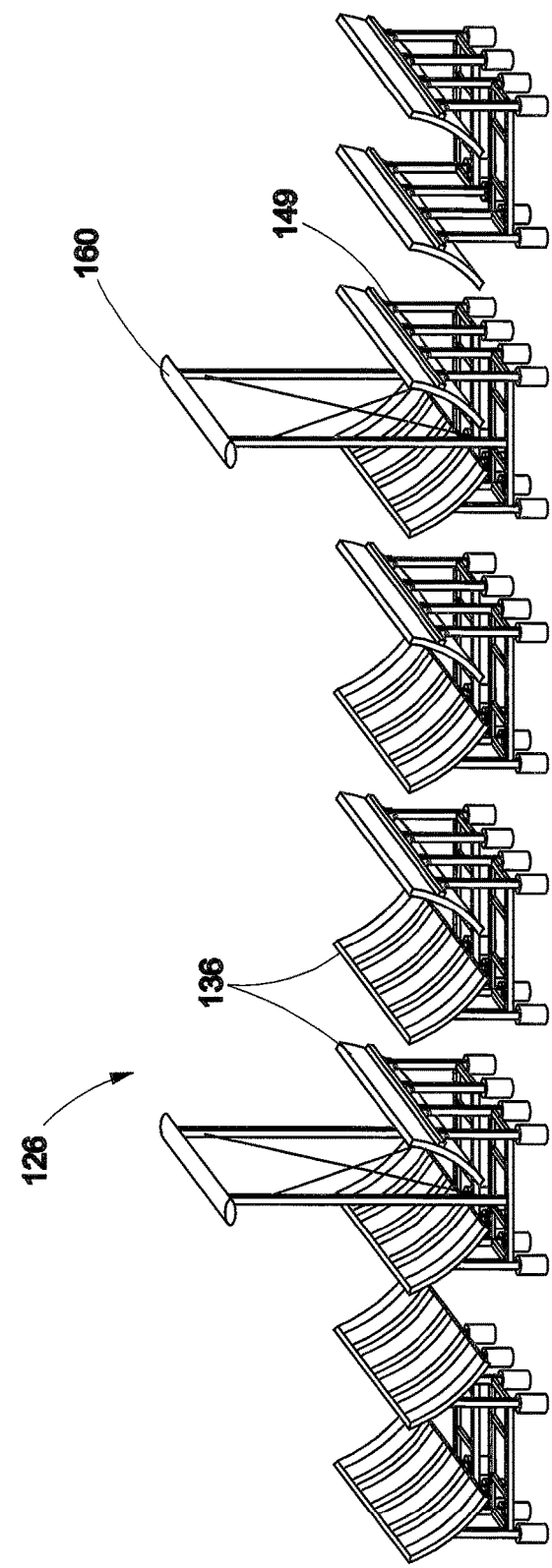
FIG. 6e is an illustration according to one or more examples of an embodiment of the absorber field unit and reflector panels as well as the carriage apparatus and further illustrates the operation of the travel and rotate mechanism of the tracking apparatus in accordance with the present invention.

FIG. 6e illustrates one embodiment of the rotating solar reflector panel 136 assembly. It illustrates the junction of two adjacent reflector panels 136 in a row of connected reflector panel structures. The reflective panel surface is a parabolic slightly curved mirror adhered to a supportive platform. The supportive platform consists of a truss-bridge type support structure 138 comprised of longitudinal beam 140, cross beams 142, trusses 144 and crescent-like endpieces 146. This circular-arch-shaped crescent provides the rotational freedom to the reflector 130 around the center of its symmetry. As provided in FIG. 6a-1 and in further detail in FIG. 6a-3, the rotational axis 147 is co-aligned with the center of gravity of the reflector panel 136 structure to provide smooth, balanced rotation for the tracking mechanism. The crescent is formed from the support structure 138 (FIG. 6a-1). It is also contemplated that the longitudinal beams 140 can be utilized as rail guides for an automatic or semi-automatic cleaning system for the reflector panels 136. In such an embodiment a cleaner is contemplated that can be transferred between longitudinal beams 140 without human intervention by the ULTRAGRID 194 artificial intelligence system or by being manually moved from a set of beams 140 to the next. It is contemplated that the cleaning system would include arms with one or more wheels or rollers to connect and automatically move along the longitudinal beams 140 on either side of the reflector panels 136. The arms elevate and support a cleaning machine with one or more brushes and cloth tufts or similar cleaning elements to polish and wipe debris from the reflector panels 136 as the arms move down the length of the longitudinal beams 140.

Figure 3:
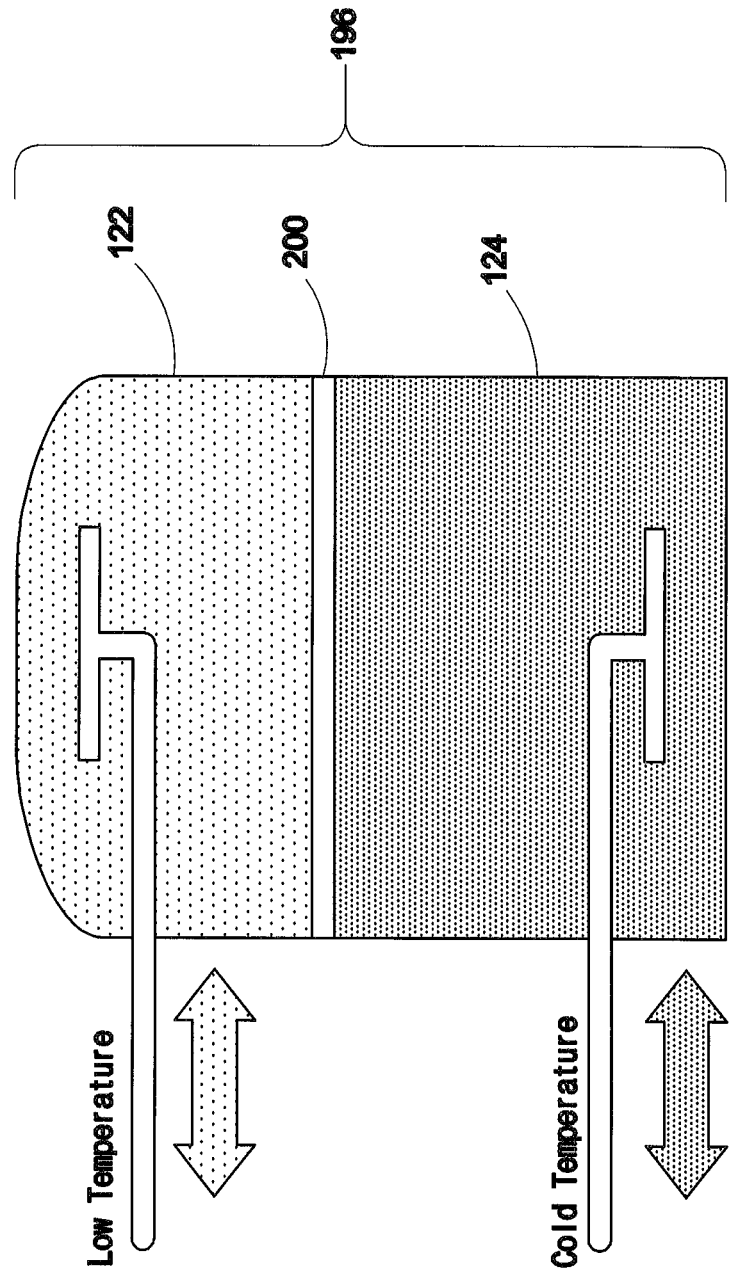
FIG. 3 is a schematic according to one or more examples of an embodiment of a stratified thermal storage vessel in accordance with the present invention.

The two-adjacent reflector panel 136 structures are connected via flex-fit sleeves 153. The reflector panel 136 structure attached to one end of the reflector panel 136 structure freely slide into a sleeve 153 attached to the other end of the adjacent reflector panel 136. The flex-fit drive sleeve connection transfers rotational torque from one panel 136 structure to another panel 136 structure and allows for longitudinal thermal expansion. The driving sleeve 153 is one component and embodiment of positioning and orienting system of the reflector panel 136 row. The drivetrain of the tracking system is mounted on the support structure 138. A single function electrical step-motor 148 is the drive of the train. It provides rotational drive. As shown in FIGS. 6a-3 and 6a-4. The rotational tracking movement of the reflector panel 136 is executed via a gear 150 or sprocket driven system with a roller chain 152 secured to the circumference of the panel gear 150 (FIG. 6a-3) and a corresponding gear 151 attached to the step-motor 148 (FIG. 6a-4).

FIGS. 6b-1 and 6b-2 further illustrates an end carriage assembly providing support and drive for a connected reflector 130. A middle carriage assembly provides support and drive for two connected reflectors 128, 129. Guiding for the carriage on the rail is provided by a bearing 149 with a base support for thermal panel 130 (FIG. 6b-1) or photovoltaic panel 154 (FIG. 6b-2). The side rails provides the stability and the supporting crescent shaped cross supports 146 for security of the reflector structure in case of strong winds. Part of this wind protection system is the drive sleeve 153 that connects reflector panels 136 securing them to the carriage through the bearing mount in case of lift from wind flows. Additionally, it is contemplated that the above described assembly can be further enhanced by utilizing a photovoltaic panel 154 mounted above the top-most thermal solar reflector 128, 129.

FIG. 6c-1 is an overall side view of the ultra-light, pre-stressed cable supported, truss-bridge structure of the dual collector 164. The tension-cable structure 156 provides support with a suspension cable bridge 132 given the required rigidity of the large-span bridge. The suspension cable truss bridge 132 structure will provide bottom support for the flexible suspended cable supports. FIG. 6c-2 provides direct attachment of the dual collector 164 to the truss-bridge structure as an alternative embodiment of the present invention.

The solar absorber is comprised of a single and/or a multitude of pressurized working fluid tubes, high temperature absorber tubes 160 and medium temperature absorber tubes 162; freely laid over and supported on suspended guy-wire cables. The supporting portion of the cable is covered with rolling beads of cylindrical or oval shape forming a rolling "beaded necklace" type support for the tube. In the center of the absorber, a rolling pin supports the tubes such that thermal expansion is not prevented by friction or other force of resistance on the side, bottom or any other area.

A lightweight yet durable sheet material with a high emissivity surface is used for the secondary reflector 130. The parabolic reflector profile is uniquely shaped to provide optimum ratio of aperture-to-absorber width, as well as to capture and to entrap most, if not the majority of all reflected energy. The function and benefits of the choice for the absorber and its coating are: emissivity; reduction of mass flow friction of working fluids; convective heat losses of the collector; resistance to high temperatures; low cost; and simple maintenance. The flow distribution and control of the thermodynamic properties of the fluid throughout the absorber grids of the EGM is of a key importance for high thermal efficiency of the solar 106 energy generation.

The preferred method of positioning and orienting the reflector 130 and/or photovoltaic panels 154 and the field of travel of reflected energy of the collection area is continually maximized and optimized for highest efficiency. Thermal panels are rotated with a fixation of reflected energy upon an elevated linear receiver comprising primarily of a dual absorber 164 and associated reflector 130 and/or radiator having a high temperature and medium temperature thermal fluid flow loop capture. Crescent like cross supports 142 at intervals along the support rails offer stable reflector panel support and wind stabilization while allowing reflector panel rotation to occur unimpeded and providing for clearance of potential seasonal snow and ice buildup. The parabolic optimal aperture curvature of the reflector panels 136 are fixed for each row of the field allowing for optimized mass production and ease of shipping, handling, installation and cleaning.

A lightweight, medium temperature collector-absorber 162 structure is mounted via physical connection to the upper reflector 130; a cable-suspension-bridge 132 supports the absorber; a guyed cable hanger supports the centrally mounted high temperature collector-absorber 160. Guyed cable array cross supports connected to each medium temperature absorber 162 connected via the outside connection points contributes to additional support and stabilization while reducing impacts to horizontal reflector energy collection mass area. This design allows for a modular approach to layout design for highly flexible system scaling. Alternately a truss support system can be mounted from the ground to support the AFU. This type of solar thermal collectors 126 shall herein be referred to as Compact Linear Parabolic Reflectors ("CLPR") and are used for their simplicity and cost effectiveness. They are fields of parabolic or quasi-parabolic reflector 130 "strips" (long and narrow panels) arranged in parallel rows and oriented to a common dual collector 164 and/or absorber with common reflectors 130 located at a certain height above the reflector field. Reflector 130 panels can be directly exchanged for Photovoltaic panels 154 of similar size to provide localized electrical generation for localized energy needs.

The dual collector 164 and/or absorber is a pipe-like, long and narrow structure, aligned in parallel with the rows of reflectors 130 designed to collect the energy from the reflector field. Dual collectors 164 and/or absorbers collect the reflected energy from multiple reflector 130 rows on each of its sides. For discussion purposes the basic unit of the field is defined as two adjacent dual collectors 164 with the attached third top reflector 130 and the bottom reflectors 130 below them. In theory any bottom reflector 130 can serve any of the four collectors 164. Multitudes of these absorber field units ("AFU")—lined up in parallel with the reflector rows—make up the solar collector field area, representing its cyclic linear layout symmetry.

The known reflectors have a single axis or degree of freedom that is a pivotal, rotational motion along their longitudinal axis. A tracking system rotates the reflectors and follows the sun's apparent movement. The orientation of the mirrors is such that the reflected incident sunlight "redirects" to one of the high heat collector and/or absorber 160 of a dual collector 164 at the edges of the absorber field unit (AFU), thereby each reflector panel row is "fixated" to a dual collector 164. Some of the known prior art technologies have mechanical linkages connecting the rows of reflectors into a single tracking array.

The present invention's approach ensures that the rotation angle of each row in the array is focused for optimal emissivity of energy reflection and that all mirrors in the linear row are focused to the same dual collector 164. Some prior art technologies prefer a North-South alignment of the rows, while other prior art prefer East-West alignment of the field. To describe the location as well as the orientation of the reflector rows in reference to the collectors, the following terminology is used: Contra arranged solar 128 rows are the rows that are on the opposite side of the tracked collector relative to the sun (on the polar side of the collector in the East-West aligned field or West-Side reflectors during the morning in the North-South aligned field). The Contra arranged solar reflectors 128 have a larger "common" surface area exposed to the sun's rays. Therefore, they have higher optimum reflection potential. Passive solar rows 129 are the rows on the same side as the sun relative to the tracked collector (equatorial side of the East-West aligned field or the East-side reflectors during the morning hours and the West reflectors during afternoons for the North-South aligned field). The Passive solar 129 rows have typically less exposed normal surface, thus they are less than optimal.

As illustrated in FIG. 6d, the purpose of the collectors 164 is to maximize the absorbed solar 106 radiation by capturing the maximum energy from the reflector panels 136 and by minimizing the radiation and convection losses of the dual collector system. Thermal transfer mediums and working fluids such as molten salt, oil, water, water/glycol mixture and/or other liquid mediums is circulated through the high temperature 160 and medium temperature 162 absorber as the heat transfer (or working) fluid. The absorber surfaces of the collectors are in effect, absorber surfaces, since the collected solar 106 heat is directly used for high temperature and low temperature thermal energy use and storage 110.

The present application thus describes an expanded travel, ultra-compact reflector panel field, where the reflector panel 136 rows have a new, dual absorber 164 and an absorber-mounted reflector panel 136 for reducing overspread of reflected concentrated light on a single absorber while allowing the second medium temperature absorber 162 to enhance direct thermal reflection energy collection and from radiated thermal energy from the primary high temperature absorber 160. The present application thus describes an additionally seamless method of integrating photovoltaic cells by interchanging, as a direct replacement for parabolic reflector panels 130, to provide local electrical generation supply and/or energy to charge batteries for activating tracking motors 148, flow valves, other electrical-powered sensor components and/or control systems. This option would eliminate the need for remote power for system functions.

The present application thus describes an additional method of integrating remote electrical components with a localized energy generation source, battery backup and wireless interface and control. The present application thus describes an additional method of integrating remote electrical components with a localized energy generation source, battery backup and wired interface and control with the need for only wired control signal connections, which reduces or eliminates the need for installation and maintenance of electrical lines for remote power.

Prior art also allowed losses from the remainder of the energy not directly hitting the collector and/or absorber to be radiated into the atmosphere. Additionally, prior art suffered losses from the reduced temperature distribution on the top 20-35% of the absorber having less energy from no concentrated reflection for absorption.

An additional benefit of the absorber-mounted reflector panel 136 is to cause overspread sunrays from the reflector field below to be redirected and reflect upon the top surface of the primary high temperature absorber 160. Creating a normalized thermal distribution over the entire surface area when compared to prior art, which effectuated only 70% of the bottom section and up part of the sides of an absorber surface with thermal energy from the below reflector panel field.

The rotating rows of the present invention have the ability to adjust and optimize their position between two dual collectors 164 and the top reflector 130 unit such that the reflected sunlight from the field as a whole is maximized throughout the day and throughout the year. The present application further describes the carriage rail apparatus of the expanded travel reflector panels. This device provides the linear and rotational mobility of the reflector panel structure as well as the tracking and positioning required for maximizing the reflected energy of the AFU. The present application further describes the ultra-light, high-efficiency collector-absorber structure. The assembly has a simple common replication for mass manufacturing, advantageous for construction and field erection.

The features of the collector are: wide aperture, optimized curvature of the secondary reflector surface, suspension cable bridge absorber supports, rolling-bead cable suspension of absorber and pre-stressed cable-bridge support structure. The present application further describes the crescent like cross support 142 rail of the reflector 130. The gravitational center line of the reflector panel 136 structure is in the rotational center 147 of the panel rail. The parabolic curvature of the reflector 130 is a normalized standard for each row of the AFU. The present application further describes the flow distribution and control method of the high temperature and medium temperature generation systems. Each absorber of a collector comprises a single tube.

The field comprises a multitude of absorber grids. Optimal control of the thermodynamic conditions (pressure, temperature, velocity and phase) throughout the entire thermal grid is provided for by a localized monitor, analysis and control system with interconnectivity and ULTRAGRID™ 194 compatibility.

The disclosed embodiments provide a method and system for generating thermal energy in the form of thermal heat energy or communicated to a chiller and/or cooling process 169 for cold based thermal storage. A solar power from solar collection system, wind power may be collected by a wind turbine, geothermal power may be collected from a geothermal power plant 100, hydroelectric power may be collected from a hydroelectric power generation source 102 or grid connected to collect power from available grid energy sources.

The preferred embodiment for the Thermal Energy Storage (TES) system consists primarily of a high temperature storage vessel 118, medium temperature storage vessel 120 and a low temperature storage vessel 122. Additional improvement is the addition of a forth thermal storage vessel consisting primarily for hot water storage that doubles as a waste energy thermal storage. The preferred embodiment uses high temperature stored thermal energy as energy input for an ammonia-based cooling process 166 to initiate and provide temperature support energy for low temperature storage vessel energy input 122.

The preferred embodiment uses high temperature stored thermal energy as energy input for a heating process to initiate and provide temperature support energy for space heater, room, area or building heating system.

The preferred embodiment uses low temperature stored thermal energy as energy input for an active cooling process 168 to initiate and provide temperature support energy for central air conditioning and cooling 173. The preferred embodiment uses low temperature stored thermal energy as energy input for an active cooling process 168 to initiate and provide temperature support energy for refrigeration appliances, walk-in refrigerators, wine storage areas, box and water cooling. The preferred embodiment uses low temperature stored thermal energy as energy input for an active cooling process 168 to initiate and provide temperature support energy for freezer appliances, walk-in freezers, box freezers 174.

The preferred embodiment consists of a Stirling cycle using the available stored high temperature thermal energy to initiate gas and/or working fluid expansion for the generation of rotational and/or linear movement. The preferred embodiment consists of a Stirling cycle using the available stored low temperature thermal energy to initiate gas and/or working fluid contraction for the generation of rotational and/or linear movement. The preferred embodiment uses generated rotational and/or linear movement applied to a generator 114 for the production of electrical energy. The preferred embodiment uses generated rotational and/or linear movement applied to a pump or compressor for the pressurization and communication of liquids, gases and/of working fluid.

The preferred embodiment uses recycled thermal waste heat from the Stirling cycle as energy input for a heating process to initiate and provide temperature support energy for space heater, room, area or building heating system as well as water heating applications. Another embodiment with less efficiency and not optimum performance would entail the usage of a steam engine in place of a Stirling process engine.

Figure 8:
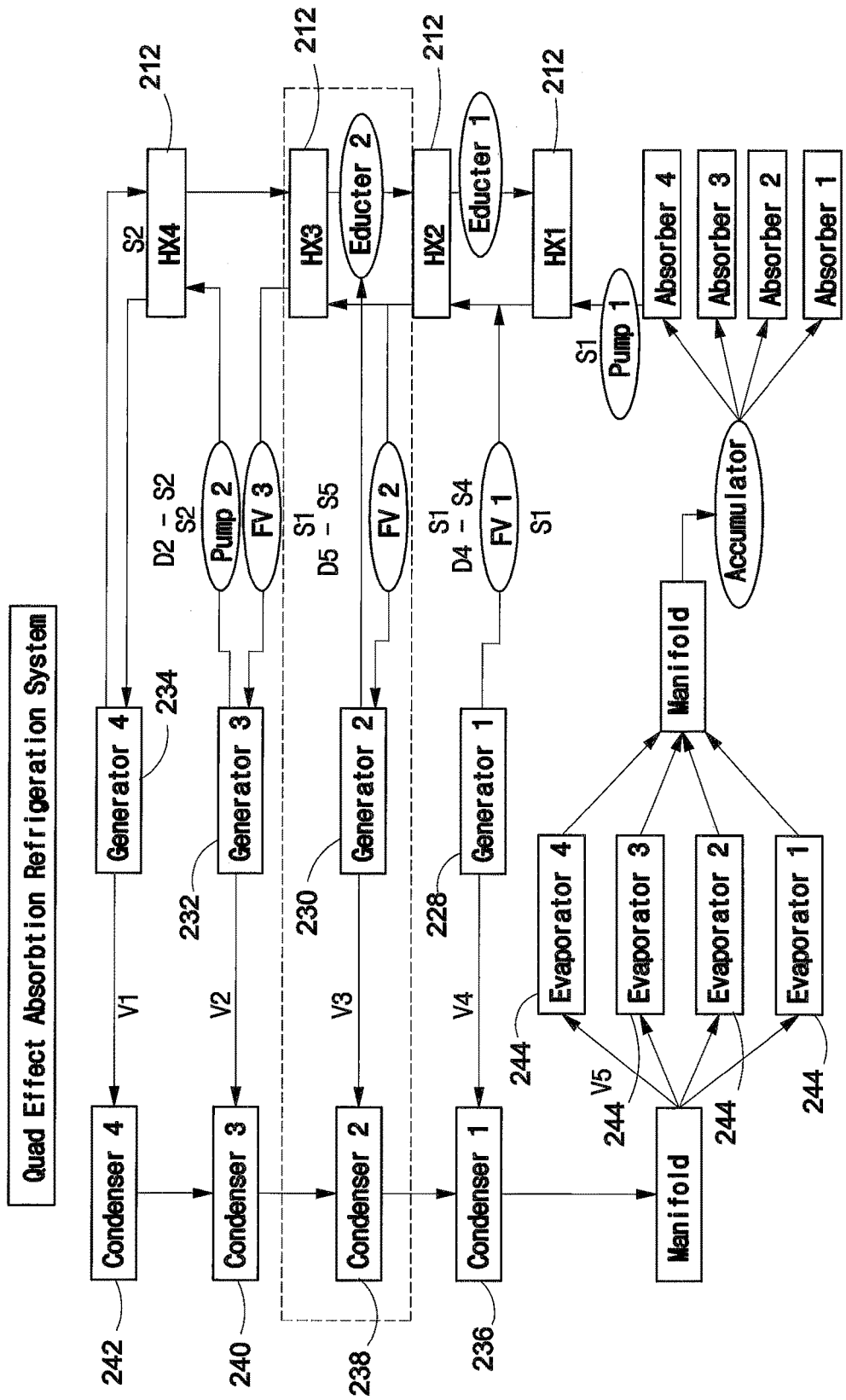
FIG. 8 is a flowchart according to one or more examples of an embodiment of a multi-effect refrigeration process in accordance with an embodiment.

Referring to FIG. 8 a schematic of the quad absorption refrigeration system is shown. In a quad effect absorption refrigeration system, solution flows from an absorber to the first 228, second 230, third 232 and fourth 234 generators connected in parallel. Solution exiting the first generator 228 returns to the multi-absorber system. Solution exiting the second generator 230 flows to a third generator 232 which flows to the fourth generator 234 connected in series with the second generator 230. Refrigerant vapor from each generator is condensed in a respective condenser 236. The fourth condenser 242 exchanges thermal energy with third generator 232, the third condenser 240 exchanges thermal energy with the second generator 230 and the second condenser 238 exchanges energy with the first generator 228.

The preferred invention cooling system 125 includes an improved multi-effect, multi-stage absorption refrigeration system, more particularly to obtain increased efficiency refrigeration effect stages relative to the quantity, quality, pressure and temperature of the available thermal energy input. This is effectuated through strict observation to a tight range of thermal energy input temperature bands as each band affects steps and stages with relationships directly coupled to a particular stage and level of cooling. This can be examined and compared with a typical, yet generic, one size fits all common approach of prior art. Prior art using inefficient non-optimized effect stages with generally unbalanced and excessive thermal, liquid and gas loading on an individual or on a multiple component basis type of design for conventional chiller or refrigeration systems.

The multi-effect, multi-stage absorption refrigeration system may comprise a multi-stage regenerator-condenser system and multi-stage evaporator-absorber system provided with a pressure elevating devices and pressure controls there between. The preferred embodiment of the current invention utilizes a cooling system 125 consisting of quad effects and/or with potentially additional effects stages based on available thermal energy temperature. Refrigeration systems of this type consist and primarily employ: a plurality of heat exchangers, a plurality of generators 228, 230, 232, 234, a plurality of condensing units 236, 238, 240, 242, a plurality of evaporators 244 to which refrigerant is metered by a plurality of variable orifice expansion valves and a plurality of absorbing units.

A multi-effect absorption refrigeration system is provided with a plurality of condenser couplings and a parallel or series circuit for feeding the refrigerant-containing absorbent solution through the ultra-high, high, intermediate, medium, low temperature generators in a quintuple effects refrigeration system or high, intermediate, medium, low temperature generators configuration in a quad effect design optimization of a multi-effect system. Additional absorption effects stages may be realized with higher input temperatures by potential construction of adding corresponding corrosion resistance in response to additional effects higher temperature, pressures, liquid and gas corrosiveness. The coupling of components will enhance the internal recovery of thermal energy within the system, given the ability to effectively communicate thermal energy between components within the system and thereby increase the system's overall thermal efficiency thereof.

In a quad effect absorption refrigeration system, solution flows from an absorber to the first 228, second 230, third 232 and fourth 234 generators connected in parallel. Solution exiting the first generator 228 returns to the multi-absorber system. Solution exiting the second generator 230 flows to a third generator 232 which flows to the fourth generator 234 connected in series with the second generator 230. Refrigerant vapor from each generator is condensed in a respective condenser 236. The fourth condenser 242 exchanges thermal energy with third generator 232, the third condenser 240 exchanges thermal energy with the second generator 230 and the second condenser 238 exchanges energy with the first generator 228.

In another embodiment, utilizing a quintuple effect absorption refrigeration system, solution flows from an absorber to the first, second, third, fourth and fifth generators connected in parallel. Solution exiting the first generator returns to the multi-absorber system. Solution exiting the second generator flows to a third generator which flows to the fourth generator which flows to a fifth generator connected in series with the second generator. Refrigerant vapor from each generator is condensed in a respective condenser. The fifth condenser exchanges thermal energy with the fourth generator, the fourth condenser exchanges thermal energy with third generator, the third condenser exchanges thermal energy with the second generator and the second condenser exchanges thermal energy with the first generator. Additional effect stages can be added using the above teachings in response to an increase in additional input temperatures and increased cooling requirements.

Artificial Intelligence Management System (AIMS) integration provides software and hardware based integrated control, data acquisition and processing for grid management 188, energy generation system, hydrogen generation system 180, ammonia production system 182, energy regeneration system, performance tuning, power monitoring 184, frequency matching 186 and control system redundancy. This is combined with machine learning for automated maintenance scheduling for enhanced uptime availability. The system additionally offers a secured SCADA integration solution for data interfacing for local and remote visual overview, monitoring and control. Additionally, the system provides active condition monitoring of system components and sensors for health monitoring, identify changes and trends to optimize overall performance, monitor alert levels, update and contact maintenance of pending issues for a proactive maintenance scheduling approach before faults occur.

Figure 12:
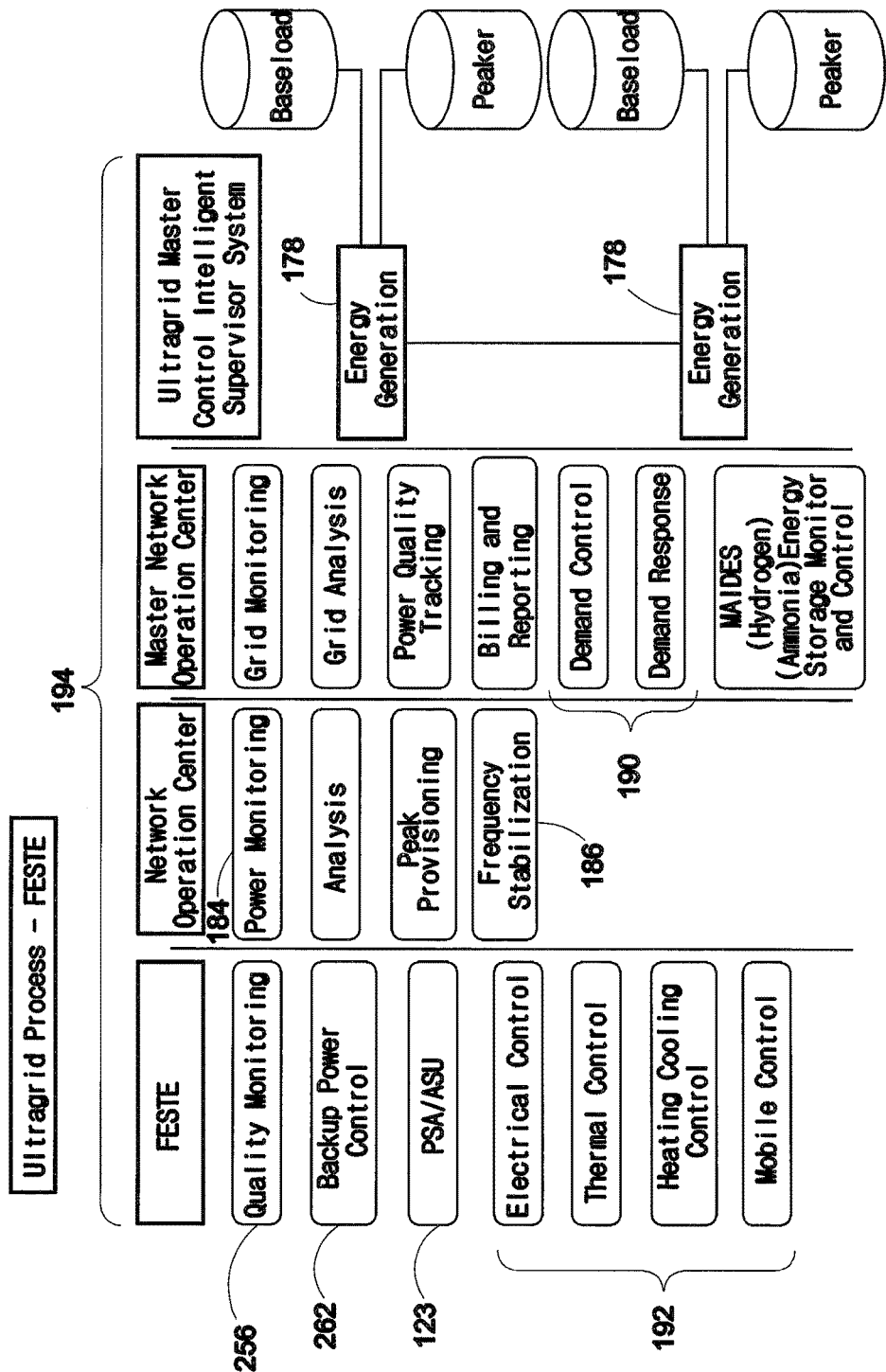
FIG. 12 is a block diagram of the ULTRAGRID™ layers utilized with the fuel cell ("FESTE") system in accordance with one or more embodiments of the present invention.

As depicted in FIG. 12, commercial Grid management system integration provides intelligent control of energy generation for load matching 190 and projected requirements of the load generation system for higher generated energy utilization. Active monitoring and control of regeneration energy systems for backup and base load provisioning to prevent brownouts from lack of energy generation availability. Smart grid interfacing 192 and monitoring for energy generation and energy use projections.

Figure 13:
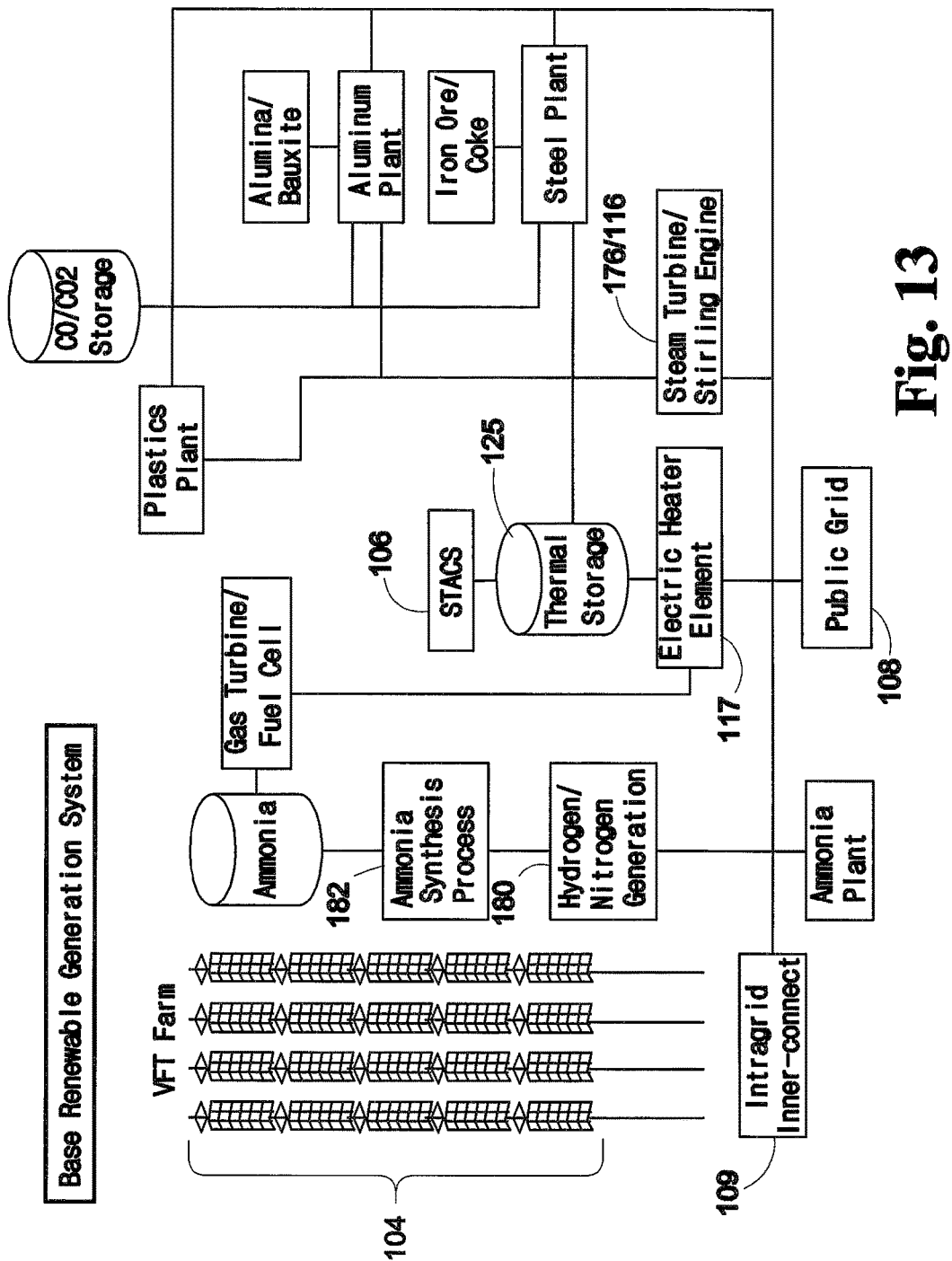
FIG. 13 is a flowchart illustrating the Base Renewable Generation System Process in accordance with one or more embodiments of the present invention.

As illustrated in FIG. 13, energy generation system integration provides intelligent interfacing of generation systems and load provisioning systems. Interaction of data between systems allows stable grid power control with less power spikes while increasing uptime availability promoting maximum efficiency of energy processing and storage systems. Energy storage 110 locally integrated bridges communication from energy generation sources to intragrid control 109 for power conversion based on variable input energy to thermal storage systems 125. Energy storage system 110 integration enables maximum energy generator with optimized energy collection. Mission critical response times for the highest efficiency and safety levels.

The present invention consists of a core renewable energy device for energy generation, processing, initiate energy transfer and energy storage 110 with a common shared intelligent interactive energy generation system 178 and intelligent machine learning system. The core energy generating device envisioned that shall hereby referred and designated as a Solar Thermal Array Conversion System (STACS) 106. This is effectuated by fully accommodating and promoting the usage of all available usable thermal energy collection be thermally communicated into heat energy storage and/or transference to cold energy storage 124.

Another improvement is using commercial grid scale electrical energy surplus via electrical derived thermal generation for commercial grid scale thermal storage. This enables storage in the hundreds and potentially thousands of kilowatt hours, expandable to megawatts hours of term storage, energy available on demand.

Another improvement is with ability to store excess wind and/or photovoltaic solar electrical energy 107 as commercial grid scale thermal energy storage 125, the excess electrical energy which is now stored as thermal energy can be used as an active or as an on-demand energy source for energy generation for commercial grid baseload or can be used to meet high peak demand load needs for load stability and voltage stability and localized power quality commercial grid efficiency.

Another improvement of the present invention is the complete integration of localized onsite thermal and geothermal energy storage 100 can be used as an on-demand energy source for energy generation for thermal storage maintenance heat generation, grid baseload, intermediate baseload peaking support or can be used to meet high peak demand load needs for load stability, frequency matching 186 and voltage stability and grid efficiency.

Another improvement is integration and inclusion of compatibility with the ULTRAGRID™ system 194, which comprises a complete line of consumer and commercial products and services for maximizing energy generation, storage and provisioning for end use. Enhanced efficiencies and energy stability through localized commercial grid provisioning systems are realized through a combined software and hardware solution. Additionally, other device power and control systems can be substituted.

Another improvement is ULTRAGRID™ 194 is designed in layers of components potentially consisting of energy generation, energy storage 110, energy provisioning, grid layer, consumer layer and end user component layer. Using layering will allow for simple logic integration, flexible information access, adaptability and expandability, rapid response, quick and easy installation, robust and secure operation.

Another improvement is integration and inclusion of compatibility with external software packages such as with the ULTRAGRID™ system 194, which comprises a complete line of consumer and commercial products and services for maximizing efficiencies and energy stability through enterprise utility grid provisioning systems from a combined software and hardware solution. Additionally, other device power and control systems can be substituted.

Software for consumers allows for local and remote use to analyze and control personal energy use and enables integration into the ULTRAGRID™ ZH1 home control and security system 194. Hardware for consumers comprises of standalone plugin adapters namely the ULTRAGRID™ Z1 allows common household appliances to be plugged in allowing them to become smart appliances. Additionally, other currently available control devices can be substituted for compatibility and continuity.

Another improvement would involve ULTRAGRID™ user sensor data monitored and stored from ULTRAGRID™

ZA1 enabled smart devices such as televisions, refrigerators and like user owned appliances, uses a common data interface and network.

Further improvement the system will monitor other STACS grid connected sites for grid energy load balancing for nominal load provisioning to enable reserve capacity generation capability for power quality and energy availability enhancement. Additionally, the system will monitor STACS thermal storage grid connected sites for grid energy load balancing for nominal load provisioning to enable reserve capacity generation capability.

Further improvement will allow loss of an energy generator's power to be reallocated and provisioned from localized storage to an online and available status, this assist mode from the local system and other active system nodes is initialized in response to ULTRAGRID™ command and control activation to prevent localized grid collapse and power quality fluctuations. A further improvement is the inclusion of ULTRAGRID™ compatibility allowing communication from all sites and manages their status from a primary centralized command and control, integrated network operations center. Through the interconnected networked data control systems and subsystems 108 that which will allow directing energy where and when needed and offering beneficial energy recycling and reclamation of waste energy and heat.

Another improvement is enhanced on consumer power quality and grid stabilization during diurnal cycle with its variation and seasonal balancing requirements. This is effectuated by using localized consumer distributed thermal storage during prime-time energy usage which occurs naturally during daytime hours. This can be supplemented to maintain optimum availability and reliability via external grid energy to thermal conversion during off peak hours.

Another improvement is the reduction or complete elimination of overlapping and redundant subsystems, reducing part counts and excess energy usage from elimination of duplicated systems and subsystems 108. The prior art depended primarily on efforts in engineering device efficiency and decreasing manufacturing costs. These methods are helpful but are limited in their scope and effectiveness due to the incremental enhancement typical to this type of development. The prior art relied heavily on modest evolutionary adaptations versus much more in depth radical revolutionary changes.

Figure 11:
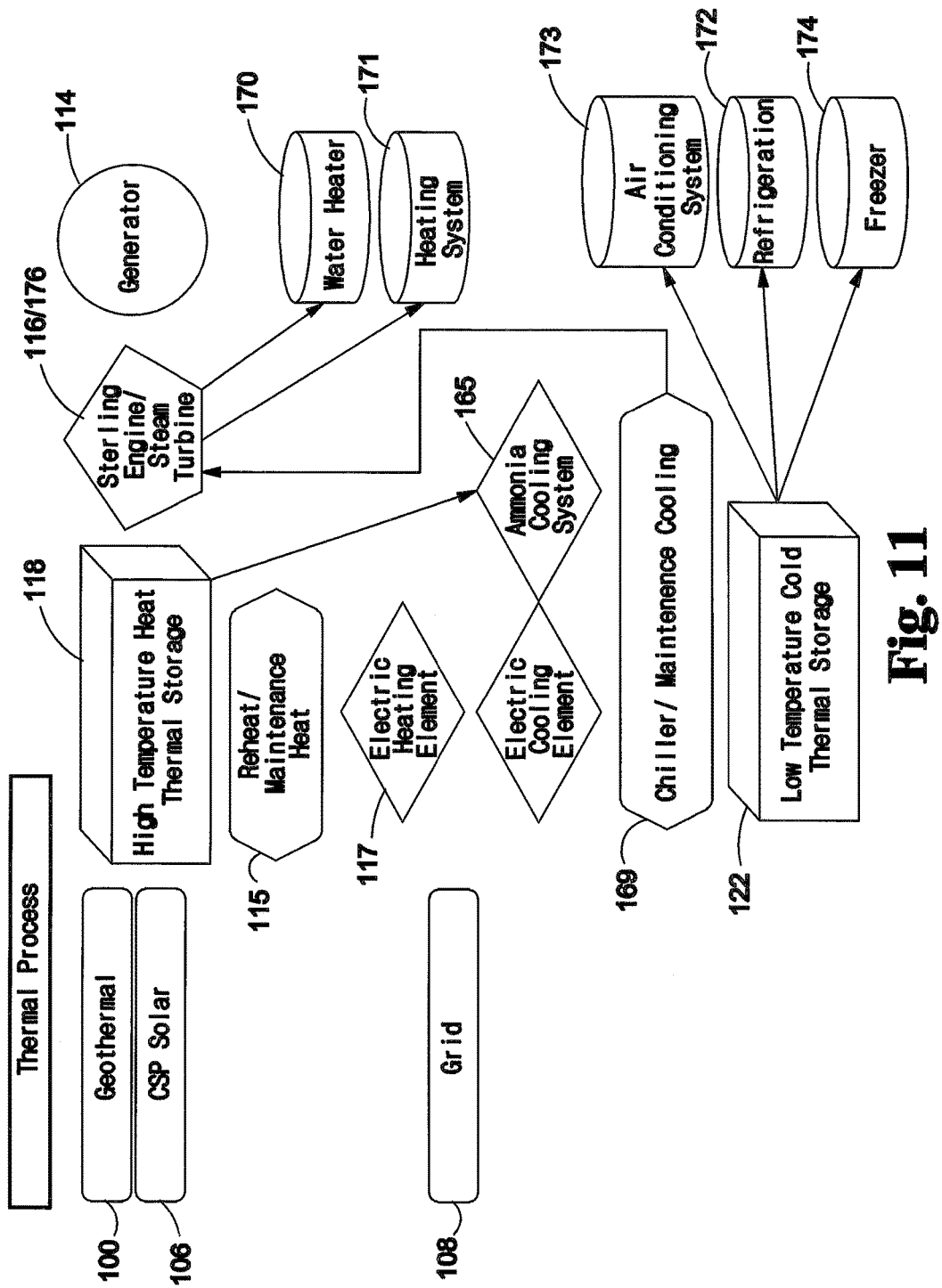
FIG. 11 is a flowchart according to one or more examples of an embodiment of the thermal system according with the present invention.

As depicted in FIG. 11, the present invention differs from other prior art from inclusion and incorporation of thermal solar 106, wind 104, photovoltaic solar 107 with integration to thermal storage and geothermal storage components 100; The present invention differs from other prior art systems from the above integration through electrical generation, heat for thermal applications energy, cold for cold thermal required applications while removing redundant components and their processes thereby reducing energy input requirements. Prior art uses additional energy input to remove the heat to cool the areas within a consumer's enclosed area thereby reducing energy usage efficiency wherein the present invention harnesses the heat energy for beneficial work.

The present invention uses the waste heat generated from the electrical generation process for use as the input energy as heat source for ammonia cooling 165 and vapor cooling processes, water purification, desalination and water heating application processes creating additional benefit of using available expended energy versus prior art creating energy loss and inefficiency by its faulty design. The present invention using a common thermal and electrical grid to reduce losses from inefficient and unnecessary conversion and transference, thereby increasing efficiency and promoting reduced energy needed and materials required for cooling applications and processes. Combining the localized systems into an efficient primary commercial grid energy system versus prior art needing and using multiple electrical and thermal distribution systems and transformation connections and conversions creating additional energy loss and efficiency with each connection.

Figure 9:
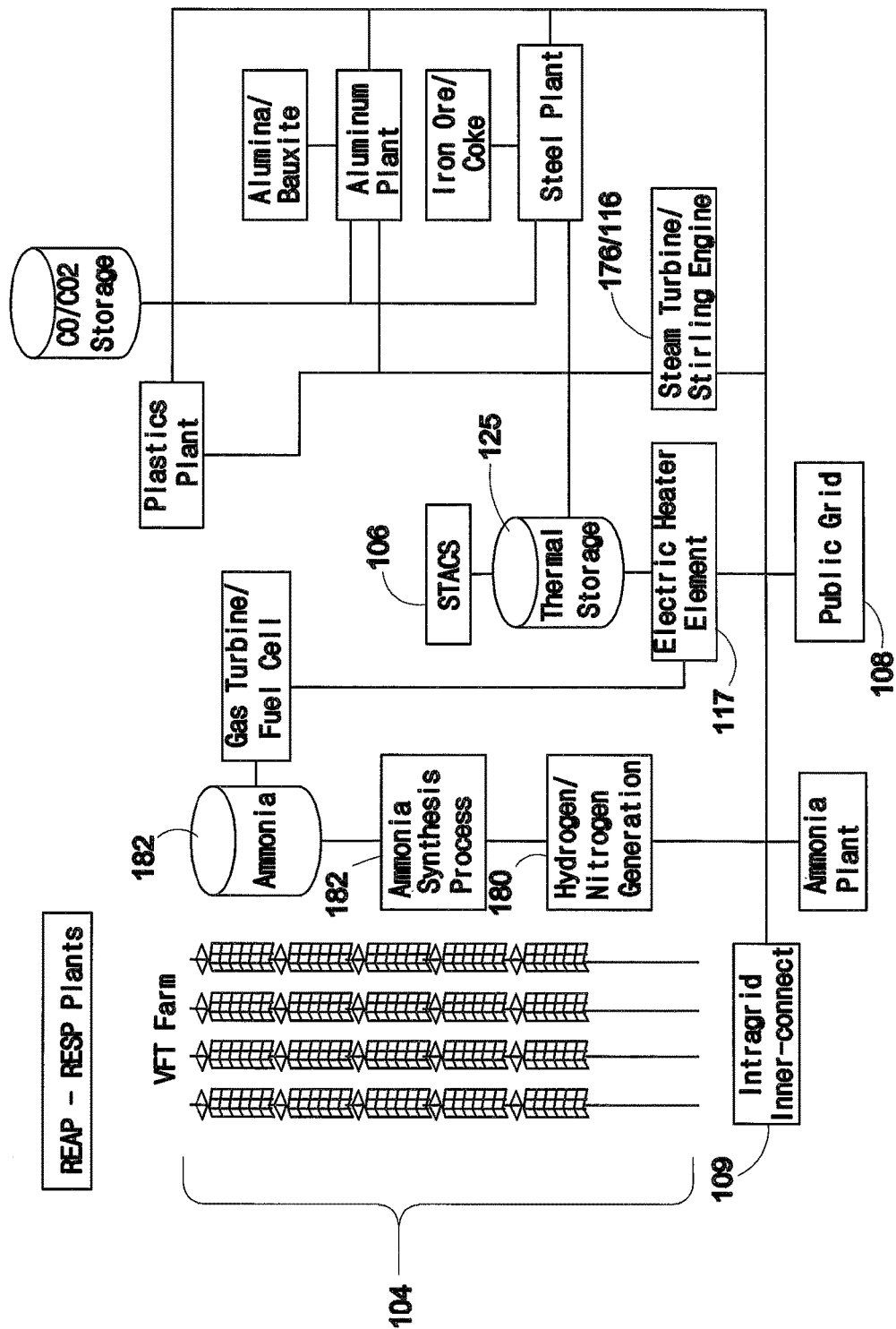
FIG. 9 is a flowchart according to one or more examples of an embodiment of the common installation connections of a Renewable Energy Aluminum Plant ("REAP") and a Renewable Energy Steel Plant ("RESP") in accordance with the present invention.

As illustrated in FIG. 9, the preferred embodiment is accomplished by facilitating electrical, thermal as well as chemical interactions and energy conversions through interconnecting a hybrid wind 104 and solar energy generation system. Alternatively, geothermal 100, hydroelectric 102 and other grid energy connected input sources may be substituted.

Primary embodiment efficiencies and cost effectiveness is made possible from its quintessential energy generation capability from the improved and inclusive hybrid energy generation system and paired with its waste heat recovery system using reclaimed energy to actualize and realize the maximum benefits of using all available system resources. Maximizing infrastructure utilization to achieve lowest possible levelized cost of energy is achieved by monetizing capital intensive fixed assets while reducing overlap and needless redundant processes. Produces substantially reduced investment capital requirements, encapsulated by enhancing greater return on invested capital expenditures.

As depicted in FIG. 9, the disclosed embodiments provide a system that generates electricity and heat energy for the purpose and production of electricity and thermal application use. During operation, the system uses the hybrid mix of wind 104 and solar to maximize day and night time electrical and thermal energy generation. Connection is made to an intragrid 109 for internal industrial usage or as an external grid energy supplier. Additionally, geothermal 100 and hydroelectric 102 or external sources can be used for electrical energy generation input.

Concentrated thermal solar system 126 is deployed to collect thermal energy to be transferred and then stored into a high temperature thermal storage system 118. During night time and inadequate thermal collection periods, system taps its reserve of heat and cold thermal storage for application usage or electrical energy generation. Alternatively, geothermal 100 and other electrical and chemical reaction for thermal generation may be used for thermal energy collection.

In some embodiments, selectively transferring the heat from the high-heat-capacity fluid to the working fluid involves disposing a thermally insulating component between the high-heat-capacity fluid and the working fluid to retain the heat in the high-heat-capacity fluid, and repositioning the thermally insulating component to transfer the heat from the high-heat-capacity fluid to the working fluid through a thermally conductive component.

High temperature thermal storage system 118 is deployed for the primary purpose of providing on demand thermal energy, this thermal energy is needed for thermal application and thermal to electrical conversion application use. High temperature thermal storage system 118 is also deployed for the secondary purpose of providing thermal energy needed for thermal exchange using a work fluid to cause a turbine's shaft to rotate to cause rotational work energy and/or Stirling cycle applications gas and/or working fluid expansion and contraction to cause usable work.

The working fluid can also cause gas and/or working fluid expansion and contraction applications to cause force on a piston to cause motion for the purpose of providing usable work. Some embodiments use rotating blades include at least one of a propeller, an impeller, one or more paddles, and a drum. Some embodiments use a working fluid that is associated with a low boiling point. Working fluids can then be reclaimed for energy recycling, and processed for system reuse. Additionally, the system deploys a cooling system and chiller system 169 to provide proper pressure and cooling for localized cold storage system and for further cold temperature application requirements.

The internals of the bottom end and top end of the Stirling Engine cylinders 116 of the preferred embodiment are differentiated from previous Stirling engine designs. The bottom end of cylinders, according to the preferred embodiment of the present invention, does not have the top of the connecting rod and is not attached directly to the piston. The top of the connecting rod 204 instead attaches to a "crosshead" 205 which rides in guide channels. A long piston rod then connects the crosshead 205 to the piston. This is done so the sideways forces produced by the connecting rod 204 are absorbed by the crosshead 205 and not by the piston.

In some embodiments, the system also uses an insulated vessel or geothermal storage 100 to retain the heat in the low-heat-capacity fluid. In some embodiments, the thermally conductive component is component having high thermal conductivity, such as a metal surface, a manifold, a conductive rod, and a radiator. Finally, the system uses the transferred rotational energy to generate work or torque.

Additionally, some embodiments, the transferred high-heat-capacity fluid boils the low-heat-capacity working fluid. Rotational energy may then be generated by exposing a compressed gas and/or working fluid in a cylinder to expand the gas and/or working fluid to provide force to a piston which then exerts the movement to a rotation on a crankshaft 202 or of linear movement of a linear generator. Using the rotational energy or linear movement to drive applications or components such as a mechanical linkage, swash plate, compressor, pump or electric generator 114.

Generated rotational and/or linear work energy is utilized by transferring the shaft rotation and/or linear movement to provide a water pump the energy needed for incoming water to become pressurized to force water through the water purification systems for example consisting of desalination, distillation, reverse osmosis and then stored in tanks and/or elevated water tanks as an additional energy storage method for on to demand use. Next, generated rotational and/or linear work energy can be used to provide rotational and/or linear energy to drive compressors to establish adequate operating pressure. This in turn enables pressure swing absorption 123 to function properly, this process allows separating, isolating and storing gases and/or working fluid as an additional energy storage method 110 for on demand use. Lastly, generated rotational and/or linear work energy can be used to provide rotational and/or linear energy to drive generators to provide electrical energy production. This energy can then be transferred into the internal grid network for system use for additional hydrogen production through powering electrolyzers 113 or made available as a grid energy supplier.

Referring to FIG. 3, a stratified thermal energy storage vessel 196 is shown. In an embodiment of the present invention, medium and low temperature thermal energy fluids can be stored in the same storage vessel 110. The use of a thermocline 200 with separated medium and low temperature loop interfaces is required as illustrated. In an embodiment of the present invention it is contemplated the medium temperature storage section 120 would hold fluid at or about 15.56° C. (60° F.) and the low temperature storage 122 section would hold fluid at or about 4.44° C. (40° F.). The specific arrangement of steps shown in FIG. 3 should not be construed as limiting the scope of the embodiments.

Figure 7:
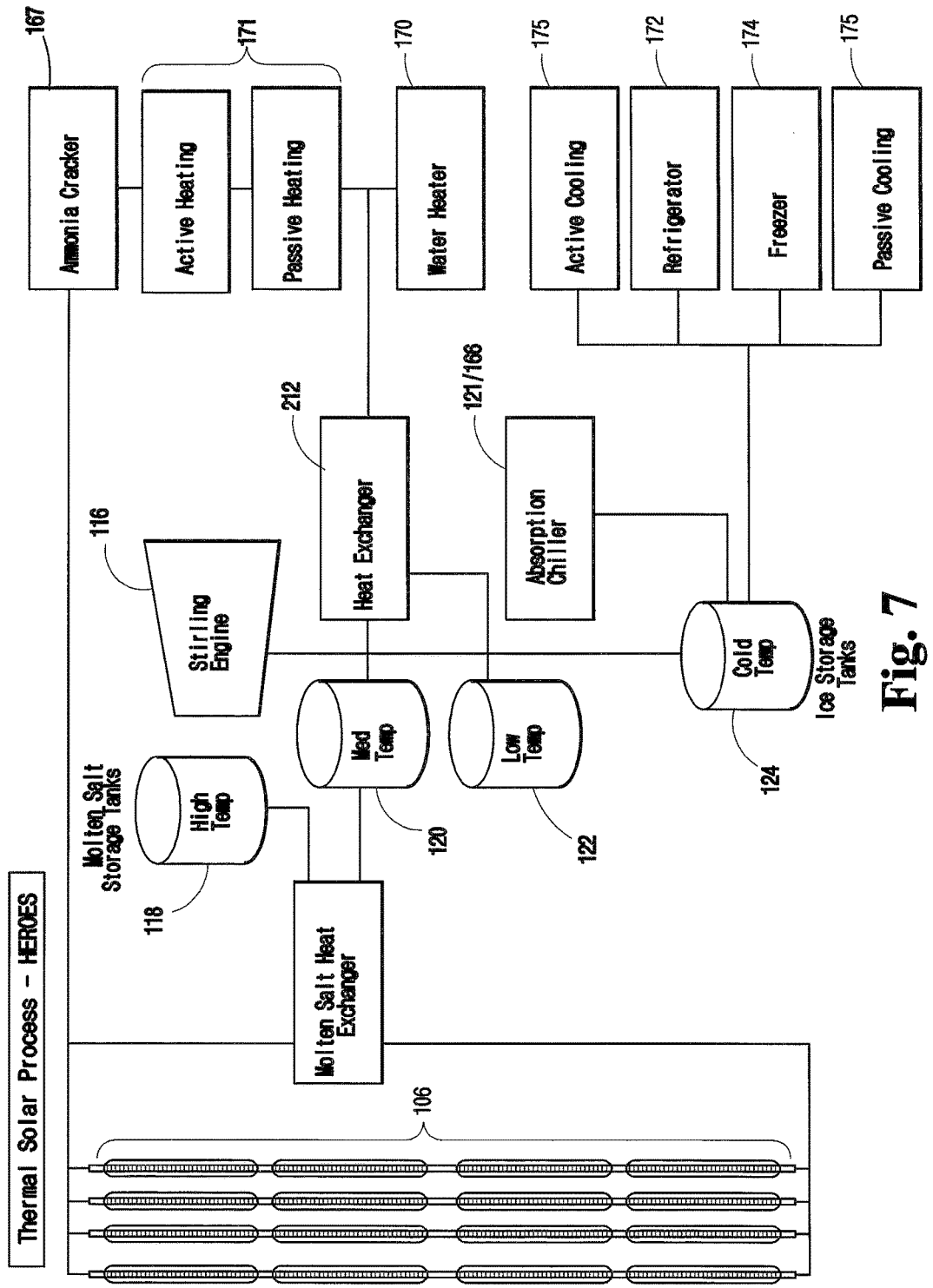
FIG. 7 is a flowchart according to one or more examples of an embodiment depicting the common connections of the Hydrogen Energy Renewable Operated Energy Station ("HEROES") in accordance with the present invention.

Referring to FIG. 4 and FIG. 7 next, flowcharts of the thermal solar process of an embodiment is shown. The insulated vessels shown facilitate the storing of energy from the renewable energy 112 in the heat-capacity fluid. The stored energy may then be used to generate electricity and thermal energy based on energy demand associated with energy requirements. To generate electricity from the stored energy, the chemical and/or heat from the associated storage 110 of specific fluid may be selectively transferred from the specific fluid to the working fluid. For example, a thermally insulating component may be disposed between the specific fluid and the working fluid to retain the heat in the specific fluid. During periods of low solar 106 and/or low wind 104 and/or high electrical demand, the thermally insulating component may be repositioned to transfer the heat from the specific fluid to the working fluid through a thermally conductive component such as a metal surface, a manifold, a conductive rod and/or a radiator.

Figure 14:
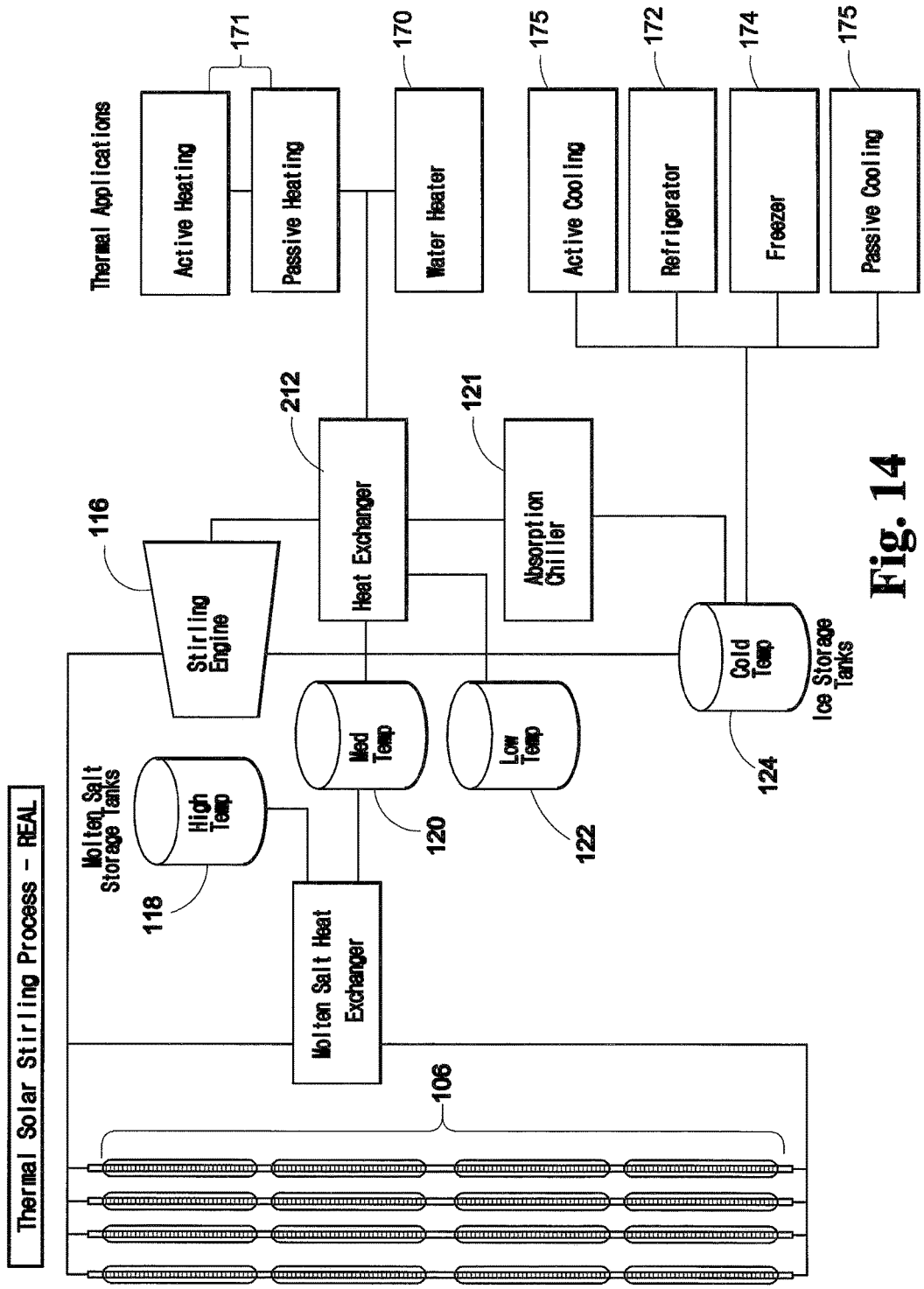
FIG. 14 is a flowchart illustrating the Thermal Solar Stirling Engine Process System in accordance with one or more embodiments of the present invention.
Figure 15:
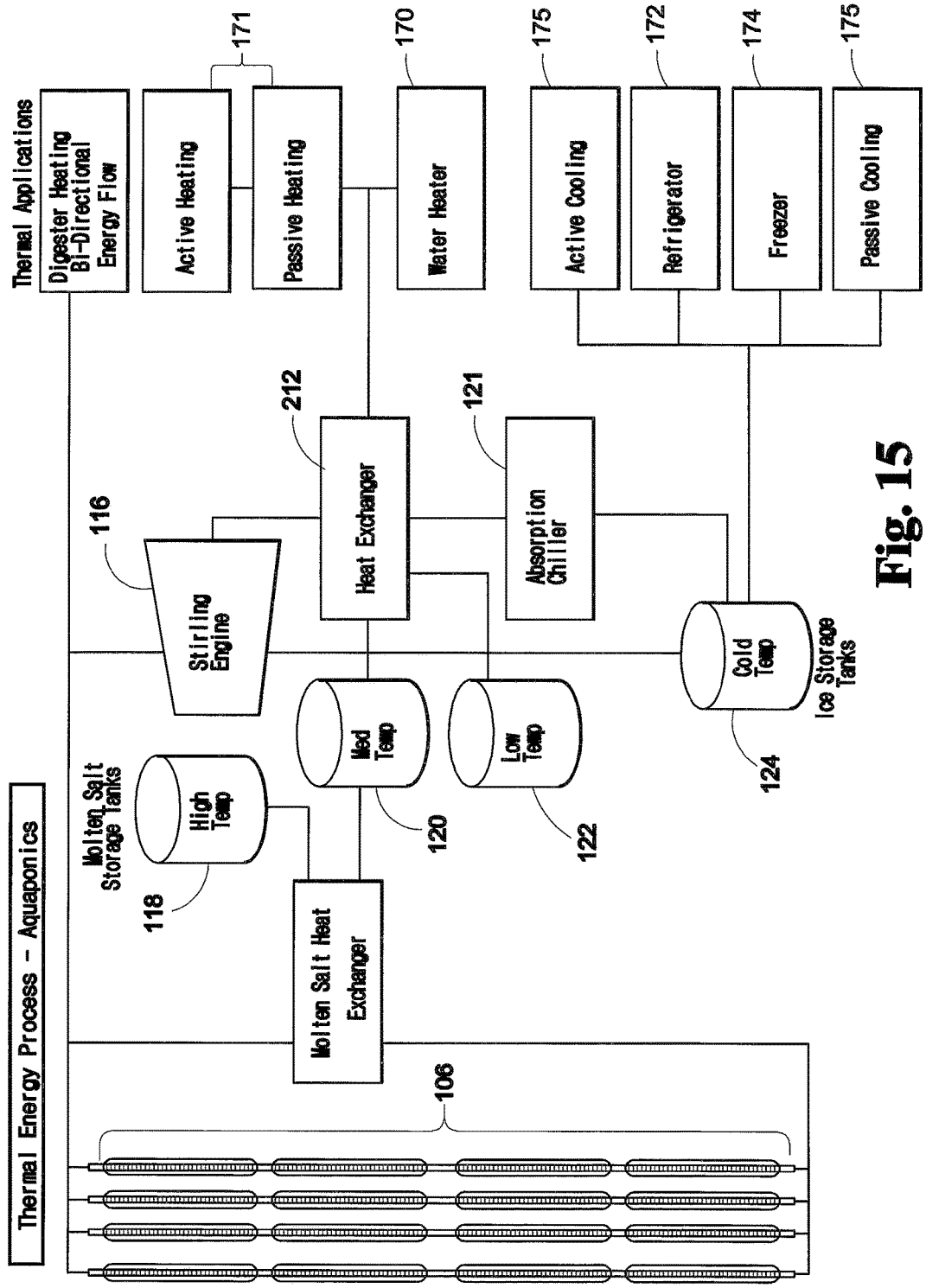
FIG. 15 is a flowchart illustrating the Aquaponics Process System in accordance with one or more embodiments of the present invention.

Finally, the transferred heat in the working fluid is used to generate electricity. More specifically, the working fluid may be associated with a low boiling point, such that the transfer of heat from the specific to the working fluid quickly boils the working fluid. Vapor and/or Steam from the boiled working fluid may then be used to rotate a turbine's rotor blades and the turbine 176 may be used to drive a rotational device for usable work and/or a Stirling engine 116 may be used to create usable work from the thermal energy directly as depicted in FIGS. 14 and 15.

Figure 5E:
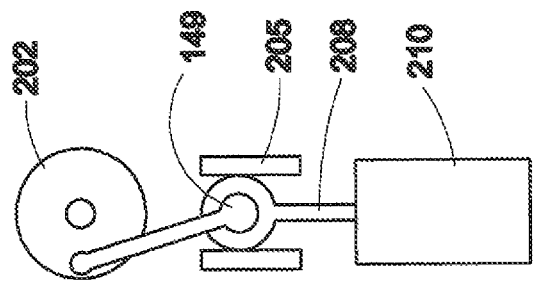
FIG. 5e is a schematic according to one or more examples of an embodiment of a cross-sectional view of a Stirling engine piston in accordance with the present invention.
Figure 5D:
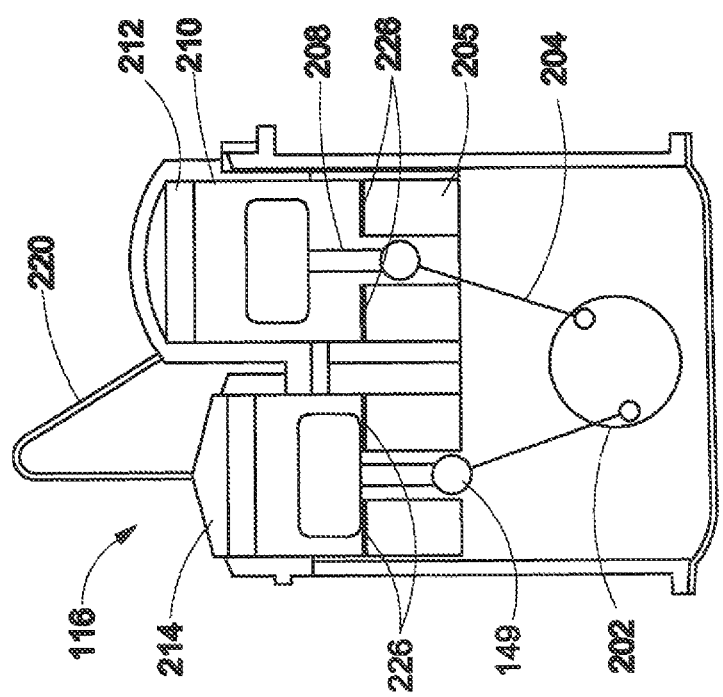
FIG. 5d is a schematic according to one or more examples of an embodiment of a cross-sectional view of a Stirling engine with dual pistons in accordance with the present invention.

Referring to FIG. 5a, the preferred embodiment of the Stirling engine 116 of the present invention is depicted. FIG. 5b depicts the overall Stirling Engine 116 cylinder arrangement. Furthermore, FIG. 5c depicts a section end view of a single Stirling engine 116 with two cylinder chambers. FIGS. 5d and 5e depict a section end view of a single set of Stirling engine 116 cylinders and a single piston arrangement of the Stirling Engine 116 in according to the preferred embodiment of the present invention. The crankshaft 202 is attached by connecting rod 204, to a wrist pin 206 and expansion piston 208; which said expansion piston 208 reciprocates in an expansion cylinder 210. Surrounding the expansion cylinder 210, and connected in series with it, are a thermal exchanger 212, regenerator 214, cooler 216 and sheath cylinder 218. Beneath the cooler 216, is a duct 220, connecting said cooler 216 with compression cylinder 209. Inside said compression cylinder 209 reciprocates the transposed compression piston. As shown in FIGS. 5b and 5d, the compression piston comprises an outer cylindrical portion, rings 222, conic section 224 and head gasket seal 226.

The preferred embodiment of the present invention consists primarily of rows of transposed compression piston and cylinders for the single engine twin cylinder Gamma Stirling engine 116. This allows for engine configurations in a linear "V", double "V", "W" and/or radial type piston arrangement. A single connection on the crankshaft 202 may be attached to one or more connecting rods 204; one connection going into each of the like-aligned cylinders. In the hot side cylinder 212 is a conventional expansion piston 208, attached by a wrist pin 206 to its respective connecting rod 204. The engine's thermal exchanger 212, regenerator 214 and cooler 216 are arranged in an annular design around this cylinder 212.

In the compression side cylinder 209 is a conventional compression piston, attached by a wrist pin 206 to its respective connecting rod 204. The engine's cooler 216 may be arranged internally and/or as an annular design around this cylinder; during scaling the cooler 216 may be moved to inline with the compression cylinder 209. An object of the present invention is the development of a generic Stirling cycle in which the thermal chambers may be of identical design with mass production, but primarily in which cylinder wall is kept thin to reduce material usage requirements and weight, lastly while maintaining reduced energy input requirements. In the multi-cylinder Stirling cycle thermal engine 116 described, the cylinders are arranged in two rows. The cylinders of one row are staggered relative to the cylinders of the other row and the longitudinal center axis of one row forms an angle with the longitudinal center axis of the cylinders of the other row. Additional rows and layouts may be added up to and including a multiple row radial engine design.

Close to the crankshaft 202 is the inner portion of the cylinder, comprising a large bore in which the compression piston ring(s) 222 and/or seal(s) rides. The connecting conic section 224 incorporates a port communicating directly to the cooler 216. Beyond the conic section 224 is a small bore (relative to the large bore previously described) outer portion of the compression cylinder 209, which essentially extends the cylinder to accommodate the long connecting rod 204. This outer portion of the cylinder will absorb the side loading of the piston due to connecting rod angularity. As used herein, "inner" and "outer" refer to a component's relative proximity to the crankshaft 202, which is the center of the engine 116.

The compression piston is transposed so that its seal is farther from the crankshaft 202 than are its wrist pin 206 and side-load bearing portions. The piston comprises a large diameter inner portion which carries the ring(s) 222 and/or seal(s) with a loading and wear area. A conic section 224 connects the inner portion of the piston with a cylindrical outer portion of a smaller diameter, which contains a sealed wrist pin 206 and a wear area. Sufficient clearance or other relief means is provided in the outer portion of the piston to permit lubrication while limiting passage of the working gas among all parts of the cylinder at all times.

Pressure release and gas transfer is accomplished through the relief passage pathway heat exchanger 212 and inline regenerator 214 for transfer to the compression side cylinder. This relief means may be located external to the cylinder, rather than in the cylinder piston. The diameter of this outer portion of the piston is as tight a clearance and as small a tolerance as possible, consistent with the loads it must bear, to minimize the dead volume ratio associated with it and its relief means. To facilitate good dynamic balance, the compression piston is designed to have the same material mass as the expansion displacer piston 208, which is counterbalanced on the crankshaft 202. The offset staggered linear arrangement of cylinders in rows will allow the system to use a common crankshaft 202 and allow the cylinder block to be a continuous sandwiched cylinder block to house, support and/or encase all cylinders.

The preferred embodiment of the current invention uses the side-by-side alignment of the displacer side cylinders for the benefits of allowing the use of casting the head and multiple cylinders as a single manufacturing piece block to simplify sealing the engine, allow for a much higher power engine with a linear offset diagonal rows of cylinders and to enhance mass manufacturing capabilities while still using a single crankshaft design. Additionally, with the placement of displacer and compression cylinders 209 of the current design, separate heads for each cylinder can be also implemented. Furthermore, one or more harmonic balancers, crank pully damper, torsional damper, etc. may be optionally connected to the crankshaft 202 of the Stirling engine 116 to reduce torsional vibrations and the noise associated with it. Similarly, one or more balance shafts may be utilized in the Stirling engine 116 to, again, reduce vibrations and vibrational noise.

Figure 47:
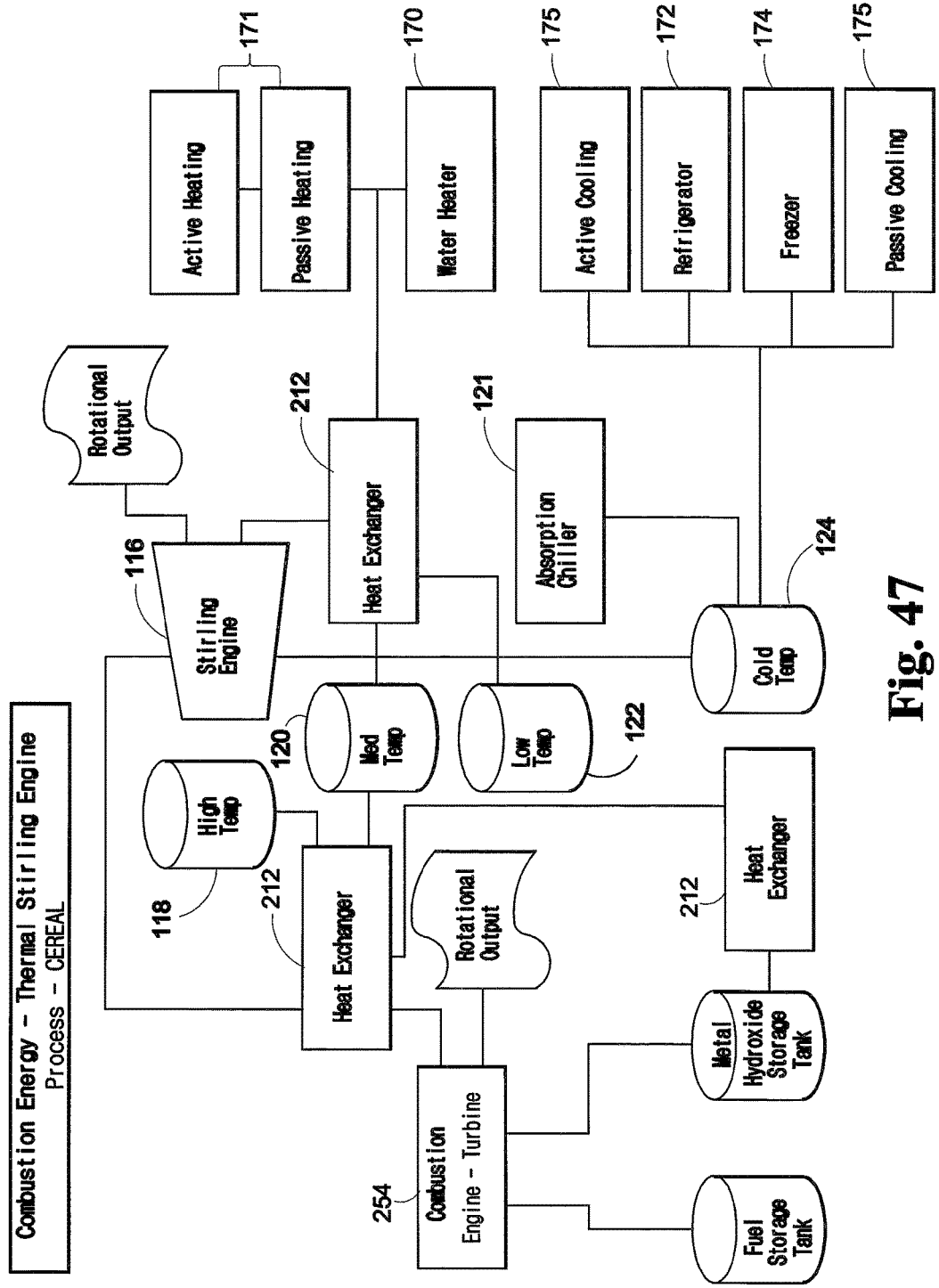
FIG. 47 is a flowchart illustrating the Combustion Energy—Thermal Stirling Engine ("CEREAL") Process in accordance with one or more embodiments of the present invention.
Figure 48:
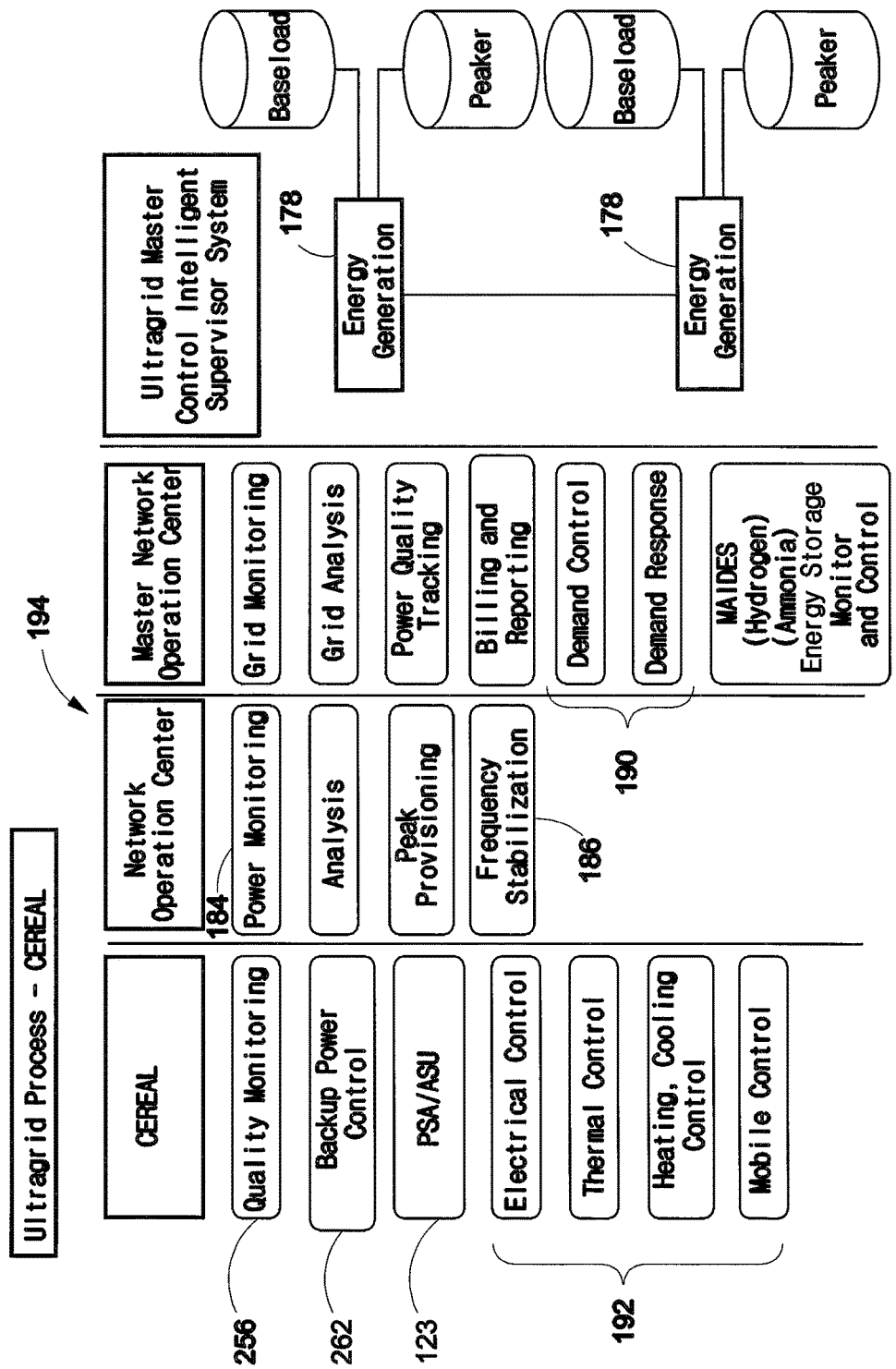
FIG. 48 is a block diagram illustrating the layers of the ULTRAGRID™—CEREAL Process in accordance with one or more embodiments of the present invention.

An additional method is the inclusion of a rotary disc valve (more commonly used in motorcycle two cycle internal combustion engines 254), which may be used for higher pressure builds when built between the compression and displacer cylinder gas exchange pathways. This may also be accomplished when exchanged in a pathway between the cylinders with a standard combustion engine type intake/exhaust valve using the crankshaft 202 with a lobe or with the addition of a camshaft to provide the timing and work to open the valve. FIG. 47 illustrates the additional combustion engine integrated into the processes of the present invention. Similarly, FIG. 48 depicts the necessary control modules and communication with the network operation and mater operation control centers for the integration of a combustion engine.

The engine lubrication system for the cylinder, piston, piston rings 222, rod bearing and potentially for valves, if used, is designed to deliver clean oil at the correct temperature and pressure to every part of the engine. The oil is sucked out the sump into the pump, being the heart of the system, then forced through an oil filter and pressure feed to the main bearings and to the oil pressure gauge. From the main bearings, the oil passes through feedholes into drilled passages in the crankshaft 202 and onto the big-end bearings of the connecting rod 204. The cylinder walls and piston pin bearings are lubricated by oil fling dispersed by the rotating crankshaft 202. The excess oil is scraped off by the lower ring 222 in the piston. The excess oil then drains back to the sump, where the heat is dispersed to the surrounding air. When the crankshaft journals become worn, the engine will have low oil pressure and throw oil throughout the inside of the engine. The excessive splash can overwhelm the rings 222 and cause the engine to leak oil into the compression chamber area of the cylinder. Worn bearing surfaces can be restored by simply replacing the bearing inserts. At the moment that sufficient oil is circulated through the system hydrodynamic lubrication manifests and reduces the progress of bearing wear and reduction in cylinder wall friction and heating.

Piston rings 222 provide a sliding seal preventing leakage of the fuel/air mixture and exhaust from the combustion chamber into the oil sump during compression and combustion. Secondly, they keep oil in the sump from leaking into the combustion area, where it would contaminate the working fluid transfer. Between the piston rings 222 and the cylinder wall of a well-maintained engine, hydrodynamic lubrication exists. This is essential for the lowest friction and wear. In the top and bottom dead center where the piston stops to redirect, the film thickness becomes minimal and mixed lubrication may exist.

To realize a good head transfer from the piston to the cylinder, an optimal sealing and a minimum of oil bleed, a minimal film thickness is desirable. The film thickness is kept minimal by a so-called oil control ring. This ring is situated beyond the piston rings 222 so that the surplus of oil is directly scraped downwards to the sump. The oil film left on the cylinder wall by the passage of this ring is available to lubricate the following ring. This process is repeated for successive rings 222. On the up stroke the first compression ring is lubricated by the oil left behind on the cylinder wall during the down stroke. Leakage of the gas from the compression chamber into the oil sump results in performance degradation. This is the reason why, despite frequent replenishment of oil, maintenance consisting of an oil change may remain essential. The multi-cylinder Stirling engine 116 of this invention provides a simple and practical method to improve the performance and life of a multi-cylinder, multi-piston Stirling engine 116 without at the same time increasing its complexity or decreasing its mechanical efficiency. It is generally accepted and agreed upon that the double-acting two piston Stirling engine is one of the most desirable forms of Stirling for high energy applications, having demonstrated both simplicity and good performance. Such Stirling engines may be designed in a variety of forms; for example, cylinders may be arranged in a single and multiple row linear, inline "V", double "V", "W" and radial layout type piston engine design configurations.

One of the most desirable arrangements is the double "V" type engine, in which the cylinders are generally located radially off of a standard crankshaft connection. This layout provides simplicity and strength, proper piston phasing for the Stirling cycle and excellent dynamic balance. There is a tradeoff that occurs with respect to the connecting rods 204. Namely, as the connecting rods 204 are made proportionally longer, the longer cylinder stroke causes the heads to be placed farther apart, thus requiring larger plenums and heat exchangers 212, with increased performance-robbing dead volume ratio, that evolves from the space between them. The other factor is the choice of optimal efficiency compact heat exchangers 212 and connecting plenums will be left with non-optimal performance due to short connecting rods 204, and the design that has efficient long connecting rods 204 will be left with non-optimal performance due to large dead volume ratio in the heat exchangers 212 and associated plenums.

The present invention discloses a new form of Stirling engine compression piston and cylinder 209 that will allow the engine designer to incorporate compact heat exchangers 212, efficient regenerator 214, plenums and efficient long connecting rods 204, on the double "V" type Stirling engine 116. The present invention Stirling engine 116 is a transposed compression piston and cylinder 209 for the double "V" type two piston engine which allows the cylinders 209, 210 to be connected by compact heat exchangers 212 and transfer channels, while retaining the use of mechanically efficient long connecting rods 204.

In one example, a crankshaft 202 is mounted in a bore that transversely intersects two cylinders 209, 210 arranged wherein one of said cylinders extends vertically from the crankshaft 202 bore and the other extends horizontally. Each crank throw on the crankshaft 202 is attached with one of the two connecting rods 204, one going into each of the two cylinders 209, 210. In the vertical cylinder is a conventional expansion piston 208, attached by a wrist pin 206 to its respective connecting rod 204. The engine's heater 212, regenerator 214 and cooler 216 are arranged in an annular fashion around this cylinder. During Stirling engine design scaling, the cooler section 216 is moved from inline with the displacer cylinder 210 to inline with the compression cylinder 209 to allow more mass volume contact without incurring excessive dead space ratio creation as shown in the included Stirling engine cutout (FIG. 5c) described below. The horizontal compression cylinder 209 has two concentric bores along a common extended axis, with a conic section 224 connecting them. Close to the crankshaft 202 is the inner portion of the cylinder, comprising a large bore in which the compression piston ring 222 and/or seal rides. The connecting conic section 224 incorporates a port communicating directly to the cooler 216. Beyond the conic section 224 is a small bore (relative to the large bore previously described) outer portion of the compression cylinder 209, which essentially extends the cylinder to accommodate the long connecting rod 204. This outer portion of the cylinder will absorb the side loading of the piston due to connecting rod angularity. The compression piston comprises a large diameter inner portion which carries the ring 222 and/or seal and a small wear area. A conic section 224 connects this inner portion with a cylindrical outer portion of a smaller diameter containing a sealed wrist pin 206 and a large wear area. To facilitate suitable dynamic balance, this piston is designed to have the same physical mass as the expansion piston 208, which is counterbalanced on the crankshaft 202.

Reversing the Stirling cycle and providing energy input in the form of linear or rotational input will allowing a Stirling cycle thermal engine 116 to perform a cooling application process. Instead of cooling the compression side and providing a heat source applied to the displacer side otherwise known as the displacement side, a thermal transfer exchanger 266 is used in replacement of a heat exchanger 212 and heat input, consisting of a device such as a thermosiphon or other past prior art thermal transfer methods for the purpose of cooling an appliance, storage space or substance of gas and/or liquid. This cooling process may be used for refrigeration 172 or can extend to provide supercooling or cryo-cooling level temperatures to liquefy gases or for providing the cooling of such substances or other thermal required applications.

The preferred method of the present invention sets forth its primary advantage and novel method over prior art above applications and processes with physically connected preheaters 213 and heating system elements 171, heat exchangers and regenerators 214 in its reclamation and recycling of waste thermal energy for use, reuse, storage and/or conversion and storage. This energy is used by thermal intensive applications such as with Stirling cycle engines which use a portion of the thermal energy for the generation of rotational energy, for use in such applications such as rotation work needed for input into a generator 114, pump or compressor. Waste heat recycled from this process may be used in a second level of reuse of available waste energy as thermal energy input into secondary lower heat threshold thermal intensive applications such as Stirling engine cycle 116 with a reduced temperature differential which would then use a portion of the thermal energy input for the generation of rotational energy for us in such applications such as rotation work needed for input into a generator, pump or compressor.

The present embodiments relate to a highly scalable mobile and stationary Quintuple-effect generation renewable energy system and energy storage systems 110. Prior art thermal energy sources consisted primarily of Gas Turbines, Microturbines, Reciprocating Engines, Steam Turbines 176, Nuclear Power Plants, Radioisotope Thermal Generators, Geothermal 100, Boilers, Stirling Engines 116, Fuel Cells, Thermal Solar Systems 106 and other thermal input sources operating in conjunction with combined heating and power (CHP). The preferred method of the present invention encapsulates a thermal energy sources with a Stirling engine 116, absorption cooling system 121, an associated storage system and integrated control system into an amalgamated energy ecosystem.

The preferred method of the present invention is to be referred to as Quintuple Effect Generation also known as (QEG) offers the advantages of integrating separate discoveries with enhanced benefit of a combined multi-cycle energy system (CMCS) amalgamated with a combined cooling, freezing, heating and power (CCFHP) system with optional rotational energy output. The preferred method of the present invention benefits from novel methods, processes and applications from inclusion of the central embodiments of the present invention and able to additionally build upon the strengths of past prior art may hold while removing or greatly reducing any deficiency that the isolated systems might have had because of their application in a non-optimized design and configuration.

The preferred method of the present invention consisting of multiple cycle generation systems using thermal energy sources such as reciprocating engines, gas and/or steam turbines 176, microturbines, thermal solar systems 106, nuclear power plants, radioisotope thermal generator, geothermal 100, fuel cells 250 and Stirling engines 116 as the primary thermal energy cycle and using the preferred method of the present invention for additional benefit will recycle thermal waste energy for additional thermal intensive processes and applications for example additional stage cycles incorporating Stirling engines 116, thermal energy storage, desalination other thermal intensive applications may be integrated for additional benefit and enhanced efficiency.

The present invention provides sustainable green energy powered production, product processing, pyrolysis, byproduct processing, separation, handling and storage system, open architecture for integration of additional processes and applications. System uses adaptive metrics, biometrics and thermal imaging sensory analysis including additional input sensors for analysis, monitoring and control with integrated automation and maintained symbiotic artificial intelligence-controlled system providing a balanced environmental friendly based facility ecosystem.

System forms an integrated mobile or stationary renewable energy production and storage method with inclusion of dedicated product processes and applications, byproduct processing separation processing primarily to include applications and processes such as electrolysis 278, pyrolysis, milling, smelting, baking, caking, washing, spray and drum drying, purification, packaging, bulk storage and dry storage facility. The preferred method of the present invention using renewable green energy sources as the primary energy component input to primarily provide energy input to applications and processes such as consisting of tri-method desalination, cement production, block and brick production, butcher, datacenter, farming, smelting, pyrolysis 264, lubrication synthesis, plastics manufacturing, carbon fiber production, acetic acid production, wet mill, cellulosic processing, other feedstock production, forge and mill facility comprised of smelter, electrolyzer 113, furnace, electrolysis 278, distillation units, evaporator units, reverse osmosis, absorption cooling 121 and Stirling engines 116 using renewable thermal energy generation, energy storage 110 and transfer for rotational and electrical generation, yields an environmental friendly, scalable and sustainable renewable energy generation and energy storage powered system 110.

These embodiments form the basis for system scaling of size, functionality, complexity, allowance of widest array of variety for processing, sub processing, byproduct processing and separation processes to include available natural and manmade organic and inorganic compounds. The electronic monitoring, identification, energy generation, baseload energy load response and energy provisioning to satisfy grid stability from supply compensation for end use requirements and control element of the present invention in the current application shall henceforth be known and designated from the above as elements for the features and functionality as system to be known as "ULTRAGRID™" 194. More specifically the preferred method of the present invention consists of an ULTRAGRID™ 194 connected, integrated and controlled energy system with scalable hybrid method of processes and applications incorporating vital procedures to promote and maintain sustainable processes and applications with effective energy, environmental control factors and balance for efficient high yield product and byproduct production, powered with renewable energy 112 and redundant backup power 262 provided by energy storage elements 110.

The preferred method of the present method is to be referred to as Quintuple Effect Generation or (QEG), which offers the advantages of integrating separate, individualized discoveries with the enhanced benefit of a combined multi-cycle energy system (CMOS) amalgamated to provide a combined cooling, freezing, heating and power (CCFHP) system with optional rotational energy output. The preferred method of the present invention benefits from the intended strengths of prior art while introducing new integrated solutions while removing or greatly reducing any deficiency that the isolated prior art systems might have had because of their application in a non-optimized design, configuration or implementation.

The preferred method of the present invention comprises an inclusion of thermal management via energy transfer through use of a thermosiphon (alt. thermosyphon) energy reclamation from direct or natural convection thermal exchange which is a property of physics and generally refers to a method of applications and processes that uses passive heat exchange based on natural convection, which circulates a substance (liquid, or gas such as nitrogen or air) without the necessity of a mechanical pump. Thermosiphoning is typically used for circulation of liquids and volatile gases in heating and cooling applications, such as heat pumps, water heaters 170, boilers and furnaces. Thermosiphons are used in some liquid-based thermal heating and/or cooling systems to perform such action to a liquid.

The preferred method of the present invention comprises an inclusion of thermal management via energy transferred in a system by the evaporation and condensation of vapor, such a system would then be properly classified as a heat pipe. If such a system also contains other fluids, such as nitrogen, helium or air, then the heat flux density will be less than in a real heat pipe, which only contains energy for additional benefit versus prior art thermal management that thermal energy waste was considered an expense to remove and had costs attributed to disposal of said thermal energy using devices such as cooling towers 246 and radiators to exhaust excess heat to the atmosphere.

Figure 16:
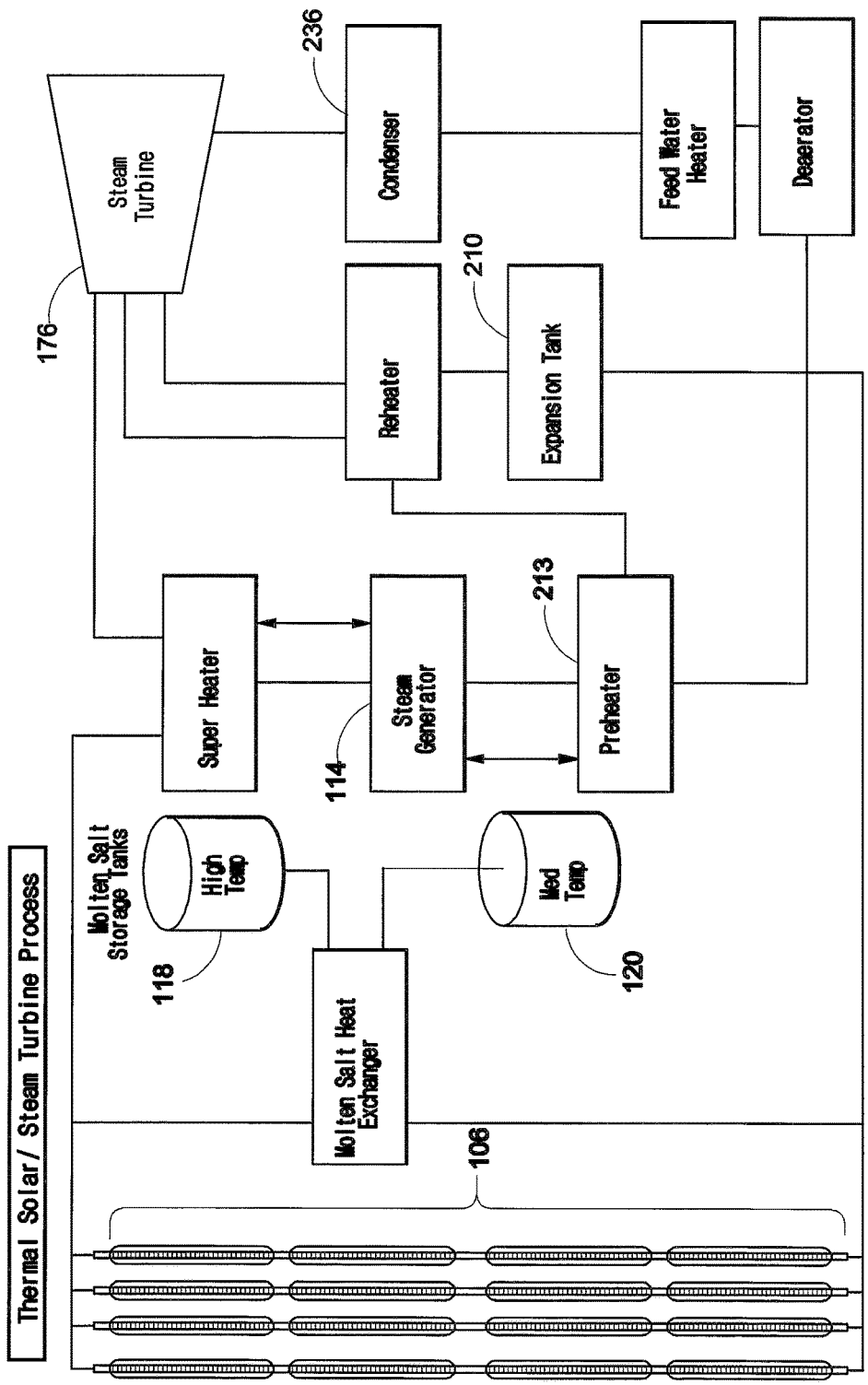
FIG. 16 is a flowchart illustrating the Thermal Solar/Steam Turbine Process System in accordance with one or more embodiments of the present invention.
Figure 17:
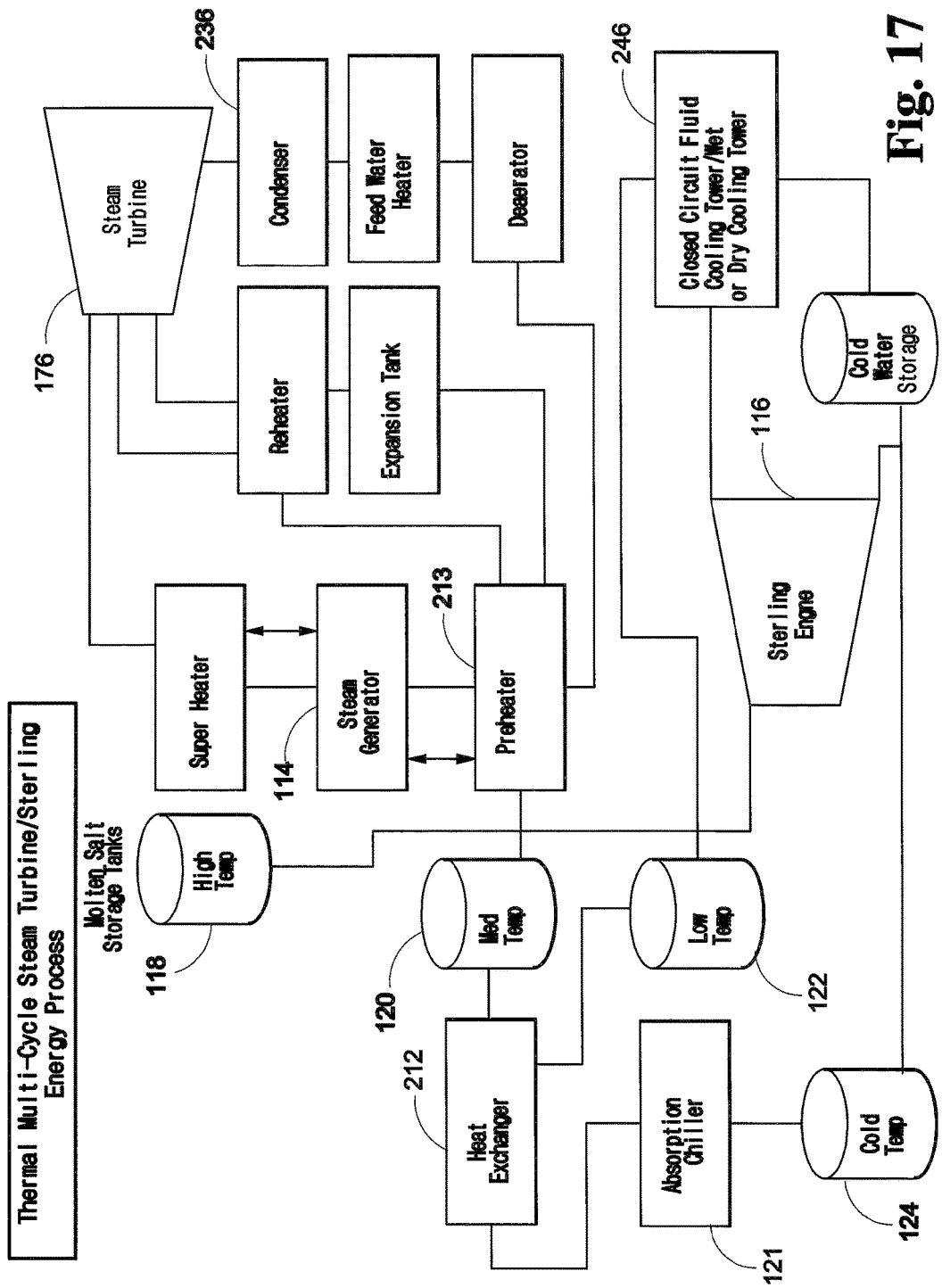
FIG. 17 is a flowchart illustrating the Thermal Multi-Cycle Steam Turbine/Stirling Energy Process System in accordance with one or more embodiments of the present invention.

As illustrated in FIGS. 16 and 17, the preferred method of the present invention would use a Stirling engine 116 using thermal energy both hot and cold inputs and additional levels or cycles of Stirling engines and absorption cooling systems 121 for operating near theoretical performance levels. An example of using the preferred method of the present invention in an existing prior art installation could consist of a natural gas power plant, heat generated from burning gas causes the turbine to rotate and generate rotational energy for communication to a generator. Waste heat is then harnessed and communicated for steam generation. The generated steam is pressurized and supplied as pressure and thermal energy to a steam turbine 176, this energy is then used to generate rotational energy which is then communicated to a generator as electrical power. Used steam energy is then transferred to a dry or wet cooling system 125 to bring the temperature of the steam condensed down in conversion and recycling back to water for reuse.

The preferred method of the present invention will communicate the thermal energy from generational source to thermal energy storage or directly communicated to a Stirling engine 116 and absorption cooling system 121, this arrangement would be used to enhance system efficiency and generate additional energy output boosting system performance by way of its enhanced output.

The preferred method in a minimal configuration could entail only the Stirling engine 116 or include only the absorption cooling 121 to enable cooling tower performance by using cold energy generation and thermal energy extraction which will lower thermal energy threshold and allow the generated cold input to counter flow and cool the remaining steam energy to enhance cooling tower performance.

The increased efficiency of the SRG may be demonstrated by a theoretical comparison of thermodynamic properties. The preferred method of the present invention builds upon those findings and come full circle with inclusions of technology integrations that advance and enhance the prior art comparison models. Typically, these calculations are can and are generally oversimplified and do not account for the nuclear decay and its inherent thermal generation which lowers thermal power output due to the long half-life of the radioisotopes used in these types of generators. Generally, the assumptions for this analysis include that systems are typically operating at steady state under the conditions observed in highly controlled experiment with rigid standards which may or may not accurately reflect real world applications and processes.

These types of generators 114 can be simplified in their single dimension analysis of a typical heat engine to be able to compare their theoretical efficiencies to their corresponding Carnot efficiencies. The preferred embodiment would have the system basis be assumed to be the Stirling engine 116 and generational components, to include the heat source, cooling system 125 and thermal exchanger 212. Greater efficiency and higher generational output can be achieved by increasing the temperature band and corresponding ratio between the hot and cold inputs of the Stirling engine 116 which is the basis of the preferred embodiment.

The preferred method of the present invention for the purpose of providing dehumidification using a liquid desiccant will integrate a typical hydrostat which is an electrical device for detecting the presence of moisture may be used to monitor and control humidity levels automatically to preset levels. The system may use any form of humidifier to raise the moisture levels to appropriate levels that may be desired or required. The system integrates the heating and cooling unit into a single solution for ventilation improved efficiency approaching 95%, vast improvement is maintained in total system efficiency, reduction of material requirements and removing redundant material requirements from an amalgamated heating, cooling, humidity, air quality control system 256.

Energy-recovery ventilators (ERVs) are devices that replace the stale indoor air and exchange it with fresh outdoor air, the process involved transfers heat and humidity from the outgoing exhaust air to the incoming fresh air. In this way, they differ greatly from simple heat-recovery ventilators (HRVs) that transfer heat but not moisture. The preferred method of the present invention promotes sustainable renewable energy inputs 112 with ERV design to the next generation with its inclusion in the heating and cooling system to provide a new level of controllability, comfort and efficiency over prior art.

This technology has demonstrated an effective means of reducing energy cost and heating and cooling load requirements, but has allowed for the scaling down of required HVAC equipment and associated material requirements such as smaller venting, heat exchangers and condensers. Additionally, this system will allow for a controlled indoor environment to initiate and maintain a relative humidity of a highly appealing and comfortable 40% to 50% range. This range can be maintained under essentially all conditions in all seasons. The only energy penalty is the power needed for the blower to overcome the pressure drop that is caused from redirecting air flow and from the flow path restrictions and surface tension caused flow resistance in the system.

Figure 18:
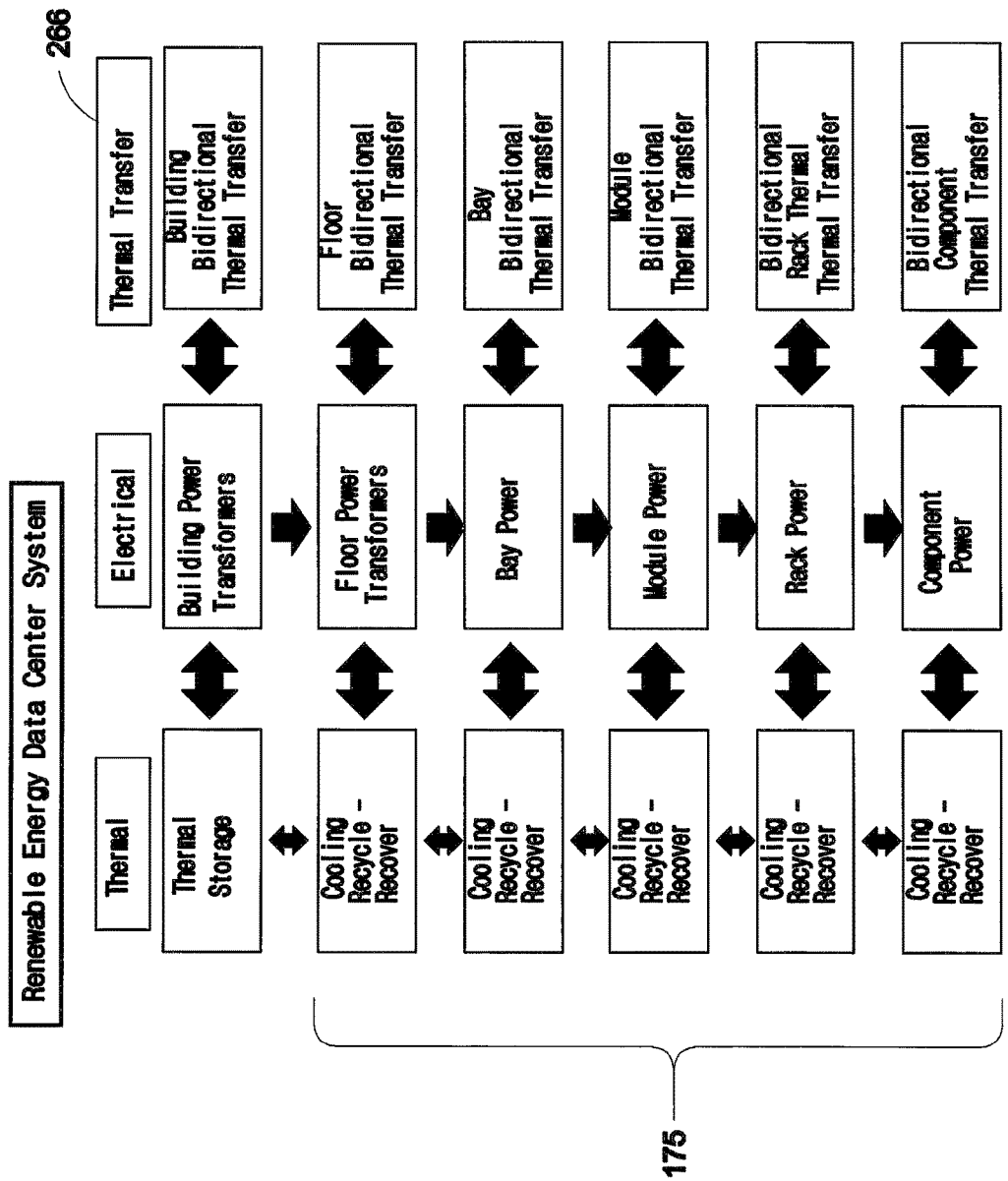
FIG. 18 is a block diagram in accordance with one or more examples of an embodiment of the data center system of the present invention.

As illustrated in FIG. 18, the preferred method of the present invention primary objective was to move beyond industry best practice and advance an energy efficient datacenter that could be delivered and operated below the cost of a typical large enterprise datacenter to set itself apart from past prior art as the most efficient computing infrastructures at the lowest possible cost. The design flow logic was to custom design the data center with its cooling and energy backup with built in energy storage from the ground up, custom build its software, server hardware implementations to enable smooth integrations and transformations into a reliable and sustainable cloud computing offering. Differing prior art used with the present inventions is use of renewable energy preferably with thermal energy with its use and reuse of recovered and recycled waste energy for enhanced uses and purposes which especially holds value with its ability to provide absorption cooling 121, the cold storage 124 medium when necessary, and on demand for cold energy for cooling purposes.

Figure 19:
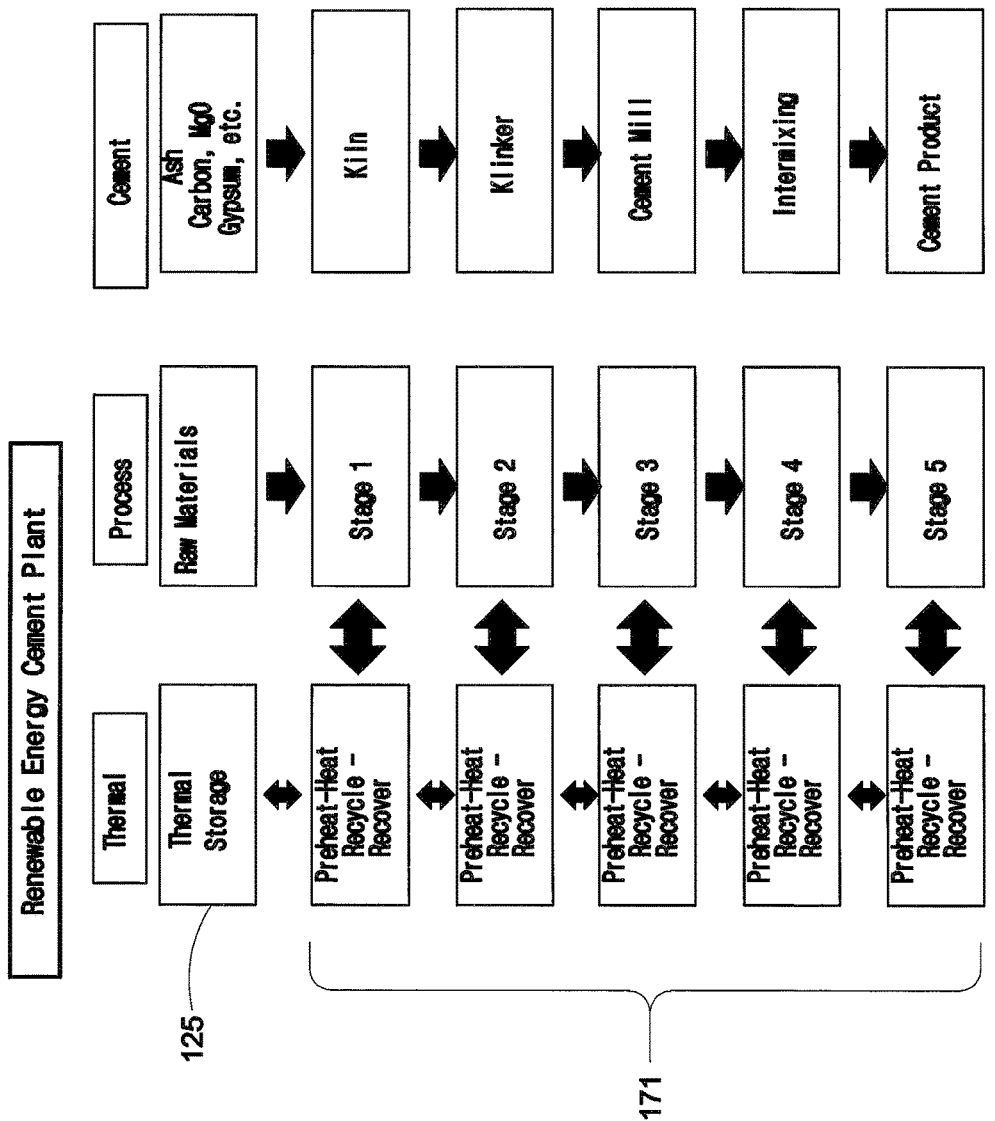
FIG. 19 is a block diagram of a cement plant system according to one or more embodiments of the present invention.

As depicted in FIG. 19, the preferred method of the present invention may use separated and processed products from the above desalination and processes separating and processing the minerals into usable components for the purpose of the provided materials input for the manufacturing of cement. This preferred method of the present invention uses the above process which has the added advantage over prior art of using minute transfer energy with the inclusion of the plants being physically interconnected in their ability to transfer materials once processed to awaiting vertical market processes as detailed above with cement product manufacturing.

Figure 20:
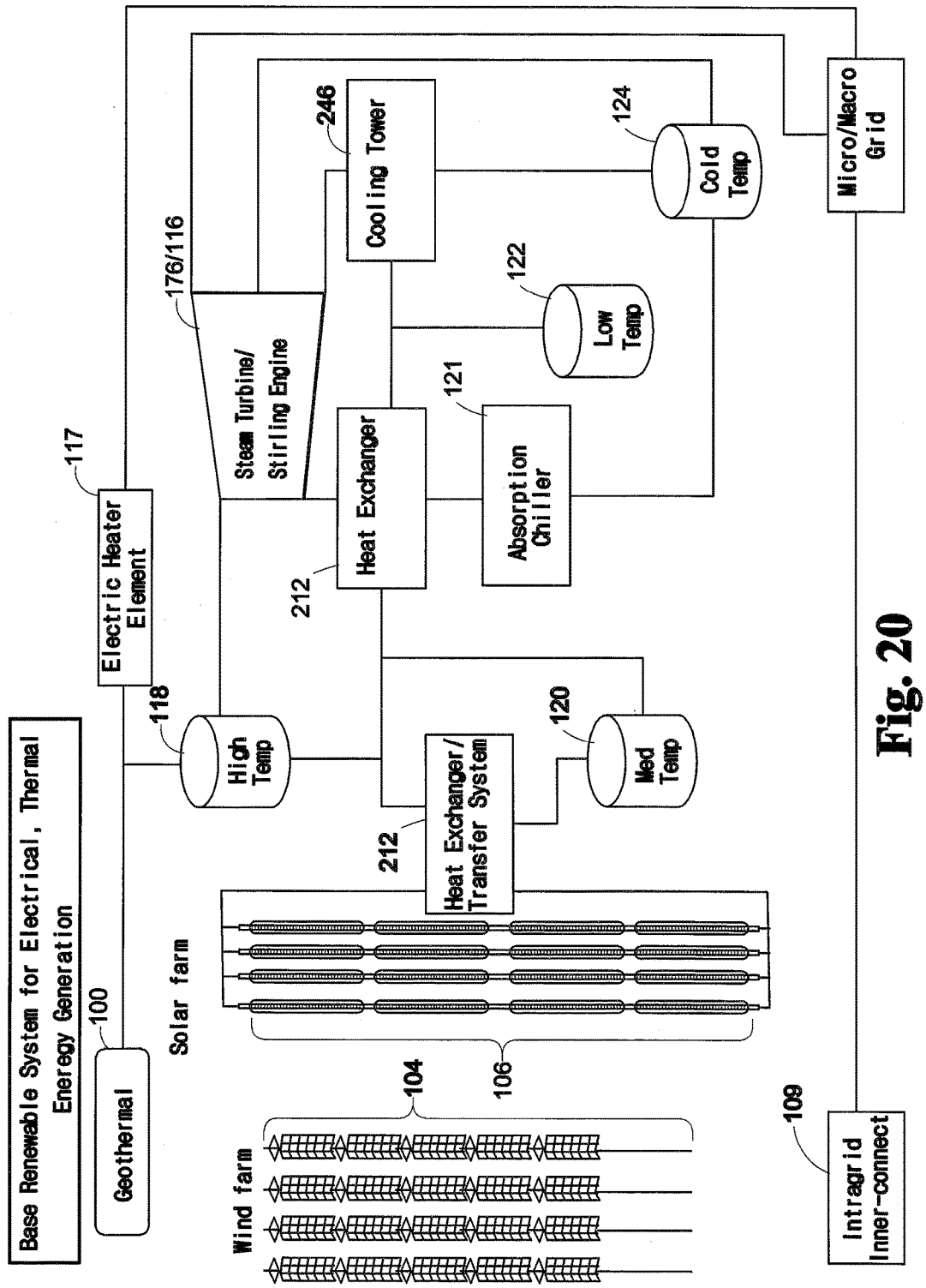
FIG. 20 is a flowchart illustrating the Base Renewable Generation System for Electrical, Thermal Energy Generation in accordance with one or more embodiments of the present invention

As shown in FIG. 20, the preferred method of the present invention has the advantage over prior art with its inclusion of stored thermal energy which results in electrical generation via steam turbine 176 or Stirling engines 116 from communicated thermal input. Additional advantage of the preferred method of the present invention is providing thermal energy communicated from thermal energy storage 125 as a backup heating source in case of grid failure and enhanced uptime and reduction of potential losses, damage to the pots is caused when the pots are allowed to cool from energy input loss which will force pots to have to be repaired at significant cost if the liquid metal is allowed to solidify.

Prior art of aluminum smelting applications and processes typically was never fully or partially automated due to its inherent design and deployment flaws. The preferred method of the present invention uses metrics, biometrics and thermal imaging technologies of analysis, monitoring and control of the smelting process using amalgamated with artificial intelligence and automation including robotics to reduce or eliminate injuries and enhanced uptime, productivity and enhanced volume.

Typically for reference a steel mill, mini mill or steelworks is an industrial plant for the manufacture of steel and processing of steel and related products. Steel is an alloy of iron and carbon. It is generally produced in a two-stage process. The first stage of prior art consists of iron ore that is reduced or smelted with coke (carbon) or carbon input replacement and limestone (ash) in a blast furnace. The preferred method of the present invention uses stored carbon monoxide and carbon dioxide as replacement for the carbon input. The preferred method of the present invention is the use of renewable energy for thermal generation or thermal storage to provide thermal energy input for pre-heating, additionally the present invention introduces the use of electrical heat elements therefore using electrical high temperature heating elements 117 to reach required temperatures normally generated in prior art by a blast furnace, this process is used for producing molten iron which is either cast into pig iron or carried to the next stage as molten iron.

The preferred method of the present invention communicates thermal energy from energy storage 110 or waste energy from a furnace to enable a Stirling engine to generate rotational energy to provide input for pressure swing absorption or air separation 123 to provide oxygen to the furnace for higher efficiency of thermal and electrical energy generation and usage.

The preferred method of the present invention recycles thermal waste energy recovery from using heat exchanger and located coils near or around the furnace. The present invention then uses this recycled thermal energy for the purpose of supplying communication to thermal storage or reuse of the thermal energy for Stirling engine input to generate rotational energy which is then used for pressure swing absorption or air separation unit 123 for oxygen extraction which is injected into the furnace to enhance furnace efficiency.

The preferred method of the present invention sets forth its primary advantage and novel method over prior art provides for normalized thermal energy balance that is essential for realized and optimized system wide use and reuse efficiencies concurrently monetizing all energy inputs for all intended applications and processes.

Prior art of steel mill applications and processes typically was never fully or partially automated due to its inherent design and deployment flaws. The preferred method of the present invention uses metrics, biometrics and thermal imaging technologies of analysis, monitoring and control of the steel making process using amalgamated with artificial intelligence and automation including robotics to reduce or eliminate injuries and enhanced uptime, productivity and enhanced volume.

The preferred method of the present invention recycles thermal waste energy recovery from using heat exchanger and located coils near or around the furnace. The present invention then uses this recycled thermal energy for the purpose of supplying communication to thermal storage or reuse of the thermal energy for Stirling engine input to generate rotational energy which is then used for pressure swing absorption or air separation unit 123 for gas extraction which is injected into the furnace to enhance furnace efficiency.

The preferred method of the present invention sets forth its primary advantage and novel method over prior art provides for normalized thermal energy balance that is essential for realized and optimized system wide use and reuse efficiencies concurrently monetizing all energy inputs for all intended applications and processes.

Figure 21:
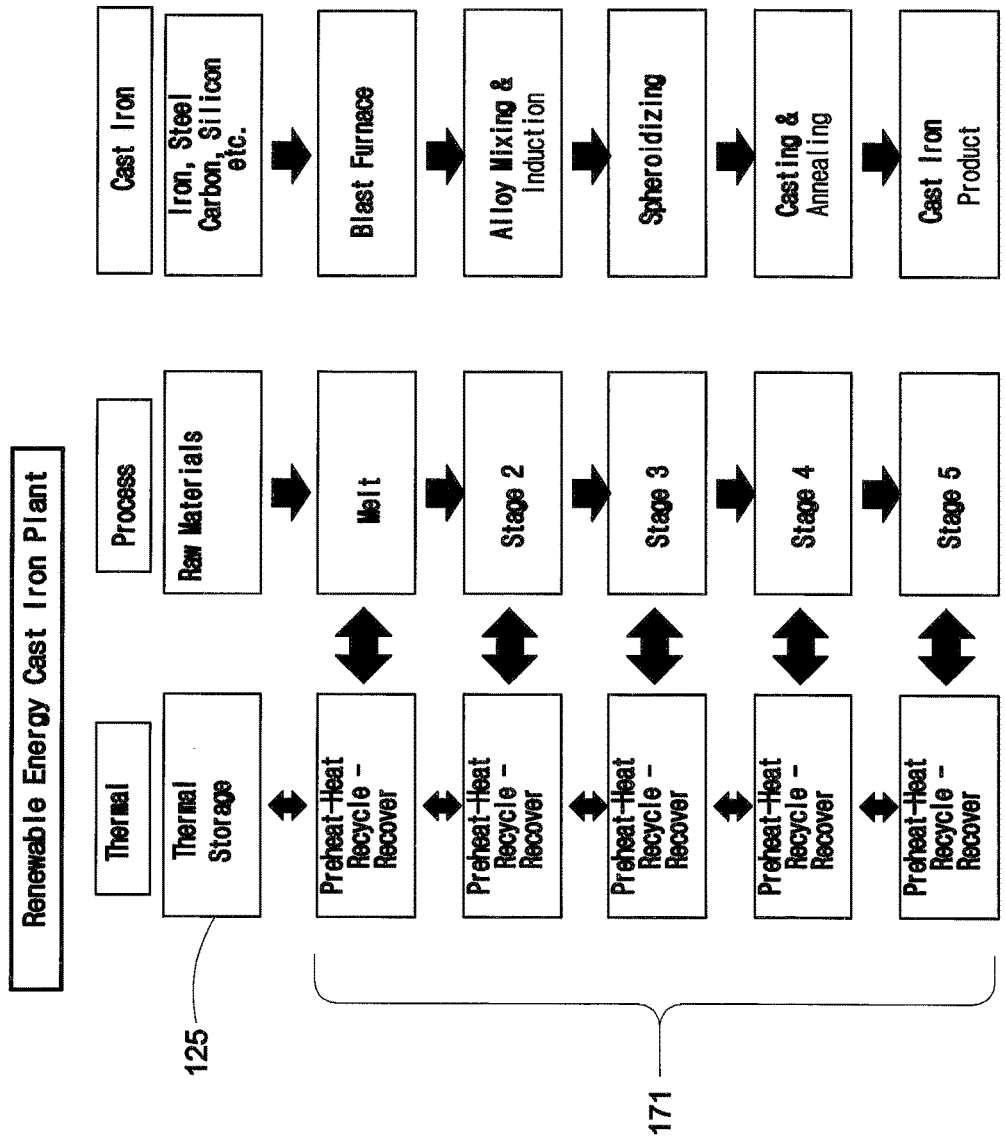
FIG. 21 is a block diagram of a cast iron plant system according to one or more embodiments of the present invention.

Prior art of cast iron applications and processes typically was never fully or partially automated due to its inherent design and deployment flaws. As shown in FIG. 21, the preferred method of the present invention uses metrics, biometrics and thermal imaging technologies of analysis, monitoring and control of the cast iron process using amalgamated with artificial intelligence and automation including robotics to reduce or eliminate injuries and enhanced uptime, productivity and enhanced volume.

The preferred method of the present invention uses wind 104 and solar generated hydrogen and through ammonia synthesis for the nitrogen input and fuel provisioning, when combined with potassium extraction from desalination, majority of the nutrient inputs has been generated or produced with green renewable energy sources 112.

Currently, the first-generation processes for the production of ethanol are typically from the use of corn feedstock which uses only a small part of the corn plant: the corn kernels are taken from the corn plant and only the starch, which represents about 50% of the dry kernel mass, is transformed into ethanol. Two types of second generation processes are currently under development. The first type uses enzymes and yeast fermentation to convert the plant cellulose into ethanol while the second type uses pyrolysis to convert the whole plant to either a liquid bio-oil or a syngas. Second generation processes can also be used with plants such as grasses, wood or agricultural waste material such as straw. The preferred method of the present invention would comprise using wet mill process followed by the cellulosic process for enhanced ethanol production and inclusion of plankton reactors for blue green algae additives to greatly enhance EFG product value output vastly superior in value proposition and nutritional value compared to prior art.

Prior art of ethanol applications and processes typically was never fully or partially automated due to its inherent design and deployment flaws. The preferred method of the present invention uses metrics, biometrics and thermal imaging technologies of analysis, monitoring and control of the ethanol and EFG process using amalgamated with artificial intelligence and automation including robotics to reduce or eliminate injuries and enhanced uptime, productivity and enhanced volume.

Figure 22:
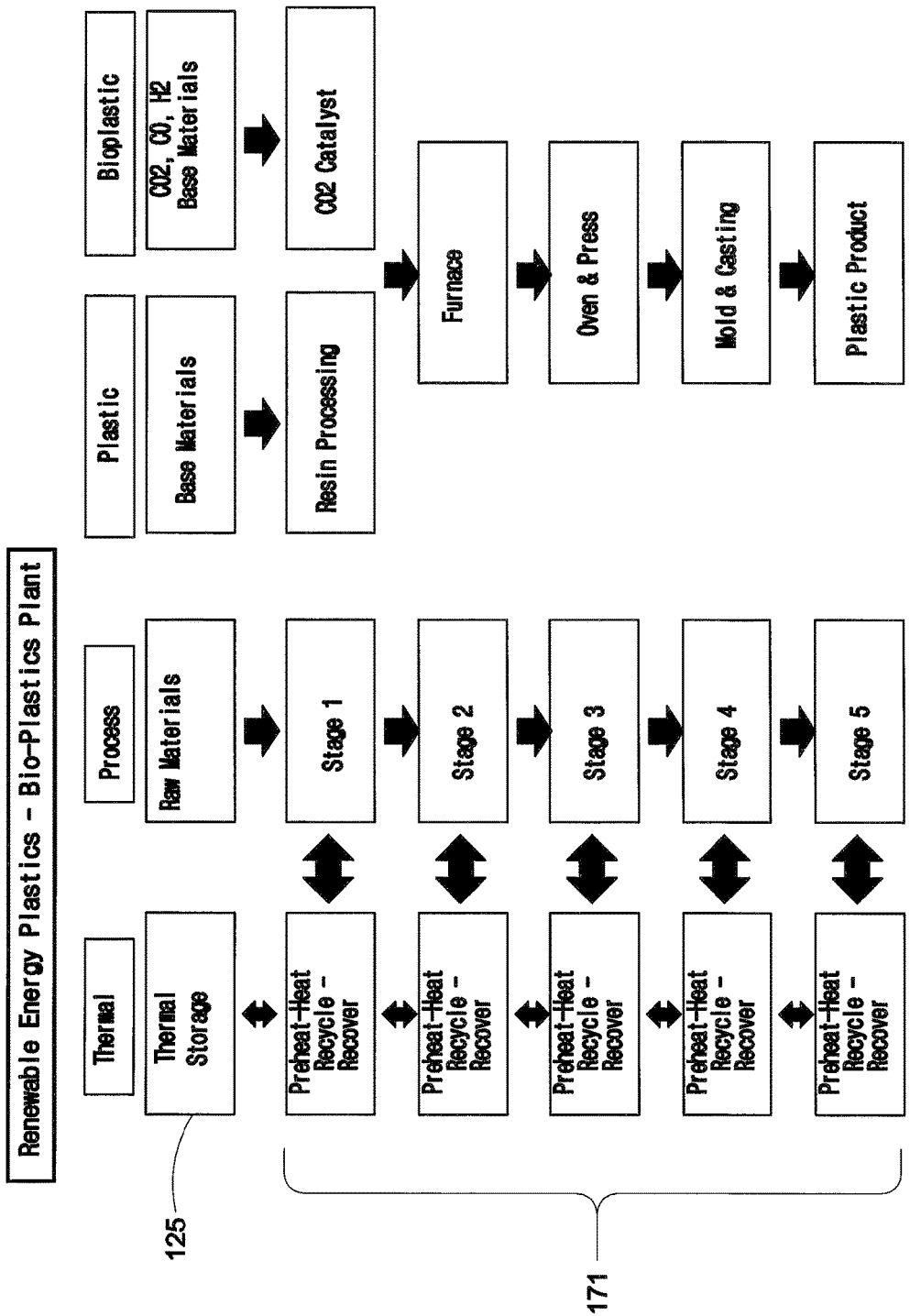
FIG. 22 is a block diagram of a plastic/bio-plastics plant system according to one or more embodiments of the present invention.

As shown in FIG. 22, the preferred method of the present invention processes and applications provides the basis for efficient and sustainable large-scale production of a polypropylene carbonate (PPC) polymer using waste carbon dioxide (CO2) as a key raw material input, powered by renewable energy 112, thermal energy and associated thermal energy storage 125 enabling financially viability while using an environmental friendly method. Conventional production of typical plastics manufacturing such as polyethylene and polypropylene are heavily reliant on use of fossil fuels as the necessary feedstock input.

The preferred method of the present invention has the additional benefit from connection to thermal energy storage for the purpose of preheat or primary thermal energy input which then offers the included ability to communicate recycled and recovered thermal energy for the purpose or thermal energy storage or reuse, this offers the advantage over prior art in it gains the system higher efficiency and reduces energy input requirements with inclusion of renewable energy generation 112 and associated thermal and gas emissions processing and storage.

The preferred method of the present invention has the additional advantage over prior art in its ability to reduce reliance on fossil fuels and non-green energy input sources. The preferred method of the present invention using localized renewable generated hydrogen and oxygen and sequestered gas and element inputs to create PPC polymers through the co-polymerization of $CO_2$ and chemicals called epoxides. The process results in polymers containing more than 30 percent $CO_2$ by weight. The $CO_2$-containing polymers can be hand tailored for applications and processes with a broad range of end product material characteristics that may range from solid plastics to soft, flexible foams, depending on the size and weight of the particular polymer chain.

Prior art of plastics manufacturing applications and processes typically was never fully or partially automated due to its inherent design and deployment flaws. The preferred method of the present invention uses metrics, biometrics and thermal imaging technologies of analysis, monitoring and control of the plastics manufacturing process using amalgamated with artificial intelligence and automation including robotics to reduce or eliminate injuries and enhanced uptime, productivity and enhanced volume.

Figure 23:
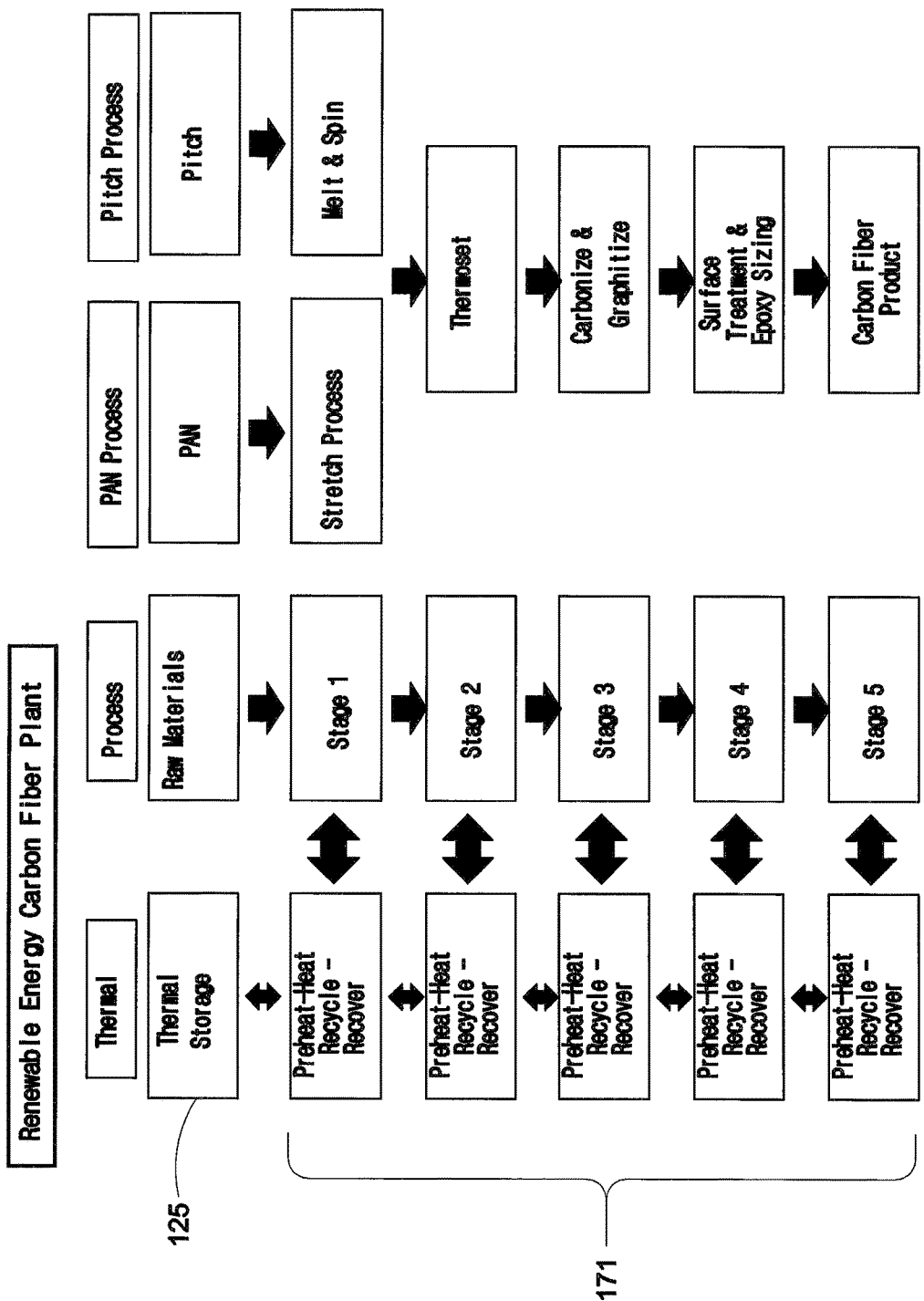
FIG. 23 is a block diagram of a carbon fiber plant system according to one or more embodiments of the present invention.

As shown in FIG. 23, the preferred method of the present invention uses renewable generated thermal energy and/or drawn from thermal storage for the purpose of pre-heating and heating for production of carbon fiber and its associated components for enhanced energy efficiencies. The preferred method of the present invention recycles thermal waste energy recovery from using heat exchanger and located coils near or around the carbon fiber furnace. The present invention then uses this recycled thermal energy for the purpose of supplying communication to thermal storage or reuse of the thermal energy for Stirling engine input to generate rotational energy which is then used for pressure swing absorption or air separation unit 123 for gas extraction which is injected into the furnace to enhance furnace efficiency.

The preferred method of the present invention sets forth its primary advantage and novel method over prior art provides for normalized thermal energy balance that is essential for realized and optimized system wide use and reuse efficiencies concurrently monetizing all energy inputs for all intended applications and processes.

Prior art of carbon fiber applications and processes typically was never fully or partially automated due to its inherent design and deployment flaws. The preferred method of the present invention uses metrics, biometrics and thermal imaging technologies of analysis, monitoring and control of the carbon fiber making process using amalgamated with artificial intelligence and automation including robotics to reduce or eliminate injuries and enhanced uptime, productivity and enhanced volume.

The preferred method of the present invention advances and improves upon prior art by creating a sustainable and renewable processes to establish a stable, cryogenic distillation of gases, separation and refinement of isolated solids, separation and refinement of bio-oil fractions through temperature separation processes of various byproducts. Each byproduct has very specific and highly unique fractionation properties that promote highly separated outputs that make them individually superior and pure products compared to prior arts contaminated outputs and conventional acidic bio-oil. The invention enables liquids and low-molecular weight compounds to be separated into a final value-added fraction suitable for upgrading or extracting into value-added chemicals, fuels and water. Initial bio-oil fractions from the process are chemically distinct, have low-water content and acidity which reduces processing costs normally associated with conventional bio-oil post-production integrating fewer separation processes, reduction of harsh processing and operational conditions and recycling waste energy from the preferred method of using stored thermal energy promoting lower auxiliary input requirements. Carbon stabilization processes to enable Biochar 280 so that it can be handled safely. The integrated fast pyrolysis process 264 includes biomass storage, preparation, pretreatment, and conversion, product recovery and processing to create and store stable isolated gases, biochar and other solids, liquids, fuels and bio-oil fractions.

The preferred method of the present invention provides for a method of fractionating gases through cryogenic distillation and bio-oil vapors comprising water, fuels and bio-oil. The first stage separates the gases and bio-oil vapors are separated in a first stage which comprises a condenser. Separated bio-oil vapors are then fed into a condenser and then cooled having passages for the bio-oil separated by a heat conducting wall from passages for the preferred methods of stored cold to supply the required coolant.

The coolant in the condenser of the first stage is maintained at a substantially constant temperature, to condense a first liquid fraction of liquefied bio-oil elements in the condenser of the first stage. The first liquid fraction of liquefied bio-oil elements from the condenser in the first stage is isolated, filtered, collected and transferred to storage. The method of the present invention allows additional processes for subsequently recovering further liquid fractions of liquefied bio-oil products.

The yield of bio-oil is optimized when the pyrolysis temperature is around 500° C. and the heating rate is high (i.e. 1000° C./s) i.e. fast pyrolysis conditions. Under these conditions bio-oil yields of 60-70 wt % of can be achieved from a typical biomass feedstock, with 10-25 wt % yields of bio-char. The remaining 10-15 wt % is syngas. Processes that use slower heating rates are called slow pyrolysis and bio-char is usually the major product of such processes. The pyrolysis process 264 can be self-sustained, as combustion of the syngas and a portion of bio-oil or bio-char can provide all the necessary energy to drive the reaction.

Figure 24:
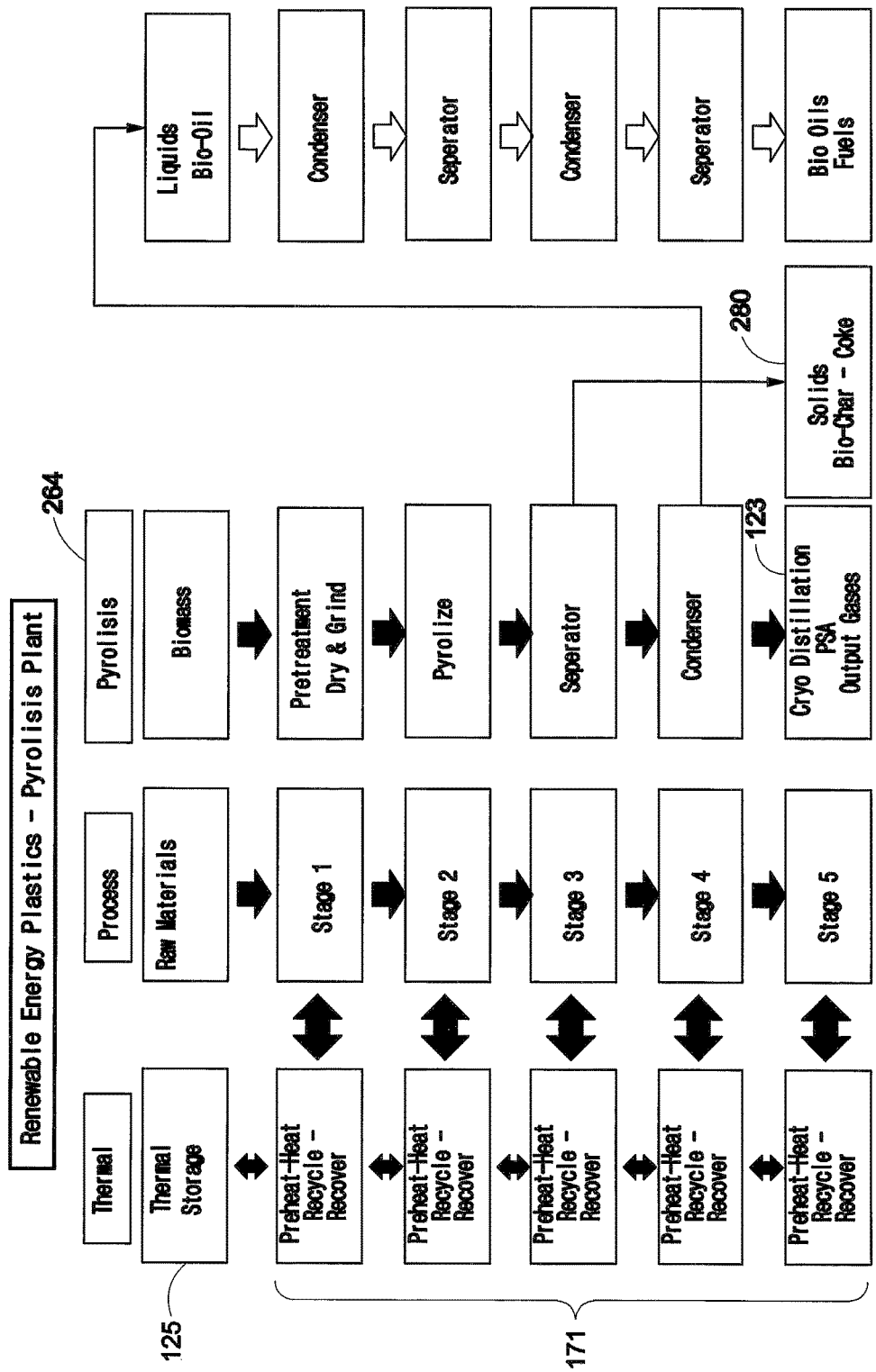
FIG. 24 is a block diagram of a pyrolysis plant system according to one or more embodiments of the present invention.
Figure 25:
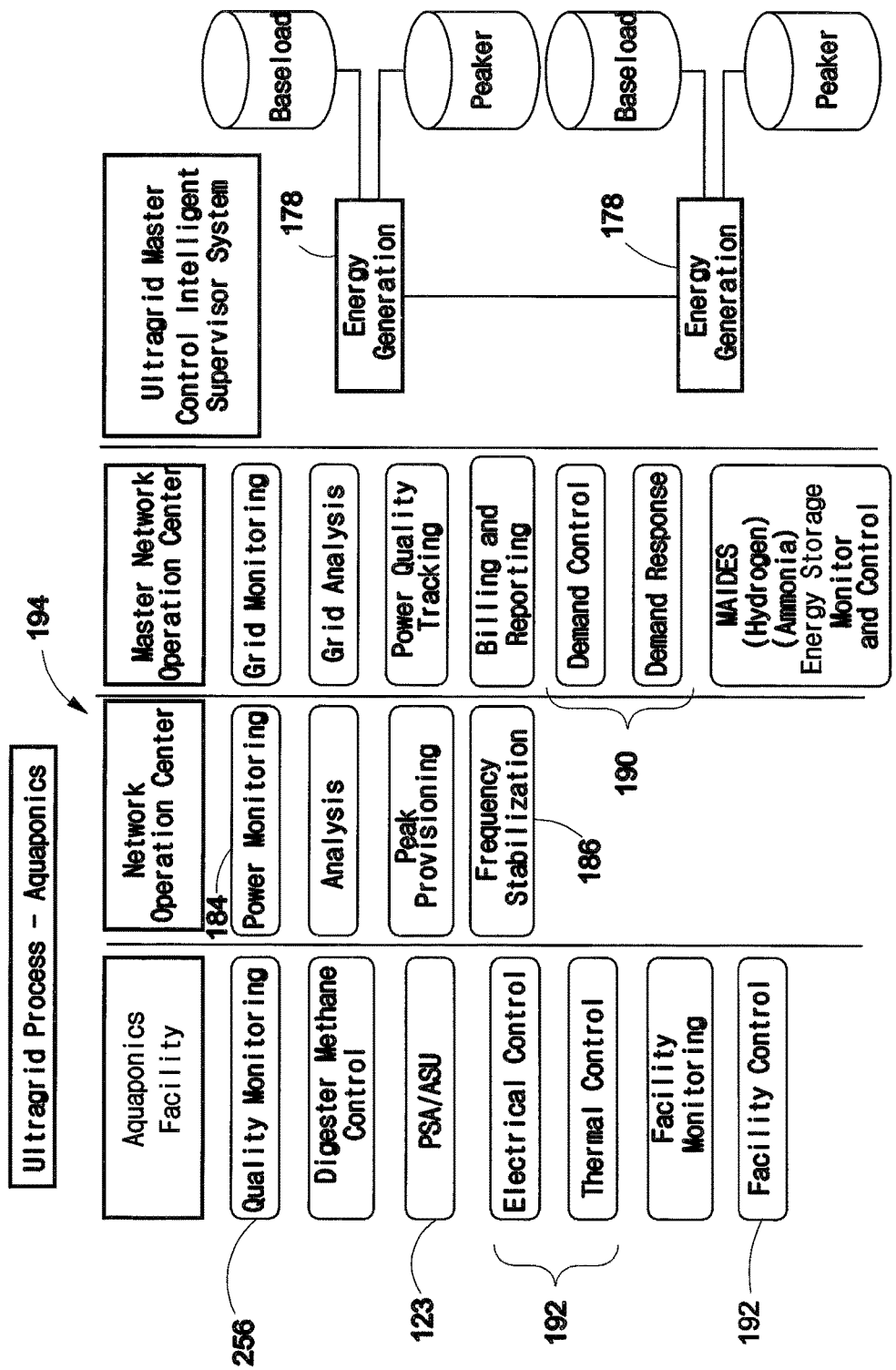
FIG. 25 is a block diagram illustrating the layers of the ULTRAGRID™—Aquaponics Process in accordance with one or more embodiments of the present invention.
Figure 26:
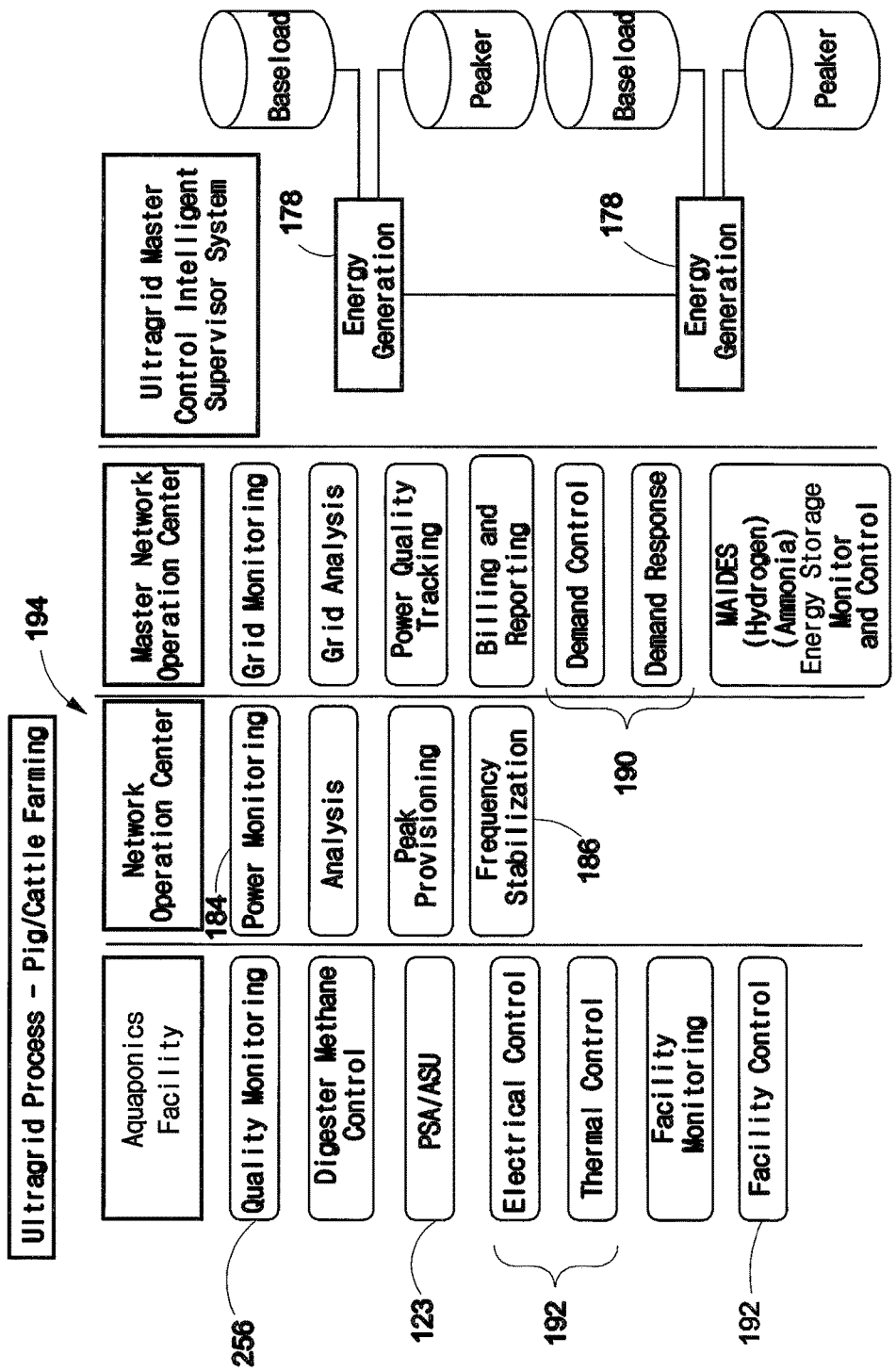
FIG. 26 is a block diagram illustrating the layers of the ULTRAGRID™—Pig/Cattle Farming Process in accordance with one or more embodiments of the present invention.
Figure 27:
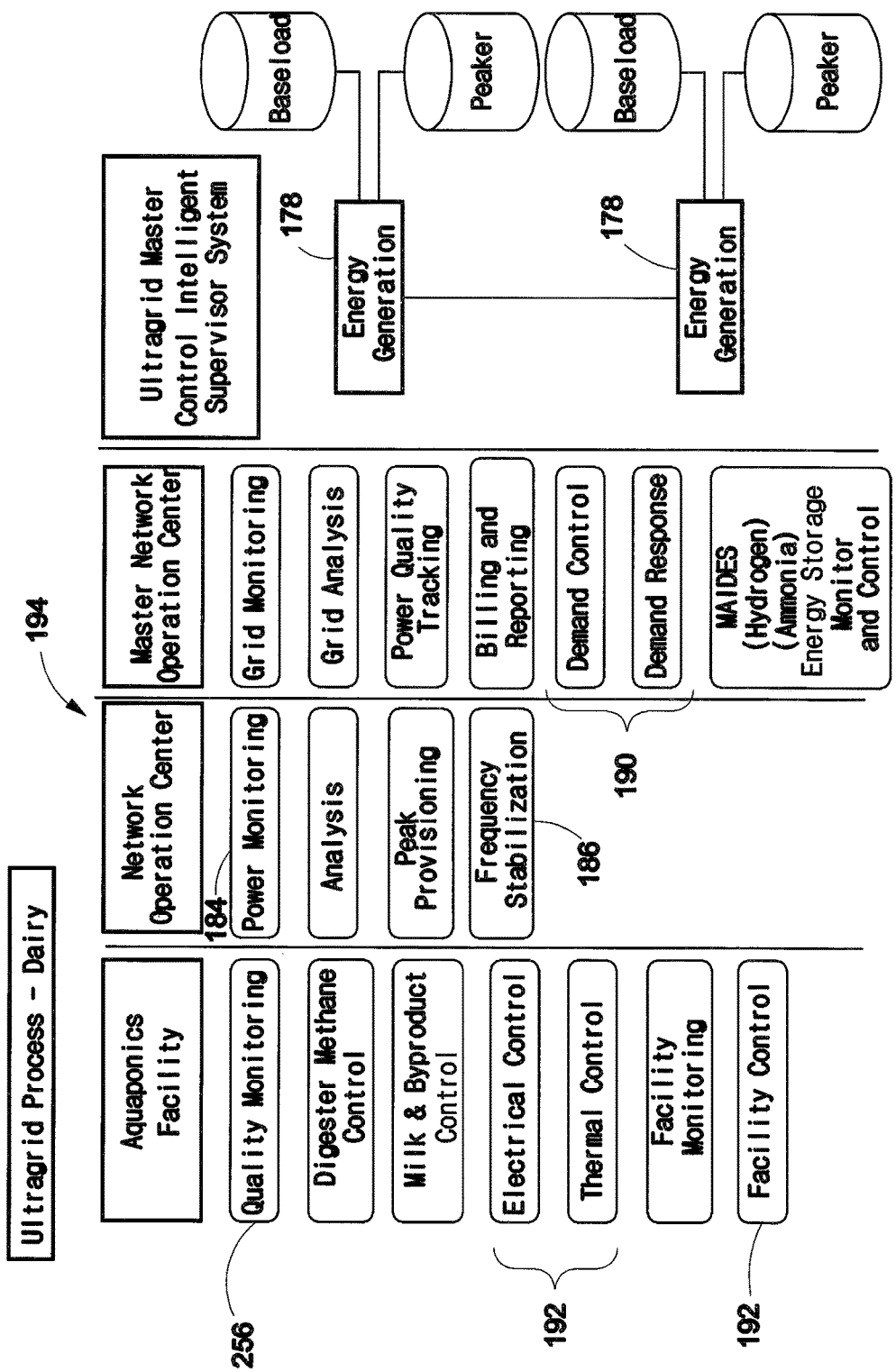
FIG. 27 is a block diagram illustrating the layers of the ULTRAGRID™—Dairy Process in accordance with one or more embodiments of the present invention.
Figure 28:
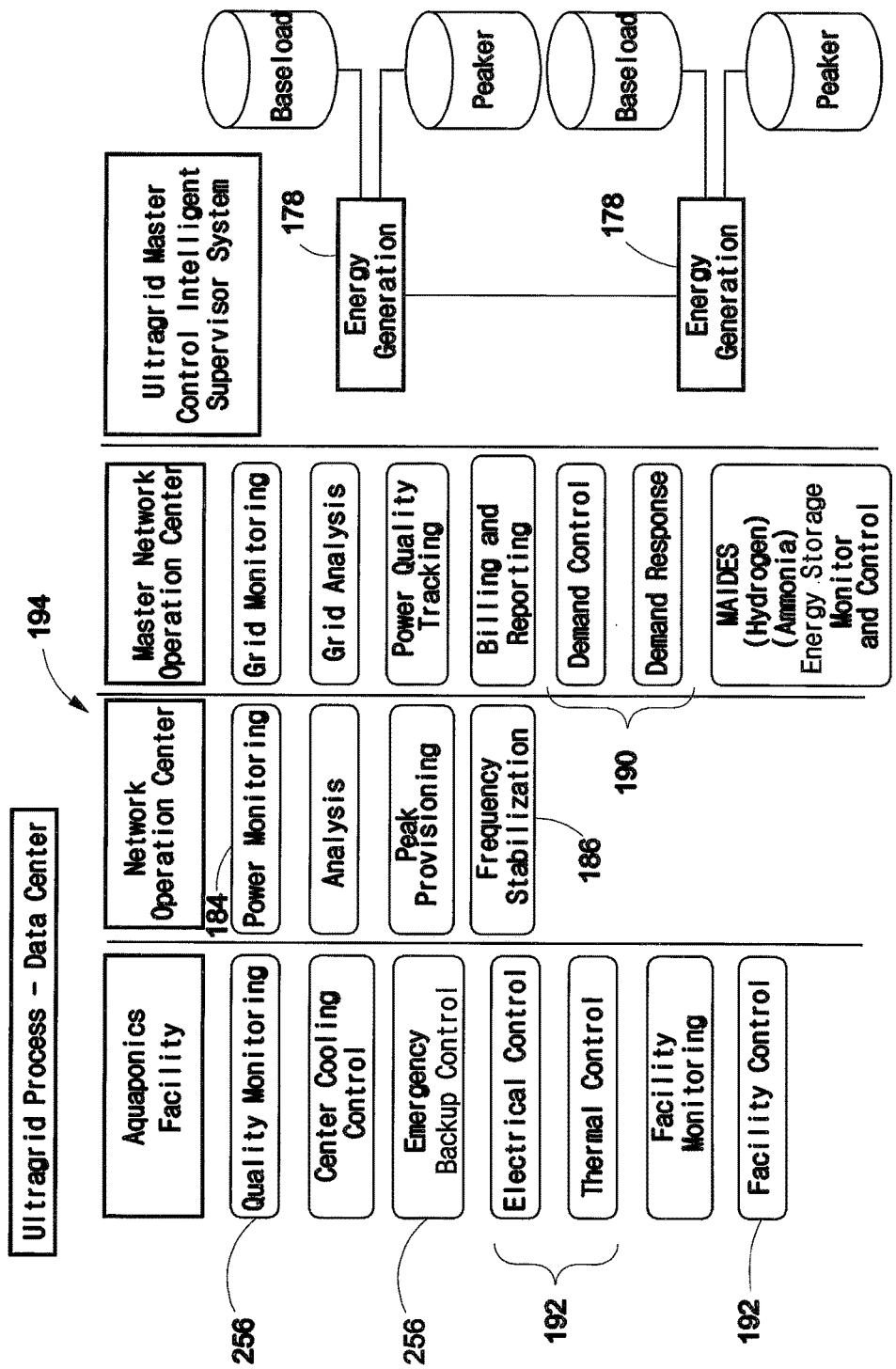
FIG. 28 is a block diagram illustrating the layers of the ULTRAGRID™—Data Center Process in accordance with one or more embodiments of the present invention.
Figure 29:
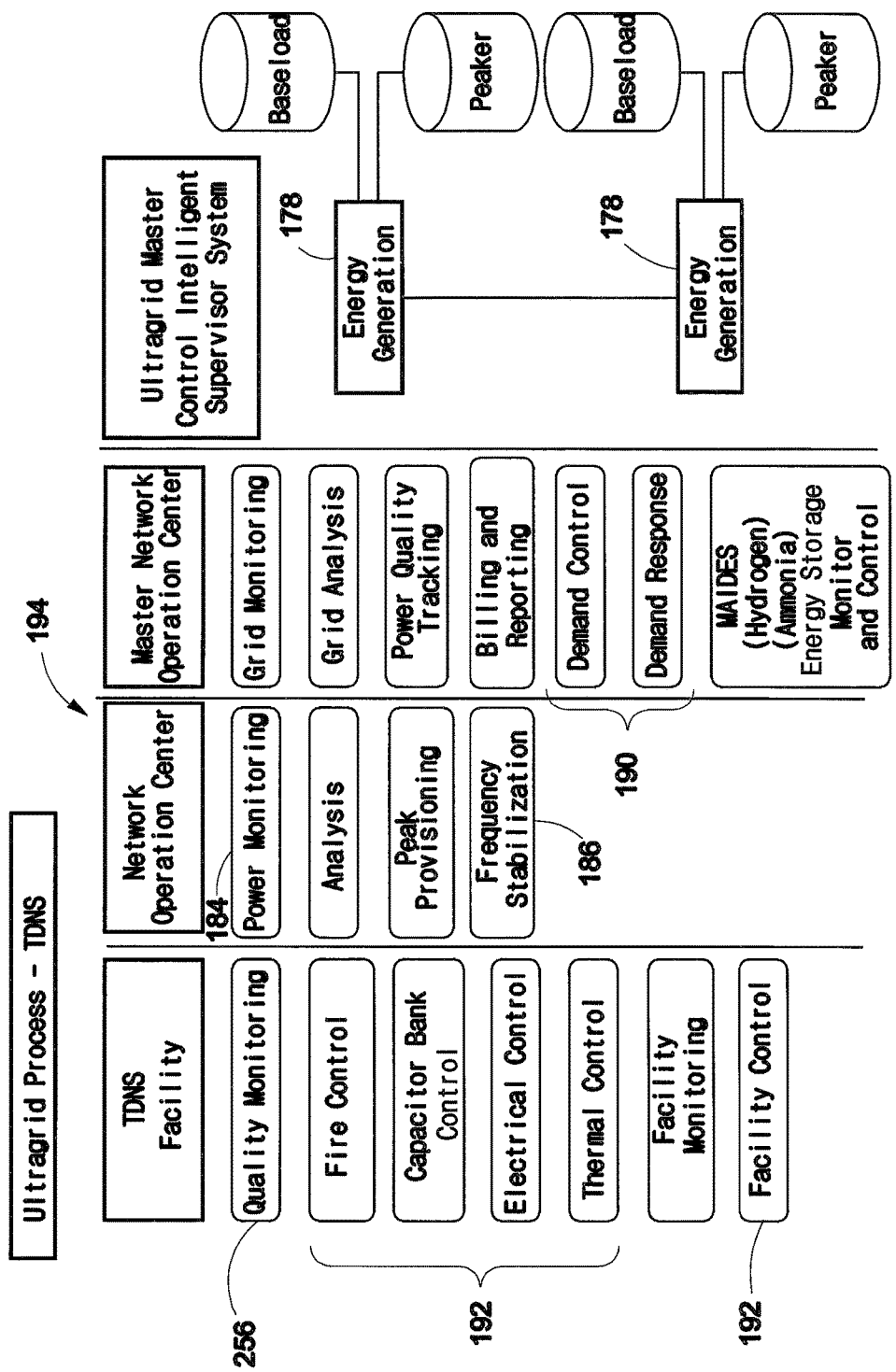
FIG. 29 is a block diagram illustrating the layers of the ULTRAGRID™—TDNS Process in accordance with one or more embodiments of the present invention.
Figure 30:
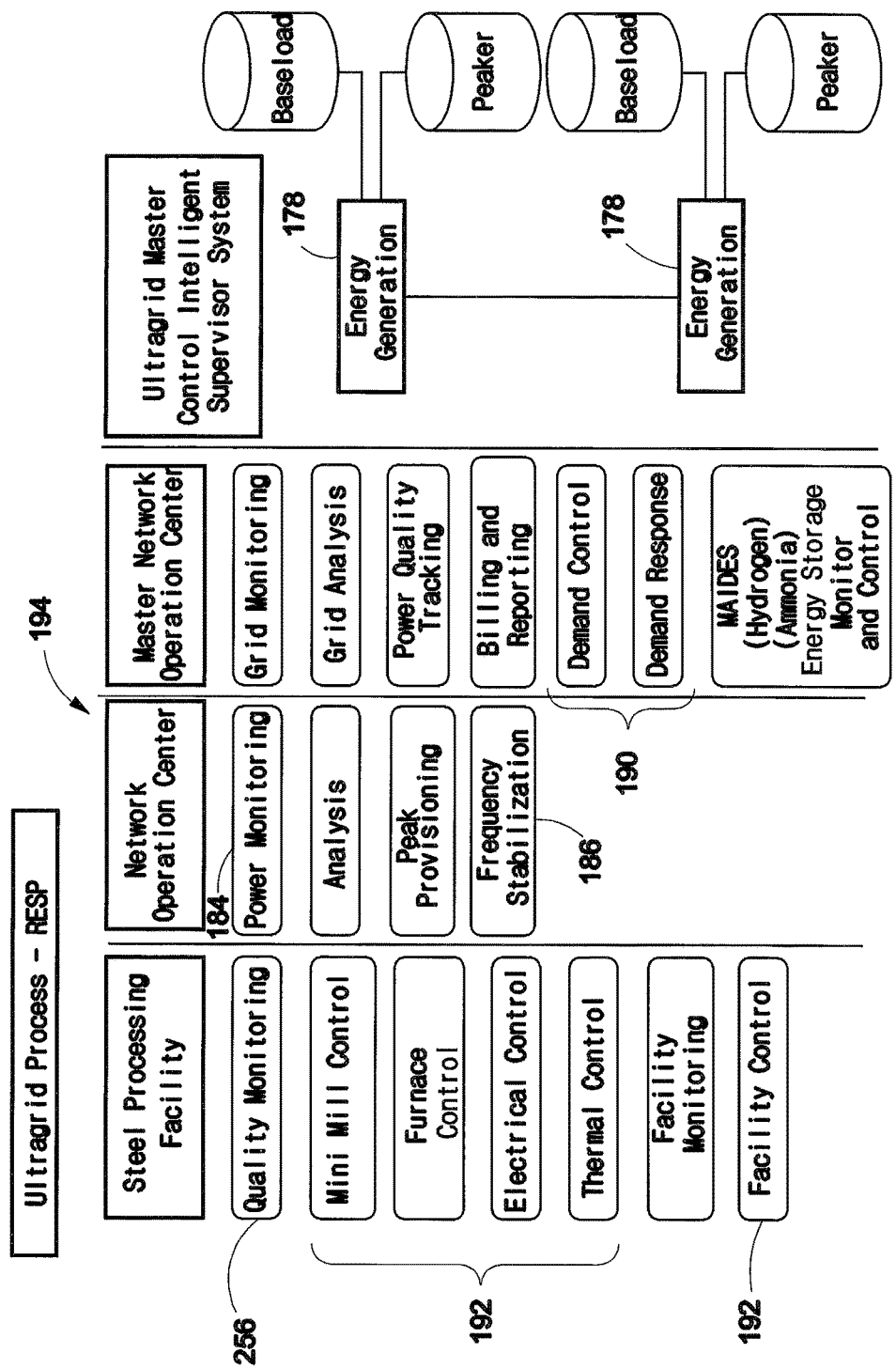
FIG. 30 is a block diagram illustrating the layers of the ULTRAGRID™—RESP Process in accordance with one or more embodiments of the present invention.
Figure 31:
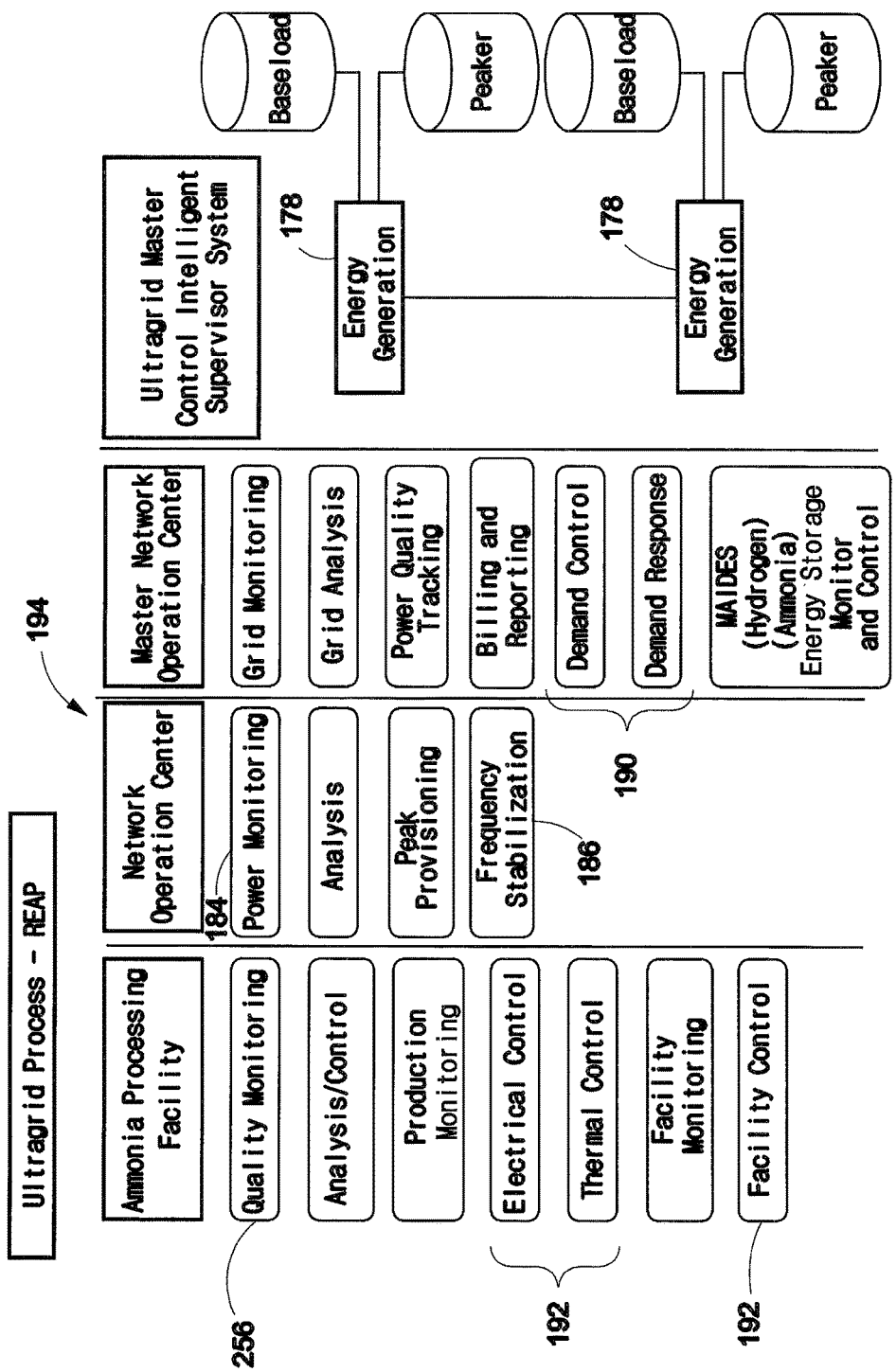
FIG. 31 is a block diagram illustrating the layers of the ULTRAGRID™—REAP Ammonia Process in accordance with one or more embodiments of the present invention.
Figure 32:
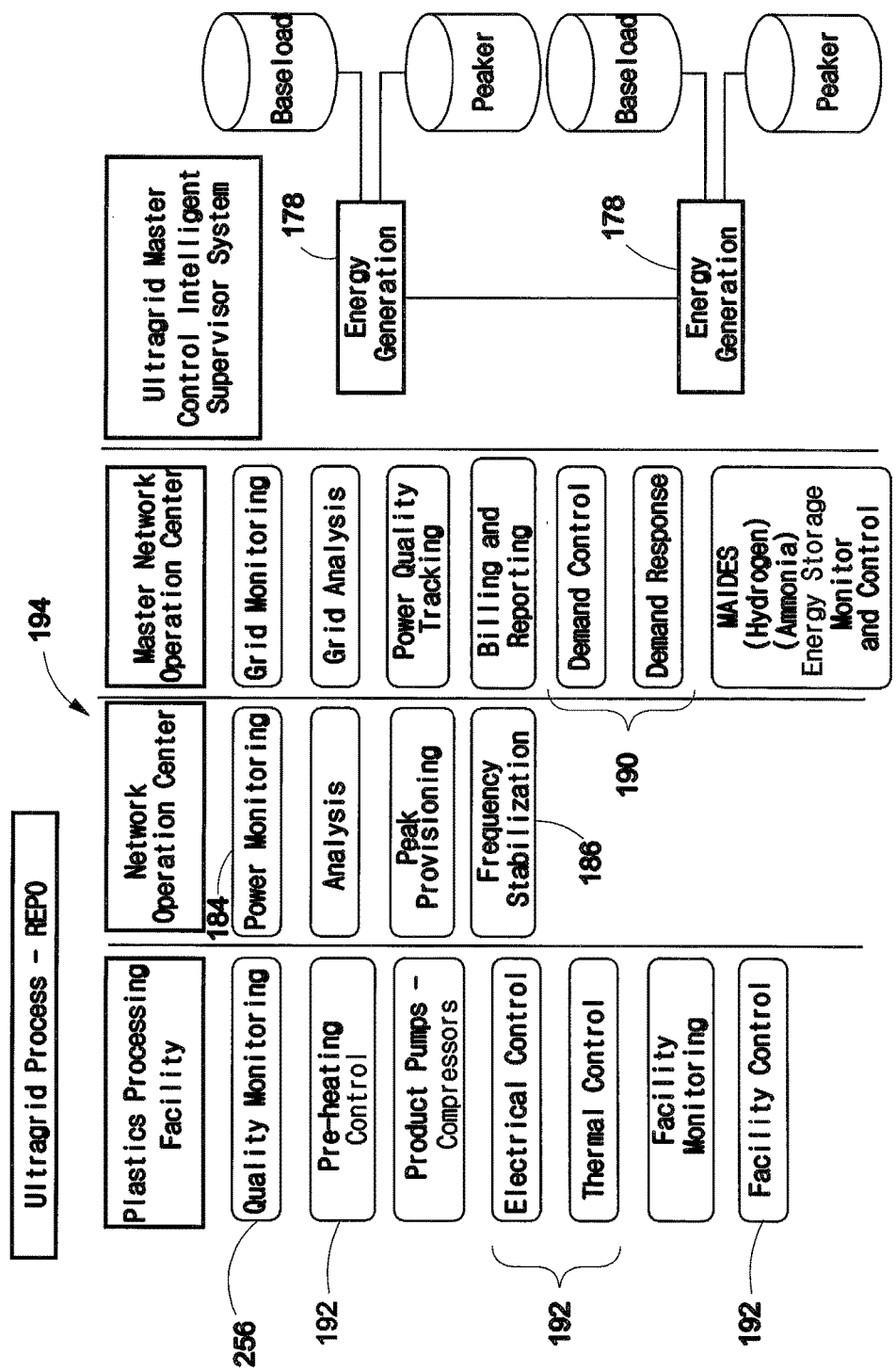
FIG. 32 is a block diagram illustrating the layers of the ULTRAGRID™—REPO Process in accordance with one or more embodiments of the present invention.

Pyrolysis transforms potentially hazardous and non-hazardous organic materials into gaseous components, small quantities of liquid, and a solid residue which has high value when included such as the preferred method of the present invention as a base product (coke—such as needed as input for steel making process and for the carbon needed for aluminum production process) containing fixed carbon and ash. As depicted in FIG. 24, the preferred method of the present invention use of renewable thermal energy for the purpose of thermal input providing for a renewable energy input for biomass processed by pyrolysis 264 for the production of bio-oil, coke and other feedstock streams.

Therefore, we envision a distributed processing model where many small scale pyrolyzers (i.e. farm scale) covert biomass to bio-oil which is then transported to a centralized location for refining. The preferred embodiment will employ a distributed "farm scale" systems feeding into a central gasification (for Fisher Tropsh liquids production) plant whereas the transportation cost savings are able to offset the higher operational and biomass costs.

The preferred method of the present invention communicates cold and heat thermal energy from thermal energy storage for the purpose of cooling or heating the gases for processing and distillation to separate the gases into their individual storage tanks.

Furthermore, the excess bio-char produced but not sold could be used on the farm as an excellent soil amender that can sequester carbon. Bio-char is highly absorbent and therefore increases the soil's ability to retain water, nutrients and agricultural chemicals, preventing water contamination and soil erosion. Soil application of bio-char 280 may enhance both soil quality and be an effective means of sequestering large amounts of carbon, thereby helping to mitigate global climate change through carbon sequestration. Use of bio-char 280 as a soil amendment will offset many of the problems associated with removing crop residues from the land.

Additionally, the emission gases may be treated in a secondary combustion chamber, flared, and partially condensed. The preferred method of the present invention would capture thermal energy from said combustion or flaring for the purpose of storage of said thermal energy. Particulate removal equipment such as fabric filters or wet scrubbers are also required.

Prior art of pyrolysis applications and processes typically was never fully or partially automated due to its inherent design and deployment flaws. The preferred method of the present invention uses metrics, biometrics and thermal imaging technologies of analysis, monitoring and control of the pyrolysis 264 process using amalgamated with artificial intelligence and automation including robotics to reduce or eliminate injuries and enhanced uptime, productivity and enhanced volume.

Terran Autonomous Response Defense ULTRAGRID™ System (TARDUS) is a directed-energy weapon system (DEWS) with an integrated energy generation, energy storage and energy analysis, monitor and control system. DEWS is a weapon system that emits an energy discharge or objects motion from an energy discharge aimed at a specified target in a predetermined or projected direction or flight path of an intended target. It sole mission is to transfer energy for use at a specific target for a desired effect.

An advantage over prior art is the preferred method of the present invention's integration and interconnection through ULTRAGRID™ 194 for the express purpose of providing energy and cooling with included analysis, monitoring and control of energy flow from localized and remote sources. Additionally, DEWS allows the energy level needed for operation of a railgun, which consists primarily of an electrically powered electromagnetic projectile launcher based on similar principles to the homopolar motor. Typically, a railgun comprises a pair of parallel conducting rails, along which a sliding armature is accelerated by the electromagnetic effects of a current that flows down one rail, into the armature and then back along the other rail. The preferred method of the present invention incorporates magnetic levitation (maglev) rails to promote enhanced firing while reducing need for often needed and costly rail replacement due to wear. The preferred method incorporating maglev rails will increase the speed of the projectile while reducing power requirements using a maglev launcher within a railgun launcher design.

These energy transfer flows would include communications such as to capacitor banks for energy input charging and recharging that once completed would allow firing circuits to discharge available stored capacitor charges from the locally connected directed energy weapon system, additionally the system would coordinate additional energy flows, charging and recharging of local and remote capacitor banks and DEWS firing station platforms. An advantage over prior art is the preferred method of the present invention that integration of ULTRAGRID™ 194 connected and operated sites for the express purpose of providing thermal energy for input such as heat and cold thermal energy into a Stirling engine 116 for electrical generation or for instance communicating cold thermal energy for cooling DEWS firing station platforms.

Additional uses aside from its primary intention for use as a potential asteroid defense network system or as potential projectile, aircraft and missile defense system. The directed-energy weapon discharge can come in various forms, for example electromagnetic radiation, including sounds, radio frequency, microwave, lasers and masers, particles with mass, in particle-beam weapons which technically is a form of micro-projectile weapon.

DEWs can be used discreetly without anyone knowing as radiation used in ranges such as RF (Radio Frequency=3 kHz to 300 GHz) is invisible and can pass through walls. Laser weapons could have several main advantages over conventional weaponry, Laser travel at the speed of light, other directed-energy weapons beams also travel at extreme high speeds, so there is no need generally except with atmospheric disruption and associated losses over extremely long distances to compensate for target movement. Consequently, evading an accurately aimed laser and/or directed-energy weapon after it has been fired is essentially impossible due to the speed of the discharge at the target and no early warning would be available to enable corrective evasive actions. Because of their extremely high speed, light and other directed-energy weapons is only slightly affected by gravity, so that long-range projection at targets requires little or no movement compensation. Other aspects such as wind speed can be neglected at most times, unless shooting through an absorptive matter. Directed-energy weapons can change focusing configuration to provide an active area that can be much smaller or larger than projectile weaponry.

The preferred method of the present invention of given the ability to communicate available energy from an energy storage system 110 and its energy generation and energy transfer that given generation sufficient energy and cooling, lasers and other directed-energy weapons could essentially have limitless ammunition and targeting capability. The operational range of a directed-energy weapon can be much larger than that of a ballistic weapon, depending on atmospheric conditions and power level. Directed-energy weapon discharges and/or beams do not generate sound or light that would be detected by human senses or easily detected by other means before or during when emitted, so the weapon would not announce the systems position when fired and additionally could strike satellite and other tracking system targets if targeted. Modern ballistic weapons commonly feature systems to counter many of the undesirable side-effects mentioned above. However, with the preferred method of the current invention ability to provide megawatts and potentially gigawatts of available energy, this would allow use of megawatt or greater class of weapons such as the above ballistics would have little or no effective defenses from such a massive energy discharge which would simply overwhelm any and all known object defenses.

The preferred method of the present invention sets forth its primary advantage and novel method over prior art above applications and processes with physically connected pre-heaters 213 and heating system elements 171, heat exchangers and regenerators 214 in its reclamation and recycling of waste thermal energy for use, reuse, storage and/or conversion and storage. This energy is used by thermal intensive applications such as with Stirling cycle engines which use a portion of the thermal energy for the generation of rotational energy, for use in such applications such as rotation work needed for input into a generator, pump or compressor. Waste heat recycled from this process may be used in a second level of reuse of available waste energy as thermal energy input into secondary lower heat threshold thermal intensive applications such as Stirling engine cycle 116 with a reduced temperature differential which would then use a portion of the thermal energy input for the generation of rotational energy for us in such applications such as rotation work needed for input into a generator, pump or compressor.

The present invention has additional advantage over prior art from additional applications and process cycles from remaining thermal energy and from storage to further encourage use and recycling of available energy for additional application and processes energy usage that may be added based on available input temperatures and return on investment cost versus an acceptable benefits-to-costs ratio. All remaining recyclable thermal energy may then be reclaimed and then communicated to appropriate temperature thermal storage systems 125. Additionally, thermal energy may be communicated to absorption cooling 121 to convert heat based thermal energy into cold based thermal energy to maintain a localized energy balance of available stored thermal energy. The preferred method of the present invention sets forth its primary advantage and novel method over prior art provides for normalized thermal energy balance that is essential for realized and optimized system wide use and reuse efficiencies concurrently monetizing all energy inputs for all intended applications and processes.

Prior art of directed-energy applications and processes typically were never fully or partially automated due to its inherent design and deployment flaws. The preferred method of the present invention uses metrics, biometrics and thermal imaging technologies of analysis, monitoring and control of the directed-energy process using amalgamated with artificial intelligence and automation including robotics to reduce or eliminate injuries and enhanced uptime, productivity and enhanced volume production.

Prior Art generally used energy input in the form of grid energy supplied or mostly provided by grid with its inherent cost and price escalation. Embodiments of the invention will employ renewable energy 112 as the primary electrical and thermal energy input for the purpose of electrical energy generation, thermal applications and energy storage 110.

Embodiments of the invention will introduce and extend artificial intelligence interfaced component layers, layers will include but not limited to building, robotics, applications and device's automation system, utilizing hardware and software-based monitoring, analysis and control system for enhanced performance, efficiencies, power quality analysis, energy cost tracking, energy demand control, energy efficiency automation. Additional layers include inventory monitoring, accounting, analysis, reporting and control.

The central energy embodiment encompasses an intelligent interface interconnecting monitor, analysis and control elements to improve reliability, manage process flows, enabling increased commercial yields, cost reduction and reduced loss of production and service availability. Maximizing infrastructure utilization to achieve lowest possible levelized cost of energy is achieved by monetizing capital intensive fixed assets while reducing overlap and needless redundant processes.

As depicted in FIGS. 25, 26, 27, and 28, this monitoring and analysis can be through sensors for local and remote purposes and may include video and thermal based sensors input for uses such as adaptive metrics, biometrics and thermal imaging for monitoring, analysis and control. This may be combined into a species by species metric, biometric and thermal imaging sensors, monitoring, analysis and control regime and may include other environmental input and control as well as involvement into the full grow cycles including germination, planting and/or placement, grow out and harvest. A similar process would be used in aquaponics with inclusion in cycles such as hatchery, fingerlings, grow out and harvesting.

Produces substantially reduced investment capital requirements, encapsulated by capturing enhanced value on capital expenditures with greatly increased return on investments. Embodiments when paired with its energy storage 110 and waste heat recovery system using reclaimed energy, system is able to actualize and realize the maximum benefits and utilization of all available system resources.

The current power grid is designed and developed unable to allow generation sources to respond to on-demand to consumer needs, while an ULTRAGRID™ 194 based smart grid 192, as depicted in FIGS. 29, 30, 31, and 32, can be designed so that usage varies on-demand with production availability from intermittent power sources such as wind 104 and solar and stabilized by matched stored energy release for commercial grid generation for both electrical and/or thermal intensive systems. End-user loads can be proactively projected and timed for a concerted startup during peak usage periods, or the cost of energy can dynamically vary between peak and nonpeak periods to encourage turning off non-essential high energy loads or control application startup to not occur simultaneously.

Single cycle and multiple cycle generation systems using steam or Stirling as the primary thermal energy cycle and for additional benefit use of recycled thermal waste energy for additional thermal intensive applications such as additional Stirling engine stages may be used for additional benefit and enhanced efficiency.

Electricity generated by the onsite power generation unit is used to operate all electrical devices needed to ensure proper operation of the production and cold storage system. Electricity is transferred using common electrical conduits and means of conduction electrical energy. Any excess electrical energy produced by the onsite power generation unit can be sold to the local utilities through a direct utility connection and monitors.

Therefore, borne out of necessity is the creation of a mechanism for mitigating variability and/or intermittency associated with the stable quality power production of energy consisting primarily of energy from wind 104, photovoltaic solar 107, thermal solar 106 and other renewable energy sources 112, additionally the absence of adequate solar energy generation for thermal solar energy 106 with the purpose of thermal energy availability.

The present invention with its elements for the features and functionality as system to be known as Modular Advanced Intelligent Commercial Energy System (MAICES) forms a foundation and basis for distributed electrical, chemical and thermal energy, localized storage reserves preserving electrical, chemical, thermal energy and supply security. The present invention provides storage reserves of electrical, chemical, thermal energy availability during natural and manmade catastrophic accidents to energy and fuel supplies.

Prior art consisted of Gas Turbines, Microturbines, Reciprocating Engines, Nuclear, Radioisotope, Geothermal, Solar Thermal, Steam Turbines, Geo-thermal, Boilers, Fuel Cells, Thermal Solar Systems and other thermal input sources operating in conjunction with combined heating and power (CHP). The preferred method of the present invention encapsulates a control system with a Stirling engine 116 and absorption cooling system 121 and an associated storage system into an amalgamated energy ecosystem, this system can be added to or designed to enhance virtual any prior art thermal energy process, application or source.

This present embodiment of preferred method is referred to as Quintuple Effect Generation or (QED) offers the advantages of integrating separate device and process discoveries with the enhanced benefit of a combined multi-cycle energy system (CMCS) amalgamated with a combined cooling, freezing, heating and power (CCFHP) system with optional rotational energy output. The preferred method of the present invention benefits from the strengths while removing or greatly reducing any deficiency that the isolated systems might have had because of their application and processes in overlap and redundant non-optimized design and configuration.

The preferred method of the present invention advantage over prior art is comprised by the introduction and integration of a multi-cycle system that includes a thermal management system capable of handling high thermal loads with fine temperature control and energy control system utilizing a direct connection of high conductivity pathways. The preferred embodiment provides enhanced waste heat reclamation and energy recycling thereby gaining additional efficiency. The preferred embodiment is comprised of connections such as a thermosiphon for low thermal transfer use, heat pipe for high thermal transfer use, thermal exchanger using thermal transfer mediums such as water and glycol mixture, oil or molten salt, a combination of these systems and components may be used for thermal temperature management of the thermal generational source. This advantage of the present invention is accomplished using thermal waste energy realized by amalgamating a Stirling engine 116 using thermal waste energy from the thermal generational source and cold thermal input from the added extended combined cycle. Further advantage of the present invention is provided by inclusion of an absorption cooling system 121 using recovered thermal waste energy from the Stirling engine 116, greatly enhancing performance and control over all past prior art attempts and implementations.

Figure 33:
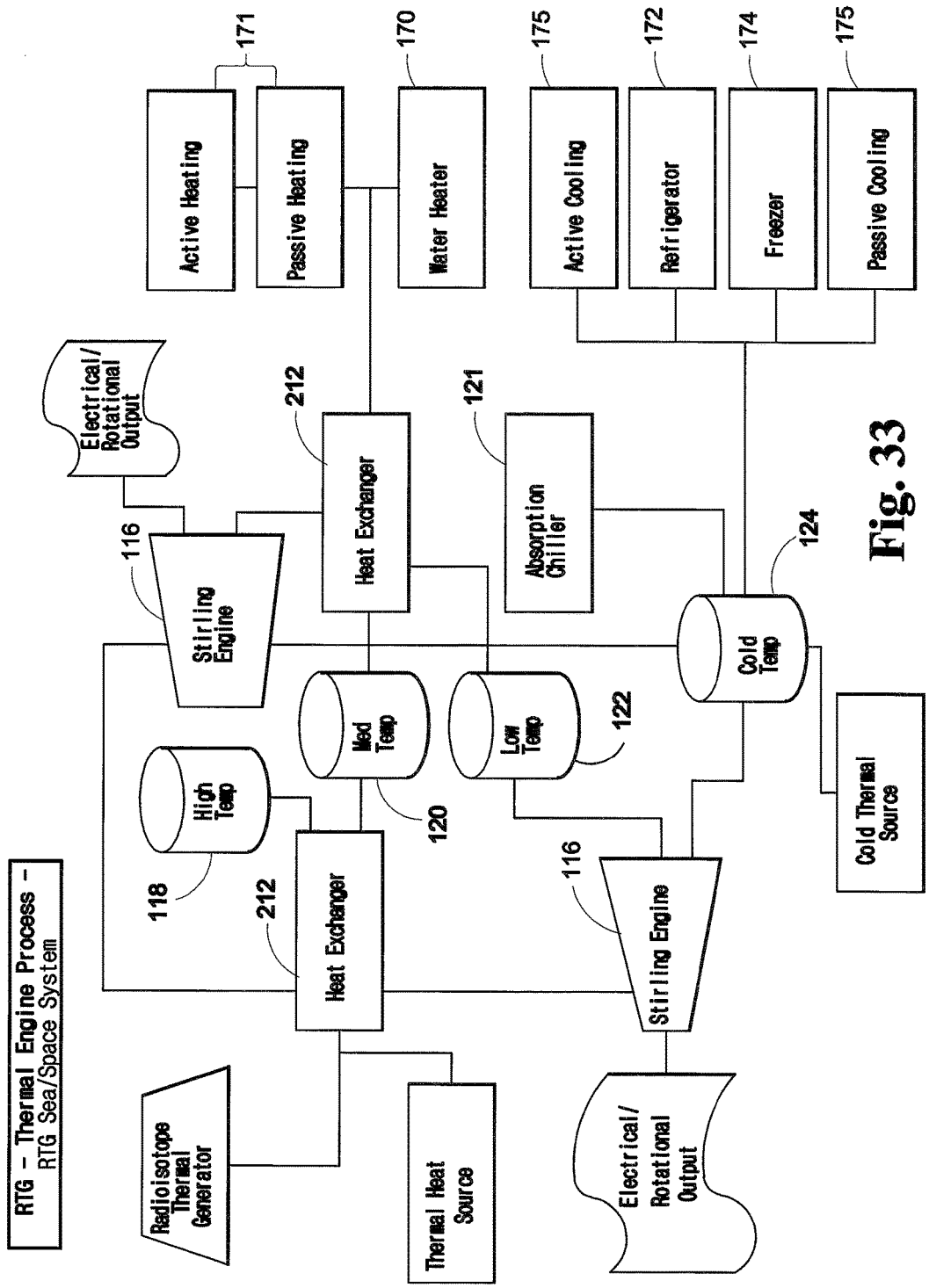
FIG. 33 is a flowchart illustrating the Thermal Engine—Radio Isotope Thermal Generator ("RTG") System Process in accordance with one or more embodiments of the present invention.

The preferred embodiment of the present invention integrating thermal energy input comprised from thermal energy sources such as but not limited to including Natural Gas, Coal, Geothermal 100, Thermal Solar 106, Large and Medium Nuclear Generators, Small Modular Reactors (SMR) and Radioisotope Thermal Generators (RTG) with the preferred method of the present invention with inclusion of a system that can be assumed to be a unified analysis, monitor, control and energy provisioning system, Stirling heat engine 116, absorption cooling 121 and thermal storage 125. As illustrated in FIG. 33, the preferred method of the present invention additional advantage to prior art comprises the application and processes of the preferred embodiment to expand and enhance value added advantages over prior art in that excess thermal energy to thermal energy storage and electrical generational energy may be stored as chemical energy storage as a medium for enhanced system efficiency and ultimately energy utilization and monetization.

The preferred method of the present invention primarily forms the basis of a next-generation high efficiency and high power capable Stirling engine 116 using a radioisotope-fueled powered thermal source called the Stirling Unified Radioisotope Generation Energy System also known as (SURGES).

The preferred method of the present invention can provide power at a multiple of times higher than the conversion efficiency of prior art RTGs and inclusion of absorption cooling 121 allows usage of a wider range of thermal energy maximizing efficiency and monetizing energy usage. Generally, the assumptions for single dimensional analysis would conclude that systems are typically operating at steady state under the conditions observed in highly controlled experiment with rigid standards which may or may not accurately reflect real world applications and processes with the inherent flaws with lack of assumption of losses and energy decay half-life driven production depreciation. These types of generators 114 can be simplified in their single dimensional analysis to that of a typical heat engine to be able to compare their theoretical efficiencies to their corresponding Carnot efficiencies. The system is assumed to be a unified analysis, monitor, control and energy provisioning system. Stirling engine 116 and generational components, to include the heat source, absorption cooling system 121, storage system and thermal exchanger 212.

The preferred method of the present invention introduces a preferred embodiment to be hence known as a Stirling Unified Radioisotope Generation Energy System also known as (SURGES). The preferred embodiment's superior efficiency and higher generational outputs that may be demonstrated by the SURGES system are primarily driven by the embodiment's monetization of the widest temperature band utilization for a given thermal input. The preferred embodiment is encompassed within the encapsulation of a unified analysis, monitor, control and energy provisioning system, Stirling engine 116, absorption cooling 121, thermal storage 125 and enhancing system efficiency from recycling and reclamation processes of thermal waste energy which defines a clear and present advantage to define the preferred method of the present invention over prior art and its implementations.

The preferred method of the present invention in sea-based applications may use thermal exchange devices using movement of sea water for the thermal transfer medium for thermal energy dissipation of excess thermal waste energy. The fuel source can last multiple decades at a known decay rate, so fuel replacement can be scheduled well in advance, leaving all the other components for general maintenance scheduling and part replacement requirements. The preferred method of the present invention encapsulates a unified control system with a Stirling engine 116 and absorption cooling system 121 and an associated storage system into an amalgamated energy ecosystem. The preferred method of the present invention benefits from the strengths while removing or greatly reducing any deficiency that the isolated systems might have had because of their application in a non-optimized design and configuration. The preferred method of the present invention additional advantage to prior art comprises the application and processes of the preferred embodiment to expand and enhance value added advantages over prior art in that excess thermal energy to thermal energy storage and electrical generational energy may be stored as chemical energy storage as a medium for enhanced system efficiency and energy utilization.

The preferred method of the present invention in concert with Electrostatic and/or Electrothermal and/or Electromagnetic propulsion engine such as Plasma and/or ION engines can benefit from the preferred embodiment by reclamation from direct or natural convection thermal exchange, recycling and reuse of thermal waste energy for enhanced efficiency and performance, this is accomplished via thermal waste energy for Stirling engine input and thermal waste energy for absorption cooling input for enhanced Stirling engine operation 116 and provide combined cooling, freezing, heating and power with energy storage for additional advantage for applications and processes incorporated with the preferred embodiment.

The preferred method of the present invention in space-based applications may use direct and convection thermal exchange devices using contact to open outer space for the thermal transfer medium for thermal energy dissipation of excess thermal waste energy. The fuel source can last multiple decades at a known decay rate, so fuel replacement can be scheduled well in advance, leaving all the other components for general maintenance scheduling and part replacement requirements. The preferred method of the present invention encapsulates a unified control system with a Stirling engine 116 and absorption cooling system 121 and an associated storage system into an amalgamated energy ecosystem. The preferred method of the present invention benefits from the strengths while removing or greatly reducing any deficiency that the isolated systems might have had because of their application in a non-optimized design and configuration. The preferred method of the present invention additional advantage to prior art comprises the application and processes of the preferred embodiment to expand and enhance value added advantages over prior art in that excess thermal energy to thermal energy storage and electrical generational energy may be stored as chemical energy storage as a medium for enhanced system efficiency and energy utilization.

Figure 34:
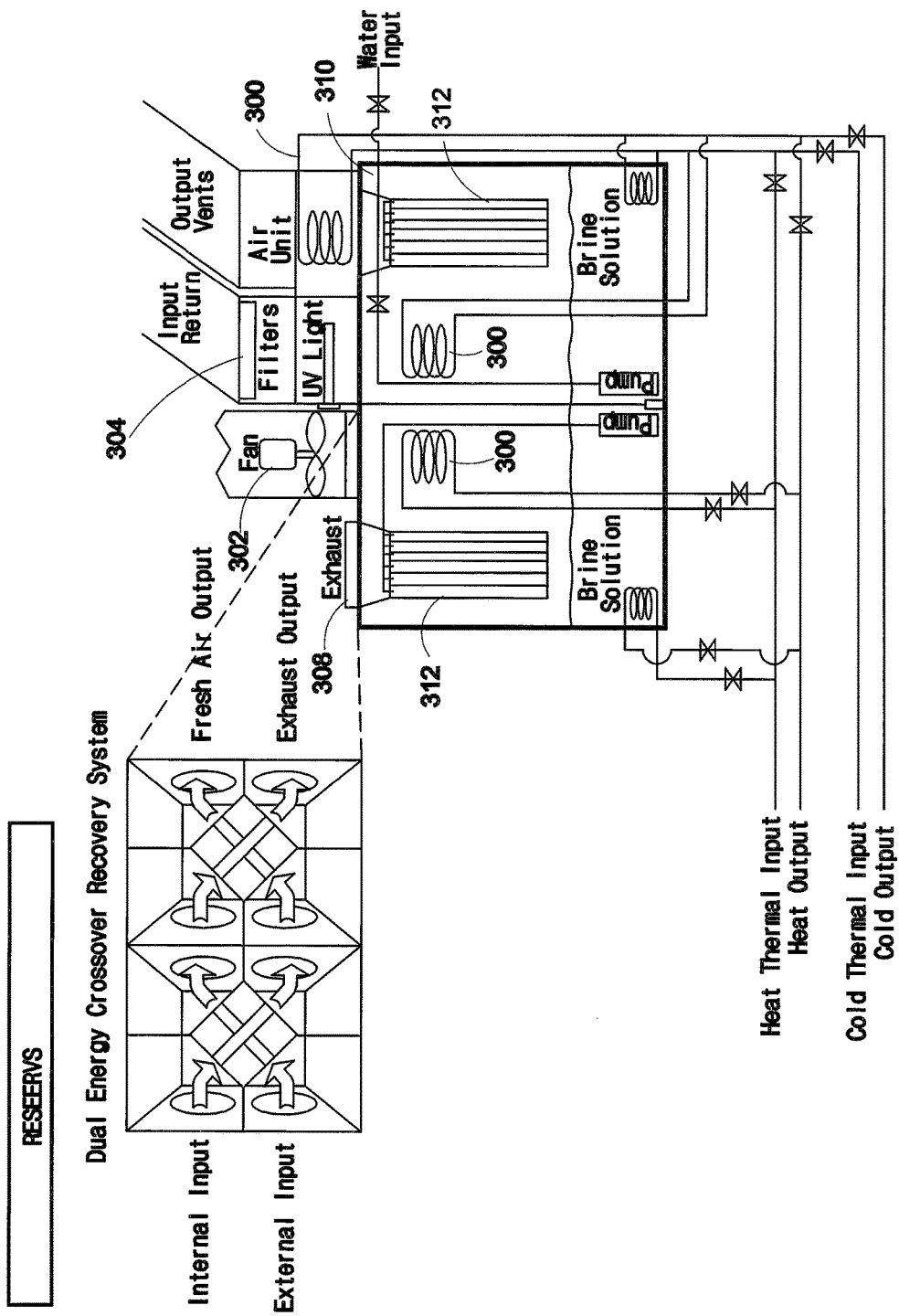
FIG. 34 is a schematic illustrating the RESEERVS Process with a dual energy crossover recovery system and air control system in accordance with one or more embodiments of the present invention.

As illustrated in FIG. 34, the preferred method of the present invention for provisioning energy and environmental control referred to as Renewable Energy Sustained Environment—Energy Recovery Ventilation System also known as (RESEERVS) within the preferred embodiment comprises of a thermal exchanger 212, thermal transfer coil 300, air filter 304, ultraviolet light source 306, dehumidifier system 312, humidifier system 310, dampers and fans 302. The system would include one or more fans 302 to circulate the air flow within the targeted environmental control area and an exhaust fan 308 to expunge the exhaust airflow and allow a controlled and regulated intake of fresh air. Additionally, the preferred embodiment may include an external heat exchanger or condenser that may be used for transfer and removal of excess waste heat and/or humidity to the outside atmosphere.

Figure 35:
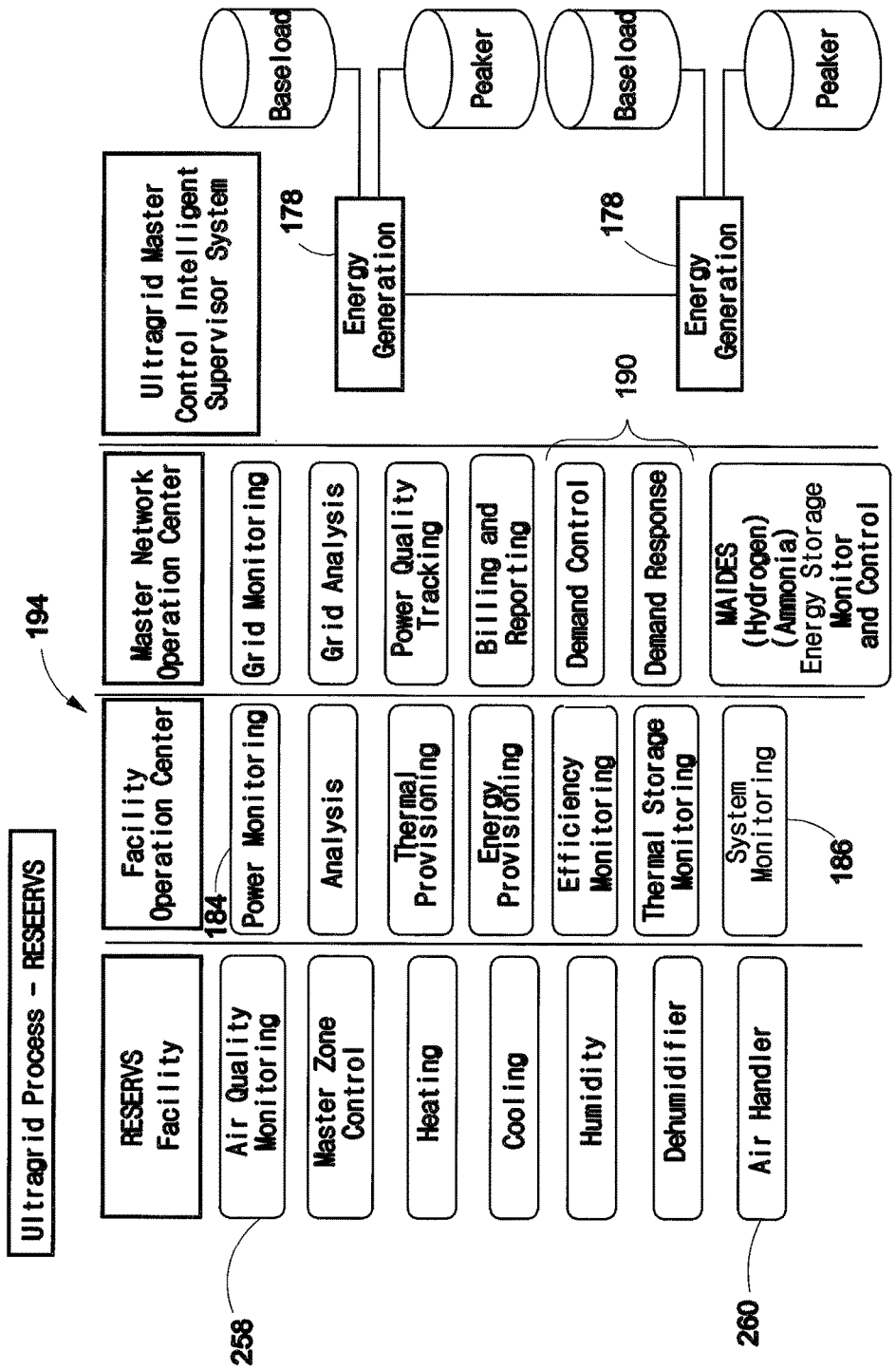
FIG. 35 is a block diagram illustrating the layers of the ULTRAGRID™—RESEERVS Process in accordance with one or more embodiments of the present invention.

As depicted in FIG. 35, the preferred embodiment with supplemental humidification, dehumidification and fresh air exchange and integrated with the central air handling system 260 provides year-around ventilation for air purity and humidity control independent of the cooling and heating system operation promoting an amalgamated environmental ecosystem. The preferred embodiment with inclusion of a humidifier, dehumidifier and fresh air exchange, the system it can directly effectuate the desired environmental factors throughout the entire control area through use of central fan cycling providing the entire control area ventilation and custom setting for independent zones.

With the inclusion and use of one or more dampers, the system can create and maintain zones throughout the desired control area that can be independently via electrical and mechanical controlled. The preferred method of the present invention is used to connect with a central environmental HVAC zone controller 258 and a multi-zone programmable thermostat-humidistat-air quality module. Alternatively, the preferred method of the present invention is used to connect with a central environmental HVAC zone controller 258 and localized zone programmable thermostat-humidistat-air quality modules for independent localized environmental zone configuration and control. The environmental control system shall hence forth be called Automatic Controlled Thermostat-humidistat-air quality System also to be known as (ACTS). The preferred method of the present invention integrates the preferred embodiment with ULTRAGRID for maximizing energy usage and monetizing peak efficiency.

The preferred embodiment consists primarily of environmental control components, central air handling system, primary ventilation system, return vent system and integrated control system with inclusion of ULTRAGRID 194 interfacing. Point source exhaust is provided by individual bathroom fans and a kitchen range hood. Periodic operation of the central air handler fan 260 assures consistent ventilation air distribution and uniform air quality. It also reduces temperature and humidity variations between rooms. The preferred embodiment is comprised by all ducts 220 inside insulated space provides the best performance, such as permitted by the unvented-cathedralized attics. Sealed and well-insulated ducts are next best. Well-ventilated conventional attics without ducts require about 40% less annual cooling than cathedralized attics with the same insulation level.

One example of a ventilation system design is a central fan integrated supply (CFIS) system, which consists of an outdoor air intake duct 220 connected to the return side of the air handler 260 with a fan cycling control to make sure the fan runs a programmed minimum amount of time to move the required volume of air flow. This duct draws outdoor fresh air into the air distribution system and distributes it to the various zones in the control area. The intake duct has a motorized damper also controlled by the environmental control system to operate the damper to prevent excess ventilation of the control area during times of significant space conditioning demands which could exceed maximum duty cycles of the shortening the lifespan of fan/blower system. The preferred embodiment comprises a mixture of 20% or less outside air mixed with 80% or more inside air to promote zone balanced temperature and humidity levels.

The preferred method of the present invention advantage coincides in direct relationship to increases in energy use as associated inherent costs also rise, the preferred embodiment of the present invention offers customizable solutions that conserve and monetize energy use and reduce heating and cooling costs to a minimum. The preferred method of the present invention environmental control system integrates heating, cooling, humidity and air quality ventilation control and air filtration for airborne organisms, particulates, dust and allergens with a central command and control system. The preferred method of the present invention integrates the preferred embodiment with UTLRAGRID for monetizing peak efficiency and maximizing energy usage. This embodiment introduces the use of reduced energy requirements and enhanced individualized zone comfort through installation of electronic air duct dampers and integration into a common control system for efficient environmental zone control.

The preferred method of the present invention integration environmental control of HVAC air duct dampers allows independent thermostatic control of environmental conditions from occupied or projected use zones while reducing energy in unoccupied or unused zones, which is incumbent upon setting limit for the flow of heating, cooling, humidity and air quality control down to only the chosen zones necessary to reduce spillage of energy use to zones with little or no apparent needs, this allows monetization of energy usage and efficiency for specifically chosen and select targeted zones or sets of zones.

The preferred embodiment allows the environmental control system to adjust changes in the temperatures, humidity levels and air quality of selected zones faster and more efficiently than conventional prior art heating and cooling system design using prior art HVAC and air ducts, thus providing shorter operational run time for the environmental control system and lowering its typical required energy usage and associated costs.

Advantages of the preferred embodiment of the ACTS environmental control and ventilation systems with integrated thermal energy recovery includes:

A. System offers reduction of thermal losses to reduce thermal input requirements to moderate and maintain the control area temperature, humidity and air quality to a comfortable or particular desired use level;

B. System is high efficiency and cost-effective, less energy is required to move air than to environmentally control it;

C. System provides environmental control whereas open windows or access portals would be a security risk and in windowless rooms (e.g. datacenters, work areas, storage rooms, closets, bathrooms and toilets, etc.); and D. System can function as a ventilation system in summer via bypassing the thermal transfer system 266 and increase air quality by simply replacing indoor air with outdoor air, the system can reduce indoor moisture in winter, as cooler outdoor air has a lower relative humidity.

The preferred method of the present invention for the purpose of providing dehumidification using a liquid desiccant will integrate a typical hydrostat or hygrometer which is an electrical device for detecting the presence of moisture may be used to monitor and control humidity levels automatically to preset levels. Desiccant is a hygroscopic substance that is commonly used as a drying agent.

Liquid desiccant is also a natural disinfectant, eliminating airborne microorganisms, bacteria, viruses and removing odors without the need of expensive filters. The salt water solution removes almost all airborne bacteria and microorganisms in a single pass and thermal energy can reduce to near zero potential contaminates, the embodiment also eliminates condensation points in the systems such as drip pans mid condensate lines which often produce algae and bacteria build-up. Additional advantage can be achieved with the present invention with the integration of ultraviolet light source to denature harmful bacteria to further advantage the present invention over prior art. Special filtering and sequestering procedures and processes may be used when incorporating control of zone contaminated environments such as paint booths, chemical manufacturing and other processing which can also include harmful particulates.

The preferred method of the present invention has additional advantages over prior art such as air quality is kept fresh with maintaining higher oxygen levels, replaceable filters from which to remove allergens such as dust, mold, mildew and pollen to include organisms such as bacterium reduction and/or removal, climate control for consistent zone to zone temperatures, humidity and air quality levels affecting zones such as a controlled work area, laboratory, work bay, kitchen, bathroom and pet odors.

The preferred method of the present invention uses sustainable renewable generated thermal energy storage for hot and cold input for control of zones independently with its ability to match desired temperatures.

The preferred method of the present invention benefits from integration of its components in a symbiotic relationship in which components are interconnected to work together to perform select tasks with higher efficiency and performance as a whole versus prior art implementation of individual systems and isolated components.

The preferred method of the present invention is concerned with an amalgamated system comprising a heating, cooling, humidifier, dehumidifier, ultra-violet light, air quality, environmental control system and energy control and provisioning system and/or ULTRAGRID to create a balanced environmental ecosystem.

An aspect of some embodiments of the invention is concerned with a combined dehumidifier/air conditioner is which a relatively low level of integration is provided. In some embodiments of the invention, heat generated by the condenser is used to remove liquid from the desiccant. However, unlike the above referenced prior art, the air conditioner condenser continues to be cooled by outside air. The heated air, which exits the air-conditioner, containing waste heat, is used to remove moisture from the desiccant.

In the preferred embodiment of the invention, a heat pump is utilized to transfer thermal energy thermal storage to relatively cool desiccant to heat the desiccant to promote drying and evaporation, in addition to the thermal energy communicated from recycled thermal waste energy supplied from the system. The result is a system in which the cooling system 125 docs not have to over compensate cooling the air to remove moisture and the dehumidifier is not required to communicate thermal energy to the heat the air in order to remove moisture. This is a direct contrast with the prior art systems in which one or more inefficient steps mast be performed.

Some embodiments of the invention provide an amalgamated environmental control system in which only "fresh ambient air", which is in essence an untreated air that would be processed via the dehumidification process prior to cooling by the cooling system 125. With the dehumidifier only operational with moist "fresh ambient air" then the cooling system 125 will be only cooling relatively dry air. This method will allow both the dehumidifier and the cooling system 125 to operate at a very high efficiency and performance rating. This offers a simple method of integration of the various components into a harmonious relationship providing advantages of utilizing waste heat from the recycled thermal energy and enhancing total system efficiency able to use stored thermal energy, unlike prior art unintegrated legacy units left unable to benefit from tightly integrated system efficiencies.

Active device operation allows absorption of humidity in the form of moisture in the dehumidifying section which increases the volume via collection of moisture in the dehumidifier sump, resulting in the gravity flow of low concentration desiccant from the cooled dehumidifier sump to the heated evaporator sump. This flow also carries with it a flow of desiccant ions, which must be returned to the dehumidifier sump, this process is achieved by natural pumping action of an ion-rich desiccant solution from the heated evaporator sump to transfer to the cooled dehumidifier sump. The preferred embodiment of the invention uses diffusion of ions to initiate and maintain the natural flow and stratification movement through the ducts 220 between the adjoining walls, from the evaporator sump to the dehumidifier sump and its reverse ionic and gravity generated actions.

The preferred embodiment for humidification comprises a system that using water input into the formerly dehumidification section and reversing the usage of the dehumidifier in cooperation of the thermal transfers in the dehumidifier sump from cooling to heat and removing thermal input to the evaporator will allow natural vapor to rise from the formerly dehumidifier and can now function as a humidifier to provide adequate air moisture levels to maintain appropriate humidification levels desired or required. The simplicity and effectiveness of an inline humidifier, the cleanliness of a flow-through system provides for a water efficiency and low maintenance system. While some minerals will adhere to the devices, use of inline water filters will remove the majority of the minerals from the water source. Flushing and cleaning can be done periodically to provide maintenance and cleaning of the humidification system, additionally reduction of contaminants build-up and extra observation against excessive water stagnation contamination and mineral deposits.

The preferred method of the present invention for liquid desiccant-based dehumidification uses a sodium chloride, potassium chloride or lithium chloride solution approximately (25%-75% solution concentrations) which in essence is essentially a highly concentrated form of salt water which is typically referred to as brine.

This natural brine solution is a non-toxic mixture and does not break down chemically under normal use but will change in concentration levels which mean it may not need to be replaced over the lifetime of the system. The solution however may need to be replaced during its lifetime from dust, dirt and contamination.

Referring to FIG. 34, the preferred method of the present invention comprises an apparatus for environmental conditioning of air comprising: a quantity of liquid desiccant; a reversible dehumidifier, humidifier section in which targeted air flows through to be conditioned. In dehumidification mode, air is contacted with a first portion of the liquid desiccant using a mist spray unit to allow the air to counter flow against the spray between the dimpled separators, the fluid is pumped from the sump to the mist sprayers; the basin at the bottom catches the mixture, the thermal exchanger 212 in the sump can be used to cool or heat dependent on the required mode. The evaporator in dehumidification mode is to remove excess water from the solution, when in humidification the sumps act as a drip tray to catch excess water, the brine will kill most organisms and to hold any contaminants from transfer from the air, the evaporator is used in both modes to remove excess water from the system using heat input via thermal exchanger in the sump communicates thermal energy to the thermal exchanger 212 in the evaporator sump for the purpose of evaporation for removing excess moisture from the brine solution to raise the concentration level to enable uninhibited properties of the liquid desiccant for removal of moisture from the dehumidifier cold side of the system for continuation of the humidity level control and to also control volume level of the mixture, in humidification the injectors input is switched to a water input for mist generation of water moisture to allow the air to counter flow against the spray to promote humidity creation between the dimpled separators ducted into the venting system. The system can use natural ion transfer for movement between sumps through the duct in the separator or alternatively, the apparatus may include a pump for pumping liquid desiccant between the humidifier/dehumidifier section and the evaporator section.

The preferred embodiment of the invention promotes a sustainable and renewable energy basis for a nontoxic method of heating and cooling, humidification and dehumidification, air quality and air filtration can be achieved from a single amalgamated device.

Figure 36:
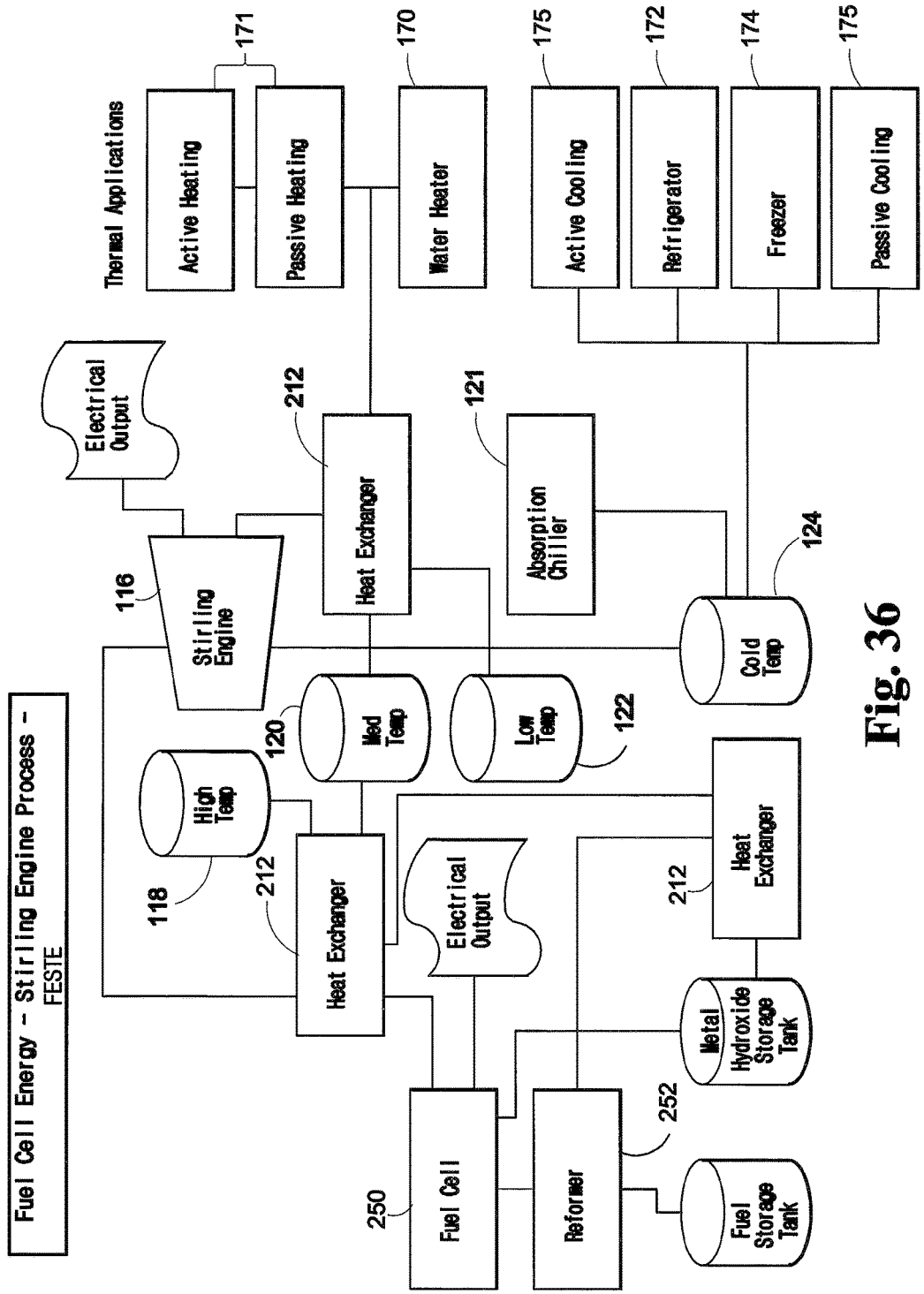
FIG. 36 is a flowchart illustrating the Fuel Cell Energy—Stirling Thermal Engine ("FESTE") Process in accordance with one or more embodiments of the present invention.
Figure 37:
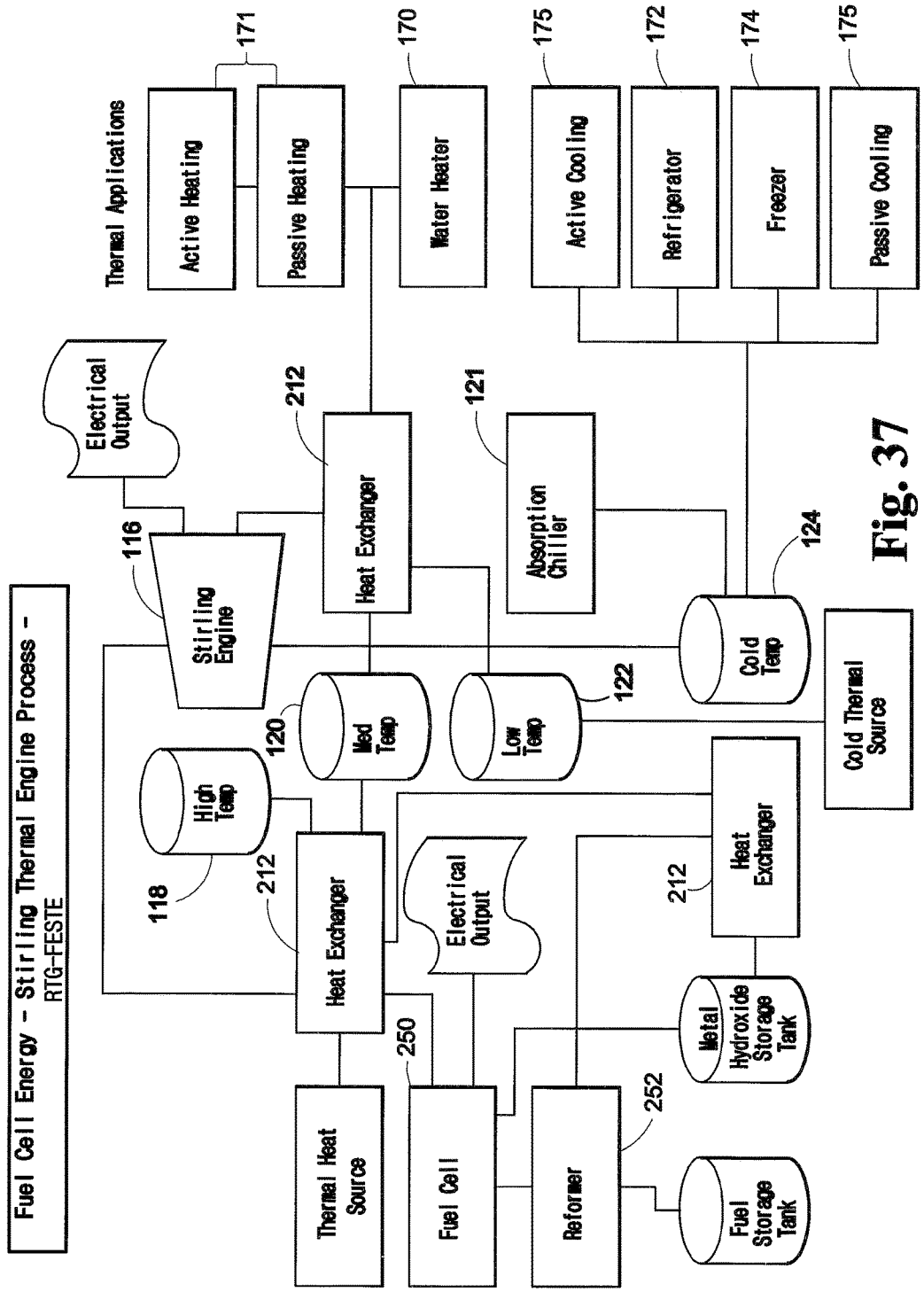
FIG. 37 is a flowchart illustrating the RTG FESTE Process in accordance with one or more embodiments of the present invention.

As shown in FIGS. 36 and 37, the preferred method of the present invention uses a second combined cycle and draws thermal energy from one or more solid oxide fuel cells 250 (sometimes "SOFC") that is necessary to effectuate thermodynamic and electrochemical performance related to SOFC systems 250. The preferred method of the present invention is for the purpose of thermal energy temperature control of the SOFC 250 by eliminating prior arts inclusion and use of water or liquid based cooling, where the preferred method of the present invention introduces a multi-cycle system, that uses a thermosiphon and/or heat pipe and/or thermal exchanger 212 for direct connection and enhanced waste heat reclamation and energy recycling thereby gaining additional efficiency via using thermal waste energy realized by amalgamating a Stirling engine using thermal waste energy from the SOFC and cold thermal input from the added the extended combined cycle provided by the absorption cooling system 121 from recovery of thermal waste energy from the Stirling engine 116.

Additional improvement using the preferred method of the current invention is incorporation of the added multi-cycle by enabling an absorption cooling 121 system to provide cold thermal input to enable higher use of input energy and have additional advantage of the combined cycle by enhancing width of heat band supplied to the Stirling engine and cold thermal energy input for dry cooling usage for component cooling within the system.

Due to these high temperatures, the preferred method of the present invention allows hydroxyl ammonium nitrate or ammonia separation via a waste energy for thermally derived cracking process. Additionally, light hydrocarbon fuels, such as methane, propane and butane can be internally reformed within the system via waste heat. SOFC power systems can increase efficiency by using the heat given off by the exothermic electrochemical oxidation within the fuel cell 250 for endothermic steam reforming and for thermal energy communicated to processes such as hydroxyl ammonia nitrate 179 mixture decomposition, an ammonia cracking process 167 or other fuel source separation processes.

Thermal expansion demands a uniform and well-regulated heating process at startup. SOFC stacks with planar geometry require thermal input to be heated to light-off temperature. The preferred method of the present invention uses stored thermal energy to provide startup or near startup temperatures thereby reducing startup times and extreme thermal temperature changes to control material creep and reduce metallurgy reactions from reduction of rapid temperature change. The preferred method of the present invention allows for electrical to thermal communication via electrical thermal heating element 117 for maintenance thermal energy input to thermal energy storage.

The preferred method of the present invention introduces graphene as the additive into the ceramic matrix used for the SOFC ceramic plates. Graphene has highly remarkable mechanical properties, which makes it potentially a good reinforcement in ceramic composites. It also has unique electrical and thermal properties, which makes it highly attractive as filler and bonding agent for producing multi-functional ceramics for a wide range of applications. In the past few years, relatively little attention has been focused on Graphene Ceramic Matrix Composites (GCMC) in comparison to polymer composites and metal composites. The preferred method of the present invention uses state of the art of GCMC which including materials synthesis, densification and characterization. Published literature allows use of critical steps for processing GCMC, and identifies its influence on the multifunctional and mechanical properties of alloys and composites.

The majority of work in graphene nanocomposites has focused on polymer matrices. The preferred method of the present invention use of graphene to enhance the toughness of bulk silicon nitride ceramics. Ceramics are ideally suited for high-temperature applications but suffer from poor toughness. The preferred method of the present invention uses graphene platelets (GPL) that are homogeneously dispersed with silicon nitride particles and densified, at approximately 1650° C. using spark plasma sintering. The sintering parameters are selected to enable the GPL to survive the harsh processing and high temperature operating environment. The preferred method of the present invention use of graphene ceramic introduces increases ceramic's fracture toughness in response to ceramic volume fraction. The preferred method of the present invention includes a novel toughening mechanisms through the inclusion of graphene with the ceramic matrix enhance GPL wrapping and anchoring themselves around individual ceramic grains to resist sheet pullout. The resulting cage-like graphene structures that encapsulate the individual grains were observed to deflect propagating cracks in not just two dimensions but extended to all three dimensions.

The preferred method of the present invention interconnects can be either a graphene metallic or graphene ceramic layer that sits between each individual cell. Its purpose is to connect each cell in series, so that the electricity each cell generates can be combined. The preferred method of the present invention allows the interconnect based on graphene ceramic matrix to be exposed to both the oxidizing and reducing side of the cell at high temperatures and still be extremely stable. For this reason, ceramics have been more successful in the long term than metals as interconnect materials. The preferred method for the present invention introduces Ceramic-metal-graphene composite matrices called 'cermeg' for high temperature usage as they have demonstrated thermal stability at high temperatures and excellent electrical conductivity.

The preferred method of the present invention advantage over prior art is comprised by the introduction and integration of a multi-cycle system with integration of thermal management system with direct connection and dissipation. Thus, would be comprised by a direct connection of a thermosiphon and/or heat pipe and/or thermal exchanger 212 using thermal transfer mediums such as molten salt for thermal temperature management of the SOFC which by inclusion provides enhanced waste heat reclamation and energy recycling thereby gaining additional efficiency via using thermal waste energy. Higher system efficiency can be actualized by using thermal waste energy as input for a reformer or cracker 252 for the decomposition of the input fuel. Additional gains using the preferred embodiment is realized by amalgamating a Stirling engine 116 using thermal waste energy from the SOFC and cold thermal input from the added extended combined cycle provided by the absorption cooling system 121 from recovery and use of thermal waste energy. These gains are monetized from the preferred embodiment and its use, greatly enhancing efficiency, performance and energy conservation and on demand control over all past prior art attempts and implementations.

The preferred method of the present invention may use direct of heat pipes and/or thermosiphon and/or convection thermal energy transfer for immediate thermal energy management and its associated energy efficiency and performance advantage over prior arts use of water, water/glycol or steam, each with their own transfer limitations and failure points and extensive efficiency losses and inherent material costs.

Additional improvement using the preferred method of the current invention is incorporation of the added multi-cycle by enabling a Stirling engine 116 to perform thermal management and additional power and efficiency gains, additional advantage when including an absorption cooling system 121 to provide cold thermal input to enable higher use of input energy and have additional advantage of the combined cycle by enhancing width of heat band supplied to the Stirling engine 116 and cold thermal energy input for dry cooling usage for component cooling within the system.

The preferred method of the present invention communicates thermal energy from thermal storage for the purpose of providing thermal energy for preheating, heating and recycling thermal energy from the energy processes.

The preferred method of the present invention recycles thermal waste energy recovery from using heat exchanger and located coils near or around the fuel cell stack with it radiation of convection based thermal energy reclamation. The present invention then uses this recycled thermal energy for the purpose of supplying communication to thermal storage 125 or reuse of the thermal energy for Stirling engine input to generate rotational energy which is then used for additional work such as input for an absorption cooling system 121 for yet higher efficiency and usage of available thermal temperature band.

The preferred method of the present invention sets forth its primary advantage and novel method over prior art comprised by normalizing the thermal energy balance which is essential for realized and optimized system wide use and reuse of recycled energy, thereby generating higher efficiencies while concurrently monetizing all energy inputs for all intended integrate methods with individualized applications and processes.

The electronic monitoring, identification, energy generation, baseload energy load response and energy provisioning to satisfy grid stability from supply compensation for end use requirements and control element of the present invention in the current application shall henceforth be known and designated from the above as elements for the features and functionality as system to be known as "ULTRAGRID™" 194.

The preferred method of the present invention sets forth its primary advantage and novel method over prior art above applications and processes with physically connected via heat pipes and/or thermosiphons, preheaters 213 and heating system elements 171, heat exchangers and regenerators 214 in its reclamation and recycling of waste thermal energy for use, reuse, storage and/or conversion and storage. This energy is used by thermal intensive applications such as with Stirling cycle engines which use a portion of the thermal energy for the generation of rotational energy, for use in such applications such as rotation work needed for input into a generator, pump or compressor. Waste heat recycled from this process may be used in a second level of reuse of available recycled waste energy as thermal energy input into secondary lower heat threshold thermal intensive applications such as Stirling engine cycle 116 with a reduced temperature differential which would then use a portion of the thermal energy input for the generation of rotational energy for us in such applications such as rotation work needed for input into a generator, pump or compressor.

The present invention has additional advantage over prior art from additional applications and process cycles from remaining thermal energy and from storage to further encourage use and recycling of available energy for additional application and processes energy usage that may be added based on available input temperatures and return on investment cost versus an acceptable benefits to costs ratio, all remaining recyclable thermal energy may then be reclaimed and then communicated to appropriate temperature thermal storage systems 125, additionally thermal energy may be communicated to absorption cooling 121 to convert heat based thermal energy into cold based thermal energy to maintain a localized energy balance of available stored thermal energy. The preferred method of the present invention sets forth its primary advantage and novel method over prior art provides for normalized thermal energy balance that is essential for realized and optimized system wide use and reuse efficiencies concurrently monetizing all energy inputs for all intended applications and processes. Single cycle and multiple cycle generation systems using steam turbines 176 or Stirling engines 116 as the primary thermal energy cycle and for additional benefit use of recycled thermal waste energy for additional thermal intensive applications such as additional Stirling engine stages may be used for additional benefit and enhanced efficiency.

Figure 38:
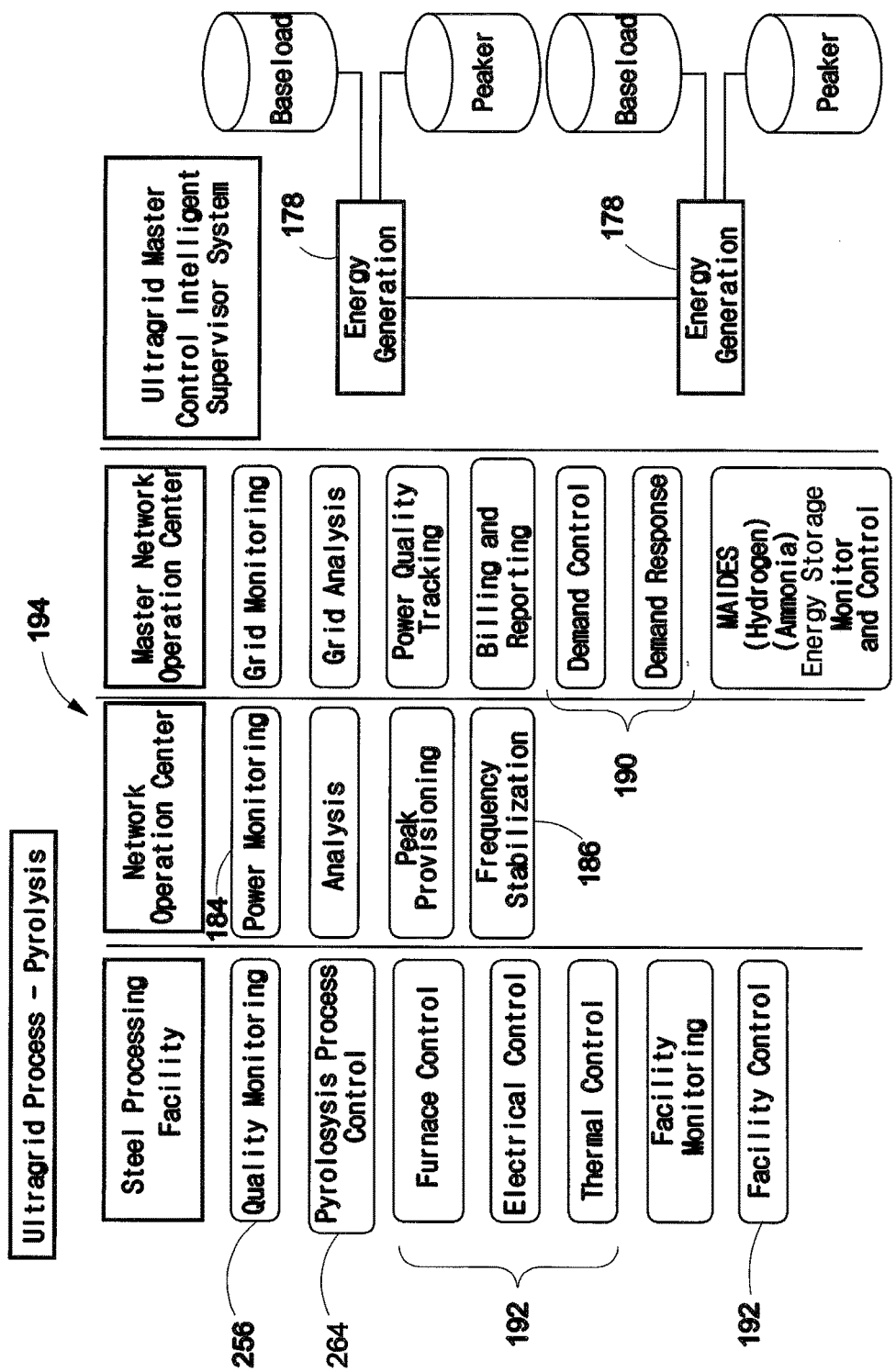
FIG. 38 is a block diagram illustrating the layers of the ULTRAGRID™—Pyrolysis Process in accordance with one or more embodiments of the present invention.
Figure 39:
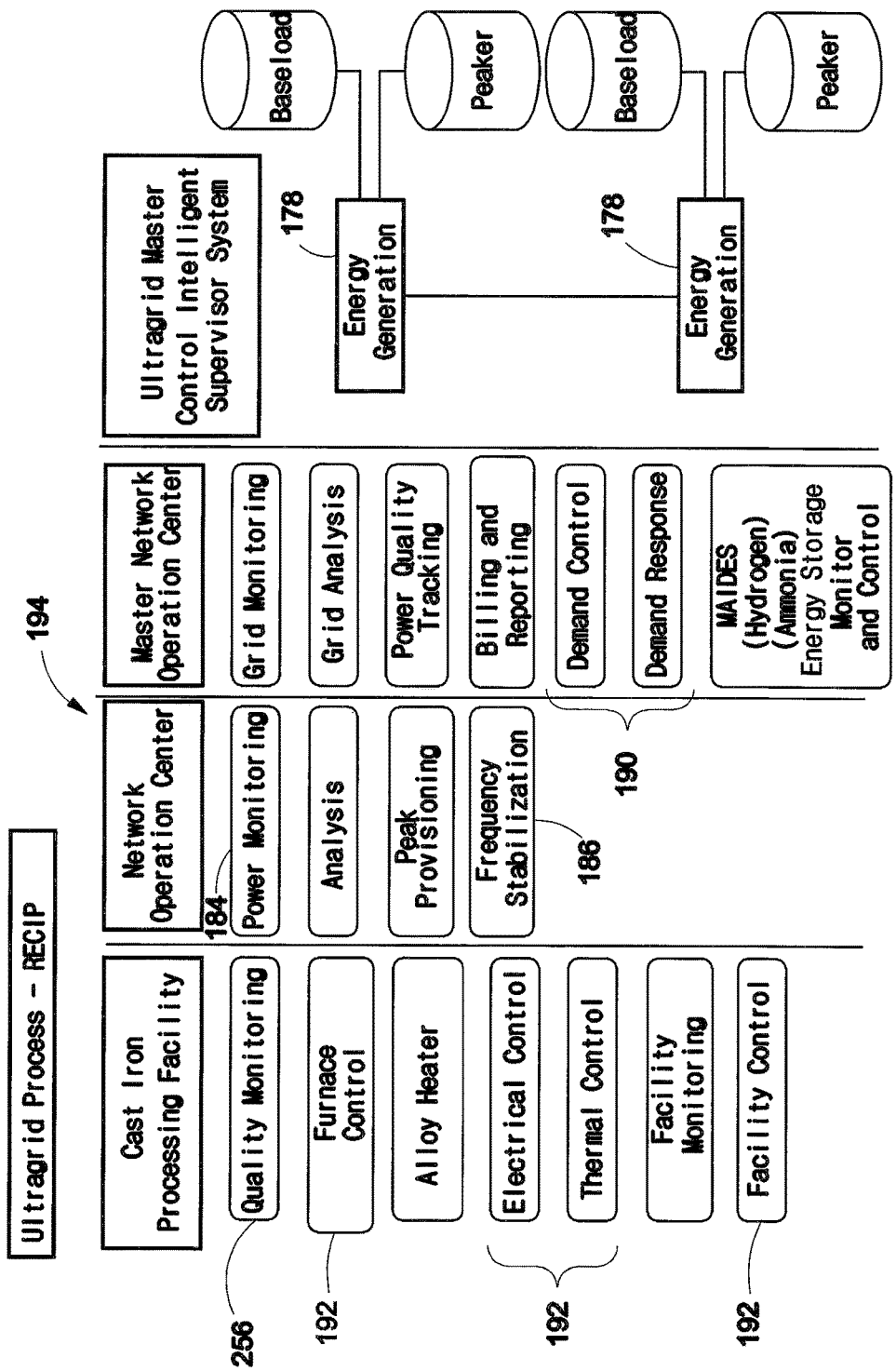
FIG. 39 is a block diagram illustrating the layers of the ULTRAGRID™—RECIP Process in accordance with one or more embodiments of the present invention.

The preferred method of the present invention reduces and potentially eliminates these issues with its energy generation, extremely high volume energy storage system 110 and finally its ability to capture and recovery waste heat for the purpose of communication to energy storage and/or for conversion to cold to cool the system all of which ULTRAGRID™ can provide analysis, monitoring and control of any and all available energy and provision for potential energy needs as depicted in FIGS. 38 and 39.

The preferred method of the present invention has the additional benefit from connection to thermal energy storage for the purpose of preheat or primary thermal energy input which then offers the included ability to communicate recycled and recovered thermal energy for the purpose or thermal energy storage or reuse, this offers the advantage over prior art in it gains the system higher efficiency and reduces energy input requirements with inclusion of renewable energy generation 112 and associated thermal and gas emissions processing and storage. The preferred method of the present invention has the additional advantage over prior art in its ability to reduce reliance on fossil fuels and non-green energy input sources.

The preferred method of the present invention advantage over prior art will be appreciated with energy input from localized energy storage that will provide energy thermal input to on demand energy generation provisioning versus prior art that required external grid energy generation input that's source generally was hundreds of miles away all points of failure and efficiencies and losses associated.

The preferred method of the present invention advantage over prior art from localized energy generation and enhanced duration of localized energy storage available only from the preferred method of the present invention use of thermal energy storage for generation of energy to facilitate fulfillment of present and future energy needs with on demand and when needed energy provisioning.

The preferred method of the present invention advantage versus prior art that required external grid energy generation input that's source generally was hundreds of miles away all points of failure and efficiencies and losses associated with prior art processes and applications versus the preferred method of the present invention use of locally generated and/or stored energy provisioned on a on demand or as needed basis via ULTRAGRID™ 194 that can provide analysis, monitoring and control of any and all available energy and potential energy needs for mission critical reliability with on demand or as needed basis.

To reduce costs and/or increase the reliability of renewable power, the system of FIG. 1 may store energy from the renewable energy generation and/or available thermal energy sources subsequently generate energy in the form of electrical, thermal and chemical storage 183 such as hydrogen and ammonia from the stored energy based on electric demand.

The present invention differs from other prior art particularly a high pressure alkaline hydrogen electrolyzer 113 and similar devices that typically uses a water and potassium hydroxide (KOH) mixture in a container and apply a DC current with two electrodes located in the mixture to separate hydrogen and oxygen; processes for water intake may use reverse osmosis and/or desalination and/or distillation and/or flash evaporation methods for water purification.

As shown in FIG. 2, the present invention differs from other prior art via integrating renewable energy generated electrical, thermal, gas and liquid generation amalgamated with a Haber/Bosch ammonia synthesis plant 181 and similar devices with the preferred inclusion of additional system processes and applications endothermic reactions using input from renewable energy generated thermal energy storage. The preferred method of the present invention vertically integrates nitric acid production using excess nitrogen and oxygen previously extracted and stored using the preferred method of the present invention recycling exothermic reaction of the nitric acid production process; additional benefit from recycling and reuse of thermal energy through capture of thermal energy from thermal energy recycling during nitric acid exothermic reactor production processes.

Figure 40:
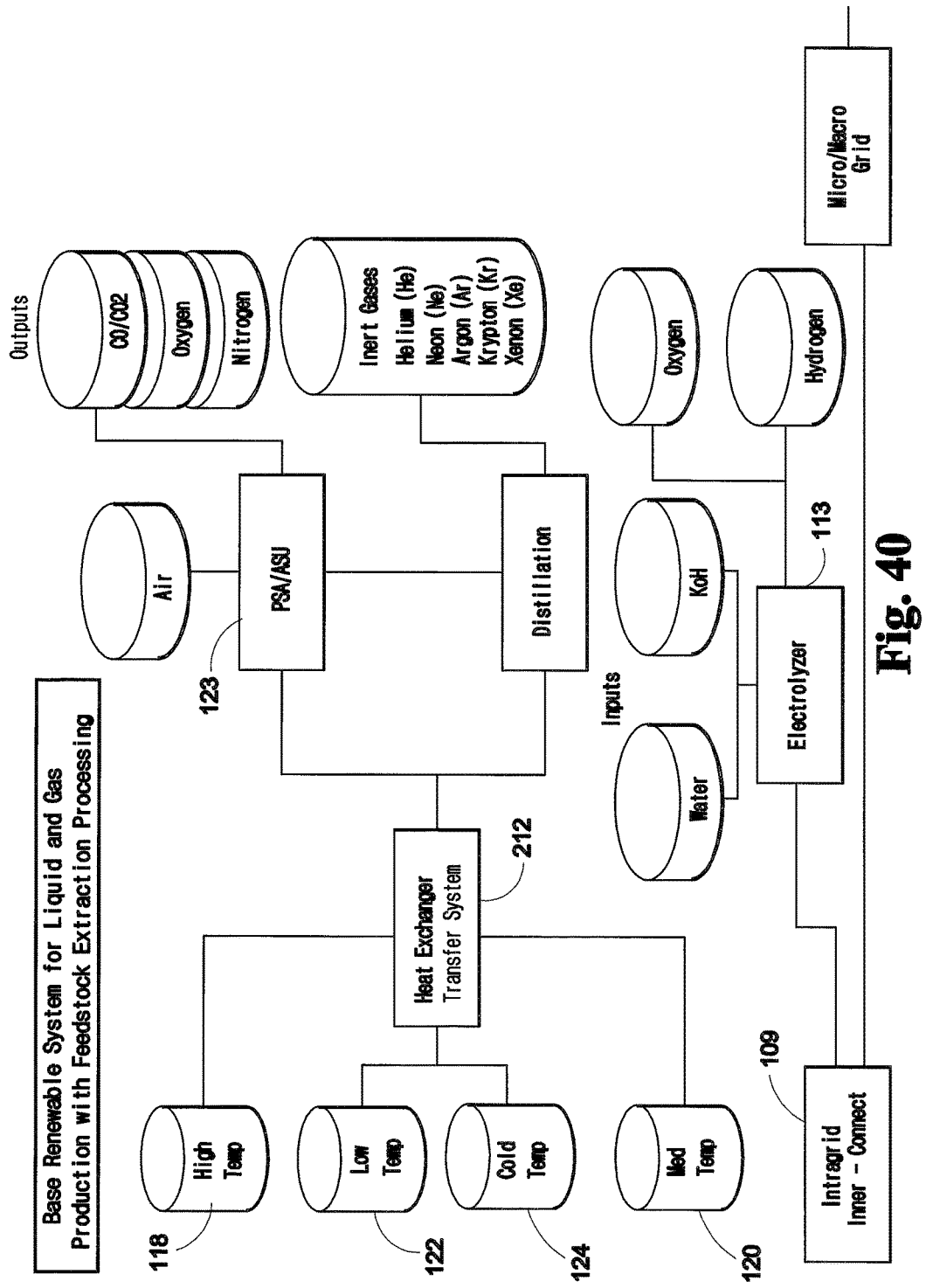
FIG. 40 is a flowchart illustrating the Base Renewable System for Liquid and Gas Production with Feedstock Extraction Process in accordance with one or more embodiments of the present invention.
Figure 41:
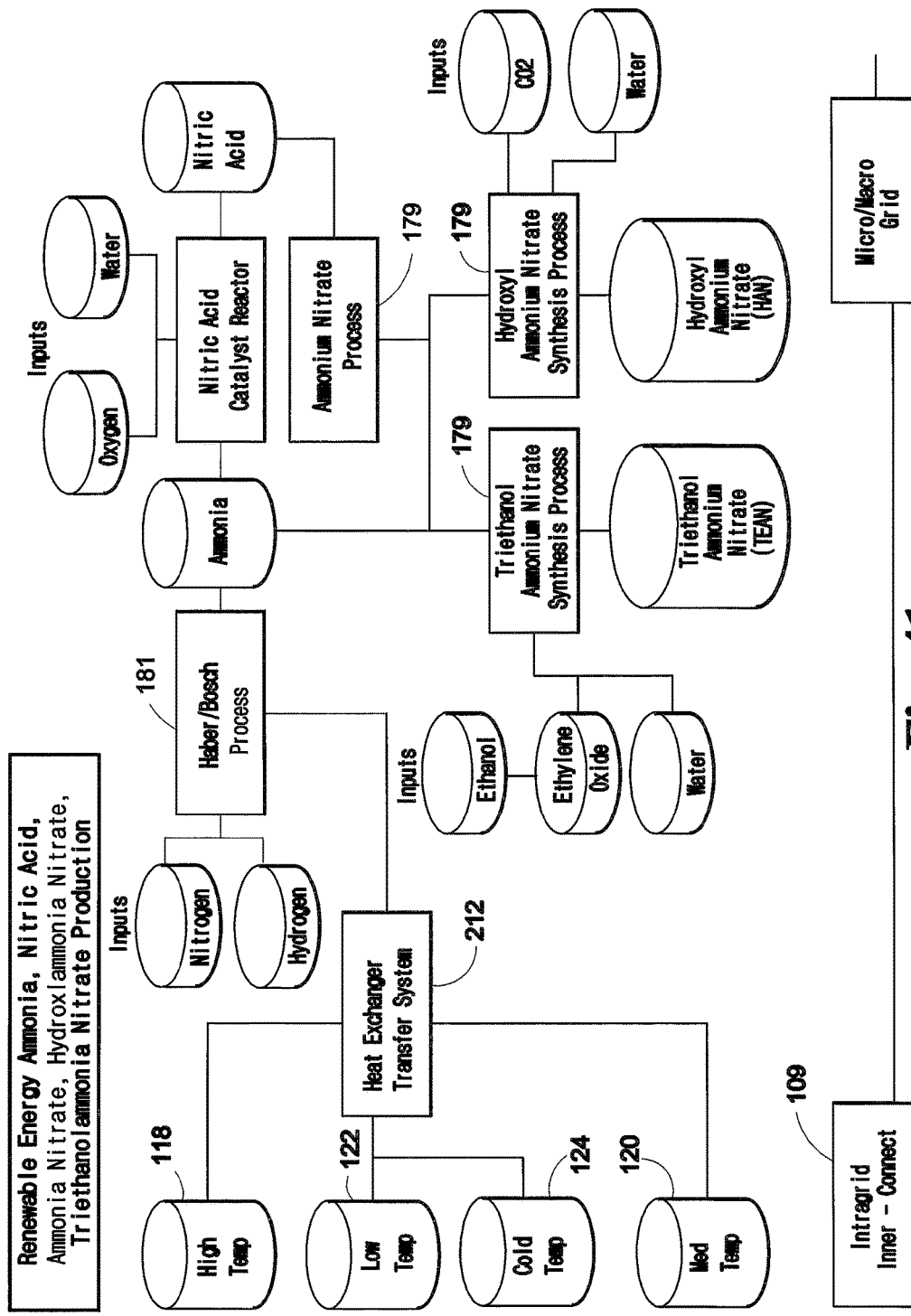
FIG. 41 is a flowchart illustrating the Renewable Energy Chemical Production System Process in accordance with one or more embodiments of the present invention.

As shown in FIGS. 40 and 41, the preferred method of the present invention comprises sustainable generation of feedstocks from renewable energy generation sources 112 to include thermal and chemical storage 183. Primary inputs are water, sea water, atmospheric air and biomass. The preferred method of the present invention consists of renewable energy inputs of electrical, thermal inputs such as wind 104, solar, geothermal 100, hydro generation and inclusion of thermal energy storage including baseline elements comprising water and air inputs. The preferred method of the present invention is to promote sustainable production via renewable energy supplied generation of high purity hydrogen, oxygen, nitrogen and include processing other inert atmospheric gases and more specifically to a set of processes for the production of concentrated hydrogen, ammonia, nitrate. The preferred method of the present invention would additionally promote sustainable production of hydrogen, nitrogen, oxygen, carbon, ethanol, methanol, butanol, ammonia, nitric acid, ammonia nitrate (AN) 179, hydroxyl ammonium nitrate (HAN) 179, tri-ethanol ammonium nitrate (TEAN) 179 as production extensions of the ammonia and nitrate family chemicals and associated production of feedstock-based family derivatives.

The preferred method of the present invention offers other objects, features and advantages that are only obtained from the inherent use of locally generated and natural high purity premium quality feedstock gases 111, liquids and solids presented by this invention. The preferred method of the present invention use of pure feedstocks has additional benefits such as those realized from use of high quality feedstocks in advanced chemical processes. The preferred method of the present invention monetizes available chemically pure feedstocks by leveraging their inclusion within processes and applications to promote highly efficient, high volume generation and production rates of premium quality products and byproducts. The preferred method of the present invention uses renewable energy generation 112 in the form of electrical input and/or rotational input, this may be combined with thermal input from recycled waste energy of communication from thermal energy storage for heating or cooling and thermal intensive applications, additionally, and energy stored as chemical storage may be transferred for usage.

The preferred method of the present invention comprises sustainable generation and production using pressure swing absorption (PSA) and/or air separation units (ASU) 123 to isolate atmospheric gases into their individual components. These separated gases form the feedstocks that are derived from renewable energy generation sources 112 to include thermal and chemical storage 183.

The preferred method of the present invention is to provide processes and applications with renewable energy, thermal and chemical energy storage, water and air as the primary inputs for the production of concentrated hydroxyl ammonium nitrate consists of mixing diluted nitric acid to a solution of aqueous hydroxylamine while cooling the resulting targeted solution.

The preferred method of the present invention allows excess stored cold thermal energy to provide additional cooling using absorption cooling 121 from waste heat thereby enhancing overall system efficiency and productivity. The preferred method of the present invention is to provide a process to maximize the production and monetize material and energy inputs to create a sustainable and chemically stable production of highly concentrated hydroxyl ammonium nitrate (HAN) while reducing decomposition of HAN product losses to a minimum.

The issues caused by from previous prior art are solved in the current method using the processes of the present invention whereby a highly purified form of a highly concentrated HAN solution can be produced without excessive nitric acid and with allowing minute HAN decomposition thereby enhancing chemical stability.

The preferred method of the present invention is to provide characteristics of concentrated nitric acid of less than about 70% yet preferably less than 50% concentration by weight concentration is added to a solution containing the excess hydroxylamine, while the solution is continuously cooled and mixed to maintain the temperature at between 45-65 degrees Celsius at all times for enhanced chemical stability.

The preferred method of the present invention has the additional benefit from connection to thermal energy storage for the purpose of preheat or primary thermal energy input which then offers the included ability to communicate recycled and recovered thermal energy for the purpose or thermal energy storage or reuse, this offers the advantage over prior art in it gains the system higher efficiency and reduces energy input requirements with inclusion of renewable energy generation and associated thermal and gas emissions processing and storage. The preferred method of the present invention has the additional advantage over prior art in its ability to reduce reliance on fossil fuels and non-green energy input sources.

The salt water brine condensate collected at the bottom of each stage can be sprayed on the tubes in the next stage, since this water has a suitable temperature and pressure near or slightly above the operating temperature and pressure in the next stage. Some of this water will flash into steam as it is released into the next stage at lower pressure than the stage it came from.

The first and last stages need external heating and cooling respectively. The preferred method of the present invention uses thermal energy storage of heat input and cold input to provide required energy inputs. The amount of heat removed from the last stage must nearly equal the amount of heat supplied to the first stage. For sea water desalination, even the first and warmest stage is typically operated at a temperature below 70° C., to avoid scale formation. The preferred method of the present invention will recycle and recover thermal waste energy for communication to storage and/or transferred via heat exchanger for additional application and process usage.

The lowest pressure stages need relatively more surface area to achieve the same energy transport across the tube walls. The expense of installing this surface area limits the usefulness of using very low pressures and temperatures in the later stages. Gases dissolved in the feed water may contribute to reducing the pressure differentials if they are allowed to accumulate in the stages. External feed water must be supplied to the first stage. The tubes of the first stage are heated using an external source of steam or through any other source of thermal energy. Condensate (fresh water) from all the tubes in all the stages must be pumped out from the respective pressures of the stages to the ambient pressure. The brine collected at the bottom of the last stage must be pumped out since it has substantially lower pressure than the ambient pressure. The preferred method of the present invention will recycle and recover thermal waste energy for communication to storage and/or transferred via heat exchanger for additional application and process usage.

Advantages are Low energy consumption (less than 1.0 kWh per cubic meter) compared to other thermal processes, Operates at low temperature (<70° C.) and at low concentration (<1.5) to avoid corrosion and scaling, Does not need pre-treatment of sea water and tolerates variations in sea water conditions, Highly reliable and simple to operate, Low maintenance cost, 24 hour a day continuous operation with minimum supervision. Can be adapted to any thermal energy source, including hot water, waste energy from power generation, industrial processes, or solar heating.

The present invention is one that works like a solar distiller, but with even greater capacity than the scale of industrial evaporation ponds as the preferred method of the present invention known as Integrated Quintuple Generation Solar Thermal Energy System 106 for Water and Mineral Reclamation.

Figure 42:
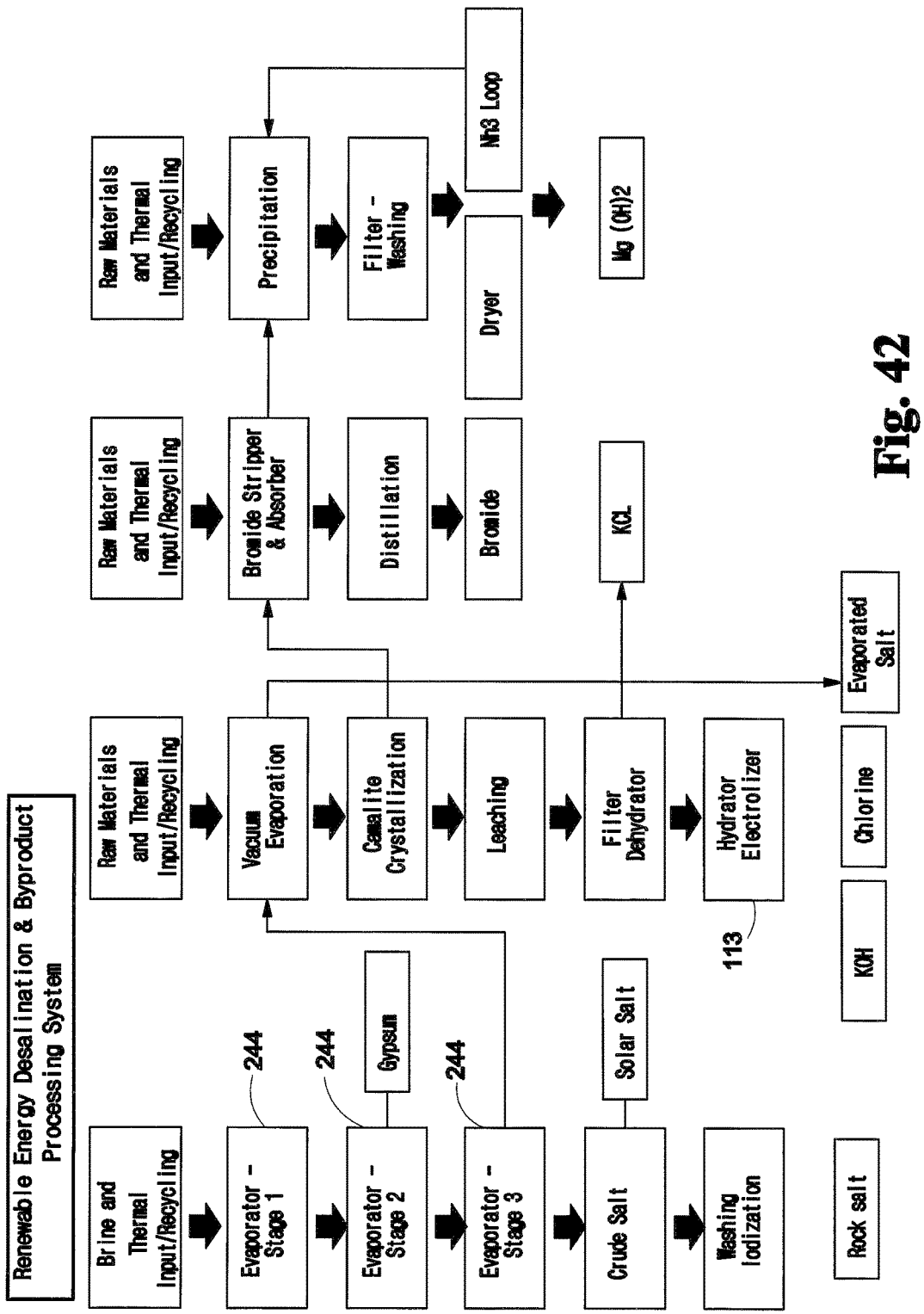
FIG. 42 is a block diagram illustrating the desalination and byproducts processing system in accordance with one or more embodiments of the present invention.

The present invention would also be considered an environmental friendly "full desalination" system because it converts nearly the entire amount of saltwater intake into potable water. One of the unique advantages of this type of solar-powered desalination is the feasibility for inland commercial operation. Several strategic advantages also include no air pollution from desalination power plants and no temperature increase of endangered natural water bodies from desalination plant water discharge and lastly salinity of nearby water bodies are not laden with excessive brine disrupting the natural surrounding ecosystem of the sea and ocean floor. Another important advantage is the production of sea salt also known as solar salt, separation and processing of additional valuable byproducts and chemical feedstock's for industrial and other commercial and noncommercial uses. As shown in FIG. 42, evaporators 244 are used in stages to separate the various mineral products, washing and drying to further separate additional products and ammonia to separate magnesium oxide as an additional step. Potassium oxide can be extracted adding in an electrolysis stage 278 and other electrical energy needs powered from the Stirling engine generator stage to maximize efficiency and an additional advantage over prior art attempts allowing the preferred embodiment of the present invention the highest desalination and mineral extraction possible using only renewable source inputs.

Salt affects our daily life and our essential needs more than anything else. For industry, salts are important raw materials for heavy chemical industries that require high quantities of salt with fewer impurities, like extracted calcium magnesium. The preferred method of the present invention advantage over prior art is the expansion of vertical market channels that are financially viable without need for subsidy support to maintain the exponential growth potential of the present invention by way of tapping new and latent resources. Although a lot has been achieved on the salt processing technology, some areas are yet to be fully discovered and monetized for which the present invention was designed to fully exploit. Marine chemicals exploration is one such area that can meet the demand for feedstock's that such unique endeavors can greatly benefit from this nearly inexhaustible resource provided by the ocean and seas.

Large integrated chemical complexes having captive fossil fuel, natural gas and nuclear energy generation facilities will need highly substantial investments to be phased out during the next decades. Thus, the preferred method of the current invention may be fully appreciated when deployed to facilitate the superior advantage over prior art in its viability and ability as a leading chemical producer and manufacturer. Additionally, deployment of the present invention may remove the financially prohibitive processes and applications very challenging tasks for the advanced recovery of marine chemicals, which will create and open scientific opportunities and new economic market expansions.

The preferred method of the present invention sets forth its advantage over prior art in its ability for economical viable vertical market penetration and expansion of large scale desalination deployment, fresh water abundant access and providing a nearly inexhaustible source for freshwater, salts and minerals.

The preferred method of the present invention sets forth its advantage over prior art in its imperative that an amalgamated system with the symbiotic integration and deployment of a sustainable ammonia production system 182 which will address the agricultural need for nitrogen-based fertilizer and the Trigeneration Desalination System for fulfillment of the potassium-based fertilizer. The present invention's advantage over prior art is the current invention's ability to exploit and ensure economically viable yet sustainable availability of potash production for industry as well as the formation of the balance of fertilizer to promote vital agricultural growth based on renewable energy sources while remaining entirely environmentally friendly.

The preferred method of the present invention sets forth its primary advantage and novel method over prior art above applications and processes with physically connected preheaters 213 and heating system elements 171, heat exchangers and regenerators 214 in its reclamation and recycling of waste thermal energy for use, reuse, storage and/or conversion and storage. This energy is used by thermal intensive applications such as with Stirling cycle engines which use a portion of the thermal energy for the generation of rotational energy, for use in such applications such as rotation work needed for input into a generator, pump or compressor. Waste heat recycled from this process may be used in a second level of reuse of available waste energy as thermal energy input into secondary lower heat threshold thermal intensive applications such as Stirling engine cycle with a reduced temperature differential which would then use a portion of the thermal energy input for the generation of rotational energy for us in such applications such as rotation work needed for input into a generator, pump or compressor.

The present invention has additional advantage over prior art from additional applications and process cycles from remaining thermal energy and from storage to further encourage use and recycling of available energy for additional application and processes energy usage that may be added based on available input temperatures and return on investment cost versus an acceptable benefits to costs ratio, all remaining recyclable thermal energy may then be reclaimed and then communicated to appropriate temperature thermal storage systems 125, additionally thermal energy may be communicated to absorption cooling 121 to convert heat based thermal energy into cold based thermal energy to maintain a localized energy balance of available stored thermal energy. The preferred method of the present invention sets forth its primary advantage and novel method over prior art provides for normalized thermal energy balance that is essential for realized and optimized system wide use and reuse efficiencies concurrently monetizing all energy inputs for all intended applications and processes.

Single cycle and multiple cycle generation systems using steam turbines 176 or Stirling engines 116 as the primary thermal energy cycle and for additional benefit use of recycled thermal waste energy for additional thermal intensive applications such ay additional Stirling engine stages may be used for additional benefit and enhanced efficiency.

The preferred method of the present invention reduces and potentially eliminates these issues with its energy generation, extremely high-volume energy storage system 110 and finally its ability to capture and recovery waste heat for the purpose of communication to energy storage and/or for conversion too cold to cool the system all of which ULTRA-GRID™ can provide analysis, monitoring and control of any and all available energy and potential energy needs.

The preferred method of the present invention has the additional benefit from connection to thermal energy storage for the purpose of preheat or primary thermal energy input which then offers the included ability to communicate recycled and recovered thermal energy for the purpose or thermal energy storage or reuse, this offers the advantage over prior art in it gains the system higher efficiency and reduces energy input requirements with inclusion of renewable energy generation 112 and associated thermal and gas emissions processing and storage. The preferred method of the present invention has the additional advantage over prior art in its ability to reduce reliance on fossil fuels and non-green energy input sources.

The preferred method of the present invention advantage over prior art will be appreciated with energy input from localized energy storage that will provide energy thermal input to on demand energy generation provisioning versus prior art that required external grid energy generation input that's source generally was hundreds of miles away all points of failure and efficiencies and losses associated.

The preferred method of the present invention advantage over prior art from localized energy generation and enhanced duration of localized energy storage available only from the preferred method of the present invention use of thermal energy storage for generation of energy to facilitate fulfillment of present and future energy needs with on demand and when needed energy provisioning.

The preferred method of the present invention advantage versus prior art that required external grid energy generation input that's source generally was hundreds of miles away all points of failure and efficiencies and losses associated with prior art processes and applications versus the preferred method of the present invention use of locally generated and/or stored energy provisioned on a on demand or as needed basis via ULTRAGRID™ that can provide analysis, monitoring and control of any and all available energy and potential energy needs for mission critical reliability with on demand or as needed basis.

The preferred method of the present invention may use solar thermal 106 generated and renewable energy based thermal energy input for thermal energy storage. This thermal energy storage may then be used as an on demand energy source for thermal intensive preheating and primary heating of clinker furnace or as input to Stirling engines 116 or steam turbines 176 for the purpose of generation of electricity or generation of rotational energy such as input to grinders for reduction of clinkers for the cement manufacturing processes. This preferred method of the present invention uses the above storage for transfer of waste energy that is communicated from collection systems and heat exchangers connected to and around the above clinker and furnace process to facilitate higher efficiency and volume production processes as an advantage over prior art.

The preferred method of the current invention uses materials from the desalination and processing or from brick and block manufacturing as fine and course aggregates for the concrete mixture. Fine and coarse aggregates make up the bulk of a concrete mixture. Sand, natural gravel and crushed stone are used mainly for this purpose. Recycled aggregates (from construction, demolition and excavation waste) are increasingly used as partial replacements of natural aggregates, while a number of manufactured aggregates, including air-cooled blast furnace slag and bottom ash are also permitted. The presence of aggregate greatly increases the durability of concrete above that of cement, which is a brittle material in its pure state. Thus, concrete is a true composite material. Redistribution of aggregates after compaction often creates inhomogeneity due to the influence of vibration. This can lead to strength gradients.

The preferred method of the present invention will use ash extracted from sea water and separated from other minerals. The preferred method of the present invention will use gypsum extracted from sea water and separated from other minerals. The preferred method of the present invention will use ash extracted from biomass during pyrolysis and separated from other minerals. These processes and applications will allow the system to use waste from other processes as valuable material input and allow the preferred embodiment to remain sustainable with additional reduction to damage to the ecology as some of its primary advantages over prior art.

The preferred method of the present invention will use MgO as an additive to enhance its environmental friendly spirit and intention, the MgO will absorb atmospheric $CO_2$ for the hardening process versus prior art generating excess emissions during the hardening process.

The manufacture and use of concrete produce a wide range of environmental and social consequences. Some are harmful, some welcome, and some both, depending on circumstances. A major component of concrete is cement, which similarly exerts environmental and social effects. The cement industry is one of the three primary producers of carbon dioxide, a major greenhouse gas. The other two are the energy production and transportation industries. As of 2011 it contributes 7% to global anthropogenic $CO_2$ emissions; largely due to the sintering of limestone and clay at 1500 C. The preferred method of the present invention uses sequestering of $CO_2$ gas emissions during sintering process for later use and reducing the environmental impact over prior art. Concrete is used to create hard surfaces that contribute to surface runoff, which can cause heavy soil erosion, water pollution, and flooding, but conversely can be used to divert, dam, and control flooding. Concrete is a primary contributor to the urban heat island effect, though less so than asphalt.

The preferred method of the present invention sets forth its primary advantage and novel method over prior art above applications and processes with physically connected preheaters 213 and heating system elements 171, heat exchangers and regenerators 214 in its reclamation and recycling of waste thermal energy for use, reuse, storage and/or conversion and storage. This energy is used by thermal intensive applications such as with Stirling cycle engines which use a portion of the thermal energy for the generation of rotational energy, for use in such applications such as rotation work needed for input into a generator, pump or compressor. Waste heat recycled from this process may be used in a second level of reuse of available waste energy as thermal energy input into secondary lower heat threshold thermal intensive applications such as Stirling engine cycle with a reduced temperature differential which would then use a portion of the thermal energy input for the generation of rotational energy for us in such applications such as rotation work needed for input into a generator, pump or compressor.

The present invention has additional advantage over prior art from additional applications and process cycles from remaining thermal energy and from storage to further encourage use and recycling of available energy for additional application and processes energy usage that may be added based on available input temperatures and return on investment cost versus an acceptable benefits to costs ratio, all remaining recyclable thermal energy may then be reclaimed and then communicated to appropriate temperature thermal storage systems 125, additionally thermal energy may be communicated to absorption cooling 121 to convert heat based thermal energy into cold based thermal energy to maintain a localized energy balance of available stored thermal energy. The preferred method of the present invention sets forth its primary advantage and novel method over prior art provides for normalized thermal energy balance that is essential for realized and optimized system wide use and reuse efficiencies concurrently monetizing all energy inputs for all intended applications and processes.

Single cycle and multiple cycle generation systems using steam turbines 176 or Stirling engines 116 as the primary thermal energy cycle and for additional benefit use of recycled thermal waste energy for additional thermal intensive applications such as additional Stirling engine stages may be used for additional benefit and enhanced efficiency.

The preferred method of the present invention reduces and potentially eliminates these issues with its energy generation, extremely high-volume energy storage system 110 and finally its ability to capture and recovery waste heat for the purpose of communication to energy storage and/or for conversion to cold to cool the system all of which ULTRAGRID™ can provide analysis, monitoring and control of any and all available energy and potential energy needs.

The preferred method of the present invention has the additional benefit from connection to thermal energy storage for the purpose of preheat or primary thermal energy input which then offers the included ability to communicate recycled and recovered thermal energy for the purpose or thermal energy storage or reuse, this offers the advantage over prior art in it gains the system higher efficiency and reduces energy input requirements with inclusion of renewable energy generation and associated thermal and gas emissions processing and storage. The preferred method of the present invention has the additional advantage over prior art in its ability to reduce reliance on fossil fuels and non-green energy input sources.

The preferred method of the present invention advantage over prior art will be appreciated with energy input from localized energy storage that will provide energy thermal input to on demand energy generation provisioning versus prior art that required external grid energy generation input that's source generally was hundreds of miles away all points of failure and efficiencies and losses associated.

The preferred method of the present invention advantage over prior art from localized energy generation and enhanced duration of localized energy storage available only from the preferred method of the present invention use of thermal energy storage for generation of energy to facilitate fulfillment of present and future energy needs with on demand and when needed energy provisioning.

The preferred method of the present invention advantage versus prior art that required external grid energy generation input that's source generally was hundreds of miles away all points of failure and efficiencies and losses associated with prior art processes and applications versus the preferred method of the present invention use of locally generated and/or stored energy provisioned on a on demand or as needed basis via ULTRAGRID™ that can provide analysis, monitoring and control of any and all available energy and potential energy needs for mission critical reliability with on demand or as needed basis.

Figure 43:
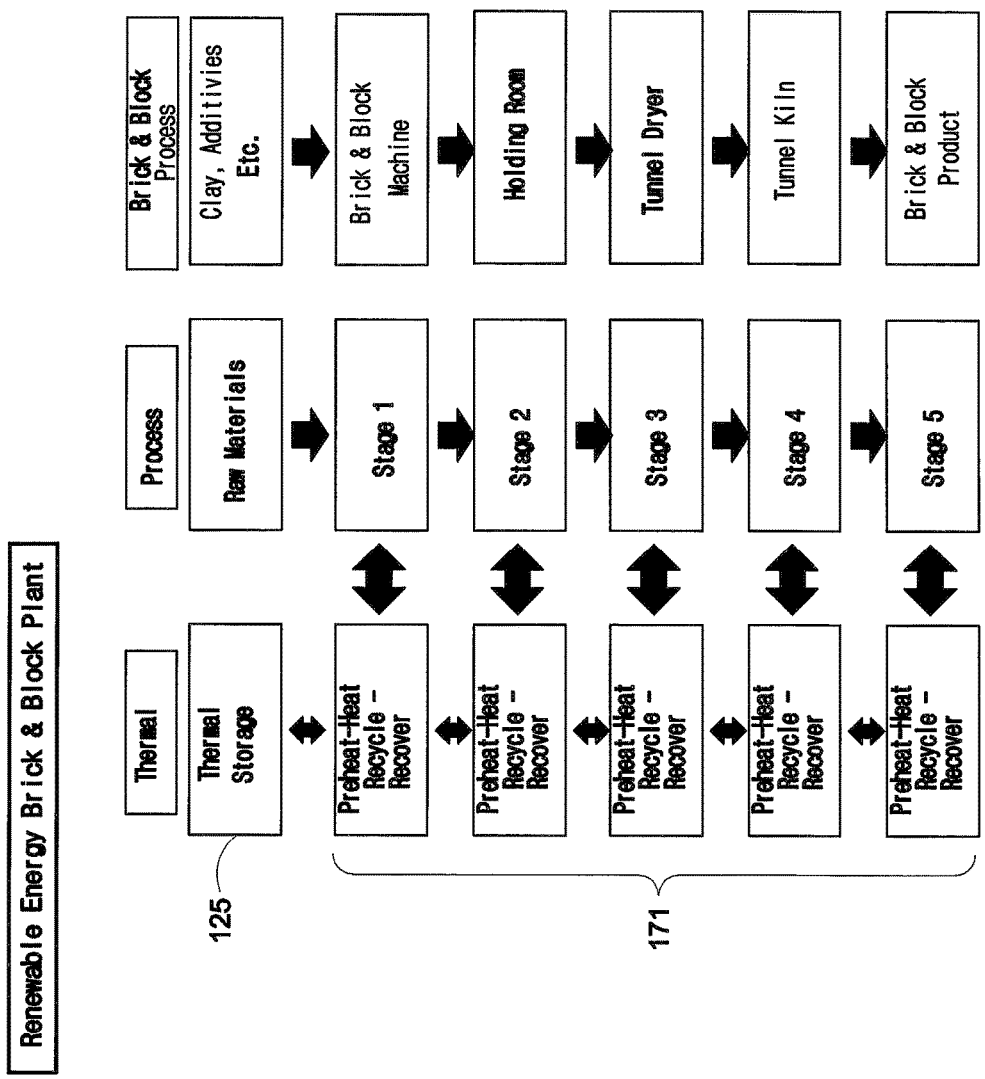
FIG. 43 is a block diagram of the brick and block plant system according to one or more embodiments of the present invention.

As depicted in FIG. 43, the preferred method of the present invention sets forth its primary advantage and novel method over prior art above applications and processes in its use of stored thermal energy for the application of thermal energy input for the purpose of firing the bricks in the respective kiln designs. The preferred method of the current invention uses waste by product materials from the desalination application with the process of mineral extraction thereof and pyrolysis processing or from brick and block manufacturing as fine and course aggregates for the concrete mixture. Fine and coarse aggregates make up the bulk of a brick mud mixture. Sand, natural gravel and crushed stone are used mainly for this purpose. Recycled aggregates (from construction, demolition and excavation waste) are increasingly used as partial replacements of natural aggregates, while a number of manufactured aggregates, including air-cooled blast furnace slag and bottom ash are also permitted. The presence of aggregate greatly increases the durability of concrete above that of cement, which is a brittle material in its pure state. Thus, concrete is a true composite material. Redistribution of aggregates after compaction often creates inhomogeneity due to the influence of vibration. This can lead to strength gradients.

The preferred method of the present invention sets forth its primary advantage and novel method over prior art above applications and processes in its use of thermal storage 125 for transfer of a fluid medium having high density and the ability for reuse of available energy and for reclamation and recycling of waste thermal energy for use, reuse, storage and/or conversion and storage.

For extruded bricks the clay is mixed with 10-15% water (stiff extrusion) or 20-25% water (soft extrusion). This mixture is forced through a die to create a long cable of material of the desired width and depth. This mass is then cut into bricks of the desired length by a wall of wires. Most structural bricks are made by this method as it produces hard, dense bricks, and suitable dies can produce perforations as well. The introduction of such holes reduces the volume of clay needed, and hence the cost. Hollow bricks are lighter and easier to handle, and have different thermal properties from solid bricks. The cut bricks are hardened by drying for 20 to 40 hours at 50 to 150° C. before being fired. The preferred method of the present invention communicates thermal energy from thermal storage for the purpose of providing thermal energy for preheating and heating the kiln for the hardening process by thermal communication for drying. The heat for drying is often waste heat from the kiln.

Bricks of concrete with sand aggregate can be made using a simple machine and a basic assembly line. A conveyor belt adds the mixture to a machine, which pours a measured amount of concrete into a form. The form is vibrated to remove bubbles, after which it is raised to reveal the wet bricks, spaced out on a plywood sheet. A small elevator then stacks these palettes, after which a forklift operator moves them to the brickyard for drying. The preferred method of the present invention communicates thermal energy from thermal storage for the purpose of providing thermal energy to the Stirling engines 116 for the purpose of generating electrical energy for the conveyer system, vibration machine, stacker and automated forklift, additionally thermal energy is communicated for preheating and heating the kiln for the drying and setting process.

An impervious and ornamental surface may be laid on brick either by salt glazing, in which salt is added during the burning process, or by the use of a "slip," which is a glaze material into which the bricks are dipped. This salt can be provided by previous desalination process using mineral extraction processes. Subsequent reheating in the kiln fuses the slip into a glazed surface integral with the brick base. The preferred method of the present invention communicates thermal energy from thermal storage for the purpose of providing thermal energy for preheating and heating the kiln for the glazing process.

The preferred method of the present invention sets forth its primary advantage and novel method over prior art above applications and processes with physically connected preheaters 213 and heating system elements 171, heat exchangers and regenerators 214 in its reclamation and recycling of waste thermal energy for use, reuse, storage and/or conversion and storage. This energy is used by thermal intensive applications such as with Stirling cycle engines which use a portion of the thermal energy for the generation of rotational energy, for use in such applications such as rotation work needed for input into a generator, pump or compressor. Waste heat recycled from this process may be used in a second level of reuse of available waste energy as thermal energy input into secondary lower heat threshold thermal intensive applications such as Stirling engine cycle 116 with a reduced temperature differential which would then use a portion of the thermal energy input for the generation of rotational energy for us in such applications such as rotation work needed for input into a generator, pump or compressor.

The present invention has additional advantage over prior art from additional applications and process cycles from remaining thermal energy and from storage to further encourage use and recycling of available energy for additional application and processes energy usage that may be added based on available input temperatures and return on investment cost versus an acceptable benefits to costs ratio, all remaining recyclable thermal energy may then be reclaimed and then communicated to appropriate temperature thermal storage systems 125, additionally thermal energy may be communicated to absorption cooling 121 to convert heat based thermal energy into cold based thermal energy to maintain a localized energy balance of available stored thermal energy. The preferred method of the present invention sets forth its primary advantage and novel method over prior art provides for normalized thermal energy balance that is essential for realized and optimized system wide use and reuse efficiencies concurrently monetizing all energy inputs for all intended applications and processes.

Single cycle and multiple cycle generation systems using steam turbines 176 or Stirling engines 116 as the primary thermal energy cycle and for additional benefit use of recycled thermal waste energy for additional thermal intensive applications such as additional Stirling engine stages may be used for additional benefit and enhanced efficiency.

The preferred method of the present invention reduces and potentially eliminates these issues with its energy generation, extremely high-volume energy storage system 110 and finally its ability to capture and recovery waste heat for the purpose of communication to energy storage and/or for conversion to cold to cool the system all of which ULTRA-GRID™ can provide analysis, monitoring and control of any and all available energy and potential energy needs.

The preferred method of the present invention has the additional benefit from connection to thermal energy storage for the purpose of preheat or primary thermal energy input which then offers the included ability to communicate recycled and recovered thermal energy for the purpose or thermal energy storage or reuse, this offers the advantage over prior art in it gains the system higher efficiency and reduces energy input requirements with inclusion of renewable energy generation and associated thermal and gas emissions processing and storage. The preferred method of the present invention has the additional advantage over prior art in its ability to reduce reliance on fossil fuels and non-green energy input sources.

The preferred method of the present invention advantage over prior art will be appreciated with energy input from localized energy storage that will provide energy thermal input to on demand energy generation provisioning versus prior art that required external grid energy generation input that's source generally was hundreds of miles away all points of failure and efficiencies and losses associated.

The preferred method of the present invention advantage over prior art from localized energy generation and enhanced duration of localized energy storage available only from the preferred method of the present invention use of thermal energy storage for generation of energy to facilitate fulfillment of present and future energy needs with on demand and when needed energy provisioning.

The preferred method of the present invention advantage versus prior art that required external grid energy generation input that's source generally was hundreds of miles away all points of failure and efficiencies and losses associated with prior art processes and applications versus the preferred method of the present invention use of locally generated and/or stored energy provisioned on a on demand or as needed basis via ULTRAGRID™ that can provide analysis, monitoring and control of any and all available energy and potential energy needs for mission critical reliability with on demand or as needed basis.

Figure 44:
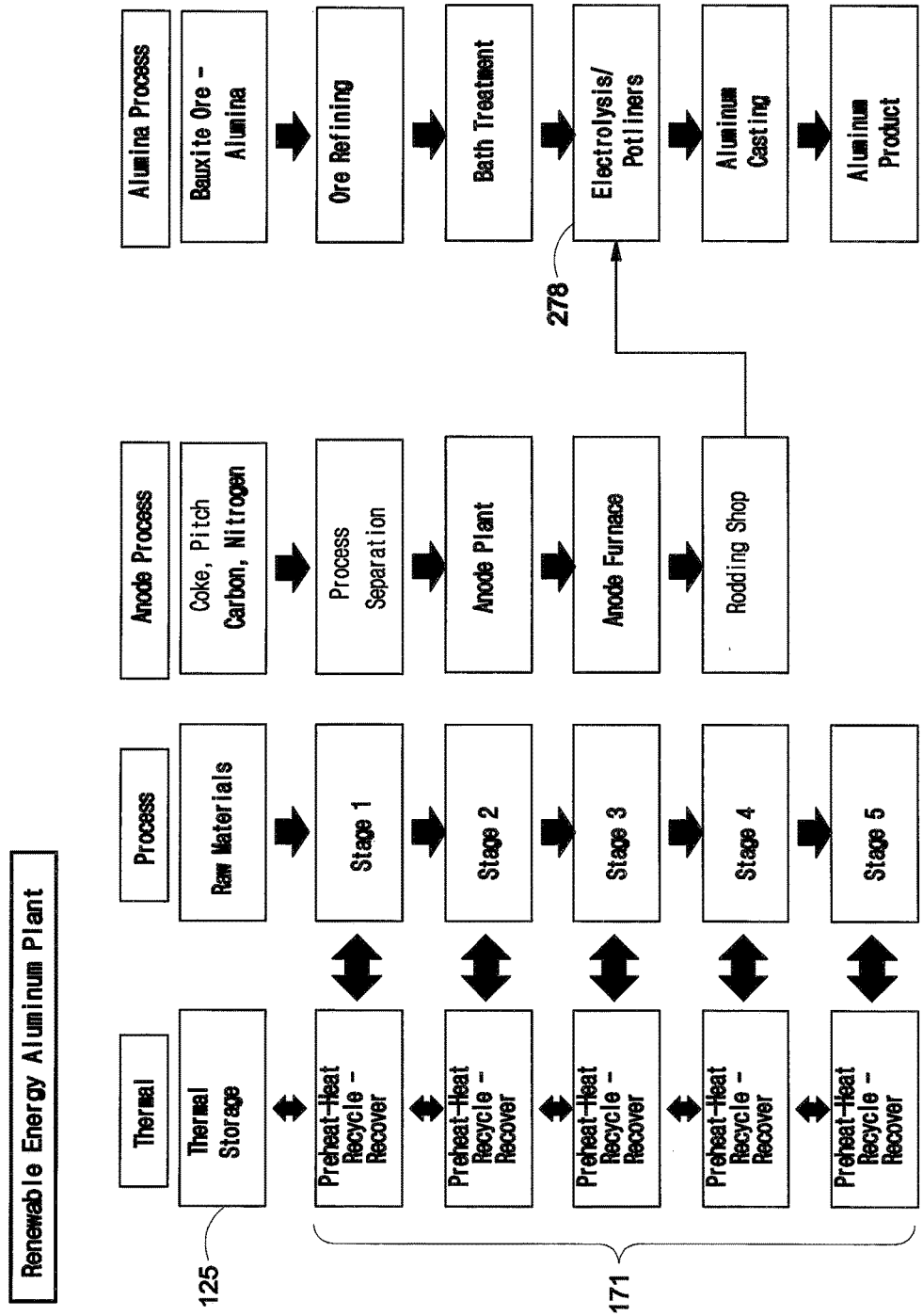
FIG. 44 is a block diagram of the aluminum plant system according to one or more embodiments of the present invention.

As depicted in FIG. 44, an aluminum smelter using the preferred method of the present invention has the advantage over prior art in its use of renewable energy thermal generation and storage input as a direct input for pre-heating and heating of alumina, enhancing system efficiency and reducing the electrical demands of entire aluminum smelting process. Alumina is dissolved in molten cryolite, typically at 960° C., although the formation of CO is thermodynamically favored at this temperature, the presence of considerable overvoltage (difference between reversible and polarization potentials) changes the thermodynamic equilibrium and a mixture of CO and CO2 is produced. Carbon anodes are typically consumed during electrolysis, prior art generally resulted in high energy consumption and excessive greenhouse gas emissions in smelting plants.

Additional advantage of the present invention over prior art is the incorporation of carbon dioxide, carbon monoxide capture and sequestering technologies to allow captured gases and elements for reuse as the primary carbon or supplemental carbon base input as the preferred method of the present invention of manufacturing of plastics and steel manufacturing. This improvement over prior art provides a sustainable environmental friendly method for energy efficient aluminum smelting using renewable energy 112.

The preferred method of the present invention sets forth its primary advantage and novel method over prior art above applications and processes with physically connected preheaters 213 and heating system elements 171, heat exchangers and regenerators 214 in its reclamation and recycling of waste thermal energy for use, reuse, storage and/or conversion and storage. This energy is used by thermal intensive applications such as with Stirling cycle engines which use a portion of the thermal energy for the generation of rotational energy, for use in such applications such as rotation work needed for input into a generator, pump or compressor. Waste heat recycled from this process may be used in a second level of reuse of available waste energy as thermal energy input into secondary lower heat threshold thermal intensive applications such as Stirling engine cycle 116 with a reduced temperature differential which would then use a portion of the thermal energy input for the generation of rotational energy for us in such applications such as rotation work needed for input into a generator, pump or compressor.

The present invention has additional advantage over prior art from additional applications and process cycles from remaining thermal energy and from storage to further encourage use and recycling of available energy for additional application and processes energy blast usage that may be added based on available input temperatures and return on investment cost versus an acceptable benefits to costs ratio, all remaining recyclable thermal energy may then be reclaimed and then communicated to appropriate temperature thermal storage systems 125, additionally thermal energy may be communicated to absorption cooling 121 to convert heat based thermal energy into cold based thermal energy to maintain a localized energy balance of available stored thermal energy. The preferred method of the present invention sets forth its primary advantage and novel method over prior art provides for normalized thermal energy balance that is essential for realized and optimized system wide use and reuse efficiencies concurrently monetizing all energy inputs for all intended applications and processes.

A major environmental hazard associated with integrated steel mills is the pollution produced in the manufacture of coke, which is an essential intermediate product in the reduction of iron ore in a blast furnace. The preferred method of the present invention advantage over prior art is the capture and sequestering of gases and elements from the steel making process. Such gases will be reused, sequestered or reduced to manageable levels. Integrated mills 276 may also adopt some of the processes used in mini-mills, such as arc furnaces and direct casting, to reduce production costs. World integrated steel production capacity is at or close to world demand, so competition between suppliers results in only the most efficient producers remaining viable.

Additional benefit of the present invention can be realized with the inclusion of a mini mill 270 which is traditionally a secondary steel producer. Benefits from the renewable energy thermal generation and storage can offset energy prior art normally used for preheating and thermal energy input of the present invention additionally allows maintaining the ability of the plant to idle production when demand is lower. Usually a mini mill obtains most of its iron from scrap steel, recycled from used automobiles and equipment or byproducts of manufacturing. Direct Reduced Iron (DRI) is sometimes used with scrap, to help maintain desired chemistry of the steel, though usually DRI is too expensive to use as the primary raw steelmaking material.

Figure 45:
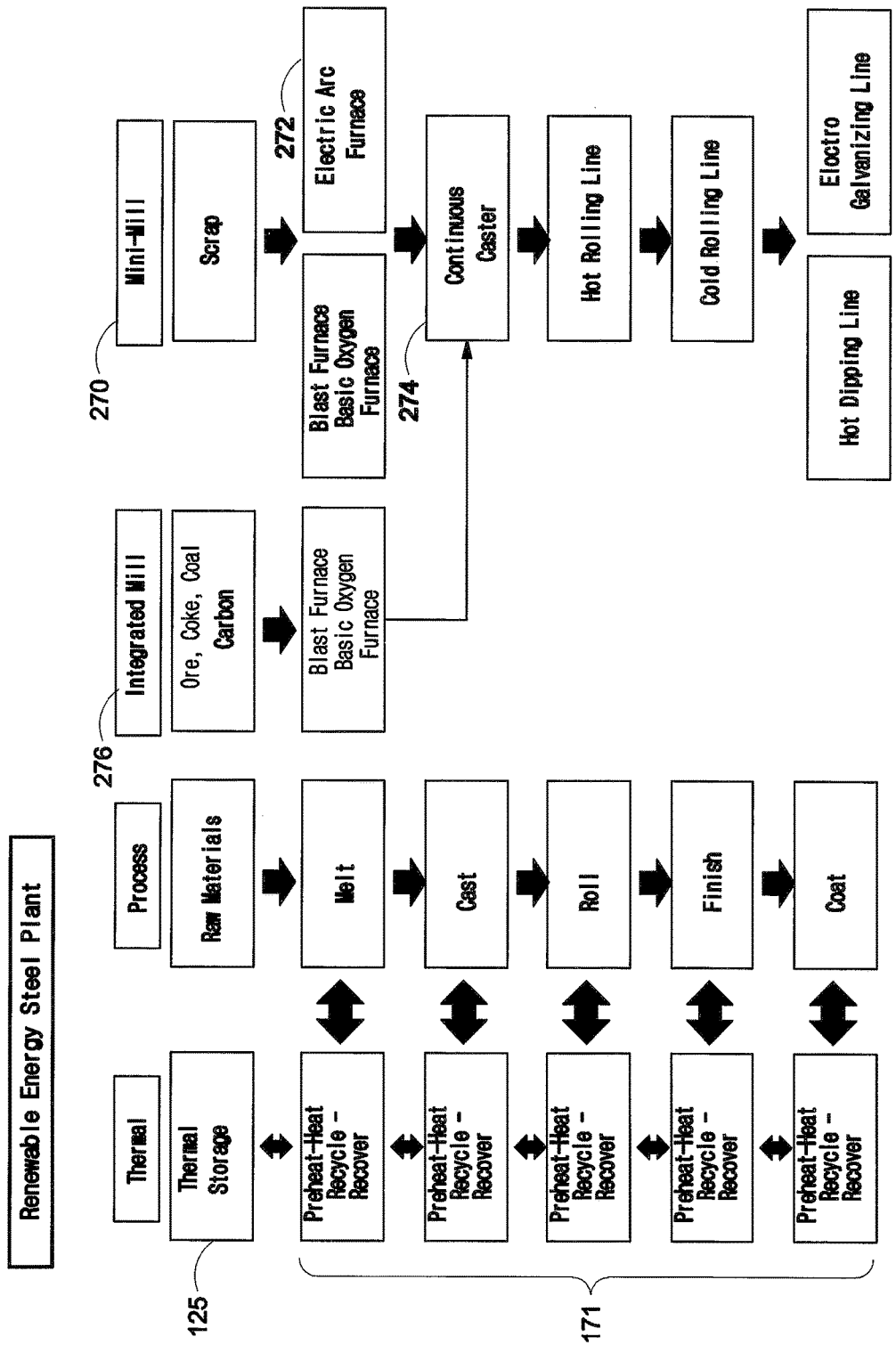
FIG. 45 is a block diagram of the steel plant system according to one or more embodiments of the present invention.

As illustrated in FIG. 45, a typical mini-mill will have an electric arc furnace for scrap melting, a ladle furnace or vacuum furnace for precision control of chemistry, a strip or billet continuous caster 274 for converting molten steel to solid form, a reheat furnace 115 and a rolling mill. The mini mill concept 270 was adapted to production of bar products only, such as concrete reinforcing bar, flats, angles, channels, pipe, and light rails. The preferred method of the present invention advantage over prior art is the capture and sequestering of gases and elements from the steel making process. Such gases will be reused, sequestered or reduced to manageable levels. With successful introduction of the direct strip casting process has made mini mill 270 production of strip feasible. The preferred method of the present invention introduces an integrated mini mill plant 276 that may specialize, for example, with making coils of rod for wire-drawing use, or pipe, or in special sections for transportation and agriculture.

Typical capacities of mini mills vary; some plants may make as much as 5,000,000 tons per year or more, a typical size is in the range 200,000 to 500,000 tons per year, and some specialty plants may make as little as 50,000 tons per year of finished product. Since the electric arc furnace 272 can be easily started and stopped on a regular basis, the preferred method of the present invention would also allow operations to follow higher renewable energy generation months, it would also allow mini mill 270 to follow the market demand for their products easily, operating on 24 hour schedules when demand is high and cutting back production when sales are lower.

The preferred method of the present invention sets forth its primary advantage and novel method over prior art above applications and processes with physically connected preheaters 213 and heating system elements 171, heat exchangers and regenerators 214 in its reclamation and recycling of waste thermal energy for use, reuse, storage and/or conversion and storage. This energy is used by thermal intensive applications such as with Stirling cycle engines which use a portion of the thermal energy for the generation of rotational energy, for use in such applications such as rotation work needed for input into a generator, pump or compressor. Waste heat recycled from this process may be used in a second level of reuse of available waste energy as thermal energy input into secondary lower heat threshold thermal intensive applications such as Stirling engine cycle 116 with a reduced temperature differential which would then use a portion of the thermal energy input for the generation of rotational energy for us in such applications such as rotation work needed for input into a generator, pump or compressor.

The present invention has additional advantage over prior art from additional applications and process cycles from remaining thermal energy and from storage to further encourage use and recycling of available energy for additional application and processes energy usage that may be added based on available input temperatures and return on investment cost versus an acceptable benefits to costs ratio, all remaining recyclable thermal energy may then be reclaimed and then communicated to appropriate temperature thermal storage systems 125, additionally thermal energy may be communicated to absorption cooling 121 to convert heat based thermal energy into cold based thermal energy to maintain a localized energy balance of available stored thermal energy. The preferred method of the present invention sets forth its primary advantage and novel method over prior art provides for normalized thermal energy balance that is essential for realized and optimized system wide use and reuse efficiencies concurrently monetizing all energy inputs for all intended applications and processes.

The preferred method of the present invention sets forth its primary advantage and novel method over prior art above applications and processes with physically connected preheaters 213 and heating system elements 171, heat exchangers and regenerators 214 in its reclamation and recycling of waste thermal energy for use, reuse, storage and/or conversion and storage. This energy is used by thermal intensive applications such as with Stirling cycle engines which use a portion of the thermal energy for the generation of rotational energy, for use in such applications such as rotation work needed for input into a generator, pump or compressor. Waste heat recycled from this process may be used in a second level of reuse of available waste energy as thermal energy input into secondary lower heat threshold thermal intensive applications such as Stirling engine cycle 116 with a reduced temperature differential which would then use a portion of the thermal energy input for the generation of rotational energy for us in such applications such as rotation work needed for input into a generator, pump or compressor.

The present invention has additional advantage over prior art from additional applications and process cycles from remaining thermal energy and from storage to further encourage use and recycling of available energy for additional application and processes energy usage that may be added based on available input temperatures and return on investment cost versus an acceptable benefits to costs ratio, all remaining recyclable thermal energy may then be reclaimed and then communicated to appropriate temperature thermal storage systems 125, additionally thermal energy may be communicated to absorption cooling 121 to convert heat based thermal energy into cold based thermal energy to maintain a localized energy balance of available stored thermal energy. The preferred method of the present invention sets forth its primary advantage and novel method over prior art provides for normalized thermal energy balance that is essential for realized and optimized system wide use and reuse efficiencies concurrently monetizing all energy inputs for all intended applications and processes.

The primary goal of the preferred method of the present invention of production of polymer and associated components is to use its advantage over prior art with the inclusion of renewable energy generation and its energy storage system 110 to reduce system greenhouse gases while reducing the use of these fuels by replacing up to half of the mass of the petroleum-based product with captured and sequestered CO2. Converting captured and sequestered CO2 into products such as chemicals, plastics, fuels, building materials, and other commodities is both an environmental friendly method and economically advantageous.

The preferred method of the present invention sets forth its primary advantage and novel method over prior art above applications and processes with physically connected preheaters 213 and heating system elements 171, heat exchangers and regenerators 214 in its reclamation and recycling of waste thermal energy for use, reuse, storage and/or conversion and storage. This energy is used by thermal intensive applications such as with Stirling cycle engines which use a portion of the thermal energy for the generation of rotational energy, for use in such applications such as rotation work needed for input into a generator, pump or compressor. Waste heat recycled from this process may be used in a second level of reuse of available waste energy as thermal energy input into secondary lower heat threshold thermal intensive applications such as Stirling engine cycle 116 with a reduced temperature differential which would then use a portion of the thermal energy input for the generation of rotational energy for us in such applications such as rotation work needed for input into a generator, pump or compressor.

The present invention has additional advantage over prior art from additional applications and process cycles from remaining thermal energy and from storage to further encourage use and recycling of available energy for additional application and processes energy usage that may be added based on available input temperatures and return on investment cost versus an acceptable benefits to costs ratio, all remaining recyclable thermal energy may then be reclaimed and then communicated to appropriate temperature thermal storage systems 125, additionally thermal energy may be communicated to absorption cooling 121 to convert heat based thermal energy into cold based thermal energy to maintain a localized energy balance of available stored thermal energy. The preferred method of the present invention sets forth its primary advantage and novel method over prior art provides for normalized thermal energy balance that is essential for realized and optimized system wide use and reuse efficiencies concurrently monetizing all energy inputs for all intended applications and processes.

The preferred method of the present invention sets forth its primary advantage and novel method over prior art above applications and processes with physically connected preheaters 213 and heating system elements 171, heat exchangers and regenerators 214 in its reclamation and recycling of waste thermal energy for use, reuse, storage and/or conversion and storage. This energy is used by thermal intensive applications such as with Stirling cycle engines which use a portion of the thermal energy for the generation of rotational energy, for use in such applications such as rotation work needed for input into a generator, pump or compressor. Waste heat recycled from this process may be used in a second level of reuse of available waste energy as thermal energy input into secondary lower heat threshold thermal intensive applications such as Stirling engine cycle 116 with a reduced temperature differential which would then use a portion of the thermal energy input for the generation of rotational energy for us in such applications such as rotation work needed for input into a generator, pump or compressor.

The present invention has additional advantage over prior art from additional applications and process cycles from remaining thermal energy and from storage to further encourage use and recycling of available energy for additional application and processes energy usage that may be added based on available input temperatures and return on investment cost versus an acceptable benefits to costs ratio, all remaining recyclable thermal energy may then be reclaimed and then communicated to appropriate temperature thermal storage systems 125, additionally thermal energy may be communicated to absorption cooling 121 to convert heat based thermal energy into cold based thermal energy to maintain a localized energy balance of available stored thermal energy. The preferred method of the present invention sets forth its primary advantage and novel method over prior art provides for normalized thermal energy balance that is essential for realized and optimized system wide use and reuse efficiencies concurrently monetizing all energy inputs for all intended applications and processes.

Existing prior art methods of storing, conducting, transforming, and directing energy are inadequate to produce a convenient multiple firing weapon. Existing directed-energy weapon systems waste much energy as heat, requiring still-bulky cooling equipment to avoid overheating damage. Air cooling can yield an unacceptable delay between shots. These problems, which severely limit directed-energy weapon practicality at present, might be offset by: Cheap, high-temperature superconductors to make the weapon more efficient. More convenient high-volume energy storage and energy generation such as the preferred method of the present invention addresses both of these prior art deficiencies which includes the primary issue of cooling which the present invention communicates from its stored energy system direct cooling capability and efficiencies communicating waste heat generated by firing the device to thermal energy storage for reuse or conversion from heat energy to cold energy through use of the absorption cooling system 121 to produce more stored cooling capacity.

The preferred method of the present invention sets forth its primary advantage and novel method over prior art above applications and processes with physically connected preheaters 213 and heating system elements 171, heat exchangers and regenerators 214 in its reclamation and recycling of waste thermal energy for use, reuse, storage and/or conversion and storage. This energy is used by thermal intensive applications such as with Stirling cycle engines which use a portion of the thermal energy for the generation of rotational energy, for use in such applications such as rotation work needed for input into a generator, pump or compressor. Waste heat recycled from this process may be used in a second level of reuse of available waste energy as thermal energy input into secondary lower heat threshold thermal intensive applications such as Stirling engine cycle 116 with a reduced temperature differential which would then use a portion of the thermal energy input for the generation of rotational energy for us in such applications such as rotation work needed for input into a generator, pump or compressor.

The present invention has additional advantage over prior art from additional applications and process cycles from remaining thermal energy and from storage to further encourage use and recycling of available energy for additional application and processes energy usage that may be added based on available input temperatures and return on investment cost versus an acceptable benefits to costs ratio, all remaining recyclable thermal energy may then be reclaimed and then communicated to appropriate temperature thermal storage systems 125, additionally thermal energy may be communicated to absorption cooling 121 to convert heat based thermal energy into cold based thermal energy to maintain a localized energy balance of available stored thermal energy. The preferred method of the present invention sets forth its primary advantage and novel method over prior art provides for normalized thermal energy balance that is essential for realized and optimized system wide use and reuse efficiencies concurrently monetizing all energy inputs for all intended applications and processes.

The preferred method of the present invention uses stored thermal energy for required thermal inputs and reclamation into additional processes such as absorption cooling, distillation, fractional distillation and other thermal intensive processes to include thermal storage thereby increasing efficiency of input energy and monetizing vertical market revenues. Low level thermal waste energy in prior art used cooling towers 246 whereas the present invention communicates low level thermal waste energy to preheat enzyme, facilitate microorganisms' growth, and preheating grain softening storage systems.

The preferred method of the present invention use and reuse of energy can and will affect every aspect of the above to enhance and monetize energy and material inputs as an integrated solution over all prior arts inefficient design and developments by generation, production, monitoring, controlling all factors influencing fermentation and inclusion of a machine learning system the system can perform and enhance itself past any prior art attempts and designs. The preferred method of the present invention use artificial intelligence controlled and stabilized environmental control system using adaptive metrics, biometrics and thermal imaging sensoring for active analysis, monitoring for influencing numerous factors, including contact time, temperature, pH, nature and composition of the medium, dissolved O2, dissolved CO2, operational system (e.g. batch, fed-batch, continuous), feeding with precursors, mixing (cycling through varying environments), and shear rates in the fermenter. Variation in these factors may affect: the rate of fermentation; the product spectrum and yield; the organoleptic properties of the product (appearances, taste, smell, and texture), the generation of toxins; nutritional quality; and other physic-chemical properties.

With increasing attention and effort to conserving energy, many methods have been proposed that avoid distillation altogether for dehydration. Of these methods, a third method has emerged and has been adopted by the majority of modern ethanol plants. This new process uses molecular sieves to remove water from fuel ethanol. In this process, ethanol vapor under pressure passes through a bed of molecular sieve beads. The bead's pores are sized to allow absorption of water while excluding ethanol. After a period of time, the bed is regenerated under vacuum or in the flow of inert atmosphere (e.g. N2) to remove the absorbed water. A plurality of beds are often used so that one is available to absorb water while the others are being regenerated. This dehydration technology can account for large energy saving when compared to earlier azeotropic distillation.

Typical plants produce ethanol by processing corn with current technology in which a bushel of corn yields approximately 2.5-2.8 gallons of ethanol. The preferred method of the present invention uses renewable energy input to thermal energy storage to provide base electrical and thermal energy output and to act as an energy backup when needed. The preferred method of the present invention uses renewable energy input in combination of wet mill process and cellulosic processes use of multiple feedstock input to produce ethanol and open valuable vertical markets based on the co-products.

The preferred method of the present invention combines drying, dried distillers' grains, or EDDG. Addition of soluble syrup creates modified distillers' grains with solubles, or MDGS. When recycling CO2 emission and using bioreactors to consume said emissions and including inputs for plankton growth which is then dried and combined with DDGS to form a highly enriched DDGS over prior art. This creates an environmental friendly system which has enhanced value outputs from combined processes and efficient use of inputs and lowered or eliminated emissions for the better good of the entire process and reduced environmental impact.

Typically, biomass is received by rail and by truck, at which point inspection, weighing and with acceptance the unloading of the biomass in a receiving building and then transfer it to storage bins and/or areas. On the grain receiving system, a dust collection system limits particulate emissions. Truck scales and a rail car scale weigh delivered biomass. Biomass unloading and storage systems include independent unloading legs and concrete and steel storage bins. From its storage location, corn is conveyed to scalpers to remove debris before it is transferred to hammermills or grinders where it is ground into a flour, or "meal."

The meal is conveyed into slurry tanks for enzymatic processing. The meal is mixed with water and enzymes and heated to break the ground grain into a fine slurry. The slurry is then ducted through pressure vessels and steam flashed in a flash vessel. This liquefied meal, now called "mash," reaches a temperature of approximately 210° F., which reduces or eliminates bacterial build-up. The preferred method of the present invention will communicate thermal energy from thermal energy storage doe the purpose of using thermal heating of the insulated vessel for an established period of time to further soften the mash and for enhanced sterilization of foreign bacteria and enzymes.

The sterilized mash is then pumped to a liquefaction tank where additional enzymes are added. This cooked mash continues through liquefaction tanks and is pumped into one of the fermenters, where propagated yeast is added, to begin a batch fermentation process. The fermentation process converts the cooked mash into carbon dioxide and beer, which contains ethanol as well as all the solids from the original feedstock. Next, a batch fermentation process in which the mash is kept in one fermentation tank for approximately two days, is utilized. The preferred method of the present invention will communicate thermal energy from thermal energy storage on an as needed basis for the purpose of fermentation thermal energy requirements. Circulation through external plate and frame heat exchangers, designed for high solids content and easy cleaning, keeps the mash at the proper temperature.

Following batch fermentation when complete, beer is pumped to the beer well and then to the distillation column to vaporize and separate the alcohol from the mash. The preferred method of the present invention will communicate thermal energy from thermal energy storage on an as needed basis. The distillation results in a 96%, or 190-proof, alcohol. This alcohol is then transported through a rectifier column system, a side stripper and a molecular sieve system where it is dehydrated to produce 200-proof anhydrous ethanol. The 200-proof alcohol and up to 5% denaturant constitute ethanol ready for sale.

The residue corn mash from the distillation stripper, called stillage, is pumped into one of several decanter type centrifuges for dewatering. The water, or thin stillage, is then pumped from the centrifuges back to mashing as backset or to an evaporator where it is dried into a thick syrup. The solids that exit the centrifuges, known as "wet cake," are conveyed to the wet cake storage pad or the thermal system heated rotary dryer for removal of residual water. Syrup is added to the wet cake as it enters the dryer, where moisture is removed. The preferred method of the present invention will communicate thermal energy from thermal energy storage on an as needed basis. The final result of the process is the production of feed grains, or FG.

The preferred method of the present invention comprises a microalgae bioreactor 282 and microorganism reactor production system is the primary method that is known and generally accepted as the most effective closed and isolated environment for production and culturing of microalgae and organisms. Prior art makes use of ocean, sea and freshwater based bioreactors and other various prior art microalgae and organism reactor growth systems, these aquatic based systems generally use a fresh water and/or brine and/or sea water pumped from surrounding water sources for water input, transfer and fluid circulation.

The preferred method of the present invention uses a photobioreactor 284 with light input, appropriate nutrient inputs and recycled CO2 from the fermentation process for the enhanced production of plankton, preferably phytoplankton. The bacteria are then used as input for the microorganism reactor for the production of plankton, preferably zooplankton. The zooplankton can then be harvested, dehydrated and/or dried and combined with FG to form a higher quality and nutrient enhanced EFG product that higher value and use than prior art while lowering the CO2 emissions of the ethanol plant. The preferred method of the present invention will communicate thermal energy from thermal energy storage for the purpose of assisting and maintaining temperatures proper for plankton production and health.

Figure 46:
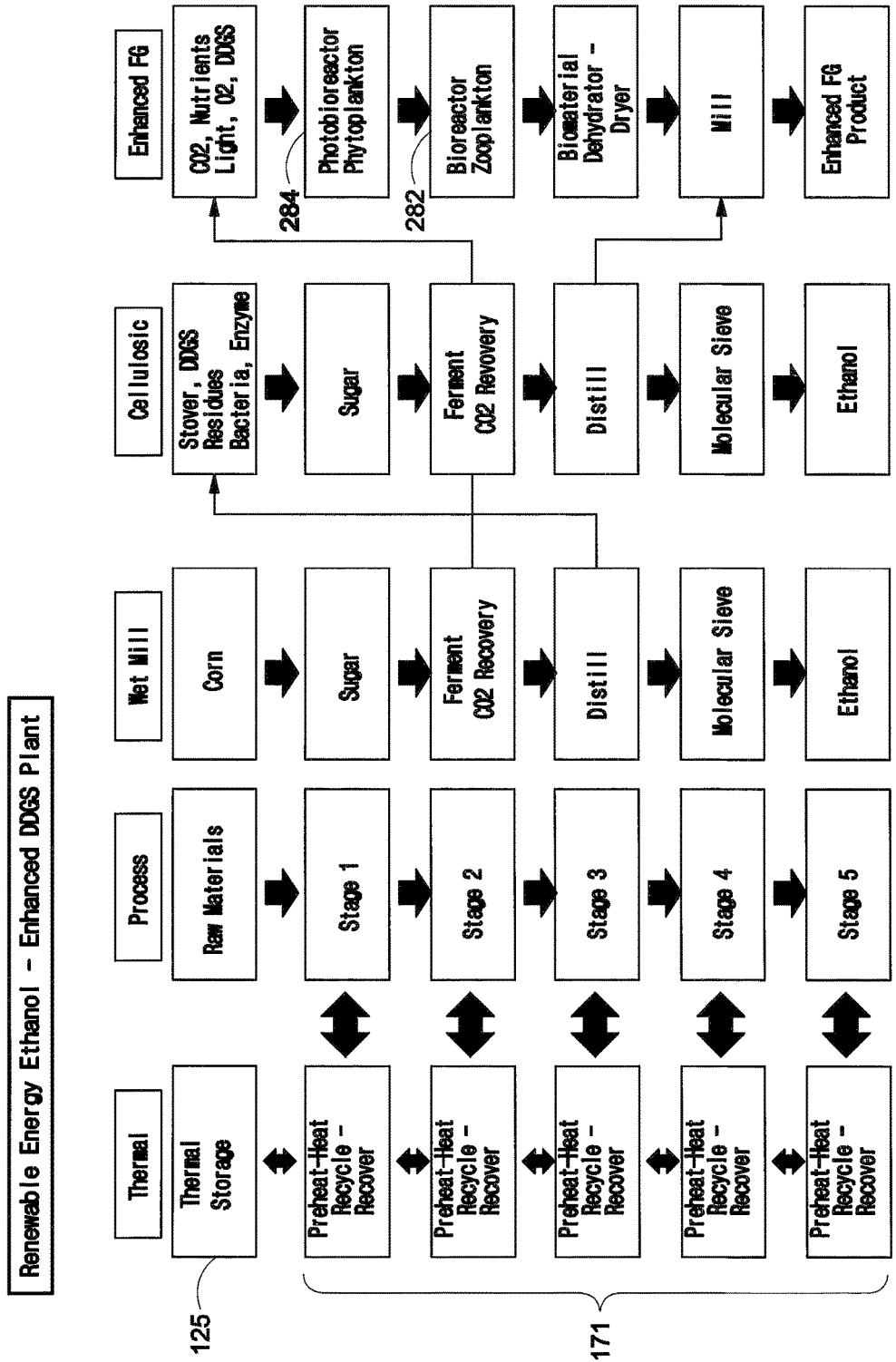
FIG. 46 is a block diagram of the renewable energy ethanol—enhanced DDGS plant system according to one or more embodiments of the present invention.

As depicted in FIG. 46, the preferred embodiment comprises an ethanol production facilities production of distillers' grains as a co-product that is generated after the grains have been fermented by yeast. In the fermentation process, nearly all of the starch in the grain is converted to ethanol and carbon dioxide, while the remaining nutrients (proteins, fats, minerals and vitamins) undergo a three-fold concentration to yield enhanced modified feed grains, or EMFG, or, after further enhanced drying, enhanced feed grains, or EFG. Addition of soluble syrup creates modified feed with solubles, or EMFGs. Each bushel of corn yields approximately 15 pounds of distillers' grains in a wet mill process. Distillers grains are an economical partial replacement for corn, soybean and dicalcium phosphate in livestock and poultry feeds. Distillers grains are derived from corn and contain a nutrient profile that has been proven to have beneficial properties for the diets of dairy and beef cattle, poultry and swine. The high digestibility and net energy content of EFG and EMFGS, compared to other feed ingredients such as soybean meal, canola meal and brewers spent grains, as well as their high fat content, results in greater milk production by dairy cattle. For beef cattle, the improved rumen health, energy effect of the fiber and payability has been shown in feedlot studies to result in faster and more efficient weight gains.

Enhanced FG or EFG with its reduced moisture content will have a prolonged shelf life. Carbon dioxide, or CO2, is also a by-product of our wet-mill ethanol production process needed for plankton growth thereby reducing the carbon foot print and converting a waste gas into an input for a more valuable vertical revenue stream. While CO2 produced is typically of sufficient quality to be collected and sold, recycling efforts to scrub the CO2 during the production process and sequester for enhanced EFG enrichment process and storage for vertical markets.

The preferred method of the present invention sets forth its primary advantage and novel method over prior art above applications and processes with physically connected preheaters 213 and heating system elements 171, heat exchangers and regenerators 214 in its reclamation and recycling of waste thermal energy for use, reuse, storage and/or conversion and storage. This energy is used by thermal intensive applications such as with Stirling cycle engines which use a portion of the thermal energy for the generation of rotational energy, for use in such applications such as rotation work needed for input into a generator, pump or compressor. Waste heat recycled from this process may be used in a second level of reuse of available waste energy as thermal energy input into secondary lower heat threshold thermal intensive applications such as Stirling engine cycle 116 with a reduced temperature differential which would then use a portion of the thermal energy input for the generation of rotational energy for us in such applications such as rotation work needed for input into a generator, pump or compressor.

The present invention has additional advantage over prior art from additional applications and process cycles from remaining thermal energy and from storage to further encourage use and recycling of available energy for additional application and processes energy usage that may be added based on available input temperatures and return on investment cost versus an acceptable benefits to costs ratio, all remaining recyclable thermal energy may then be reclaimed and then communicated to appropriate temperature thermal storage systems 125, additionally thermal energy may be communicated to absorption cooling 121 to convert heat based thermal energy into cold based thermal energy to maintain a localized energy balance of available stored thermal energy. The preferred method of the present invention sets forth its primary advantage and novel method over prior art provides for normalized thermal energy balance that is essential for realized and optimized system wide use and reuse efficiencies concurrently monetizing all energy inputs for all intended applications and processes.

With increasing attention and effort to conserving energy, many methods have been proposed that avoid distillation altogether for dehydration. Of these methods, a third method has emerged and has been adopted by the majority of modern ethanol plants. This new process uses molecular sieves to remove water from fuel ethanol. In this process, ethanol vapor under pressure passes through a bed of molecular sieve beads. The bead's pores are sized to allow absorption of water while excluding ethanol. After a period of time, the bed is regenerated under vacuum or in the flow of inert atmosphere (e.g. N2) to remove the absorbed water. A plurality of beds are often used so that one is available to absorb water while the others are being regenerated. This dehydration technology can account for large energy saving when compared to earlier azeotropic distillation.

Typical plants produce ethanol by processing corn with current technology in which a bushel of corn yields approximately 2.5-2.8 gallons of ethanol. The preferred method of the present invention uses renewable energy input to thermal energy storage to provide base electrical and thermal energy output and to act as an energy backup when needed. The preferred method of the present invention uses renewable energy input in combination of wet mill process and cellulosic processes use of multiple feedstock input to produce ethanol and open valuable vertical markets based on the co-products.

The preferred method of the present invention combines drying, dried distillers' grains, or EDDG. Addition of soluble syrup creates modified distillers' grains with solubles, or MDGS. When recycling CO2 emission and using bioreactors to consume said emissions and including inputs for plankton growth which is then dried and combined with DDGS to form a highly enriched DDGS over prior art. This creates an environmental friendly system which has enhanced value outputs from combined processes and efficient use of inputs and lowered or eliminated emissions for the better good of the entire process and reduced environmental impact.

Typically, biomass is received by rail and by truck, at which point inspection, weighing and with acceptance the unloading of the biomass in a receiving building and then transfer it to storage bins and/or areas. On the grain receiving system, a dust collection system limits particulate emissions. Truck scales and a rail car scale weigh delivered biomass. Biomass unloading and storage systems include independent unloading legs and concrete and steel storage bins. From its storage location, corn is conveyed to scalpers to remove debris before it is transferred to hammermills or grinders where it is ground into a flour, or "meal."

The preferred method of the present invention sets forth its primary advantage and novel method over prior art above applications and processes with physically connected preheaters 213 and heating system elements 171, heat exchangers and regenerators 214 in its reclamation and recycling of waste thermal energy for use, reuse, storage and/or conversion and storage. This energy is used by thermal intensive applications such as with Stirling cycle engines which use a portion of the thermal energy for the generation of rotational energy, for use in such applications such as rotation work needed for input into a generator, pump or compressor. Waste heat recycled from this process may be used in a second level of reuse of available waste energy as thermal energy input into secondary lower heat threshold thermal intensive applications such as Stirling engine cycle 116 with a reduced temperature differential which would then use a portion of the thermal energy input for the generation of rotational energy for us in such applications such as rotation work needed for input into a generator, pump or compressor.

The present invention has additional advantage over prior art from additional applications and process cycles from remaining thermal energy and from storage to further encourage use and recycling of available energy for additional application and processes energy usage that may be added based on available input temperatures and return on investment cost versus an acceptable benefits to costs ratio, all remaining recyclable thermal energy may then be reclaimed and then communicated to appropriate temperature thermal storage systems 125, additionally thermal energy may be communicated to absorption cooling 121 to convert heat based thermal energy into cold based thermal energy to maintain a localized energy balance of available stored thermal energy. The preferred method of the present invention sets forth its primary advantage and novel method over prior art provides for normalized thermal energy balance that is essential for realized and optimized system wide use and reuse efficiencies concurrently monetizing all energy inputs for all intended applications and processes.

The preferred method of the present invention additionally benefits from the use of cold energy storage 124 and beneficial use of waste heat for generation of additional cold input for energy storage versus prior art use of cooling towers 246, evaporators 244 and economizers that are greatly affected by datacenter temperatures and outside ambient temperatures exasperating inefficiencies reduced cooling capacity during warmer external air temperatures.

The preferred method of the present invention advantage over prior art will be appreciated with input from cold storage that will allow passive cooling within the floors and walls, provide cold energy thermal input to provide input to heat exchangers and blower fans to cool the airspace within the datacenter and assist in control of datacenter humidity.

The preferred method of the present invention advantage over prior art will be appreciated with input from cold storage that is used to provide cold thermal energy input to cool the general facility open areas of the datacenter and between the rows and isles of rack and cabinet storage systems via cold energy storage 124 provided input to an a-frame coil or the preferred method of the present invention uses an ALECC (air leveraged efficient coolant coil) fan blown cooled air conditioning, this process and included application will also allow passive cooling within the floors and walls.

Prior art datacenter applications and processes typically were never fully or partially automated due to its inherent design and deployment flaws. The preferred method of the present invention uses metrics, biometrics and thermal imaging technologies of analysis, monitoring and control of the carbon fiber making process using amalgamated with artificial intelligence and automation including robotics to reduce or eliminate injuries and enhanced uptime, productivity and enhanced volume.

The preferred method of the present invention sets forth its primary advantage and novel method over prior art above applications and processes with physically connected heat exchangers and regenerators 214 in its reclamation and recycling of waste thermal energy for use, reuse, storage and/or conversion and storage. This energy is used by thermal intensive applications such as with Stirling cycle engines which use a portion of the thermal energy for the generation of rotational energy, for use in such applications such as rotation work needed for input into a generator, pump or compressor. Waste heat recycled from this process may be used in a second level of reuse of available waste energy as thermal energy input into secondary lower heat threshold thermal intensive applications such as Stirling engine cycle 116 with a reduced temperature differential which would then use a portion of the thermal energy input for the generation of rotational energy for us in such applications such as rotation work needed for input into a generator, pump or compressor.

The preferred method of the present invention advantage versus prior art with inclusion of ULTRAGRID™ can provide analysis, monitoring and control of any and all available energy and potential energy needs for mission critical reliability with on demand or as needed basis.

The present invention has additional advantage over prior art from additional applications and process cycles from remaining thermal energy and from storage to further encourage use and recycling of available energy for additional application and processes energy usage that may be added based on available input temperatures and return on investment cost versus an acceptable benefits to costs ratio, all remaining recyclable thermal energy may then be reclaimed and then communicated to appropriate temperature thermal storage systems 125, additionally thermal energy may be communicated to absorption cooling 121 to convert heat based thermal energy into cold based thermal energy to maintain a localized energy balance of available stored thermal energy. The preferred method of the present invention sets forth its primary advantage and novel method over prior art provides for normalized thermal energy balance that is essential for realized and optimized system wide use and reuse efficiencies concurrently monetizing all energy inputs for all intended applications and processes.

The preferred method of the present invention uses adaptive metrics, biometrics and thermal imaging sensory analysis including additional input sensors for analysis, monitoring and control with integrated robotic automation and maintained symbiotic artificial intelligence-controlled system providing a balanced environmental friendly based facility ecosystem.

The preferred method of the present invention advantage over prior art using the above methods allows automations of biometrics, metrics and thermal analysis to isolate, monitor and track specific animals, using a combination metrics, biometrics, thermal sensor analysis for specific animals can be monitored, charted and tracked along animal lifespan, unlike prior art using tags and other mediums, the preferred method of the present invention's use of biometrics, metrics and thermal analysis allows for quick and easy identification and analyzation by artificial intelligence controlled systems for highly defined regimen for a customized and individualized animal specific care plan and accompanying diet with automated responses and alterations to feeds, nutrient supplements for health monitoring, milking process accounting and quality control 256, additional input for optimization of the artificial intelligence control system promoting robotic milking efficiency and dairy farm production entailing analysis, monitor, tracking and control to optimize and realize production through enhanced animal health and improved milk production.

The preferred method of the present invention advantage over prior art using automation and robotics will allow a nearly closed cycle operation, using stored thermal energy for hot and cold and other temperature inputs will reduce and potentially eliminate contamination from certain types of bacteria, additional benefit from lack of uncontrolled exposure to outside unfiltered air and associated air borne contaminants. The preferred method of the present invention advantage over prior art using automation and robotics will allow a nearly closed cycle operation, prior art used suspension hooks and conveyer belts to transfer and move product between processing zones, the preferred method of the present invention uses renewable energy to provide cooling for ice flow development, using a tray system arrangement and product suspended in a slurry to reduce spoilage and bacteria exposure.

The preferred method of the present invention uses one or more of the following methods to preserve animal based products include: A) the control of temperature using ice, refrigeration 172 or freezing, B) the control of water activity by drying and freeze-drying, C) the physical control of microbial loads through thermal heating or ionizing irradiation, D) the chemical control of microbial loads by adding essential acids, E) oxygen deprivation, such as vacuum packing or reduced oxygen content processing areas.

The preferred method of the present invention uses an effective method of preserving the freshness of product is to chill with ice by distributing ice uniformly around the product, preferably in slurry consisting of ice and water. It is a safe and highly benign method of cooling that keeps the product suspended in moisture and in easily stored forms suitable for transport. It has become widely used since the development of absorption and mechanical refrigeration, which makes ice easy and cheap to produce. Ice is produced in various shapes; crushed ice and ice flakes, plates, tubes and blocks are commonly used to cool products.

Particularly effective is when ice is used in a slurry, made from micro crystals such as those made with injection of aeration to initiate the formation of crystals of ice formed and suspended within a solution of water and a freezing point depressant, such as the addition of salt. New methods include pumpable ice technology. Pumpable ice flows like water, and because it is homogeneous, it cools the aquaculture faster than fresh water solid ice methods and eliminates freeze burns. It complies with various protocols such as HACCP and ISO food safety and public health standards, and uses less energy than conventional fresh water solid ice technologies.

The preferred method of the present invention will also reduce and potentially eliminate pests and insect type of contaminations and infestations.

The preferred method of the present invention advantage over prior art and its above problems and issues and establish biosecurity not available and not found in prior art from the inclusion of automation and robotics reduces or eliminates the above issues and others typically found with prior art facilities, practices, processes and applications. The preferred method of the present invention advantage over prior art using the above methods allows automations of biometrics, metrics and thermal analysis to isolate, monitor and track employees and guests to establish security levels of access to the facility and its food chain not available and not found in prior art farming facilities, processes or applications. The preferred method of the present invention will allow using a combination biometrics, metrics and thermal analysis for any activity within the facility. The preferred method of the present invention will scan for all motions and any thermal source whether it human or animal, so it can be monitored, charted and tracked and recorded for historical purposes or for improper entry to alert and set alarms and record activities for actionable response or legal and criminal prosecution.

The preferred method of the present invention advantage over prior art inclusion of solar thermal collection system 106, absorption cooling 121 and energy storage 110, allows a dairy farm the additional benefit from connection to thermal energy storage for the purpose of preheat or primary thermal energy input to the dairy facility for product processing and other thermal intensive applications, also allows for passive heating the facility. The preferred method of the present invention has the additional advantage versus prior art with the ability to apply cold input from cold energy storage 124 for the purpose of cooling the facility and for cold input for milk and cheese processing, transfer and storage. Additionally, the preferred method of the present invention over prior art farming facility would allow said dairy facility to do convenience food processing such as ice cream and other frozen dairy products using the onsite hot and cold thermal energy storage.

The preferred method of the present invention would reduce transportation requirements with the added ability to do processing, packaging to include dry and cold storage onsite. The preferred method of the present invention advantage over prior art inclusion of renewable energy generation and storage which would then offer the included ability to communicate recycled and recovered thermal energy for the purpose or thermal energy storage or reuse. The preferred method of the present invention advantage over prior art using absorption cooling for cold energy generation using waste thermal energy to enhance efficiency using available energy while cold energy generation for cold thermal energy intensive applications and processes. The preferred method of the present invention offers the advantage over prior art in it gains the system higher efficiency and reduces energy input requirements with inclusion of renewable energy generation and associated thermal and gas emissions processing and storage, additionally offers advantage over prior art in its ability to reduce reliance on fossil fuels and non-green energy input sources.

Prior art farming applications and processes typically were never fully or partially automated due to its inherent design and deployment flaws. The preferred method of the present invention uses metrics, biometrics and thermal imaging technologies of analysis, monitoring and control of the farming process using amalgamated with artificial intelligence and automation including robotics to reduce or eliminate injuries and enhanced uptime, productivity and enhanced volume.

The preferred method of the present invention sets forth its primary advantage and novel method over prior art above applications and processes with physically connected heat exchangers and regenerators 214 in its reclamation and recycling of waste thermal energy for use, reuse, storage and/or conversion and storage. This energy is used by thermal intensive applications such as with Stirling cycle engines which use a portion of the thermal energy for the generation of rotational energy, for use in such applications such as rotation work needed for input into a generator, pump or compressor. Waste heat recycled from this process may be used in a second level of reuse of available waste energy as thermal energy input into secondary lower heat threshold thermal intensive applications such as Stirling engine cycle 116 with a reduced temperature differential which would then use a portion of the thermal energy input for the generation of rotational energy for us in such applications such as rotation work needed for input into a generator, pump or compressor.

The present invention has additional advantage over prior art from additional applications and process cycles from remaining thermal energy and from storage to further encourage use and recycling of available energy for additional application and processes energy usage that may be added based on available input temperatures and return on investment cost versus an acceptable benefits to costs ratio, all remaining recyclable thermal energy may then be reclaimed and then communicated to appropriate temperature thermal storage systems 125, additionally thermal energy may be communicated to absorption cooling 121 to convert heat based thermal energy into cold based thermal energy to maintain a localized energy balance of available stored thermal energy. The preferred method of the present invention sets forth its primary advantage and novel method over prior art provides for normalized thermal energy balance that is essential for realized and optimized system wide use and reuse efficiencies concurrently monetizing all energy inputs for all intended applications and processes.

The preferred method of the present invention advantage over prior art using the above methods allows automations of biometrics, metrics and thermal analysis to isolate, monitor, track and sort harvested eggs for processing by size, color and quality assurance processing of good and rejection and/or removal of bad or irregular eggs from the associated egg production and packaging process, irregular eggs can be packaged as inferior products and bad eggs transferred for recycling.

The preferred method of the present invention advantage over prior art and its above problems and issues and establish biosecurity not available and not found in prior art from the inclusion of automation and robotics reduces or eliminates the above issues and others typically found with prior art facilities, practices, processes and applications. The preferred method of the present invention advantage over prior art using the above methods allows automations of biometrics, metrics and thermal analysis to isolate, monitor and track employees and guests to establish security levels of access to the facility and its food chain not available and not found in prior art farming facilities, processes or applications. The preferred method of the present invention will allow using a combination biometrics, metrics and thermal analysis for any activity within the facility. The preferred method of the present invention will scan for all motions and any thermal source whether it human or animal, so it can be monitored, charted and tracked and recorded for historical purposes or for improper entry to alert and set alarms and record activities for actionable response or legal and criminal prosecution.

The preferred method of the present invention advantage over prior art with inclusion of autonomous robotic butcher and processing system. The preferred method of the present invention advantage over prior art is with inclusion of autonomous robotic poultry plucker and cleaner. The preferred method of the present invention's advantage over prior art is with the inclusion of autonomous robotic poultry de-boner and knife which then sends product to finishing. The preferred method of the present invention advantage over prior art is with inclusion of raw poultry product processing and packaging. The preferred method of the present invention advantage over prior art is with inclusion of convenience processing consisting primarily of flavoring the poultry product, package and freezing or flavoring the poultry product, dry heat or moist heat processing, packaging and freezing.

The preferred method of the present invention advantage over prior art in using biometrics, metrics and thermal analysis gives the invention the ability to track an animal from birth to grow-out, slaughter, butchering and packaging.

The preferred method of the present invention advantage over prior art using the above methods allows automations of biometrics, metrics and thermal analysis to isolate, monitor and track specific animals, using a combination biometrics, metrics and thermal analysis for specific animals can be monitored, charted and tracked along animal lifetime, unlike prior art using tags and other mediums, the preferred method of the present invention's use of biometrics, metrics and thermal analysis allows for quick and easy identification and analyzation by artificial intelligence controlled systems for defined and individualized animal specific care plan and accompanying diet with automated responses and alterations to feeds, nutrient supplements and milking for accounting and quality control 256, additional input for and egg laying for accounting and quality control 256, additional input for automated and robotic egg harvesting efficiency to promote overall higher farming efficiency, analysis, monitor, tracking and control to optimize and realize production and animal health and for meat and egg harvesting.

The preferred method of the present invention advantage over prior art and its above problems and issues and establish biosecurity not available and not found in prior art from the inclusion of automation and robotics reduces or eliminates the above issues and others typically found with prior art facilities, practices, processes and applications. The preferred method of the present invention advantage over prior art using the above methods allows automations of biometrics, metrics and thermal analysis to isolate, monitor and track employees and guests to establish security levels of access to the facility and its food chain not available and not found in prior art farming facilities, processes or applications. The preferred method of the present invention will allow using a combination biometrics, metrics and thermal analysis for any activity within the facility. The preferred method of the present invention will scan for all motions and any thermal source whether it human or animal, so it can be monitored, charted and tracked and recorded for historical purposes or for improper entry to alert and set alarms and record activities for actionable response or legal and criminal prosecution.

The preferred method of the present invention advantage over prior art inclusion of solar thermal collection system 106, absorption cooling 121 and energy storage 110, allows a dairy farm the additional benefit from connection to thermal energy storage for the purpose of preheat or primary thermal energy input to the poultry facility for product processing thermal intensive applications, also can allows for passive heating the facility. The preferred method of the present invention has the additional advantage versus prior art with the ability to apply cold input from cold energy storage 124 for the purpose of cooling the facility and for cold input for processing, transfer and storage of processed meat and storage of processed eggs. The preferred method of the present invention would reduce transportation requirements with the added ability to do processing, packaging to include dry and cold storage onsite. The preferred method of the present invention advantage over prior art inclusion of renewable energy generation and storage which would then offer the included ability to communicate recycled and recovered thermal energy for the purpose or thermal energy storage or reuse. The preferred method of the present invention offers the advantage over prior art in it gains the system higher efficiency and reduces energy input requirements with inclusion of renewable energy generation and associated thermal and gas emissions processing and storage, additionally offers advantage over prior art in its ability to reduce reliance on fossil fuels and non-green energy input sources.

The preferred method of the present invention advantage over prior art using automation and robotics will allow a nearly closed cycle operation, using stored thermal energy for hot and cold and other temperature inputs will reduce and potentially eliminate contamination from certain types of bacteria, additional benefit from lack of uncontrolled exposure to outside unfiltered air and associated airborne contaminants. The preferred method of the present invention advantage over prior art using automation and robotics will allow a nearly closed cycle operation, prior art used suspension hooks and conveyer belts to transfer and move product between processing zones, the preferred method of the present invention uses renewable energy to provide cooling for ice flow development, using a tray system arrangement and product suspended in a slurry to reduce spoilage and bacteria exposure.

Prior art farming applications and processes typically were never fully or partially automated due to its inherent design and deployment flaws. The preferred method of the present invention uses metrics, biometrics and thermal imaging technologies of analysis, monitoring and control of the farming process using amalgamated with artificial intelligence and automation including robotics to reduce or eliminate injuries and enhanced uptime, productivity and enhanced volume.

The preferred method of the present invention sets forth its primary advantage and novel method over prior art above applications and processes with physically connected heat exchangers and regenerators 214 in its reclamation and recycling of waste thermal energy for use, reuse, storage and/or conversion and storage. This energy is used by thermal intensive applications such as with Stirling cycle engines which use a portion of the thermal energy for the generation of rotational energy, for use in such applications such as rotation work needed for input into a generator, pump or compressor. Waste heat recycled from this process may be used in a second level of reuse of available waste energy as thermal energy input into secondary lower heat threshold thermal intensive applications such as Stirling engine cycle 116 with a reduced temperature differential which would then use a portion of the thermal energy input for the generation of rotational energy for us in such applications such as rotation work needed for input into a generator, pump or compressor.

The preferred method of the present invention advantage versus prior art with inclusion of ULTRAGRID™ can provide analysis, monitoring and control of any and all available energy and potential energy needs for mission critical reliability with on demand or as needed basis.

The present invention has additional advantage over prior art from additional applications and process cycles from remaining thermal energy and from storage to further encourage use and recycling of available energy for additional application and processes energy usage that may be added based on available input temperatures and return on investment cost versus an acceptable benefits to costs ratio, all remaining recyclable thermal energy may then be reclaimed and then communicated to appropriate temperature thermal storage systems 125, additionally thermal energy may be communicated to absorption cooling 121 to convert heat based thermal energy into cold based thermal energy to maintain a localized energy balance of available stored thermal energy. The preferred method of the present invention sets forth its primary advantage and novel method over prior art provides for normalized thermal energy balance that is essential for realized and optimized system wide use and reuse efficiencies concurrently monetizing all energy inputs for all intended applications and processes.

The preferred method of the present invention advantage over prior art using the above methods allows automations of biometrics, metrics and thermal analysis to isolate, monitor and track specific animals, using a combination biometrics, metrics and thermal analysis for specific animals can be monitored, charted and tracked along animal lifetime, unlike prior art using tags and other mediums, the preferred method of the present invention's use of biometrics, metrics and thermal analysis allows for quick and easy identification and analyzation by artificial intelligence controlled systems for defined and individualized animal specific care plan and accompanying diet with automated responses and alterations to feeds, nutrient supplements for growth and health accounting and quality control 256, additional input for reproduction and calving operations accounting and quality control 256, additional input for automated and slaughter and meat processing efficiency to promote overall higher farming efficiency, analysis, monitor, tracking and control to optimize and realize meat production and animal health and for meat processing.

The preferred method of the present invention advantage over prior art and its above problems and issues and establish biosecurity not available and not found in prior art from the inclusion of automation and robotics reduces or eliminates the above issues and others typically found with prior art facilities, practices, processes and applications. The preferred method of the present invention advantage over prior art using the above methods allows automations of biometrics, metrics and thermal analysis to isolate, monitor and track employees and guests to establish security levels of access to the facility and its food chain not available and not found in prior art farming facilities, processes or applications. The preferred method of the present invention will allow using a combination biometrics, metrics and thermal analysis for any activity within the facility. The preferred method of the present invention will scan for all motions and any thermal source whether it human or animal, so it can be monitored, charted and tracked and recorded for historical purposes or for improper entry to alert and set alarms and record activities for actionable response or legal and criminal prosecution.

The preferred method of the present invention advantage over prior art using the above methods allows automations of biometrics, metrics and thermal analysis to isolate, monitor, track cows and pigs for quality assurance processing of healthy animals and rejection and/or removal of unhealthy animals to separate from further issues and potential contaminations.

The preferred method of the present invention advantage over prior art with inclusion of autonomous robotic butcher and processing system. The preferred method of the present invention advantage over prior art is with inclusion of autonomous robotic cow or pig slaughter processing and cleaner. The preferred method of the present invention's advantage over prior art is with inclusion of autonomous robotic cow or pig butcher and knife which then sends product to finishing. The preferred method of the present invention advantage over prior art is with inclusion of raw beef or pork product processing and packaging. The preferred method of the present invention advantage over prior art is with inclusion of convenience processing consisting primarily of flavoring the beef or pork product, package and freezing or flavoring the beef or pork product, dry heat or moist heat processing, packaging and then freezing.

The preferred method of the present invention advantage over prior art in using biometrics, metrics and thermal analysis gives the invention the ability to track an animal from birth to grow out, slaughter, butchering and packaging.

The preferred method of the present invention advantage over prior art using the above methods allows automations of biometrics, metrics and thermal analysis to isolate, monitor and track specific animals, using a combination biometrics, metrics and thermal analysis for specific animals can be monitored, charted and tracked along animal lifetime, unlike prior art using tags and other mediums, the preferred method of the present invention's use of biometrics, metrics and thermal analysis allows for quick and easy identification and analyzation by artificial intelligence controlled systems for defined and individualized animal specific care plan and accompanying diet with automated responses and alterations to feeds, nutrient supplements and milking for accounting and quality control 256, additional input for and egg laying for accounting and quality control 256, additional input for automated and robotic egg harvesting efficiency to promote overall higher farming efficiency, analysis, monitor, tracking and control to optimize and realize production and animal health and for meat and egg harvesting.

The preferred method of the present invention advantage over prior art inclusion of solar thermal collection system 106, absorption cooling 121 and energy storage 110, allows an animal farm the additional benefit from connection to thermal energy storage for the purpose of preheat or primary thermal energy input to the poultry facility for product processing thermal intensive applications, also can allows for passive heating the facility. The preferred method of the present invention has the additional advantage versus prior art with the ability to apply cold input from cold energy storage 124 for the purpose of cooling the facility and for cold input for processing, transfer and storage of processed meat and storage of processed eggs. The preferred method of the present invention would reduce transportation requirements with the added ability to do processing, packaging to include dry and cold storage onsite. The preferred method of the present invention advantage over prior art inclusion of renewable energy generation and storage which would then offer the included ability to communicate recycled and recovered thermal energy for the purpose or thermal energy storage or reuse. The preferred method of the present invention offers the advantage over prior art in it gains the system higher efficiency and reduces energy input requirements with inclusion of renewable energy generation and associated thermal and gas emissions processing and storage, additionally offers advantage over prior art in its ability to reduce reliance on fossil fuels and non-green energy input sources.

The preferred method of the present invention advantage over prior art using automation and robotics will allow a nearly closed cycle operation, using stored thermal energy for hot and cold and other temperature inputs will reduce and potentially eliminate contamination from certain types of bacteria, additional benefit from lack of uncontrolled exposure to outside unfiltered air and associated air home contaminants. The preferred method of the present invention advantage over prior art using automation and robotics will allow a nearly closed cycle operation, prior art used suspension hooks and conveyer belts to transfer and move product between processing zones, the preferred method of the present invention uses renewable energy to provide cooling for ice flow development, using a tray system arrangement and product suspended in a slurry to reduce spoilage and bacteria exposure.

Prior art farming applications and processes typically were never fully or partially automated due to its inherent design and deployment flaws. The preferred method of the present invention uses metrics, biometrics and thermal imaging technologies of analysis, monitoring and control of the farming process using amalgamated with artificial intelligence and automation including robotics to reduce or eliminate injuries and enhanced uptime, productivity and enhanced volume.

The preferred method of the present invention sets forth its primary advantage and novel method over prior art above applications and processes with physically connected heat exchangers and regenerators 214 in its reclamation and recycling of waste thermal energy for use, reuse, storage and/or conversion and storage. This energy is used by thermal intensive applications such as with Stirling cycle engines which use a portion of the thermal energy for the generation of rotational energy, for use in such applications such as rotation work needed for input into a generator, pump or compressor. Waste heat recycled from this process may be used in a second level of reuse of available waste energy as thermal energy input into secondary lower heat threshold thermal intensive applications such as Stirling engine cycle 116 with a reduced temperature differential which would then use a portion of the thermal energy input for the generation of rotational energy for us in such applications such as rotation work needed for input into a generator, pump or compressor.

The preferred method of the present invention advantage versus prior art with inclusion of ULTRAGRID™ can provide analysis, monitoring and control of any and all available energy and potential energy needs for mission critical reliability with on demand or as needed basis.

The present invention has additional advantage over prior art from additional applications and process cycles from remaining thermal energy and from storage to further encourage use and recycling of available energy for additional application and processes energy usage that may be added based on available input temperatures and return on investment cost versus an acceptable benefits to costs ratio, all remaining recyclable thermal energy may then be reclaimed and then communicated to appropriate temperature thermal storage systems 125, additionally thermal energy may be communicated to absorption cooling 121 to convert heat based thermal energy into cold based thermal energy to maintain a localized energy balance of available stored thermal energy. The preferred method of the present invention sets forth its primary advantage and novel method over prior art provides for normalized thermal energy balance that is essential for realized and optimized system wide use and reuse efficiencies concurrently monetizing all energy inputs for all intended applications and processes.

The preferred method of the present invention advantage over prior art using the above methods allows automations of biometrics, metrics and thermal analysis to isolate, monitor and track specific animals, using a combination biometrics, metrics and thermal analysis for specific animals can be monitored, charted and tracked along aquatic species lifetime, unlike prior art using tags and other mediums, the preferred method of the present invention's use of biometrics, metrics and thermal analysis allows for quick and easy identification and analyzation by artificial intelligence controlled systems for defined and individualized animal specific care plan and accompanying diet with automated responses and alterations to feeds, nutrient supplements for growth and health accounting and quality control 256, additional input for breeding, reproduction and hatchery operations accounting and quality control 256, additional input for automated and slaughter and meat processing efficiency to promote overall higher farming efficiency, analysis, monitor, tracking and control to optimize and realize meat production and animal health and for meat processing.

The preferred method of the present invention advantage over prior art and its above problems and issues and establish biosecurity not available and not found in prior art from the inclusion of automation and robotics reduces or eliminates the above issues and others typically found with prior art facilities, practices, processes and applications. The preferred method of the present invention advantage over prior art using the above methods allows automations of biometrics, metrics and thermal analysis to isolate, monitor and track employees and guests to establish security levels of access to the facility and its food chain not available and not found in prior art farming facilities, processes or applications. The preferred method of the present invention will allow using a combination biometrics, metrics and thermal analysis for any activity within the facility. The preferred method of the present invention will scan for all motions and any thermal source whether it human or animal, so it can be monitored, charted and tracked and recorded for historical purposes or for improper entry to alert and set alarms and record activities for actionable response or legal and criminal prosecution.

The preferred method of the present invention allows minimal human exposure and personal contact within the facility, therefore reduces bacteria and potential viral communication to all processing and byproduct processing, convenience processing, packaging and storage within the facility.

The preferred method of the present invention advantage over prior art and including its above problems and issues, the present invention will establish localized slaughter facility and processing with the inclusion localized renewable energy, energy storage 110, energy recovery and recycling of waste energy, use of automation and robotics reduces or eliminates the above issues and others typically found with prior art facilities, practices, processes and applications. The preferred method of the present invention advantage with inclusion onsite automation and robotics providing processing and convenience food preparation, product finishing with dry or moist heat, freezing and packaging and opens new vertical markets and product lines with additional advantage of its reduced bacterial and contamination exposure, automated and robotic workforce allows reduced facility temperatures to near freezing to retard and reduce bacterial grow versus prior art disadvantages with human workforce prone with injury causing repetitive actions, dangerous interaction with knives and slippery cutting surfaces and floors, allowed human contact and human carried contaminations.

The preferred method of the present invention allows minimal human exposure and personal contact within the facility, therefore reduces bacteria and potential viral communication to all processing and byproduct processing, convenience processing, packaging and storage within the facility, this reduced regulatory burdens while enhancing financial viability.

Prior art farming applications and processes typically were never fully or partially automated due to its inherent design and deployment flaws. The preferred method of the present invention uses metrics, biometrics and thermal imaging technologies of analysis, monitoring and control of the farming process using amalgamated with artificial intelligence and automation including robotics to reduce or eliminate injuries and enhanced uptime, productivity and enhanced volume.

The preferred method of the present invention sets forth its primary advantage and novel method over prior art above applications and processes with physically connected heat exchangers and regenerators 214 in its reclamation and recycling of waste thermal energy for use, reuse, storage and/or conversion and storage. This energy is used by thermal intensive applications such as with Stirling cycle engines which use a portion of the thermal energy for the generation of rotational energy, for use in such applications such as rotation work needed for input into a generator, pump or compressor. Waste heat recycled from this process may be used in a second level of reuse of available waste energy as thermal energy input into secondary lower heat threshold thermal intensive applications such as Stirling engine cycle 116 with a reduced temperature differential which would then use a portion of the thermal energy input for the generation of rotational energy for us in such applications such as rotation work needed for input into a generator, pump or compressor.

The present invention primarily extends the ability to incorporate and integrate additional industries and its associated processes and applications within the suite of ULTRAGRID™ 194 capabilities and amalgamated with a hybrid solution to form a symbiotic sustainable system unification melded with artificial intelligence and machine learning based automation of processes and applications monitoring, analysis, and control in combination with a robotic based automation solution and powered with renewable energy components.

The operation of the unit is extremely cost efficient. Changes may be made in the nature, composition, operation and arrangement of the various elements, steps and procedures described herein without departing from the spirit and scope of the invention as defined in the included claims. The present invention recognizes that there are potential problems and/or disadvantages in the above-discussed way of providing energy for an energy generation and energy storage system 110. A related potential problem is the potential threat to the global warming of the Earth's climate. Various embodiments of the present invention may be advantageous in that they may solve in its entirety or reduce to a certain degree of one or more of the potential problems and/or disadvantages discussed above.

Thermal energy to electrical and thermal energy on demand for thermal intensive applications integration allows timely and responsive energy generation capabilities to respond to heavy baseline load requirements and needs based on smart grid communications 192. ULTRAGRID™ 194 system integration allows fast interaction of energy systems for maximum power availability and flexibility to handle all system needs and energy requirements. This integration extends the compatibility and usability into additional initial end user product design and manufacturing. Thus, the present invention has been described in an illustrative manner. It is to be understood that the terminology that has been used is intended to be in the nature of words of description rather than of limitation. Consequently, features specified in one section may be combined with features specified in other sections, as appropriate. Many modifications and variations of the present invention are possible in light of the above teachings.

The foregoing descriptions of various embodiments have been presented only for purposes of illustration and description. They are not intended to be exhaustive or to limit the present invention to the forms disclosed. Accordingly, many modifications and variations of the present invention are possible in light of the above teachings will be apparent to practitioners skilled in the art. Additionally, the above disclosure is not intended to limit the present invention. In the specification and claims the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g. attached, adhered, joined) are to be construed broadly and may include intermediate members between a connection of elements and relative movement between elements. As such, joinder references do not necessarily infer that two elements are directly connected and in fixed relation to each other. Moreover, network connection references are to be construed broadly and may include intermediate members or devices between network connections of elements. As such, network connection references do not necessarily infer that two elements are in direct communication with each other. In some instances, in methodologies directly or indirectly set forth herein, various steps and operations are described in one possible order of operation, but those skilled in the art will recognize that steps and operations may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to the embodiments outlined above, various alternatives, modifications, variations, improvements and/or substantial equivalents, whether known or that are or may be presently foreseen, may become apparent to those having at least ordinary skill in the art. Listing the steps of a method in a certain order does not constitute any limitation on the order of the steps of the method. Accordingly, the embodiments of the invention set forth above are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements and/or substantial equivalents.

The invention claimed is:

1. A process for desalination and byproduct processing utilizing renewable thermal energy input comprising:
   a) Utilizing thermal energy converted to at least one of rotational work and electricity for at least one sub-process and module;
   b) Input of recycled brine solution to at least one evaporator module;
   c) Input of pre-heat and heat thermal energy to said at least one evaporator module;
   d) Recovering waste heat from said at least one evaporator module using at least one waste-heat recovery loop;
   e) Wherein said at least one byproduct from said at least one evaporator module is input to at least one vacuum evaporation module;
   f) Combining said at least one byproduct from said at least one evaporator module transferred to said at least one vacuum evaporation module with raw materials and thermal energy input;
   g) Recovering waste heat from said vacuum evaporation module using at least one waste-heat recovery loop;
   h) Processing materials from said at least one vacuum evaporation module through at least one camalite crystallization module;
   i) Wherein byproduct from said at least one camalite crystallization module is processed through at least one of a bromide stripper and absorber module and a leaching module;
   j) Wherein materials from said leaching module are processed through at least one filter-dehydrator module;
   k) Wherein materials from said at least one filter-dehydrator module are processed through at least one hydrator-electrolyzer module;
   l) Wherein materials from said at least one camalite crystallization module transferred to at least one bromide stripper and absorber module are combined with raw materials and thermal energy input;
   m) Recovering waste heat from said at least one bromide stripper and absorber module using at least one waste-heat loop;
   n) Processing materials from said at least one bromide stripper and absorber module to at least one of a distillation module and precipitation module;
   o) Processing materials from said distillation module to a bromide production module;
   p) Wherein materials from said at least one bromide stripper and absorber module transferred to at least one precipitation module are combined with raw materials and thermal energy input;
   q) Recovering waste heat from said at least one precipitation module using at least one waste-heat loop;
   r) Processing materials from said at least one precipitation module to at least one filter-washing module;

s) Processing materials from said at least one filter-washing module to at least one of a dryer module and ammonia loop module; and t) Wherein said at least one ammonia loop module transfers materials back to said at least one precipitation module.

2. The process of claim 1 wherein said input thermal energy is from recycled waste heat loops thermal energy.

3. The process of claim 1 wherein said recycled brine solution cycled through at least one evaporator module produces at least one byproduct of gypsum, crude salt, and high-heat retaining solar salt.

4. The process of claim 3 wherein said crude salt is further processed through at least one washing-iodization module to produce rock salt.

5. The process of claim 1 wherein said at least one vacuum evaporation module produces at least one byproduct of potassium hydroxide, chlorine, and evaporated salt.

6. The process of claim 1 wherein potassium chloride is extracted from at least one byproduct of said filter-dehydrator module.

7. The process of claim 1 wherein magnesium hydroxide is extracted from said at least one of a dryer module and ammonia loop module.

8. A process to produce cement from renewable thermal energy input comprising:
   a) Utilizing thermal energy converted to at least one of rotational work and electricity for at least one sub-process and module;
   b) Input of at least one of ash, lime, carbon, magnesium oxide and gypsum to a kiln;
   c) Input of pre-heat and heat thermal energy to said kiln;
   d) Recovering waste heat from said kiln using at least one waste-heat recovery loop;
   e) Processing materials from said kiln to a klinker and inputting further pre-heat and heat energy to said klinker;
   f) Recovering waste heat from said klinker using said at least one waste-heat recovery loop;
   g) Processing materials from said klinker to a cement mill and inputting further pre-heat and heat energy to said cement mill;
   h) Recovering waste heat from said cement mill using said at least one waste-heat recovery loop;
   i) Processing materials from said cement mill to an intermixing module and inputting further pre-heat and heat energy to said intermixing module;
   j) Recovering waste heat from said intermixing module using said at least one waste-heat recovery loop;
   k) Processing materials from said intermixing module to a cement product finalization module and inputting further pre-heat and heat energy to said cement product finalization module; and
   i) Recovering waste heat from said cement product finalization module using said at least one waste-heat recovery loop.

9. A process to produce cast iron from renewable thermal energy input comprising:
   a) Utilizing thermal energy converted to at least one of rotational work and electricity for at least one sub-process and module;
   b) Input of at least one of iron, steel, carbon, and silicon to a blast furnace;
   c) Input of pre-heat and heat thermal energy to said blast furnace;
   d) Recovering waste heat from said blast furnace using at least one waste-heat recovery loop;
   e) Processing materials from said blast furnace to an alloy mixing and induction module and inputting further pre-heat and heat energy to said alloy mixing and induction module;
   f) Recovering waste heat from said alloy mixing and induction module using said at least one waste-heat recovery loop;
   g) Processing materials from said alloy mixing and induction module to a spheroidizing module and inputting further pre-heat and heat energy to said spheroidizing module;
   h) Recovering waste heat from said spheroidizing module using said at least one waste-heat recovery loop;
   i) Processing materials from said spheroidizing module to a casting and annealing module and inputting further pre-heat and heat energy to said casting and annealing module;
   j) Recovering waste heat from said casting and annealing module using said at least one waste-heat recovery loop;
   k) Processing materials from said casting and annealing module to a cast iron product finalization module and inputting further pre-heat and heat energy to said cast iron product finalization module; and
   l) Recovering waste heat from said cast iron product finalization module using said at least one waste-heat recovery loop.

10. A process to produce plastics from renewable thermal energy input comprising:
    a) Utilizing thermal energy converted to at least one of rotational work and electricity for at least one sub-process and module;
    b) Input of base materials to a resin processor;
    c) Input of pre-heat and heat thermal energy to said resin processor;
    d) Recovering waste heat from said resin processor using at least one waste-heat recovery loop;
    e) Processing materials from said resin processor to a furnace and inputting further pre-heat and heat energy to said furnace;
    f) Recovering waste heat from said furnace using said at least one waste-heat recovery loop;
    g) Processing materials from said furnace to an oven and press module and inputting further pre-heat and heat energy to said oven and press module;
    h) Recovering waste heat from said oven and press module using said at least one waste-heat recovery loop;
    i) Processing materials from said oven and press module to a mold and casting module and inputting further pre-heat and heat energy to said mold and casting module;
    j) Recovering waste heat from said mold and casting module using said at least one waste-heat recovery loop;
    k) Processing materials from said mold and casting module to a plastic product finalization module and inputting further pre-heat and heat energy to said plastic product finalization module; and
    l) Recovering waste heat from said plastic product finalization module using said at least one waste-heat recovery loop.

11. A process to produce bio-plastics from renewable thermal energy input comprising:
    a) Utilizing thermal energy converted to at least one of rotational work and electricity for at least one sub-process and module;

b) Input of base materials to a carbon dioxide catalyst;
c) Input of pre-heat and heat thermal energy to said carbon dioxide catalyst;
d) Recovering waste heat from said carbon dioxide catalyst using at least one waste-heat recovery loop;
e) Processing materials from said carbon dioxide catalyst to a furnace and inputting further pre-heat and heat energy to said furnace;
f) Recovering waste heat from said furnace using said at least one waste-heat recovery loop;
g) Processing materials from said furnace to an oven and press module and inputting further pre-heat and heat energy to said oven and press module;
h) Recovering waste heat from said oven and press module using said at least one waste-heat recovery loop;
i) Processing materials from said oven and press module to a mold and casting module and inputting further pre-heat and heat energy to said mold and casting module;
j) Recovering waste heat from said mold and casting module using said at least one waste-heat recovery loop;
k) Processing materials from said mold and casting module to a plastic product finalization module and inputting further pre-heat and heat energy to said plastic product finalization module; and
l) Recovering waste heat from said plastic product finalization module using said at least one waste-heat recovery loop.

12. A process to produce carbon fiber from renewable thermal energy input comprising:
a) Utilizing thermal energy converted to at least one of rotational work and electricity for at least one sub-process and module;
b) Input of base materials to at least one stretch process module and melt and spin module;
c) Input of pre-heat and heat thermal energy to said at least one stretch process module and melt and spin module;
d) Recovering waste heat from said at least one stretch process module and melt and spin module using at least one waste-heat recovery loop;
e) Processing materials from said at least one stretch process module and melt and spin module to a thermoset module and inputting further pre-heat and heat energy to said furnace;
f) Recovering waste heat from said thermoset module using said at least one waste-heat recovery loop;
g) Processing materials from said thermoset module to a carbonize and graphitize module and inputting further pre-heat and heat energy to said module;
h) Recovering waste heat from said carbonize and graphitize module using said at least one waste-heat recovery loop;
i) Processing materials from said carbonize and graphitize module to a surface treatment and epoxy sizing module and inputting further pre-heat and heat energy to said module;
j) Recovering waste heat from said surface treatment and epoxy sizing module using said at least one waste-heat recovery loop;
k) Processing materials from said surface treatment and epoxy sizing module to a carbon fiber product finalization module and inputting further pre-heat and heat energy to said carbon fiber product finalization module; and
l) Recovering waste heat from said carbon fiber product finalization module using said at least one waste-heat recovery loop.

13. A process to produce brick and block products from renewable thermal energy input comprising:
a) Utilizing thermal energy converted to at least one of rotational work and electricity for at least one sub-process and module;
b) Input of base materials to at least one brick and block machine;
c) Input of pre-heat and heat thermal energy to said at least one brick and block machine;
d) Recovering waste heat from said at least one brick and block machine using at least one waste-heat recovery loop;
e) Processing materials from said at least brick and block machine to a holding room and inputting further pre-heat and heat energy to said holding room;
f) Recovering waste heat from said holding room using said at least one waste-heat recovery loop;
g) Processing materials from said holding room to a tunnel dryer and inputting further pre-heat and heat energy to said module;
h) Recovering waste heat from said tunnel dryer using said at least one waste-heat recovery loop;
i) Processing materials from said tunnel dryer to a tunnel kiln and inputting further pre-heat and heat energy to said module;
j) Recovering waste heat from said tunnel kiln using said at least one waste-heat recovery loop;
k) Processing materials from said tunnel kiln to a brick and block product finalization module and inputting further pre-heat and heat energy to said brick and block product finalization module; and
l) Recovering waste heat from said brick and block product finalization module using said at least one waste-heat recovery loop.

14. A process to produce aluminum from renewable thermal energy input comprising:
a) Utilizing thermal energy converted to at least one of rotational work and electricity for at least one sub-process and module;
b) Input of base materials to at least one process separation module and ore refining module;
c) Input of pre-heat and heat thermal energy to said at least one process separation module and ore refining module;
d) Recovering waste heat from said at least one process separation module and ore refining module using at least one waste-heat recovery loop;
e) Processing materials from said at least one process separation module and ore refining module to at least one anode plant module and bath treatment module and inputting further pre-heat and heat energy to said at least one anode plant module and bath module;
f) Recovering waste heat from said at least one anode plant module and bath treatment module using said at least one waste-heat recovery loop;
g) Processing materials from said at least one anode plant module to an anode furnace module and inputting further pre-heat and heat energy to said module;
h) Recovering waste heat from said anode furnace module using said at least one waste-heat recovery loop;
i) Processing materials from said anode furnace module to a rodding shop module and inputting further pre-heat and heat energy to said module;

j) Recovering waste heat from said rodding shop module using said at least one waste-heat recovery loop;
k) Processing materials from said at least one rodding shop module and bath treatment module to an electrolysis/potliners module and inputting further pre-heat and heat energy to said module;
l) Recovering waste heat from said electrolysis/potliners module using said at least one waste-heat recovery loop;
m) Processing materials from said electrolysis/potliners module to an aluminum casting module and inputting further pre-heat and heat energy to said module;
n) Recovering waste heat from said aluminum casting module using said at least one waste-heat recovery loop;
o) Processing materials from said aluminum casting module to an aluminum product finalization module and inputting further pre-heat and heat energy to said module; and
p) Recovering waste heat from said aluminum product finalization module using said at least one waste-heat recovery loop.

15. A process to produce steel from renewable thermal energy input comprising:
   a) Utilizing thermal energy converted to at least one of rotational work and electricity for at least one sub-process and module;
   b) Input of base materials to at least one blast furnace and electric arc furnace;
   c) Input of pre-heat and heat thermal energy to said at least one blast furnace and electric arc furnace;
   d) Recovering waste heat from said at least one blast furnace and electric arc furnace using at least one waste-heat recovery loop;
   e) Processing materials from said at least one blast furnace and electric arc furnace to a continuous caster module and inputting further pre-heat and heat energy to said module;
   f) Recovering waste heat from said continuous caster module using said at least one waste-heat recovery loop;
   g) Processing materials from said continuous caster module to a hot rolling line and inputting further pre-heat and heat energy to said module;
   h) Recovering waste heat from said hot rolling line using said at least one waste-heat recovery loop;
   i) Processing materials from said hot rolling line to a cold rolling line and inputting further pre-heat and heat energy to said module;
   j) Recovering waste heat from said cold rolling line using said at least one waste-heat recovery loop;
   k) Processing materials from said cold rolling line to at least one hot dipping line and electro galvanizing line and inputting further pre-heat and heat energy to said at least one hot dipping line and electro galvanizing line; and
   l) Recovering waste heat from said at least one hot dipping line and electro galvanizing line using said at least one waste-heat recovery loop.

16. A process to produce ethanol from renewable thermal energy input comprising:
   a) Utilizing thermal energy converted to at least one of rotational work and electricity for at least one sub-process and module;
   b) Input of at least one of corn, stover, residues, bacteria, enzymes, carbon dioxide, nutrients, light, and oxygen to at least one of a sugar module and photobioreactor and phytoplankton module;
   c) Input of pre-heat and heat thermal energy to said at least one of a sugar module and photobioreactor and phytoplankton module;
   d) Recovering waste heat from said at least one of a sugar module and photobioreactor and phytoplankton module using at least one waste-heat recovery loop;
   e) Processing materials from said at least one of a sugar module and photobioreactor and phytoplankton module to at least one of a ferment and carbon dioxide recovery module and bioreactor with zooplankton and inputting further pre-heat and heat energy to said at least one of a ferment and carbon dioxide recovery module and bioreactor with zooplankton;
   f) Recovering waste heat from said at least one of a ferment and carbon dioxide recovery module and bioreactor with zooplankton using said at least one waste-heat recovery loop;
   g) Processing materials from said at least one of a ferment and carbon dioxide recovery module and bioreactor with zooplankton to at least one of a distiller module and biomaterial dehydrator module and inputting further pre-heat and heat energy to said at least one of a distiller module and biomaterial dehydrator module;
   h) Recovering waste heat from said at least one of a distiller module and biomaterial dehydrator module using said at least one waste-heat recovery loop;
   i) Processing materials from said at least one of a distiller module and biomaterial dehydrator module to at least one of a molecular sieve module and mill module and inputting further pre-heat and heat energy to said at least one of a molecular sieve module and mill module;
   j) Recovering waste heat from said at least one of a molecular sieve module and mill module using said at least one waste-heat recovery loop;
   k) Processing materials from said at least one of a molecular sieve module and mill module to an ethanol product finalization module and inputting further pre-heat and heat energy to said module; and
   l) Recovering waste heat from said ethanol product finalization module using said at least one waste-heat recovery loop.

17. A process for pyrolysis from renewable thermal energy input comprising:
   a) Utilizing thermal energy converted to at least one of rotational work and electricity for at least one sub-process and module;
   b) Input of base, bio-mass materials to a pretreatment dry and grind module;
   c) Input of pre-heat and heat thermal energy to said pretreatment dry and grind module;
   d) Recovering waste heat from said pretreatment dry and grind module using at least one waste-heat recovery loop;
   e) Processing materials from said pretreatment dry and grind module to a pyrolyzer and inputting further pre-heat and heat energy to said pyrolyzer;
   f) Recovering waste heat from said pyrolyzer using said at least one waste-heat recovery loop;
   g) Processing materials from said pyrolyzer to a separator and inputting further pre-heat and heat energy to said separator;
   h) Recovering waste heat from said separator using said at least one waste-heat recovery loop;

i) Processing materials from said separator to a condenser and inputting further pre-heat and heat energy to said condenser;
j) Recovering waste heat from said condenser using said at least one waste-heat recovery loop;
k) Processing materials from said condenser to at least one of a cryo-distillation module and pressure swing absorption module with output gases and inputting further pre-heat and heat energy to said modulo; and
l) Recovering waste heat from said at least one of said cryo-distillation module and pressure swing absorption module with output gases using said at least one waste-heat recovery loop.

18. The process of claim 17 wherein said separator further produces solid by products of at least one of bio-char and coke.

19. The process of claim 17 wherein said condenser further produces liquid bio-oils that may be further condensed and separator using a pre-heat, heat, and heat-recovery system to further refine said liquid bio-oils.

* * * * *